(12) United States Patent
Toutov et al.

(10) Patent No.: US 12,474,168 B2
(45) Date of Patent: Nov. 18, 2025

(54) USING A MAGNETIC RECORDING FOR AUTHENTICATION

(71) Applicant: Astra Navigation, Inc., Escondido, CA (US)

(72) Inventors: Alexandre Toutov, Kingston (CA); Anton Toutov, Magnolia, TX (US); Oleksiy Lutsyk, Inowroclaw (PL); Svitlana Ilnytska, Kingston (CA)

(73) Assignee: Astra Navigation, Inc., Escondido, CA (US)

( * ) Notice: Subject to any disclaimer, the term of this patent is extended or adjusted under 35 U.S.C. 154(b) by 0 days.

(21) Appl. No.: 18/939,880

(22) Filed: Nov. 7, 2024

(65) Prior Publication Data

US 2025/0071512 A1 Feb. 27, 2025

Related U.S. Application Data

(63) Continuation of application No. 18/795,375, filed on Aug. 6, 2024.

(Continued)

(51) Int. Cl.
*G01C 21/08* (2006.01)
*G01C 21/00* (2006.01)
(Continued)

(52) U.S. Cl.
CPC ............ *G01C 21/08* (2013.01); *G01C 21/005* (2013.01); *G01R 17/04* (2013.01);
(Continued)

(58) Field of Classification Search
CPC ... H04W 4/022; G01R 17/04; G01R 33/0029; G01R 33/10
(Continued)

(56) References Cited

U.S. PATENT DOCUMENTS

| 4,995,165 A | 2/1991 | Daniels |
| 2009/0088974 A1 | 4/2009 | Yasan et al. |

(Continued)

FOREIGN PATENT DOCUMENTS

| CN | 101867868 | 10/2010 |
| KR | 20180072914 A | 7/2018 |

(Continued)

OTHER PUBLICATIONS

Angelis, et al., An Experimental System for Tightly Coupled Integration of GPS and AC Magnetic Positioning, IEEE Transactions on Instrumentation and Measurement, vol. 65, No. 5, pp. 1232-1241, May 2016.

(Continued)

*Primary Examiner* — Christopher P Mcandrew

(57) ABSTRACT

In one embodiment, a method includes accessing a first series of first magnetic values that represents a first magnetic recording that includes a first set of first magnetic measurements. Each of the first magnetic values represents one of the first magnetic measurements. The method includes accessing a second series of second magnetic values that represents a second magnetic recording that includes a second set of second magnetic measurements. Each of the second magnetic values represents one of the second magnetic measurements. The method includes approximately aligning the first and second series with each other; calculating a difference between the first and second series as aligned with each other; and determining a similarity between the first and second series based on the difference.

30 Claims, 72 Drawing Sheets

Related U.S. Application Data

(60) Provisional application No. 63/531,316, filed on Aug. 8, 2023.

(51) Int. Cl.
    *G01R 17/04* (2006.01)
    *G01R 33/00* (2006.01)
    *G01R 33/02* (2006.01)
    *G01R 33/10* (2006.01)
    *G01S 19/07* (2010.01)
    *H04W 4/021* (2018.01)
    *H04W 12/06* (2021.01)
    *H04W 12/63* (2021.01)

(52) U.S. Cl.
CPC ......... *G01R 33/0029* (2013.01); *G01R 33/02* (2013.01); *G01R 33/10* (2013.01); *G01S 19/07* (2013.01); *H04W 4/022* (2013.01); *H04W 12/06* (2013.01); *H04W 12/63* (2021.01)

(58) Field of Classification Search
USPC ........................................................ 324/331
See application file for complete search history.

(56) References Cited

U.S. PATENT DOCUMENTS

| | | | |
|---|---|---|---|
| 2009/0150457 | A1 | 6/2009 | Nakamura et al. |
| 2013/0279543 | A1 | 10/2013 | Torimoto et al. |
| 2014/0029136 | A1 | 1/2014 | Sugii |
| 2014/0129136 | A1 | 5/2014 | Celia |
| 2015/0198722 | A1 | 7/2015 | Ben-Akiva et al. |
| 2016/0084659 | A1 | 3/2016 | Yang et al. |
| 2016/0116290 | A1 | 4/2016 | Haverinen et al. |
| 2016/0187142 | A1 | 6/2016 | Larsen et al. |
| 2016/0202064 | A1 | 7/2016 | Haverinen |
| 2017/0102467 | A1 | 4/2017 | Nielsen et al. |
| 2017/0299724 | A1 | 10/2017 | Hsu et al. |
| 2018/0283048 | A1 | 10/2018 | Hage et al. |
| 2018/0283882 | A1 | 10/2018 | He et al. |
| 2019/0128673 | A1 | 5/2019 | Faragher et al. |
| 2019/0277638 | A1 | 9/2019 | Larsen |
| 2019/0335983 | A1* | 11/2019 | Duan ................ G01R 33/0206 |
| 2019/0377035 | A1* | 12/2019 | Nakamura ............ A61B 5/242 |
| 2020/0103477 | A1 | 4/2020 | Berkovich et al. |
| 2020/0264316 | A1 | 8/2020 | Langstraat et al. |
| 2020/0293508 | A1 | 9/2020 | Tan et al. |
| 2020/0319267 | A1* | 10/2020 | Ashe ...................... A61B 34/20 |
| 2020/0400762 | A1* | 12/2020 | Ellis, Jr. ................. G06V 20/80 |
| 2021/0141034 | A1* | 5/2021 | Sharma .................. A61B 5/062 |
| 2021/0231751 | A1* | 7/2021 | Okatake ................. G01R 33/09 |
| 2021/0286023 | A1* | 9/2021 | Okatake ............... G01R 33/098 |
| 2021/0386315 | A1* | 12/2021 | Anderson ......... A61M 25/0127 |
| 2022/0026212 | A1 | 1/2022 | Toutov et al. |
| 2022/0128365 | A1 | 4/2022 | Berkovich et al. |
| 2023/0079876 | A1* | 3/2023 | Hinke ................. E21B 47/0228 175/24 |

FOREIGN PATENT DOCUMENTS

| | | |
|---|---|---|
| KR | 1020230114143 A | 8/2023 |
| WO | 2021067140 A1 | 4/2021 |

OTHER PUBLICATIONS

Ashraf, et al., Floor Identification Using Magnetic Field Data with Smartphone Sensors, www.mdpi.com/journal/sensors, Jun. 3, 2019.

Canciani, et al., Absolute Positioning Using The Earth's Magnetic Anomaly Field, Air Force Institute of Technology, Sep. 2016.

Canciani, et al., Magnetic Navigation, Air Force Institute of Technology.

Chen, et al., Quantum Physicists Found a New, Safer Way to Navigate, https://www.wired.com/story/quantum-physicists-found-a-new-safer-way-to-navigate/, Nov. 1, 2018.

Hernandez, et al., Steering Control of Automated Vehicles Using Absolute Positioning GPS and Magnetic Markers, IEEE Transactions on Vehicular Technology, vol. 52, No. 1, pp. 150-161, Jan. 2003.

Indooratlas, et al., Last meter accuracy through technology fusion, https://www.indooratlas.com/positioning-technology/, 2021.

Kim, et al., Indoor positioning system using geomagnetic anomalies for smartphones, International Conference on Indoor Positioning and Indoor Navigation, Nov. 2012.

Kim, et al., Indoor Positioning System Using Magnetic Field Map Navigation and an Encoder System, www.mdpi.com/journal/sensors, Mar. 22, 2017.

Lee, et al., Aerial Simultaneous Localization and Mapping Using Earth's Magnetic Anomaly Field, Air Force Institute of Technology, Mar. 21, 2019.

Li, et al., How feasible is the use of magnetic field alone for indoor positioning, International Conference on Indoor Positioning and Indoor Navigation, Nov. 2012.

Liu, et al., Fusion of Magnetic and Visual Sensors for Indoor Localization: Infrastructure-Free and More Effective, IEEE Transactions on Multimedia, vol. 19, No. 4, pp. 874-888, Apr. 2017.

Lohmann, et al., Magnetic maps in animals: nature's GPS, The Journal of Experimental Biology 210, pp. 3697-3705, Jul. 2007.

Noaa, et al., The World Magnetic Model—Uses, https://www.ngdc.noaa.gov/geomag/WMM/uses.shtml, Feb. 2020.

Prigge, et al., Signal Architecture for a Distributed Magnetic Local Positioning System, IEEE Sensors Journal, vol. 4, No. 6, pp. 864-873, Dec. 2004.

Riehle, et al., Indoor Waypoint Navigation via Magnetic Anomalies, IEEE Engineering in Medicine and Biology Society. Conference Aug. 2011.

Search Report and Written Opinion from PCT Application No. PCT/US2024/041287 dated Nov. 21, 2024.

Shockley, et al., Ground Vehicle Navigation Using Magnetic Field Variation, Air Force Institute of Technology, Sep. 2012.

Solin, et al., Modeling and Interpolation of the Ambient Magnetic Field by Gaussian Processes, Accepted to IEEE Transactions on Robotics, Mar. 21, 2018.

Vallivaara, et al., Simultaneous Localization and Mapping Using The Indoor Magnetic Field, University of Oulu Graduate School; University of Oulu, Faculty of Information Technology and Electrical Engineering Acta Univ. Oul. C 642, 2018.

Cross Validated, Alternate distance metrics for two time series, www.stats.stackexchange.com/questions/185912/alternate-distance-metrics-for-two-time-series, Jul. 5, 2023.

Leung et al., A measure of distance between time series: Dynamic Time Warping, www.informs.org/Publications/OR-MS-Tomorrow/A-measure-of-distance-between-time-series-Dynamic-Time-Warping, Jul. 3, 2023.

\* cited by examiner

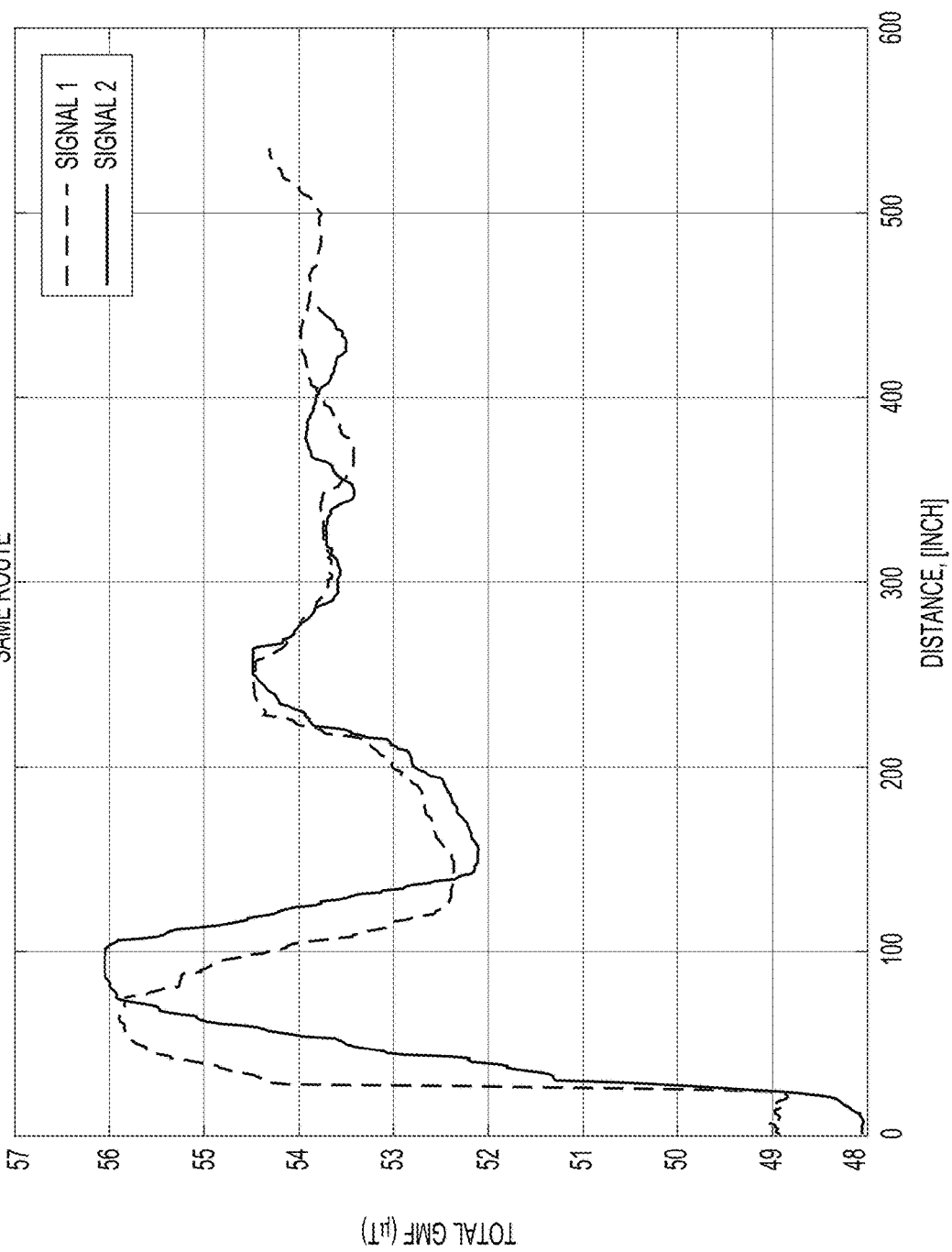

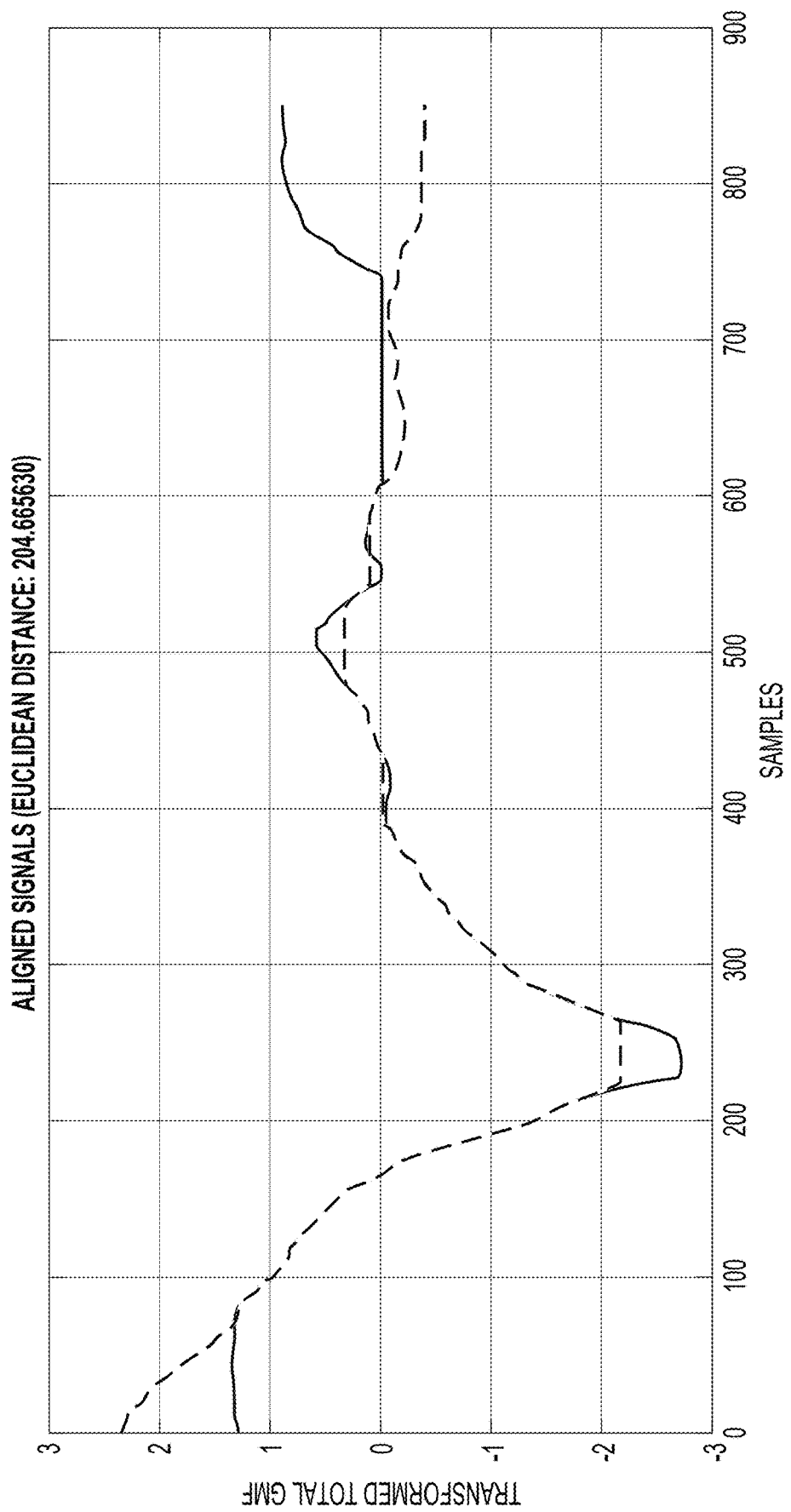

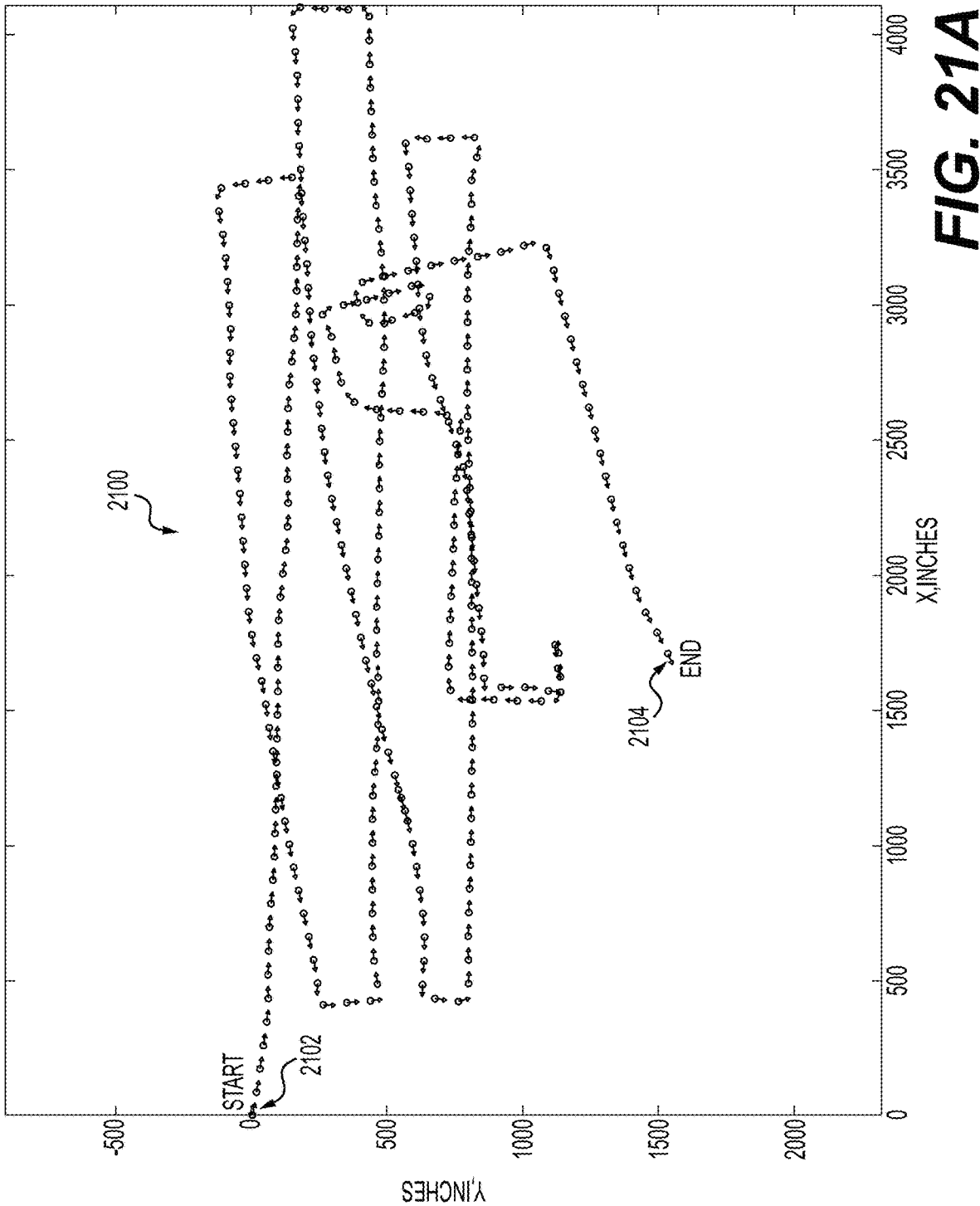

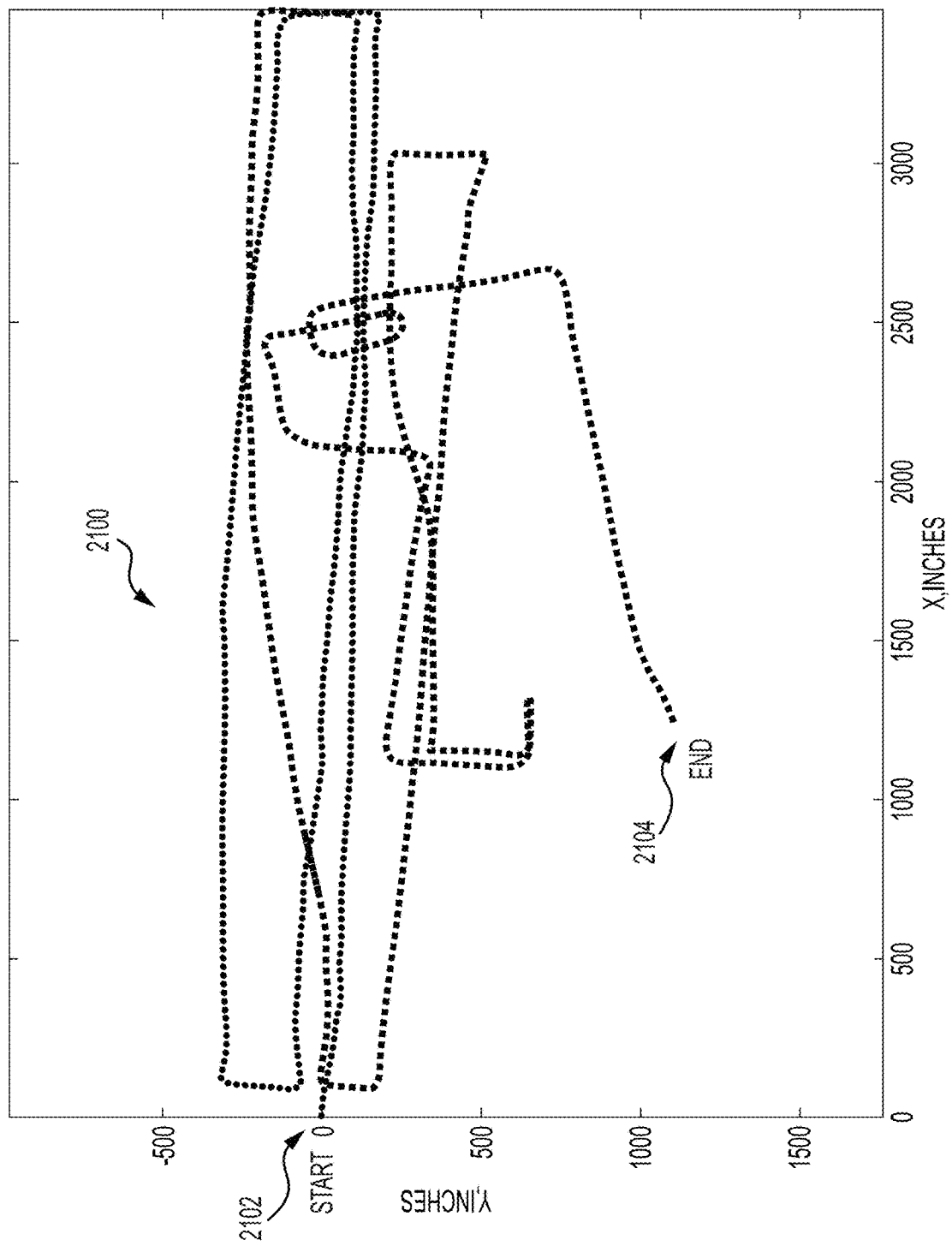

USING A MAGNETIC RECORDING FOR AUTHENTICATION

PRIORITY

This application is a continuation, under 35 U.S.C. § 120, of U.S. patent application Ser. No. 18/795,375, filed 6 Aug. 2024, which claims the benefit, under 35 U.S.C. § 119(e), of U.S. Provisional Patent Application No. 63/531,316, filed 8 Aug. 2023, which is incorporated herein by reference.

TECHNICAL FIELD

This disclosure generally relates to the use of magnetic sensors.

BACKGROUND

The Earth's geomagnetic field (GMF) is a continuous potential field that is locally unique due to its physical nature and the influence of surrounding objects (e.g. buildings, ferromagnetic materials, pillars, etc.). The GMF is stable, and changes over time are predictable and well documented. Magnetic anomalies can lead to local anomalies in the GMF. As a result, the GMF is a source of specific data that can be recorded, processed, and analyzed.

A fusion filter is an algorithm that may be used in sensor fusion to combine data from multiple sensors, resulting in a more accurate estimate of a system being measured. The goal of a fusion filter is to reduce errors and uncertainty and thereby improve the accuracy and reliability of the system. A fusion filter may combine data from multiple sensors measuring the same variable(s), such as position or orientation, and then apply statistical techniques to that data to estimate the most likely value of the variable(s). An advantage of fusion filters is their ability to deal with noisy or unreliable sensor data. By combining data from multiple sources, a fusion filter may reduce the impact of any individual sensor's errors or biases, resulting in a more accurate estimate of the system being measured.

A magnetic field in an indoor environment tends to be significantly non-uniform and anomalous. As a result, when a fusion filter is used in such an environment, the fusion filter will tend to function incorrectly and orientation (or one or more other variables) will not be able to be determined accurately.

BRIEF DESCRIPTION OF THE DRAWINGS

FIGS. 6A-6B and 7A-7B illustrate example conversion of example time series of example magnetic recordings to example distance series.

FIGS. 18A-18F illustrate example comparisons of example plots of example magnetic recordings of the trajectory of FIG. 15A with example magnetic recordings of the trajectory of FIG. 15B.

DESCRIPTION OF EXAMPLE EMBODIMENTS

Figure 1:
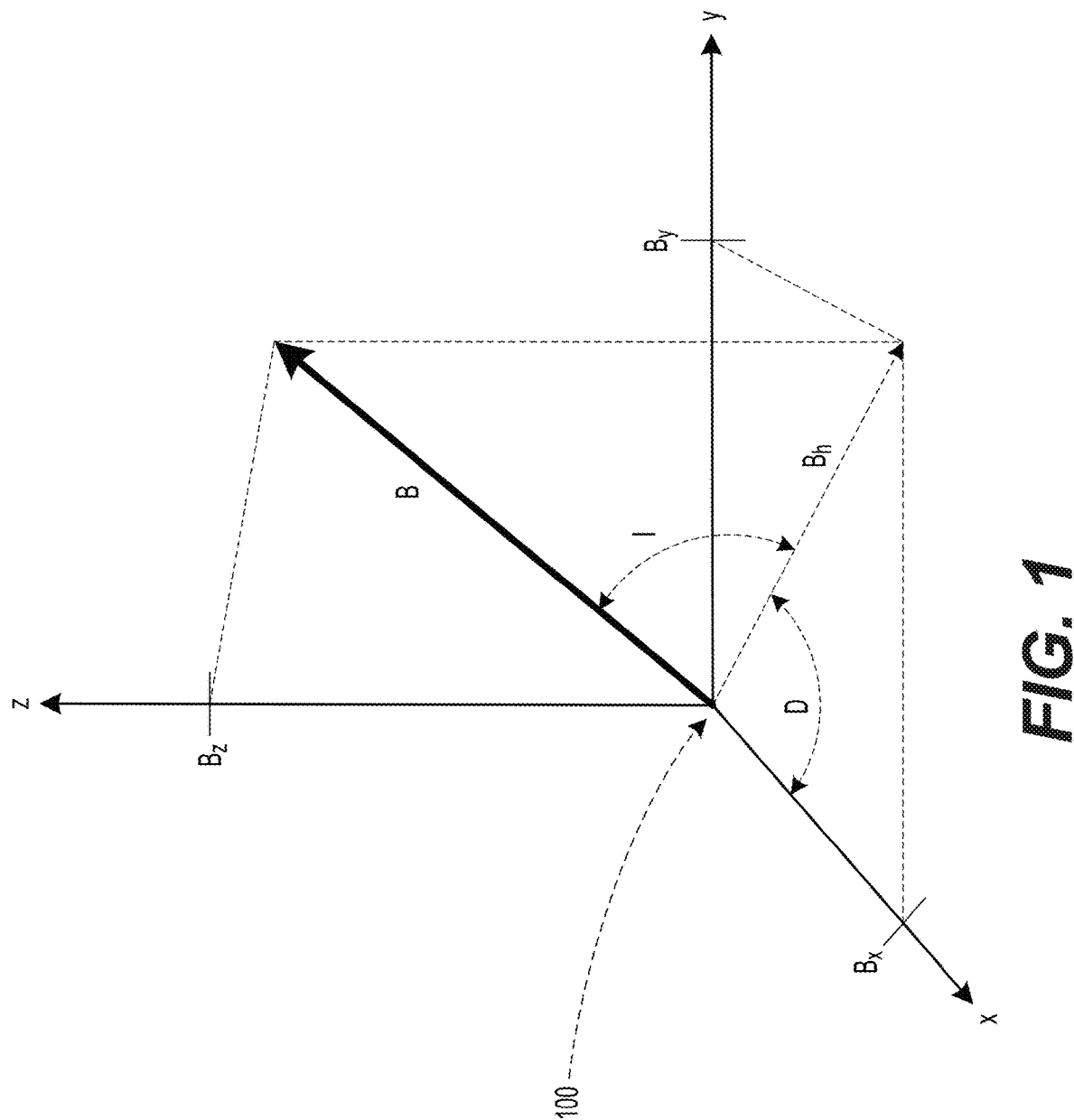
FIG. 1 illustrates example measurements of an example magnetic field at an example point in space.

Particular embodiments facilitate authentication of a user or device by comparing magnetic or other recordings (or, where appropriate, signals or samples) associated with the user or device with each other. In particular embodiments, a recording is a unique time series of measurements. A magnetic recording may include a unique series of magnetic measurements (such as, for example, measurements of magnetic-field strength, magnetic-field inclination angle, magnetic susceptibility, magnetic conductivity, or a combination of the foregoing) made by one or more magnetic sensors (such as, for example, magnetometers). The series may be a time series, distance series, or other suitable series. The magnetic measurements may be made or taken at a sampling rate of, for example, 50 Hz or another suitable sampling frequency or rate. In particular embodiments, the magnetic measurements may be used to calculate magnetic values (for example as shown in Equation (1) below) and the magnetic recording may include those values in addition or as an alternative to the magnetic measurements used to calculate those values. Herein, reference to a value may include the measurements used to calculated the value, and vice versa, where appropriate. In particular embodiments, a magnetic recording may (but need not necessarily) be plotted, as described below by way of example. Herein, reference to a plot of a magnetic recording may include a graphical representation of the plot, the data associated with the magnetic recording, or both, where appropriate. Similarly, reference herein to a magnetic recording may include a plot of the magnetic recording, and vice versa, where appropriate. In particular embodiments, a magnetic recording may be aligned with one or more other magnetic recordings to facilitate comparison between or among them, as described below by way of example. Such alignment may include scaling, centering, or other normalization, as described below by way of example. Herein, reference to a magnetic recording or a plot of a magnetic recording may include an aligned version of the magnetic recording or plot, and vice versa, where appropriate. Herein, reference to a magnetic recording may include one or more magnetic recordings, and vice versa, where appropriate. Herein, reference to a magnetic recording may include a portion of a magnetic recording, and vice versa, where appropriate.

In addition or as an alternative to including magnetic measurements from magnetic sensors, a magnetic recording may include inertial measurements from one or more inertial measurement units (IMUs) or other measurements from one or more Global Navigation Satellite System (GNSS) receivers, accelerometers, gyroscopes, barometers, cameras, microphones, or other sensors. The magnetic and other measurements may be correlated or otherwise combined with each other in whole or in part in the magnetic recording. This disclosure contemplates any suitable recordings including any suitable time or distance series of any suitable measurements or combinations of measurements. Herein, reference to a recording may include a magnetic recording, and vice versa, where appropriate. Herein, reference to a signal or sample may include a recording, and vice versa, where appropriate.

A magnetic recording may correspond to a trajectory. In particular embodiments, a trajectory is a continuous three-dimensional or two-dimensional path in space. A path may be a continuous series of positions or configurations that may be assumed in a motion or process of change by a moving or varying system (such as device 204 or device 2000). Herein, reference to a trajectory may include a graphical representation of the trajectory, the data associated with the trajectory (such as one or more magnetic or other recordings corresponding to the trajectory), or both, and vice versa, where appropriate. A device may take magnetic measurements as it moves or is moved through a two-dimensional or three-dimensional space by a user. The device may include one or more magnetic sensors (such as, for example, magnetometers) and, as the device moves or is moved, the device may use one or more of its magnetic sensors to measure the magnetic field along that trajectory at, for example, a sampling rate of 50 Hz or another suitable sampling rate. The electronic device may record those magnetic measurements, and that magnetic recording may be stored locally on the device or remotely on one or more other devices. The magnetic recording may serve as a reference magnetic recording that may be compared with a subsequently generated candidate magnetic recording to facilitate authentication of the user or device. (In particular embodiments, that comparison may be used together with one or more other authentication factors (or security credentials)—such as, for example, one or more passwords, passcodes, personal identification numbers (PINs), tokens, or biometric scans—to authenticate the user or device.) In addition or as an alternative, the magnetic recording may serve as a candidate magnetic recording that may be compared with an earlier generated reference magnetic recording to facilitate authentication of the user or device. Where appropriate, a magnetic recording may be a combination of multiple magnetic recordings. For example, a reference magnetic recording may be a combination of a first magnetic recording made by the user moving the device through a two-dimensional or three-dimensional space a first time and one or more subsequent magnetic recordings made by the user repeating, or attempting to repeat as closely as possible, that movement with the device one or more subsequent times.

FIG. 1 illustrates example measurements of an example magnetic field at an example point 100 in space, one or more of which may be included in a magnetic recording. Herein, reference to a magnetic field may include the GMF on the surface of the Earth (e.g. on land or on water), the GMF under the surface of the Earth (e.g. underground or under water), the GMF in the Earth's atmosphere (e.g. at any suitable altitude), a magnetic field on or under the surface of or in the atmosphere (if any) of another celestial body, a magnetic field in outer space, or a magnetic field in or on a man-made building, structure, or object in or on any of the foregoing. Moreover, reference herein to measurement(s) of a magnetic field include measurements of any suitable magnetic field(s). Although particular magnetic fields are described and illustrated herein, this disclosure contemplates any suitable magnetic field(s). A magnetic field may include one or more magnetic fields. In the example of FIG. 1, B is a vector representing in a three-dimensional coordinate frame the magnitude (or strength) and direction of the magnetic field at point 100. The coordinate frame may be a body-fixed coordinate frame relative to a device measuring the magnetic field, such as a magnetometer or a device containing the magnetometer. $B_x$ is the x component of the magnitude of the magnetic field (which may be the projection of the strength of the magnetic field along the x axis of the coordinate frame), By is the y component of the magnitude of the magnetic field (which may be the projection of the strength of the magnetic field along the y axis of the coordinate frame), and $B_z$ is the z component of the magnitude of the magnetic field (which may be the projection of the strength of the magnetic field along the z axis of the coordinate frame). Reference herein to a value or values of a magnetic field may include the strength of the magnetic field; the inclination angle of the magnetic field; the declination angle of the magnetic field; magnetic susceptibility;

magnetic conductivity; one or more individual components of the foregoing (such as, for example, $B_x$, $B_y$, or $B_z$); one or more derivatives of the foregoing; another property of the magnetic field, or a combination of the foregoing, where appropriate. A magnetic-field value may a measurement or a result of a calculation. $B_h$ is the magnitude of the projection of the vector of magnetic induction to a plane defined by the x and y axes of the coordinate frame, which may be a horizontal plane. D is the declination angle of the magnetic field relative to the coordinate frame, and I is the inclination angle of the magnetic field relative to the body-fixed coordinate frame. If $B_x$, $B_y$, and $B_z$ are measured components of the magnetic-induction vector, e.g., by a magnetometer, then with those values the following equations may be used to determine the magnitude of the magnetic-induction vector, |B|, the magnitude of the horizontal component of B, $|B_h|$, the declination angle of the magnetic field, D, and the inclination angle of the magnetic field, I:

$$|B| = \sqrt{B_x^2 + B_y^2 + B_z^2} \quad (1)$$

$$|B_h| = \sqrt{B_x^2 + B_y^2} \quad (2)$$

$$D = \cos^{-1}\left(\frac{B_x}{B_h}\right) \quad (3)$$

$$I = \sin^{-1}\left(\frac{B_z}{B}\right) \quad (4)$$

Although particular measurements of a particular magnetic field at a particular point in space is described and illustrated herein, this disclosure contemplates any suitable measurements of any suitable magnetic field at any suitable point in space. Similarly, a magnetic recording may include any suitable time or distance series of any suitable magnetic measurements, which may but need not necessarily be one or more of the magnetic measurements described and illustrated herein. Moreover, magnetic measurements in a magnetic recording may be direct magnetic measurements (e.g. $B_x$, $B_y$, or $B_z$) or calculated from direct magnetic measurements (e.g. B, $B_h$, D, I, |B|, or $|B_h|$). Herein, reference to one or more magnetic measurements may include magnetic-sensor data, and vice versa, where appropriate. Herein, reference to one or more magnetic measurements may include one or magnetic-field values, and vice versa, where appropriate.

In particular embodiments, a magnetometer measures the direction, strength, or relative change of a magnetic field at a point in space. In particular embodiments, a magnetometer includes one or more magneto-resistive (MR) or other sensors. In addition or as an alternative to including one or more MR sensors, a magnetometer may include one or more superconducting quantum-interference device (SQUID) sensors; search-coil sensors; nuclear-precession sensors; optically pumped sensors; fiber-optic sensors; fluxgate sensors; magneto-inductive sensors; anisotropic magneto-resistive (AMR) sensors; bias magnet field sensors; reed switches; Hall sensors; integrated Hall sensors; giant magneto-resistive (GMR) sensors; unpinned sandwich GMR sensors; antiferromagnetic-multilayer sensors; spin-valve sensors; spin-dependent tunneling (SDT) sensors; colossal magneto-resistive (CMR) sensors; or other suitable sensors for measuring a magnetic field. Although particular magnetometers including particular numbers of particular sensors are described and illustrated herein, this disclosure contemplates any suitable magnetometers including any suitable number of any suitable sensors. Moreover, although magnetometers are described and illustrated herein as taking magnetic measurements for magnetic recordings, this disclosure is not limited to magnetometers and contemplates any suitable magnetic sensors taking magnetic measurements (such as, for example, measurements of magnetic-field strength, magnetic-field inclination angle, magnetic susceptibility, magnetic conductivity, or a combination of the foregoing) for a magnetic recording.

A magnetometer may be contained in a semiconductor package (which may include, for example, a metal, glass, plastic, or ceramic casing). In particular embodiments, a magnetometer may be present alongside one or more Internet of Everything (IoT) sensors. In particular embodiments, a magnetometer may be used in conjunction with one or more other sensors, such as, for example, accelerometers, gyroscopes, light detection and ranging (LIDAR) sensors, or pressure sensors. The semiconductor package containing the magnetometer may be mounted on a printed circuit board (PCB) along with one or more other components, which together may be referred to as an assembly (or module). The assembly may include an inter-integrated circuit (I²C) interface for communicating with one or more other devices, such as for example one or more controllers via one or more switches. An example switch includes the TCA9548A I²C multiplexer made by ADAFRUIT INDUSTRIES. A TCA9548A I²C multiplexer can switch up to eight magnetometers over an I²C bus. A TCA9548A I²C multiplexer has its own 0x70 I²C address, which can be changed using three pins. In particular embodiments, this enables the microcontroller to communicate with up to 64 magnetometers. Herein, reference to a magnetometer may include both the magnetometer and the semiconductor package containing it, where appropriate. Example magnetometers include the HMC5983 three-axis digital-compass integrated circuit (IC) made by HONEYWELL, the HMC5883L three-axis digital-compass IC made by HONEYWELL, the QMC5883L three-axis magnetic sensor made by QST, and the AK8963 three-axis electronic compass made by ASAHI KASEI MICRODEVICES. Although particular magnetometers are described and illustrated herein, this disclosure contemplates any suitable magnetometers. Example assemblies (or modules) with magnetometers include a GY-271L electronic compass and a GY-273 compass module. Although particular assemblies (or modules) are described and illustrated herein, this disclosure contemplates any suitable assemblies (or modules). Herein, reference to a magnetometer may include both the magnetometer and the assembly it is mounted on, where appropriate.

Figure 2:
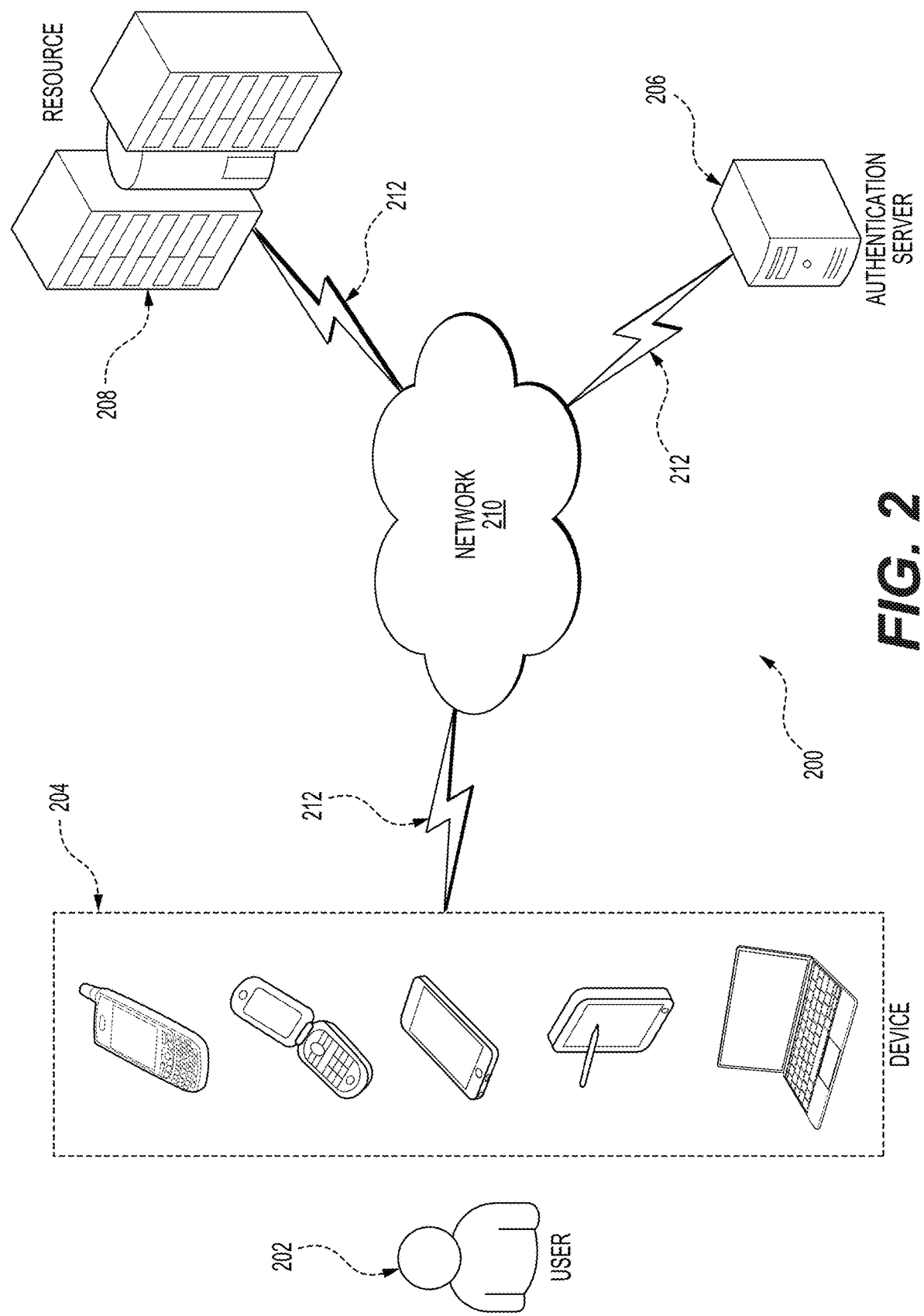
FIG. 2 illustrates an example system for authenticating a user or device using a magnetic recording.

FIG. 2 illustrates an example system 200 for authenticating a user 202 or device 204 using a magnetic recording. System 200 includes device 204 (associated with user 202), an authentication server 206, and a resource 208 connected to each other by a network 210. Although FIG. 2 illustrates a particular arrangement of user 202, device 204, authentication server 206, resource 208, and network 210, this disclosure contemplates any suitable arrangement of user 202, device 204, authentication server 206, resource 208, and network 210. As an example and not by way of limitation, two or more of device 204, authentication server 206, and resource 208 may be connected to each other directly, bypassing network 210. As another example, two or more of device 204, authentication server 206, and resource 208 may be functionally, physically, or logically colocated with each other in whole or in part. Moreover, although FIG. 2 illustrates a particular number of users 202, devices 204, authentication servers 206, resources 208, and networks 210, this disclosure contemplates any suitable number of users 202, devices 204, authentication servers 206, resources 208, and networks 210. As an example and not by way of limitation, system 200 may include multiple devices 204 (associated with multiple users 202), authentication servers 206, resources 208, and networks 210.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks.

Links 212 may connect device 204 (associated with user 202), authentication server 206, and resource 208 to network 210 or to each other. This disclosure contemplates any suitable links 212. In particular embodiments, one or more links 212 include one or more wireline (such as for example Digital Subscriber Line (DSL) or Data Over Cable Service Interface Specification (DOCSIS)), wireless (such as for example WI-FI or WORLDWIDE INTEROPERABILITY FOR MICROWAVE ACCESS (WIMAX), BLUETOOTH, or near-field communication (NFC)), or optical (such as for example Synchronous Optical Network (SONET) or Synchronous Digital Hierarchy (SDH)) links. In particular embodiments, one or more links 212 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links 212 need not necessarily be the same throughout system 200. One or more links 212 may differ in one or more respects from one or more other links 212.

User 202 may be a person and may operate device 204. Device 204 may include hardware, software, or both and be capable of carrying out the functionalities implemented or supported by device 204. As an example and not by way of limitation, device 204 may be a smartphone, cellular telephone, personal digital assistant (PDA), tablet computer, or laptop or notebook computer. In addition or as an alternative, device 204 may be a handheld computer, smartwatch or other wearable computer, or other suitable device. As another example, device 204 may include a robot. As another example, device 204 may include a drone. As another example, device 204 may include a manned, unmanned, remotely piloted or driven, or autonomous aerial vehicle, ground vehicle, underwater vehicle, or surface vessel. A ground vehicle may include a conventional land vehicle, such as for example a forklift, conventional car, truck, tractor, or tractor-trailer truck. In addition or as an alternative, a ground vehicle may include earth-moving, agricultural, or forestry equipment, such as for example an excavator, backhoe loader, bulldozer, skid-steer loader, motor grader, crawler loader, trencher, scraper, dump truck, harvester, mower, baler, feller buncher, shovel logger, or other equipment. As another example, device 204 may include an unmanned aerial vehicle (UAV), unmanned ground vehicle (UGV), or unmanned underwater vehicle or vessel (UUV). As another example, device 204 may include a remotely piloted aircraft (RPA), remotely operated ground vehicle, remotely operated underwater vehicle (ROUV), or remotely operated surface vessel. As another example, device 204 may include an autonomous aerial vehicle (AAV), autonomous ground vehicle (AGV), autonomous underwater vehicle (AUV), or autonomous surface vessel or vehicle (ASV). As another example, device 204 may include a satellite, space probe, or other spacecraft (which may be manned, unmanned, remotely piloted, or autonomous). As another example, device 204 may include a high-altitude balloon or stratostat (such as a sounding balloon) or other balloon. Although particular devices are described and illustrated herein, this disclosure contemplates any suitable devices.

User 202 may access and interact with one or more software applications or other computer programs on or through device 204. One or more of the computer programs (or one or more functions of the computer programs) may reside locally on device 204 or on one or more computers or other devices remote from device 204. Moreover, one or more of the computer programs (or one or more functions of the computer programs) may be executed in whole or in part locally on device 204 or on a computer or other device remote from device 204. User 202 may also access and interact with data on or through device 204. All or some of the data may reside locally on device 204 or on one or more computers or other devices remote from device 204. This disclosure contemplates any suitable device with any suitable functionalities.

Device 204 may include one or more sensors. For example, device 204 may include one or more magnetic sensors (such as, for example, magnetometers). In addition or as an alternative, device 204 may include one or more IMUs, GNSS receivers, accelerometers, gyroscopes, barometers, cameras, microphones, or other sensors. Although particular sensors are described and illustrated herein, this disclosure contemplates any suitable sensors. In particular embodiments, an IMU on device 204 may be used to measure specific force, angular rate, or orientation of device 204. In particular embodiments, a GNSS receiver on device 204 may be used to produce PNT data sets for device 204. Example GNSSs include but are not limited to the Global Positioning System (GPS); BeiDou Navigation Satellite System (BDS); Galileo, Globalnaya Navigazionnaya Sputnikovaya Sistema (GLONASS); Indian Regional Navigation Satellite System (IRNSS)/Navigation Indian Constellation (NavIC); and Quasi-Zenith Satellite System (QZSS). Device 204 may include one or more one or more wired, wireless, optical, or other communication modules, which may enable device 204 to communicate with one or more networks or other devices. By way of example only and not limitation, this may include a Global System for Mobile Communications (GSM) or other cellular-telephone transceiver; a WI-FI transceiver; a WIMAX transceiver; a BLUETOOTH transceiver; or an NFC transceiver.

User 202 may use device 204 to generate reference or candidate magnetic recordings or to measure magnetic-field values that may be used to authenticate user 202 or device 204. For example, user 202 may move device 204 through a trajectory and, as device 204 is moved, one or more magnetic sensors in device 204 may measure the magnetic field along that trajectory at, for example, a sampling rate of 50 Hz or another suitable sampling rate. In addition or as an alternative, one or more other sensors in device 204 may measure one or more other aspects or contexts of the trajectory as device 204 is moved through the trajectory at, for example, a sampling rate of 50 Hz or another suitable sampling rate. The time series of other measurements may be synchronized with the time series of magnetic measurements. For example, an inertial sensor in device 204 may be used to determine an inertial shape of the trajectory at, for example, a sampling rate of 50 Hz or another suitable sampling rate, and that time series of inertial measurements may be synchronized with the time series of magnetic measurements. Device 204 may record the magnetic or other measurements for the trajectory as a reference magnetic recording or a candidate magnetic recording, which may be stored locally on device 204 or transmitted to authentication server 206. In particular embodiments, communication between authentication server 206 and user 202 or device 204 may be encrypted or otherwise subject to one or more security protocols in whole or in part. In particular embodiments, a set of reference recordings may be created at various locations. Selecting a location from a list of locations (and a corresponding reference recording) may facilitate the use of particular methods of authentication described and illustrated herein in different places.

In particular embodiments, the use of inertial recordings or other trajectory recordings in addition to magnetic recordings may increase information content and increase the uniqueness of the records used. In particular embodiments, creating recordings by collecting data from other sensors in addition to magnetic sensors (in a similar way as described for magnetic sensors) facilitates multi-layer (or multi-factor) authentication. Time-series data from various sensors will differ for each individual user since that data will be determined by the specific user's behavior. For example, different users may hold or operate the same smartphone differently. This behavior may be recorded by storing and processing data from IMUs, GNSS receivers, accelerometers, gyroscopes, magnetometers, barometers, cameras, microphones, and other sensors. Data from multiple types of sensors may be combined together, which may increase information content and help to increase uniqueness of the recordings.

Authentication server 206 may authenticate user 202 or device 204. Authenticating user 202 or device 204 may include verifying or validating the identity of user 202 or device 204 to facilitate determining whether to grant user 202 or device 204 access to resource 208 (as described below). Authenticating user 202 or device 204 may include determining the identity of user 202 or device 204 before, or as an alternative to, verifying or validating that identity. For example, authentication server 206 may receive a reference magnetic recording from user 202 or device 204 and store it in a record associated with user 202 or device 204. Authentication server 206 may later receive a candidate magnetic recording from user 202 or device 204. Authentication server 206 may compare the candidate magnetic recording with the reference magnetic recording (e.g. using quantitative comparison as described below). If authentication server 206 determines, based on the comparison, that the candidate magnetic recording differs from the reference magnetic recording by less than a predetermined value, is within a predetermined range, or does not exceed a predetermined threshold (as described below), then authentication server 206 may determine that the identity of user 202 or device 204 is verified or validated. This determination may then be used to facilitate determining whether to grant user 202 or device 204 access to resource 208. In particular embodiments, the results of one or more comparisons of one or more candidate magnetic recordings with a reference magnetic recording may be one authentication factor used with one or more other authentication factors (such as, for example, one or more passwords, passcodes, PINs, tokens, or biometric scans) to authenticate user 202 or device 204. In particular embodiments, calculated differences between or among two or more magnetic recordings may be used to authenticate a user (like a password) to access sensitive data.

In particular embodiments, recorded and stored initial magnetic recordings may be used as reference data. In particular embodiments, recording a candidate recording that differs from a reference recording by less than a predetermined value may provide a positive authentication.

In particular embodiments, magnetic recordings or other magnetic data may be used to establish geofencing areas for authentication purposes. In addition or as an alternative, magnetic recordings or other magnetic data may be compared with geofencing data indicating a geofencing area to authenticate a user 202 or device 204. Geofencing may provide an additional level of information security. Much like a physical fence providing a level of physical security around a physical area, geofencing may increase control over access to digital assets or other resources 208. In particular embodiments, applying a geofence may restrict access of a user 202 to a digital or other resource 208 by verifying that user 202 is connecting at a pre-approved physical location.

Geofencing data may include magnetic or other data indicating or otherwise corresponding to one or more geographical or other areas (such as, for example, a particular property, building, floor or other portion of a building, country, continent, hemisphere of the Earth, or other area). In particular embodiments, geofencing data corresponding to a particular area may include one or more reference magnetic recordings corresponding to that area. For example, one or more reference magnetic recordings may be generated using a device 204 when device 204 is located in that area. Those reference magnetic recordings may collectively circumscribe or include substantially all or one or more points within the area or a portion of that area. The reference magnetic recordings may be stored, e.g., by authentication server 206.

Later, when a user 202 attempts to access a resource 208 using device 204 (or another device 204), one or more candidate magnetic recordings generated using device 204 (or other device 204) may be compared with one or more of the reference magnetic recordings. The comparison may be performed by authentication server 206 and may include one or more difference or similarity measures, as described below. By way of example, if a difference or similarity (or distance) calculated between the candidate and reference magnetic recordings is less than a predetermined value (or threshold value), then it may be determined that device 204 is located in the area corresponding to the geofencing data. Device 204 (or user 202 using device 204) may then be deemed authenticated and granted access to resource 208. If the difference or similarity (or distance) is not less than the predetermined value (or threshold value), then it may be determined that device 204 is not located in the area corresponding to the geofencing data. Device 204 (or user 202 using device 204) may then be deemed not authenticated and denied access to resource 208.

In addition or as an alternative to including magnetic recordings, geofencing data corresponding to a particular area may include one or more values of the magnetic field in that area, such as, for example, the strength of the magnetic field, the inclination angle of the magnetic field, the declination angle of the magnetic field, magnetic susceptibility, magnetic conductivity, another property of the magnetic field, or a combination of the foregoing, where appropriate. Each magnetic-field value may be a particular value or a range of values, where appropriate. One or more of the magnetic-field values may be measured by one or more devices 204 when devices 204 are in the area and communicated, e.g., to authentication server 206 for storage and later use for authentication. In addition or as an alternative, one or more of the magnetic-field values may be obtained from a third-party or other source, such as the World Magnetic Model (WMM) developed by the United States National Centers for Environmental Information (NCEI) and the British Geological Survey (BGS); the International Geomagnetic Reference Field (IGRF) model produced by the International Association of Geomagnetism and Aeronomy (IAGA); or the Enhanced Magnetic Model (EMM) developed by the NCEI.

Later, when a user 202 attempts to access a resource 208 using device 204 (or another device 204), one or more magnetic-field values may be measured by device 204 (or other device 204) and compared, e.g., by authentication server 206, with one or more magnetic-field values included in the geofencing data for the area. The comparison may be performed by authentication server 206. By way of example, if one or more differences (or a predetermined sufficient number or percentage of the differences) calculated between the magnetic-field values being compared are less than predetermined values (or threshold values) for those comparisons, then it may be determined that device 204 is located in the area corresponding to the geofencing data. Device 204 (or user 202 using device 204) may then be deemed authenticated and granted access to resource 208. If one or more differences (or a predetermined number or percentage of the differences) are not less than the predetermined values (or threshold values) for those comparisons, then it may be determined that device 204 is not located in the area corresponding to the geofencing data. Device 204 (or user 202 using device 204) may then be deemed not authenticated and denied access to resource 208.

In particular embodiments, the generation and storage of reference or candidate magnetic recordings, measurement of magnetic-field values, or their comparison may be an automatic or background operation running in the background on device 204, and may run continually or semi-continually, without being requested or otherwise manually initiated by user 202. For example, software installed on a device 204 of a user 202 may run in the background on device 204 to measure magnetic-field data (e.g. one or more magnetic recordings) around a house or apartment of user 202. This data may be built into a database that in turn may be used to determine if device 204 (or another device 204) is located within that house or apartment. If it is determined that device 204 (or other device 204) is within the house or apartment, then that determination may be used to authenticate device 204 or other device 204 (or user 202), possibly with other information, to grant or restrict access to a particular resource 208. As another example, candidate magnetic recordings may periodically be generated in a background operation of device 204 and compared automatically with one or more reference magnetic recordings corresponding to a particular geographical area. Device 204 (or a user 202 using device 204) may then be granted or denied access to one or more resources 208 based on the result(s) of the comparison(s).

In addition or as an alternative to determining whether a device 204 is located in a particular area, particular embodiments may determine whether a device 204 is not located in a particular area using one or more of the methods described above. In particular embodiments, this may be done instead of device 204 providing its location, with or without having a prebuilt magnetic map. For example, the value of magnetic inclination or other characteristics of the magnetic field vary dramatically between locations in the southern and northern hemispheres of the Earth and even between continents and countries. In particular embodiments, if it is determined that a device 204 is not located in a particular area, all or certain particular data or computer programs on device 204 may automatically be erased permanently. In addition or as an alternative, device 204 may automatically self-destruct in whole or in part. Such determination (and any communication related to it) may be an automatic or background operation running in the background on device 204, and may run continually or semi-continually, without being requested or otherwise manually initiated by user 202.

Although a particular authentication server 206 is described and illustrated herein, this disclosure contemplates any suitable authentication server(s). Authentication server 206 (or one or more of its functions) may be local or proximate to or remote from user 202 or device 204 in whole or in part and may be functionally, physically, or logically colocated with user 202 or device 204 in whole or in part. Authentication server 206 (or one or more of its functions) may be local or proximate to or remote from resource 208 in whole or in part. Authentication server 206 may be logically or physically unitary or distributed and may be functionally, logically, or physically colocated with one or more other authentication servers 206. Authentication server 206 may include one or more authentication servers 206.

Resource 208 may be any suitable resource(s) that user 202 may, with or through device 204, request access to, such as software, data, hardware, device(s), equipment, machine(s), physical structure(s), location(s), area(s), or any suitable combination of these. For example, resource 208 may include a computer program (or function of a computer program) executing in whole or in part on a computer remote from device 204 or locally on device 204. As another example, resource 208 may include data stored in whole or in part on a computer remote from device 204 or locally on device 204. As another example, resource 208 may include one or more authentication servers 206, application servers, catalog servers, communications servers, computing servers, database servers, fax servers, file servers, game servers, mail servers, media servers, print servers, proxy servers, resource servers, service servers, sound servers, virtual servers, web servers, other suitable servers, or combinations of two or more of these. Herein, reference to a server may include hardware, software, or both. As another example, resource 208 may include one or more database management systems (DBMSs). As another example, resource 208 may include one or more mainframe computers. As another example, resource 208 may include one or more data centers or more physical or logical portions of one or more data centers. As another example, resource 208 may include a user account of user 202. As another example, resource 208 may include device 204. In addition or as an alternative, device 204 may include resource 208. As another example, resource 208 may include a robot. As another example, resource 208 may include a drone. As another example, resource 208 may include a manned, unmanned, remotely piloted or driven, or autonomous aerial vehicle, ground vehicle, underwater vehicle, or surface vessel. A ground vehicle may include a conventional land vehicle, such as for example a forklift, conventional car, truck, tractor, or tractor-trailer truck. In addition or as an alternative, a ground vehicle may include earth-moving, agricultural, or forestry equipment, such as for example an excavator, backhoe loader, bulldozer, skid-steer loader, motor grader, crawler loader, trencher, scraper, dump truck, harvester, mower, baler, feller buncher, shovel logger, or other equipment. As another example, resource 208 may include a UAV, UGV, or UUV. As another example, resource 208 may include an RPA, remotely operated ground vehicle, ROUV, or remotely operated surface vessel. As another example, resource 208 may include an AAV, AGV, AUV, or ASV. As another example, resource 208 may include a satellite, space probe, or other spacecraft (which may be manned, unmanned, remotely piloted, or autonomous). As another example, resource 208 may include a high-altitude balloon or stratostat (such as a sounding balloon) or other balloon. As another example, resource 208 may include an office building or other physical structure. As another example, resource 208 may include a floor or room in an office building or other area or location in another physical structure. Although particular resources are described and illustrated herein, this disclosure contemplates any suitable resources. Resource 208 (or one or more of its functions) may be local or proximate to or remote from user 202 or device 204 in whole or in part. Resource 208 (or one or more of its functions) may be local or proximate to or remote from authentication server 206 in whole or in part. Resource 208 may be logically or physically unitary or distributed and may be functionally, logically, or physically colocated with one or more other resources 208. Resource 208 may include one or more resources 208.

Figure 3:
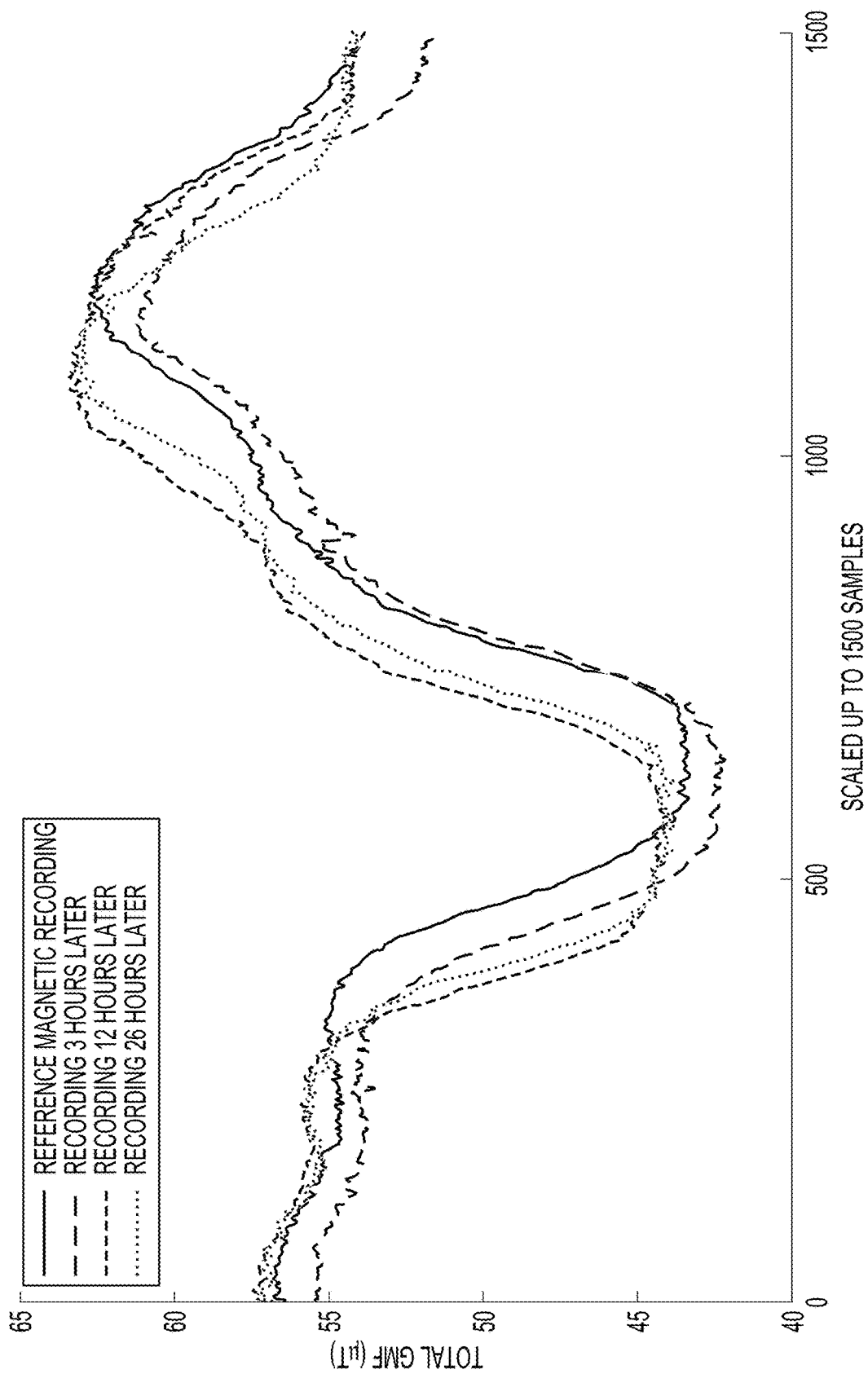
FIG. 3 illustrates example plots of example magnetic recordings of an example trajectory.

In particular embodiments, with an arbitrary movement of a magnetic sensor (such as a magnetometer) in space (along a particular trajectory), the values obtained from this sensor with a certain frequency can be formed into a time series. This time series may be considered a magnetic identification of the trajectory. Each trajectory will have its own unique magnetic identifications due to the nature of the GMF. Therefore, in order to receive two substantially identical magnetic identifications, it may be necessary to have information about the exact trajectory, e.g., its shape and length, the location of the corresponding magnetic sensor in space, its velocity, instantaneous accelerations, and the sensor-polling frequency. In other words, the magnetic identification of a trajectory may serve as its own unique "magnetic recording." FIG. 3 illustrates plots of example magnetic recordings of an example trajectory. In the example of FIG. 3, the magnetic recordings are from the same trajectory at different times. Some visual differences in the magnetic recordings may be due to the fact that different recordings were made at different velocities, sensor noise, or the user not repeating the same trajectory with the magnetic sensor with exact precision. Different trajectories may have different magnetic recordings. This feature (one-to-one correspondence between the set of all possible trajectories and corresponding magnetic recordings) may enable many applications, such as for example navigating along a particular previously recorded trajectory (like navigating along isolines), geofencing, and various security applications.

Particular embodiments may determine whether different magnetic recordings correspond to the same trajectory (or different trajectories) as follows. One example method for evaluating magnetic recordings is to determine and utilize some difference or similarity measures, e.g., how "close" two or more magnetic recordings are to each other. Such approaches can utilize concepts like degree of difference (the distance) between two recording samples. The minimum distance will occur when the two samples are least different from (or most similar to) each other and, as the differences increase, the value of this distance will increase accordingly. In real conditions, the types of magnetic sensors that are built into possible devices can differ greatly in their principle of operation and their characteristics affecting the measuring accuracy of such magnetic sensors. Magnetic recordings recorded by such sensors may be subject to some noise, leading to potential distortions. Difference or similarity measures applied to such magnetic recordings can be tolerated by applying some threshold values when calculating distances. In addition or as an alternative to potentially utilizing magnetic sensors of different characteristics and accuracy when recording two magnetic recordings for which the value of the distance is being determined, it may also be taken into account that two recordings in question may be made by different users, which may result in differences in velocity, instantaneous accelerations, and other kinematic characteristics. Depending on the velocity and instantaneous accelerations of the magnetometer in space, two or more recordings of the same trajectory in space may look very different when their corresponding time series are visualized without any post processing. This may be due to shifting, compressing, or stretching of the local peaks along the x-axis (e.g. time). Therefore, achieving invariance of the difference or similarity assessment between the reference and the candidate magnetic recording(s) may be necessary. One example solution to this problem is the use of an estimation algorithm allowing estimation based on consecutive stretching or compression of data to find the best match between local minima and maxima of the magnetic recordings in question. Then the distance of the degree of difference or similarity may be calculated by assessing the difference or similarity of existing local maxima and minima of data. Setting a certain threshold value may facilitate determination of the correspondence between reference and candidate magnetic recording(s).

Imperfections of the magnetic sensor in some cases may introduce uncertainty in the form of shifts of amplitude of the magnetic field along the y-axis (e.g. magnetic values). In particular embodiments, this problem may be addressed by utilizing pre-processing methods and bringing the data to some standardized form. This includes the use of specialized methods of normalization and centering of the magnetic recording on the basis of preliminary evaluation of its statistical characteristics. In particular embodiments, this may include, for the total magnetic field of each of the reference and candidate samples, performing preliminary centering and scaling of the signal by amplitude. For centering, the average value of the signal may be subtracted from the signal, which may substantially nullify shifts among the reference and candidate (or test) signals. For scaling, each signal sample may be divided by its weighted average value. An example application of this approach is in the area of cyber security. For example, a user may create a specific magnetic recording by moving a measuring device (e.g. a cell phone) along a particular trajectory in space. The corresponding magnetic recording (as a time series) is recorded and stored in binary form. Repeating the same trajectory will be a countersign (parole). It can be used to authenticate a user.

In particular embodiments, a magnetic recording is a unique time series representing a magnetic-field recording. Two or more identical magnetic recordings are very unlikely to exist. However, similar magnetic recordings can be created using the same or similar magnetic anomalies. In particular embodiments, quantitative comparison may be used to compare reference and candidate magnetic recordings, as follows:

1. For each of the reference and candidate magnetic recordings, do the following:
   a. Receive magnetic-recording data.
   b. Select data from the magnetic components $B_x$, $B_y$, and $B_z$ and determine the total magnetic value as a root from the sum of the squares of individual components.
   c. Based on the use of spline interpolation, convert the resulting sequence of magnetic-field values into a certain number of elements (magnetic features), such as, for example, approximately 2000 to 2500 elements (which in particular embodiments may be represented as points in a plot of the magnetic recording).
2. For the total magnetic field of each of the reference and candidate samples, perform preliminary centering and scaling of the signal by amplitude. For centering, subtract the average value of the signal from the signal, which substantially nullifies shifts among the reference and test signals. For scaling, divide each signal sample by its weighted average value.
3. To address additive noise from the magnetic sensor(s) used to collect the magnetic recordings, perform median filtration on the reference and candidate signals. A middle filter window with a size of, for example, 50 elements may be used.
4. Compare the reference and candidate signals of the samples based on dynamic time warping (DTW). The distance value is a criterion for the difference or similarity of the candidate to the reference. The distance value between the candidate magnetic recording and the reference magnetic recording may be calculated as the sum of the Euclidean distances between corresponding points in their plots. As described above, a point in a plot of a magnetic recording (e.g. x coordinate and y coordinate) may represent an element of the magnetic recording (e.g. value and position in series). Reference to a point in a plot of a magnetic recording may include the element it represents, and vice versa, where appropriate. In particular embodiments, the calculation of the distance value between the candidate and reference magnetic recordings may be performed mathematically without graphical versions of the plots of the magnetic recordings being generated or presented. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In this calculation, a point in the plot of the candidate magnetic recording and a point in the plot of the reference magnetic recording may correspond to each other if they have the same position in the order among the points constituting their respective plots. Using a certain threshold value (such as, for example, 200-250) for the distance value may allow an acceptable limit of the calculated distance value to be set.

Figure 4:
FIG. 4 illustrates an example two-dimensional trajectory.

FIG. 4 illustrates an example two-dimensional trajectory. This trajectory may be created, for example, by a user moving a device including one or more magnetic sensors (such as, for example, magnetometers) on the top of a table as indicated in FIG. 4. This trajectory may be simple and repeatable, which may be advantageous in particular embodiments in which position in space and direction of movement are critical.

Figure 5:
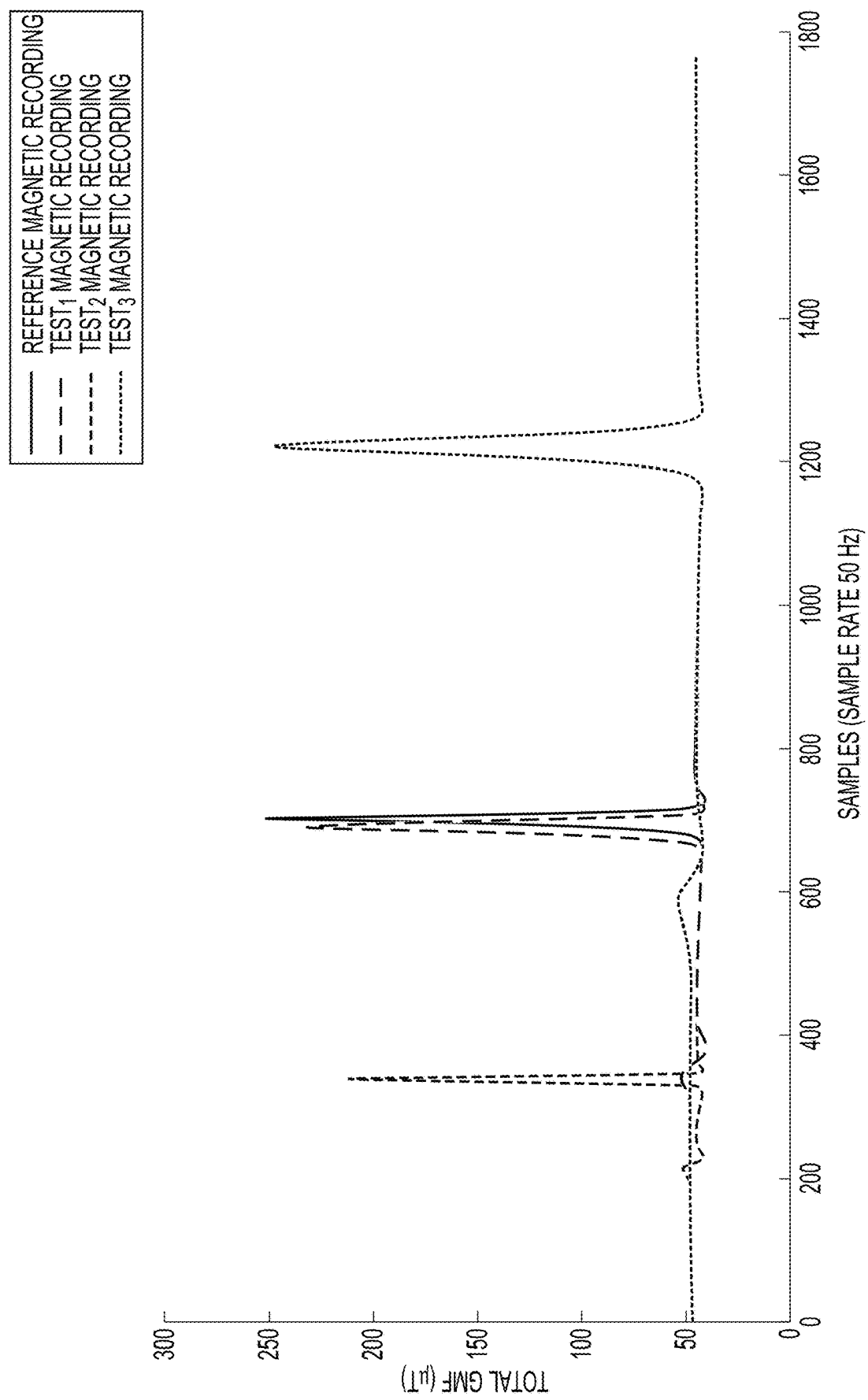
FIG. 5 illustrates example plots of example magnetic recordings of the trajectory of FIG. 4.

FIG. 5 illustrates example plots of four example magnetic recordings of the trajectory of FIG. 4. In the example of FIG. 5, the first one of the magnetic recordings, "Reference magnetic recording," is a reference magnetic recording made by moving a device along the trajectory of FIG. 4; the second one of the magnetic recordings, "$Test_1$ magnetic recording," is a candidate magnetic recording made by moving the device along the trajectory of FIG. 4 under the same conditions as the reference magnetic recording; the third one of the magnetic recordings, "$Test_2$ magnetic recording," is a candidate magnetic recording made by moving the device along the trajectory of FIG. 4 at an increased velocity relative to the reference magnetic recording; and the fourth one of the magnetic recordings, "$Test_3$ magnetic recording," is a candidate magnetic recording made by moving the device along the trajectory of FIG. 4 at a reduced velocity relative to the reference magnetic recording. The plots of the magnetic recordings are unscaled in FIG. 5 and stretching has occurred in some of them due to recording at different velocities (e.g. moving the device along the trajectory at different velocities). In FIG. 5, the x axis represents samples and the y axis represents total GMF in microteslas. The value of total GMF of a sample is the square root of the sum of the squares of the components of the magnetic measurement in the sample, as shown for example in Equation (1) above. For example, the square root of the sum of the squares of the components of the magnetic measurements in the approximately $1,221^{st}$ sample in the magnetic recording "$Test_3$ magnetic recording" is approximately 250 microteslas. Similarly, the square root of the sum of the squares of the components of the magnetic measurements in the approximately $340^{th}$ sample in the magnetic recording "$Test_2$ magnetic recording" is approximately 212 microteslas.

Although particular plots of particular magnetic recordings of particular trajectories are described and illustrated herein, this disclosure contemplates any suitable plots of any suitable magnetic recordings of any suitable trajectories. Although plots with particular numbers of particular axes with particular units are described and illustrated herein, this disclosure contemplates plots with any suitable number of any suitable axes with any suitable units. Moreover, in particular embodiments, graphical representations of plots of magnetic recordings need not be generated or displayed and the operations and methods described and illustrated herein may be performed mathematically without graphical representations of plots of magnetic recordings being generated or displayed.

Figure 6A:
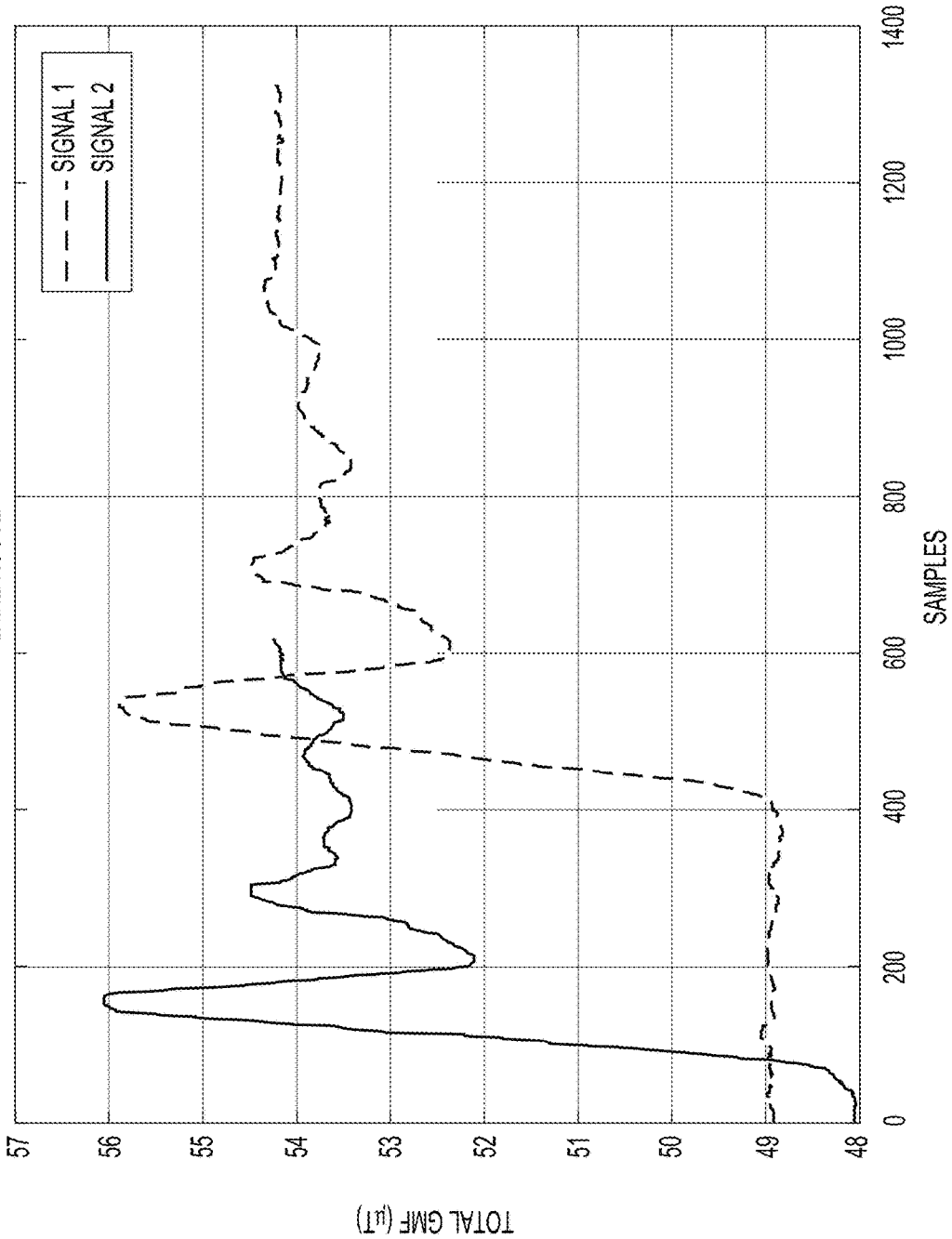
Figure 7A:
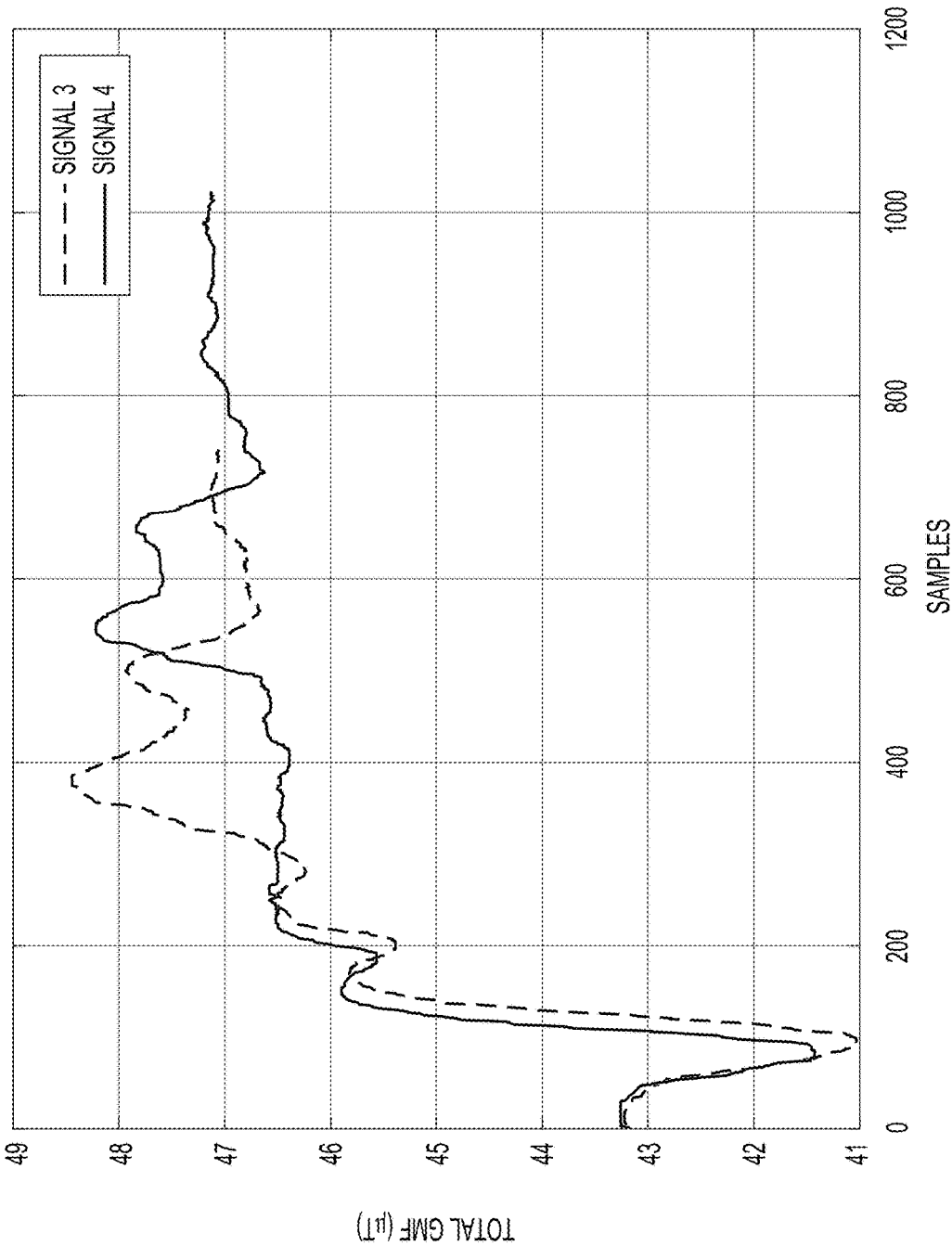
Figure 7B:
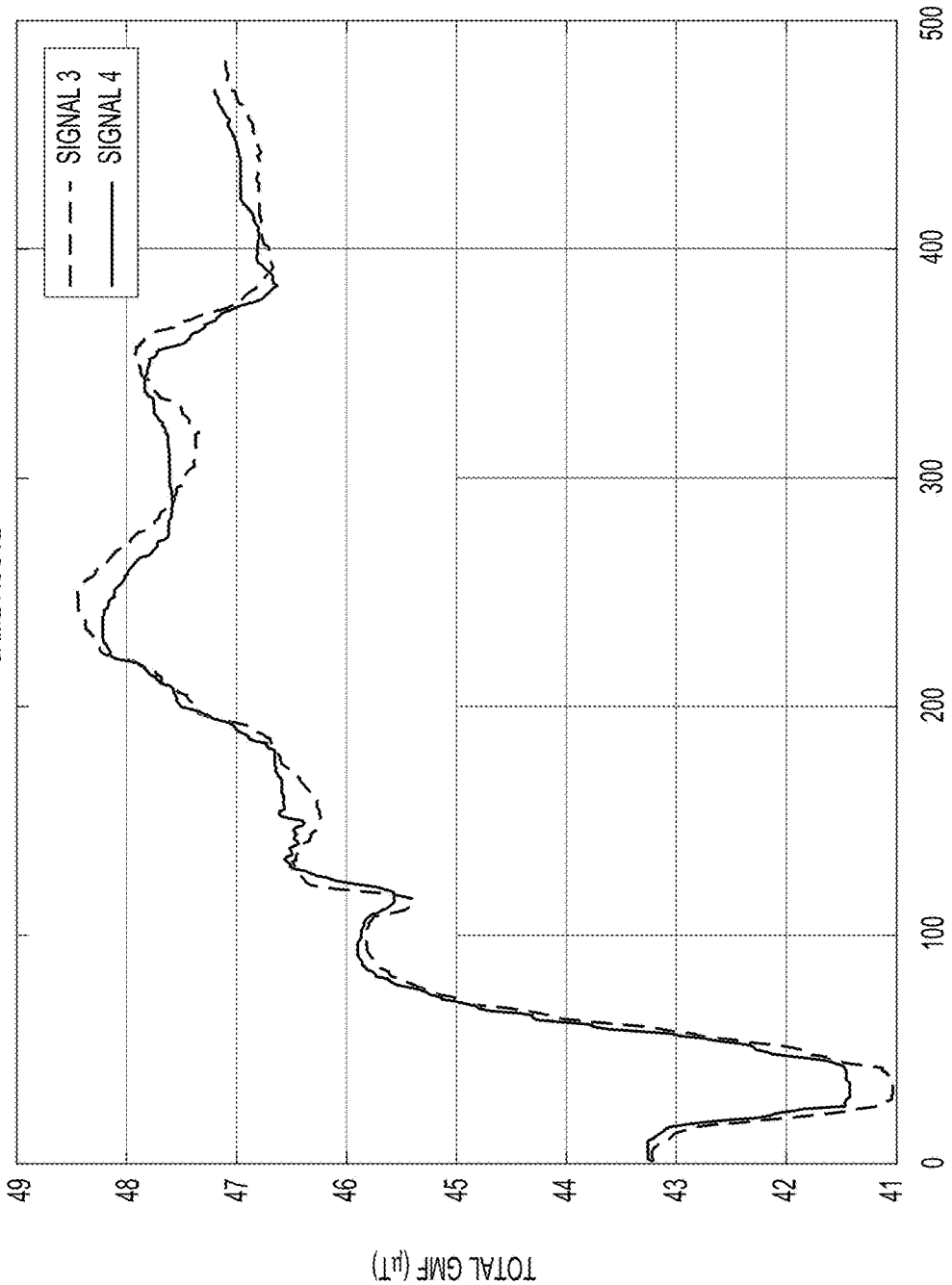

Furthermore, as described above, a recording may be a series of values each of which represents one or more measurements at a particular time or location relative to other measurements that other values in the series represent. In particular embodiments, if the measurements were made or taken in a time series (for example at a sampling rate of 50 Hz), then the series of measurements (or a corresponding series of values calculated from those measurements) may be converted to a distance series, for example, for quantitative comparison to one or more other series of measurements or values. When comparing two or more magnetic recordings with each other to determine a degree of their difference or similarity, it may be advantageous to represent each of them as a distance series in which the magnetic values of the magnetic recording are provided at equal distances along the trajectory corresponding to the magnetic recording, instead of as a time series in which the magnetic values of the magnetic recording are provided at equal time intervals, e.g., at 50 Hz. This may be particularly advantageous when attempting to determine a difference or similarity between or among two or more magnetic recordings with corresponding trajectories that were recorded at different and potentially variable velocities. FIGS. 6A-6B and FIGS. 7A-7B illustrate example conversion of time series of magnetic recordings to distance series. FIG. 6A illustrates two example plots of two example magnetic recordings represented as example time series. FIG. 6B illustrates two example plots representing those same magnetic recordings as example distance series. In the example of FIGS. 6A-6B, the two magnetic recordings "Signal 1" and "Signal 2" were recorded by two different users moving a device along the same trajectory. FIG. 7A illustrates two other example plots of two other example magnetic recordings represented as example time series. FIG. 7B illustrates two other example plots representing those same magnetic recordings as example distance series. In the example of FIGS. 7A-7B, the two magnetic recordings "Signal 3" and "Signal 4" were recorded by two different users moving a device along the same trajectory (but different from the trajectory corresponding to the magnetic recordings of FIGS. 6A-6B). In particular embodiments, to represent a time series of a magnetic recording as a distance series, a velocity at which the device that made the magnetic recording moved during magnetic recording may be estimated to facilitate modifying the representation of the magnetic recording. The resulting distance series will include a set of magnetic values over equal-length displacements in space. To determine a velocity based on a time series of sensor readings, particular embodiments may use one or more of the following methods:

Step-based method: Movement may be determined by analyzing steps. The method may determine a number and length of steps while also considering a probability of false steps.

Integration of local gyroscope acceleration: Movement is estimated by integrating readings from local gyroscope accelerations.

Neural network model training: Movement may be determined through the training of neural network models. In this case, a large amount of data may be used to train the neural network. A regression neural network model may learn to predict movement using data from various sensors, such as accelerometers, gyroscopes, magnetometers, and pressure sensors.

Magnetometer-based displacement determination: Displacement or velocity may be determined using one or more apparatuses, systems, or methods described below.

Vibration signal analysis: Wheel movement may be determined using the repetitive nature of vibration signals from one or more wheels, from which the frequency of rotation and movement of the wheel(s) may be determined.

Image record reconstruction for displacement calculation: Displacement may be calculated by reconstructing an image record, such as a video sequence. This may involve determining the relative distance between specific points in the image, identifying the axis of movement, and reconstructing the absolute displacement.

Although particular embodiments for determining a velocity based on a time series of sensor readings are described and illustrated, this disclosure contemplates any suitable method for determining a velocity based on a time series of sensor readings.

Figure 8:
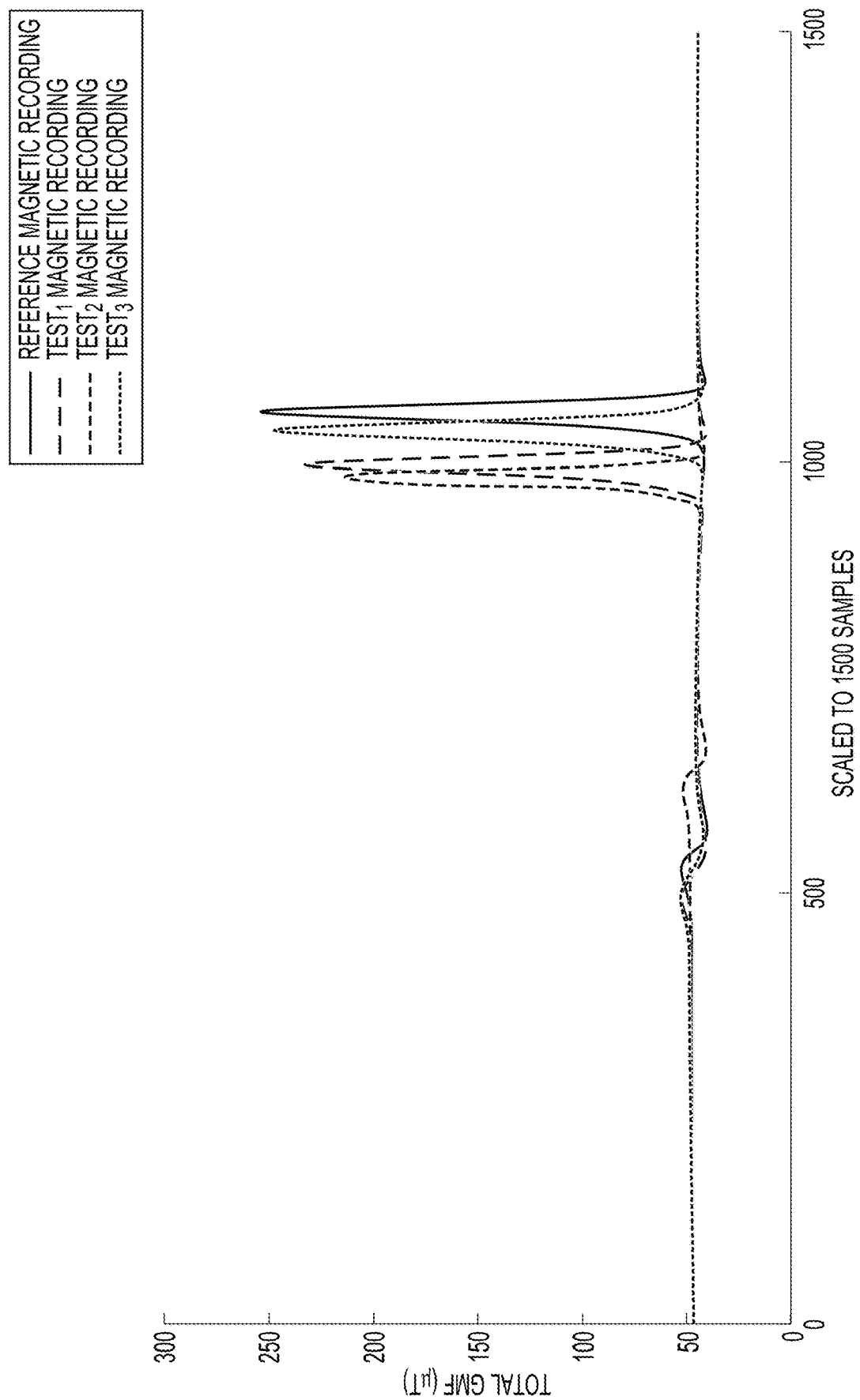
FIG. 8 illustrates example scaling of the plots of FIG. 5.

FIG. 8 illustrates example scaling of the plots of FIG. 5. In the example of FIG. 8, the plots of FIG. 5 have been scaled to 1500 samples. This may substantially normalize the magnetic recordings with respect to velocity. Although particular scaling is described and illustrated, this disclosure contemplates any suitable scaling. In FIG. 8, the difference between the plot of "Reference magnetic recording" and the plot of "$Test_1$ magnetic recording" is approximately distance d=14.741; the difference between the plot of "Reference magnetic recording" and the plot of "$Test_2$ magnetic recording" is approximately distance d=20.382; and the difference between the plot of "Reference magnetic recording" and the plot of "$Test_3$ magnetic recording" is approximately distance d=22.642. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision). In particular embodiments, these distances d are dimensionless and are measures of difference or similarity that may be calculated using the methods described herein. In particular embodiments, these distances d are each a measure of difference or similarity between two time series that takes into account possible distortions in the time axis (in this case the x axis). In particular embodiments, a distance d (or difference) between magnetic recordings may be calculated as the sum of the Euclidean distances between corresponding points in their plots. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In particular embodiments, this calculation may be performed mathematically without graphical versions of the plots of the magnetic recordings being generated or displayed. In this calculation, a point in the plot of the candidate magnetic recording and a point in the plot of the reference magnetic recording may correspond to each other if they have the same position in the order among the points constituting their respective plots. In particular embodiments, this approach to calculating the difference between two magnetic recordings is substantially invariant to the velocity with which the magnetic sensor is moved along the trajectory in question.

Figure 9:
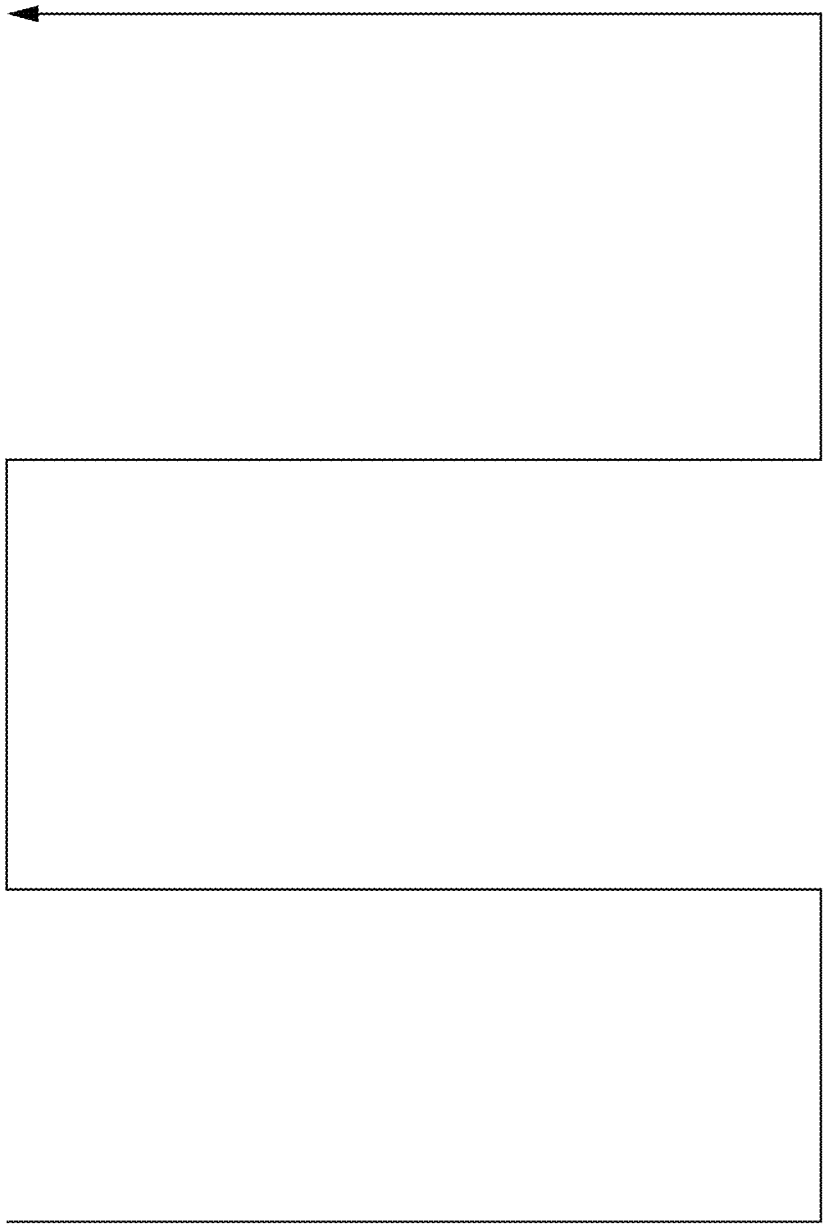
FIG. 9 illustrates another example two-dimensional trajectory.
Figure 10:
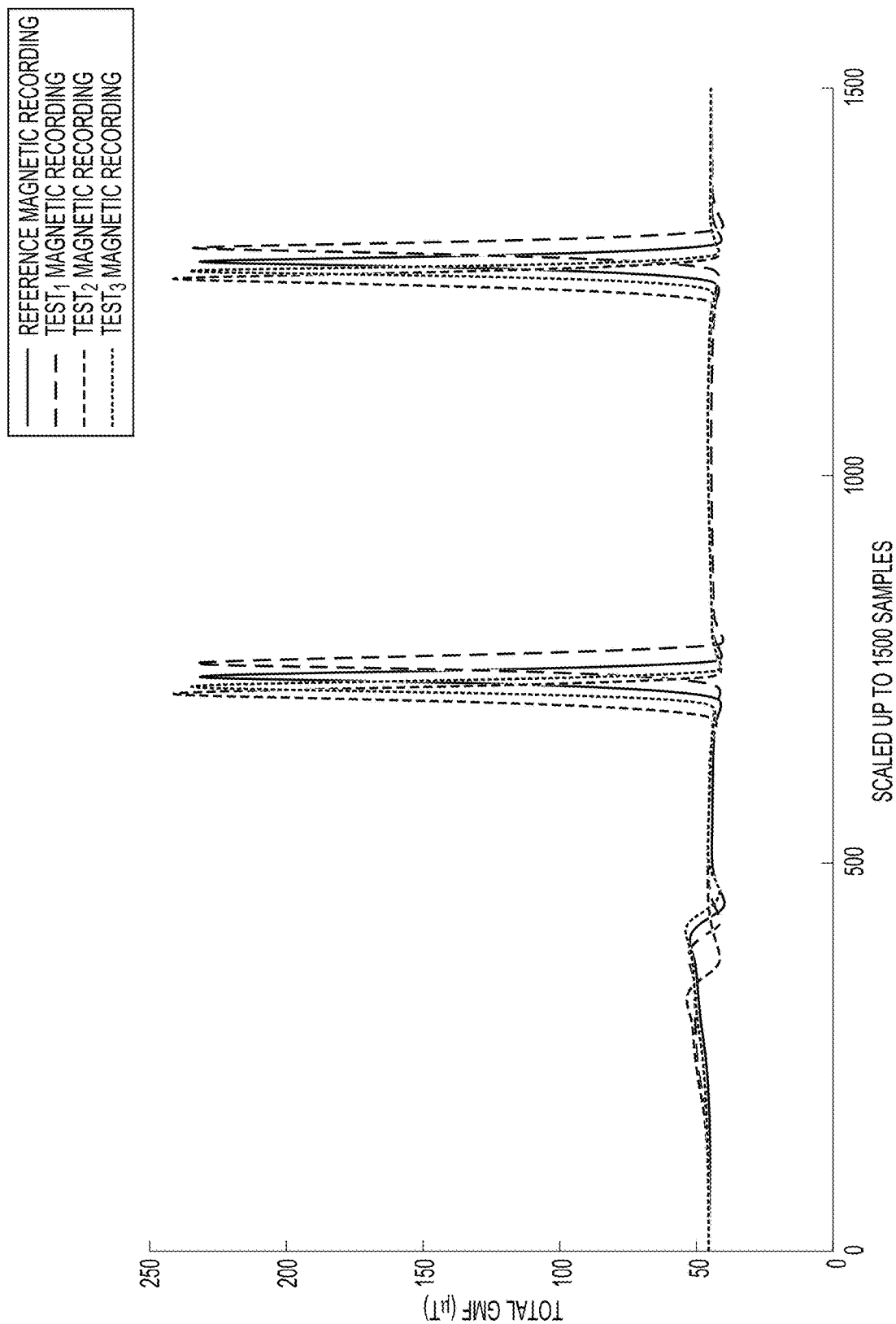
FIG. 10 illustrates example plots of example magnetic recordings of the trajectory of FIG. 7.

FIG. 9 illustrates another example two-dimensional trajectory. This trajectory may be created, for example, by a user moving a device including one or more magnetic sensors (such as, for example, magnetometers) on the top of a table as indicated in FIG. 9. FIG. 10 illustrates four example plots of example magnetic recordings of the trajectory of FIG. 9. In the example of FIG. 10, the magnetic recordings have been scaled to 1500 samples, which may substantially normalize the magnetic recordings with respect to the device's velocity along the trajectory of FIG. 9. Although particular scaling is described and illustrated, this disclosure contemplates any suitable scaling. In FIG. 10, the first one of the magnetic recordings, "Reference magnetic recording," is a reference magnetic recording made by moving a device along the trajectory of FIG. 9; the second one of the magnetic recordings, "$Test_1$ magnetic recording," is a candidate magnetic recording made by moving the device along the trajectory of FIG. 9 under the same conditions as the reference magnetic recording; the third one of the magnetic recordings, "$Test_2$ magnetic recording," is a candidate magnetic recording made by moving the device along the trajectory of FIG. 9 at an increased velocity relative to the reference magnetic recording; and the fourth one of the magnetic recordings, "Test₃ magnetic recording," is a candidate magnetic recording made by moving the device along the trajectory of FIG. 9 at a reduced velocity relative to the reference magnetic recording. In the example of FIG. 10, the magnetic recordings have been scaled to 1500 samples; the difference between the plot of "Reference magnetic recording" and the plot of "Test₁ magnetic recording" is approximately distance d=21.149; the difference between the plot of "Reference magnetic recording" and the plot of "Test₂ magnetic recording" is approximately distance d=12.839; and the difference between the plot of "Reference magnetic recording" and the plot of "Test₃ magnetic recording" is approximately distance d=24.118. Although the trajectory of FIG. 9 is quite different from the trajectory of FIG. 4, the results of computing the distances are similar. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision).

Figure 11:
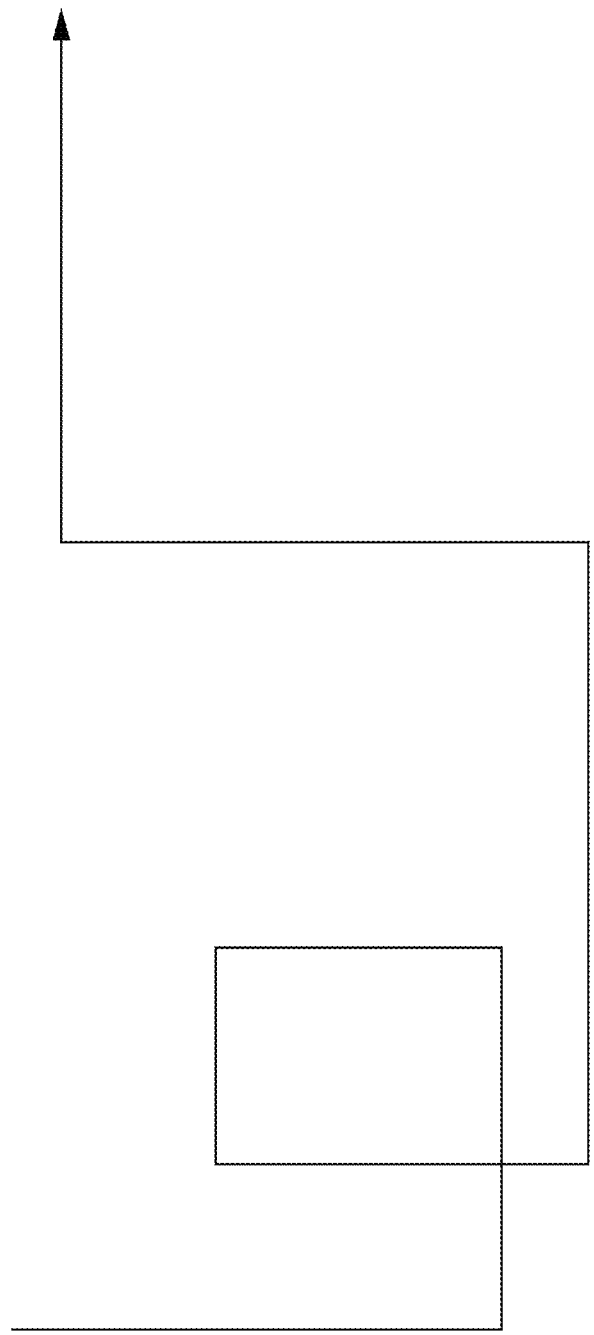
FIG. 11 illustrates another example two-dimensional trajectory.
Figure 12:
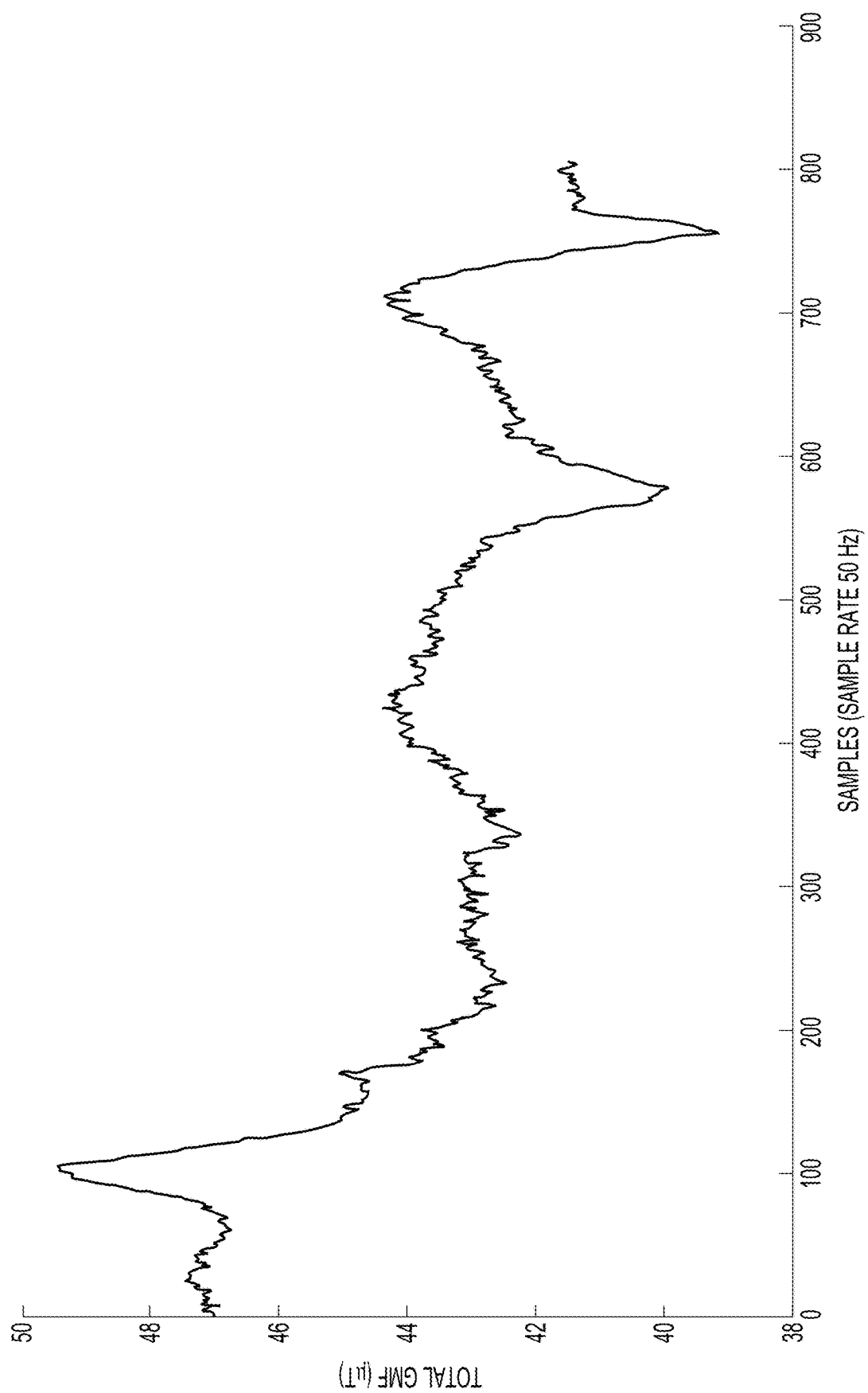
FIG. 12 illustrates an example plot of an example magnetic recording of the trajectory of FIG. 11.

FIG. 11 illustrates another example two-dimensional trajectory, and FIG. 12 illustrates an example magnetic recording of the trajectory of FIG. 11. The difference between the plot of "Reference magnetic recording" in FIG. 8 and the magnetic recording of FIG. 12 is approximately distance d=547.428. The difference between the plot of "Reference magnetic recording" in FIG. 10 and the magnetic recording of FIG. 12 is approximately distance d=489.113. As can be seen, the proposed approach, in particular embodiments, works well when comparing magnetic recordings of different trajectories. With this approach, it can successfully be determined that the magnetic recordings of different trajectories (with different shapes) differ from each other. As described below, in particular embodiments, this approach works for trajectories with identical shapes when those trajectories are shifted in space. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision).

Figure 13:
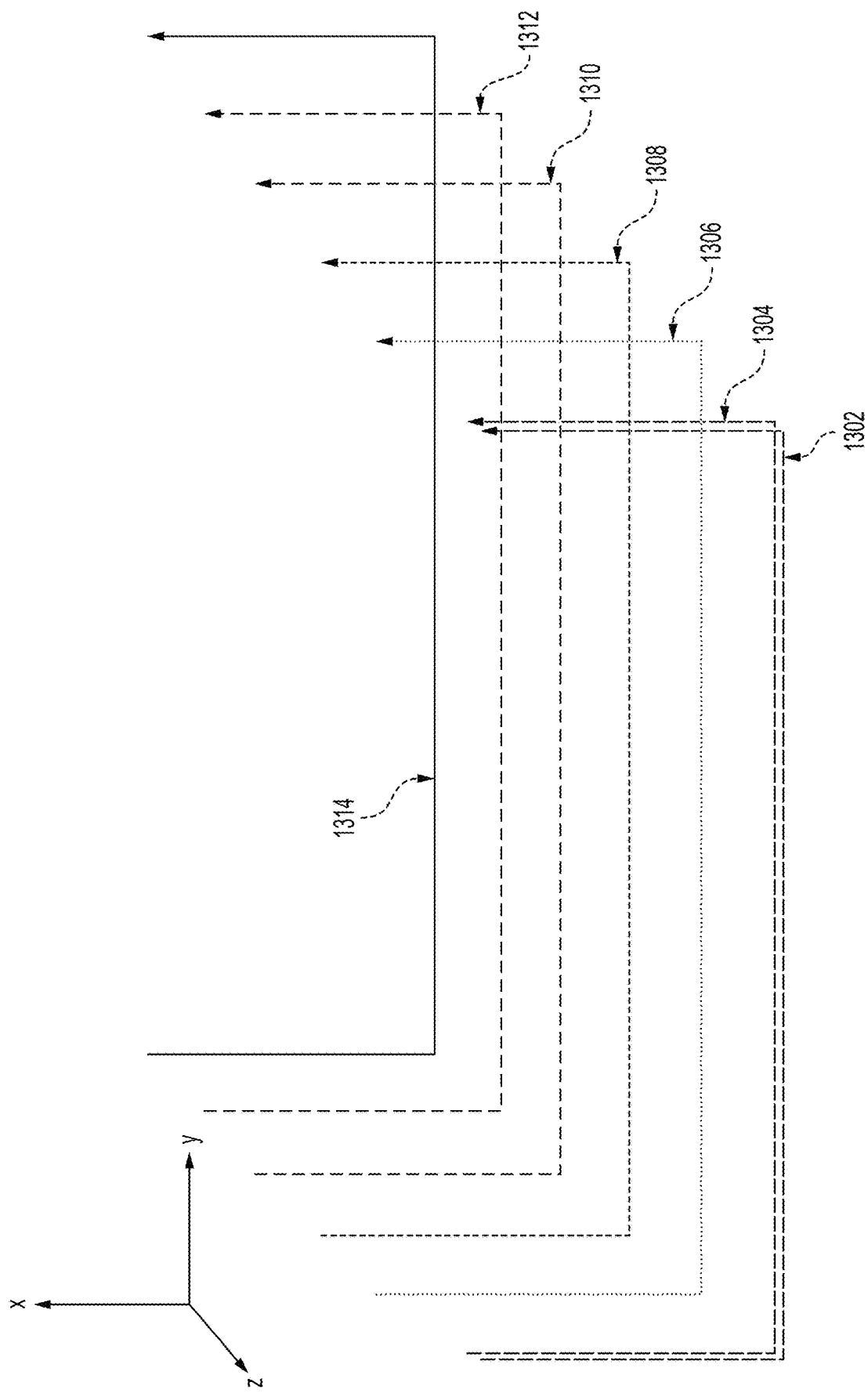
FIG. 13 illustrates an example two-dimensional reference trajectory and example two-dimensional candidate trajectories offset from the reference trajectory.
Figure 14:
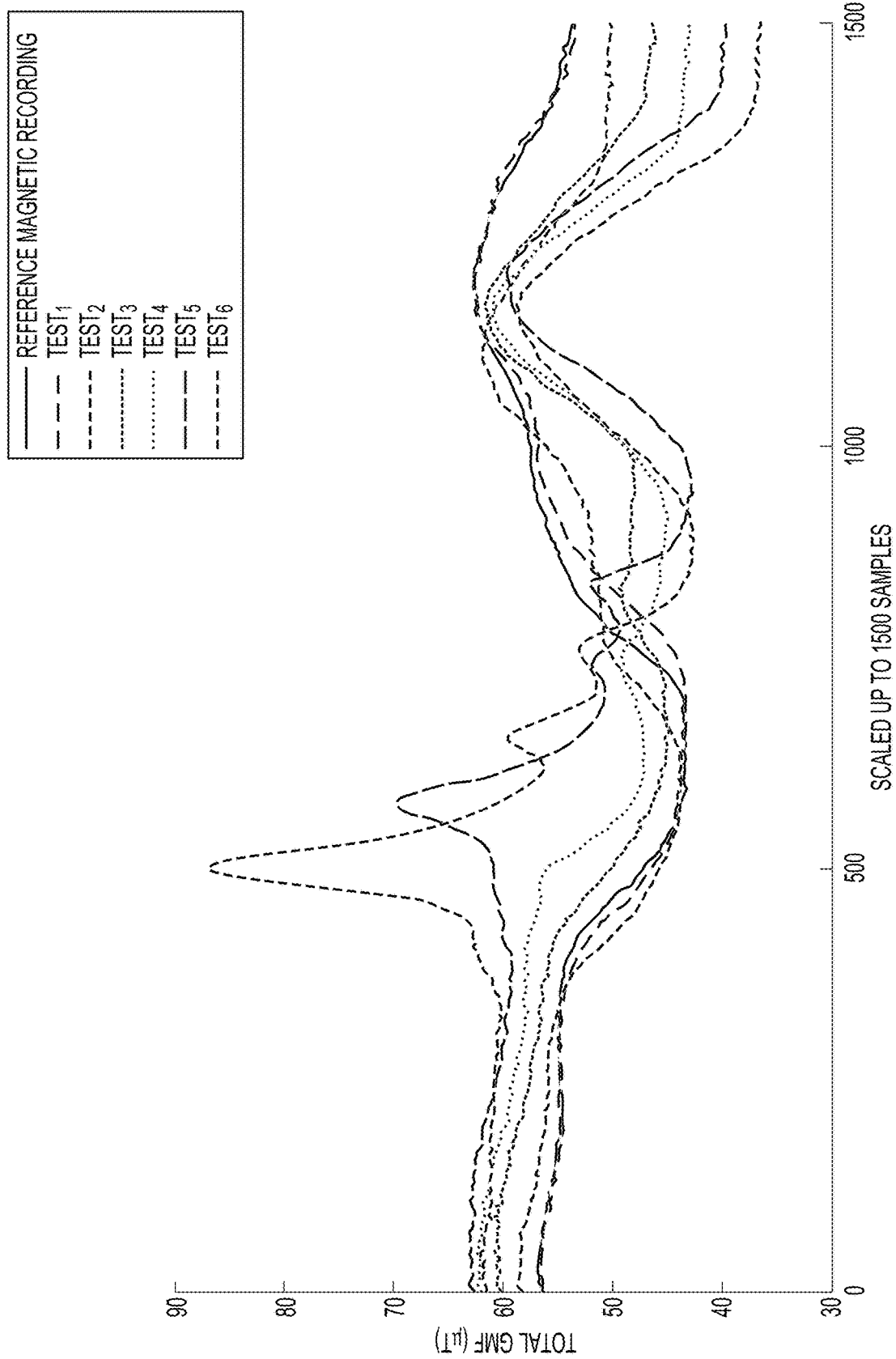
FIG. 14 illustrates example plots of example magnetic recordings of the trajectories of FIG. 13.

FIG. 13 illustrates an example two-dimensional reference trajectory 1302 and example two-dimensional candidate trajectories 1304, 1306, 1308, 1310, 1312, and 1314 offset from the reference trajectory. In the example of FIG. 13 (which is not necessarily to scale), candidate trajectories 1304, 1306, 1308, 1310, 1312, 1314 are offset in the z direction from reference trajectory 1302 by approximately 0.0 meters, 0.1 meters, 0.2 meters, 0.3 meters, 0.4 meters, and 0.5 meters, respectively. FIG. 14 illustrates example magnetic recordings of the trajectories of FIG. 13. In the example of FIG. 14, the magnetic recordings have been scaled to 1500 samples, which may substantially normalize the magnetic recordings with respect to velocity. Although particular scaling is described and illustrated, this disclosure contemplates any suitable scaling. As can be seen, slight trajectory offset from reference trajectory 1302 can have a significant effect on magnetic recordings and resulting distance. In FIG. 14, "Reference magnetic recording" corresponds to reference trajectory 1302; "Test₁ magnetic recording" corresponds to candidate trajectory 1304 offset from reference trajectory 1302 by 0.0 meters; "Test₂ magnetic recording" corresponds to candidate trajectory 1306 offset from reference trajectory 1302 by approximately 0.1 meters; "Test₃ magnetic recording" corresponds to candidate trajectory 1308 offset from reference trajectory 1302 by approximately 0.2 meters; "Test₄ magnetic recording" corresponds to candidate trajectory 1310 offset from reference trajectory 1302 by approximately 0.3 meters; "Test₅ magnetic recording" corresponds to candidate trajectory 1312 offset from reference trajectory 1302 by approximately 0.4 meters; and "Test₆ magnetic recording" corresponds to candidate trajectory 1314 offset from reference trajectory 1302 by approximately 0.5 meters. Moreover, the difference between the plot of "Reference magnetic recording" and the plot of "Test₁ magnetic recording" is approximately distance d=18.608; the difference between the plot of "Reference magnetic recording" and the plot of "Test₂ magnetic recording" is approximately distance d=90.247; the difference between the plot of "Reference magnetic recording" and the plot of "Test₅ magnetic recording" is approximately distance d=170.575; the difference between the plot of "Reference magnetic recording" and the plot of "Test₄ magnetic recording" is approximately distance d=248.769; the difference between the plot of "Reference magnetic recording" and the plot of "Test₅ magnetic recording" is approximately distance d=272.814; and the difference between the plot of "Reference magnetic recording" and the plot of "Test₆ magnetic recording" is approximately distance d=363.855. This shows that, in particular embodiments, the offset from the reference leads to an increase in the distance criteria. However, the exact reproduction of the trajectory gives the most similar magnetic recordings, while the criterion for the difference or similarity distance is always small. Also, as shown in the FIG. 3, the magnetic recording for a particular trajectory does not significantly change over time (invariant to the time/day) in particular embodiments. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision).

As described above, FIG. 3 illustrates example magnetic recordings. In the example of FIG. 3, the magnetic recordings have been scaled to 1500 samples, which may substantially normalize the magnetic recordings with respect to velocity. Although particular scaling is described and illustrated, this disclosure contemplates any suitable scaling. In FIG. 3, there are four plots of four magnetic recordings of the same trajectory at different times: the first one of the magnetic recordings, "Reference magnetic recording," is a reference magnetic recording made by moving a device along a trajectory at a first time; the second one of the magnetic recordings, "Recording 3 hours later," is a candidate magnetic recording made by moving the device along the same trajectory approximately three hours after the reference magnetic recording; the third one of the magnetic recordings, "Recording 12 hours later," is a candidate magnetic recording made by moving the device along the same trajectory approximately 12 hours after the reference magnetic recording; and the fourth one of the magnetic recordings, "Recording 26 hours later," is a candidate magnetic recording made by moving the device along the same trajectory approximately 26 hours after the reference magnetic recording. In the example of FIG. 3, the magnetic recordings have been scaled to 1500 samples; the difference between the plot of "Reference magnetic recording" and the plot of "Recording 3 hours later" is approximately distance d=14.510; the difference between the plot of "Recording 12 hours later" and the plot of "Reference magnetic recording" is approximately distance d=15.356; and the difference between the plot of "Reference magnetic recording" and the plot of "Recording 26 hours later" is approximately distance d=14.457.

Figure 15B:
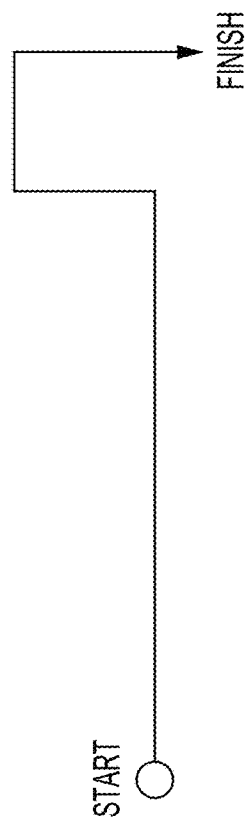
FIGS. 15A and 15B illustrate other example two-dimensional trajectories.
Figure 15A:
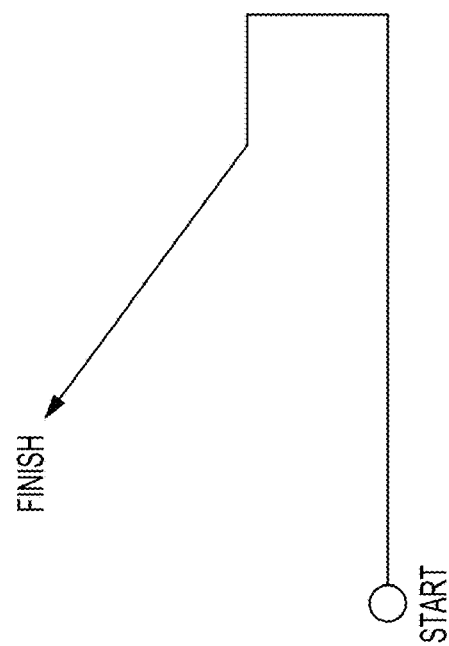

FIGS. 15A and 15B illustrate other example two-dimensional trajectories. These trajectories may be created, for example, by a user walking the example routes or paths indicated in FIG. 15A or 15B with a device including one or more magnetic sensors (such as, for example, magnetometers). The route indicated in FIG. 15A may have a length of approximately 7.2 meters from start to finish. The first section, closest to the start, may be approximately 4.0 meters in length; the second section, after the first approximately 900 turn to the left along the route, may be approximately 0.6 meters in length; the third section, after the second approximately 90° turn to the left along the route, may be approximately 0.6 meters in length; and the fourth, or last, section, after the approximately 450 turn to the right along the route, may be approximately 2 meters in length. The route indicated in FIG. 15B may have a length of approximately 6.0 meters from start to finish. The first section, closest to the start, may be approximately 4.0 meters in length; the second section, after the approximately 90° turn to the left along the route, may be approximately 0.6 meters in length; the third section, after the first approximately 900 turn to the right along the route, may be approximately 0.6 meters in length; and the fourth, or last, section, after the second approximately 900 turn to the right along the route, may be approximately 0.8 meters in length. Although particular routes or paths with particular numbers of particular sections of particular lengths are described and illustrated herein, this disclosure contemplates any suitable routes or paths with any suitable numbers of any suitable sections of any suitable lengths. The example routes or paths of FIGS. 15A and 15B both include four legs. The first and second legs of the example route or path of FIG. 15A are substantially identical to the first and second legs of the example route or path of FIG. 15B. The third and fourth legs of the example route or path of FIG. 15A differ significantly from the third and fourth legs of the example route or path of FIG. 15B. In particular embodiments, the following results are obtained: for files from the same route the distance d does not exceed approximately 40 and, for the files from different routes, such distance d is more than approximately 160.

Figure 16A:
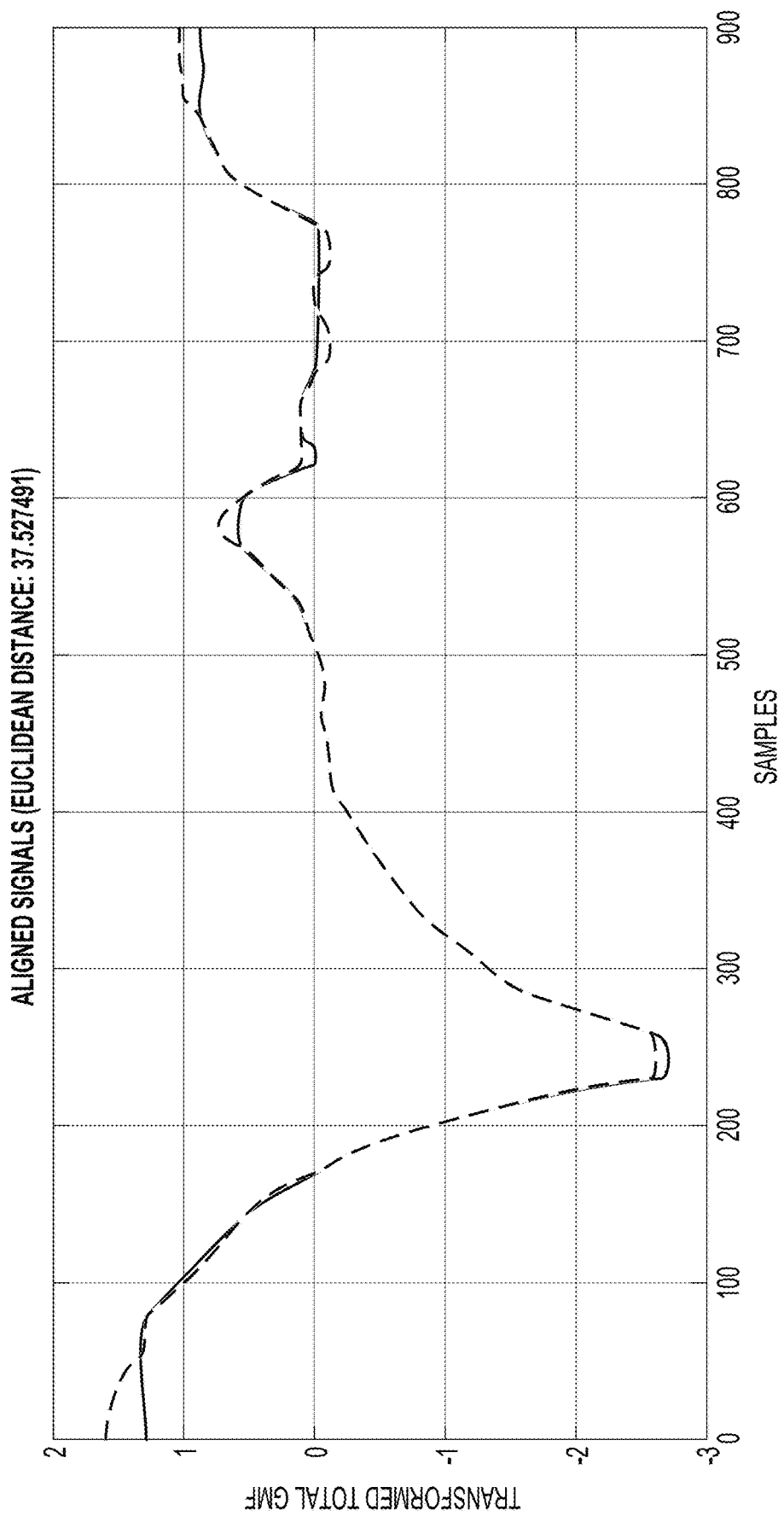
FIGS. 16A-16F illustrate example comparisons of example plots of four example magnetic recordings of the trajectory of FIG. 15A with each other.
Figure 16B:
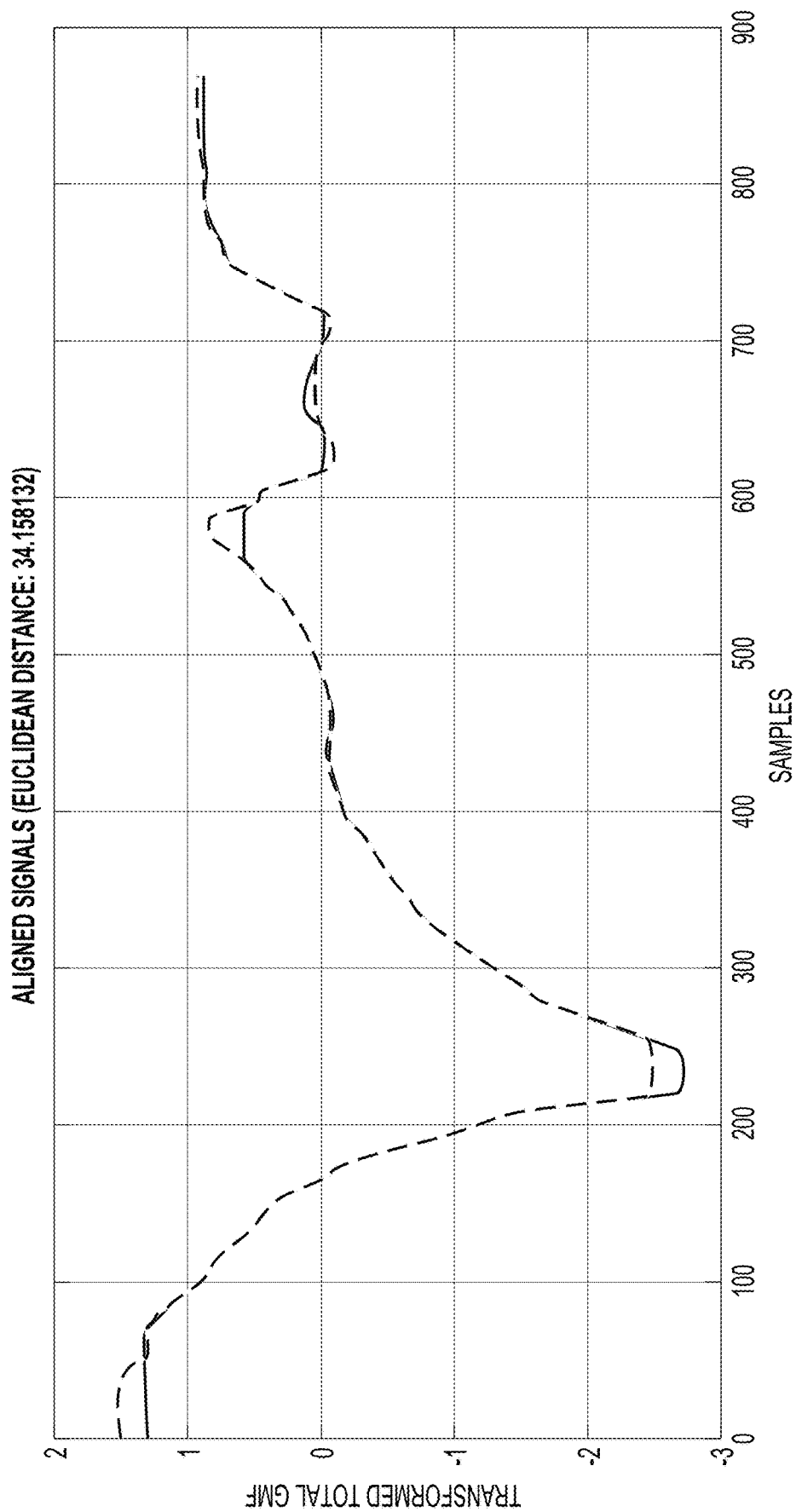
Figure 16C:
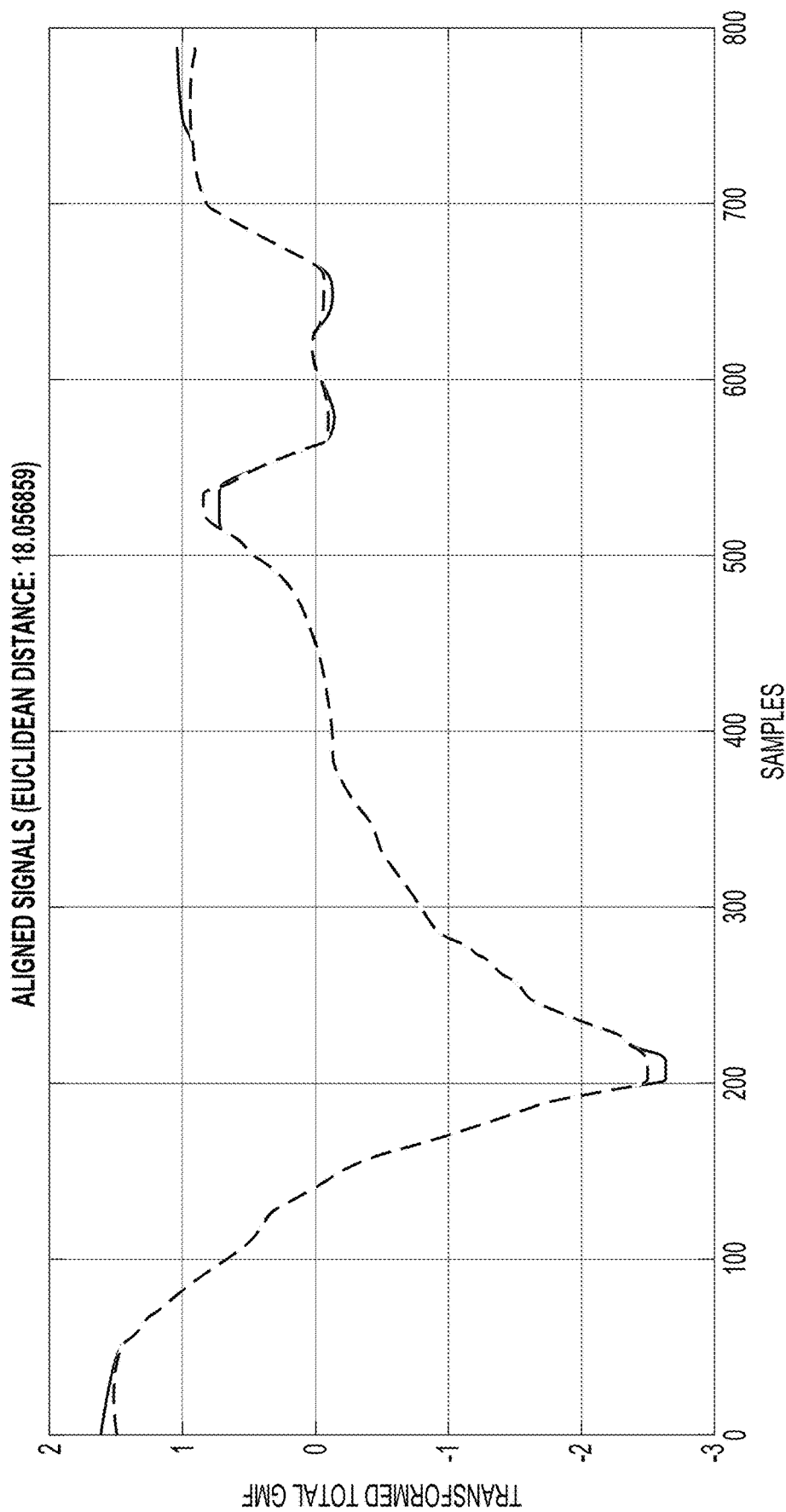
Figure 16D:
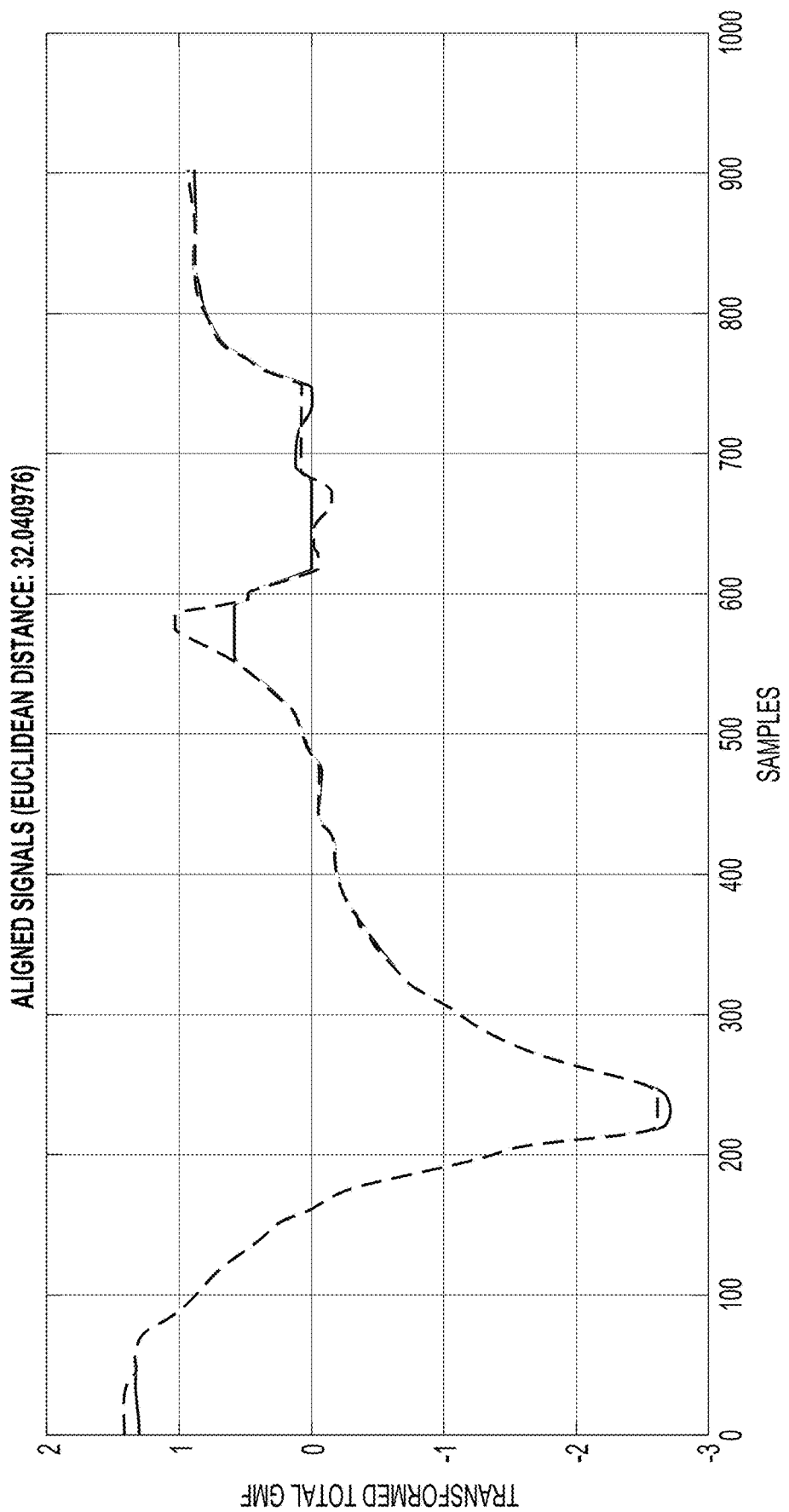
Figure 16E:
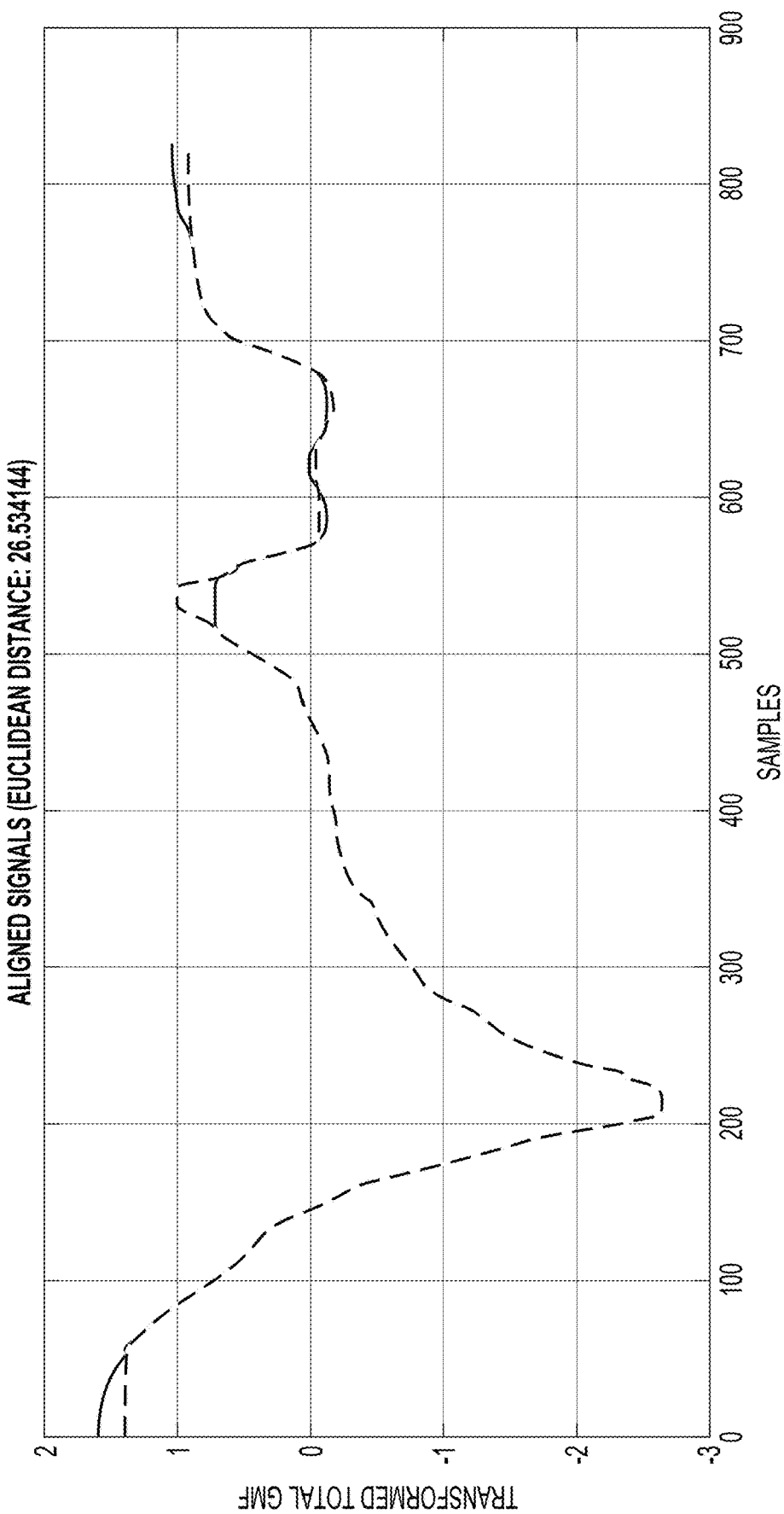
Figure 16F:
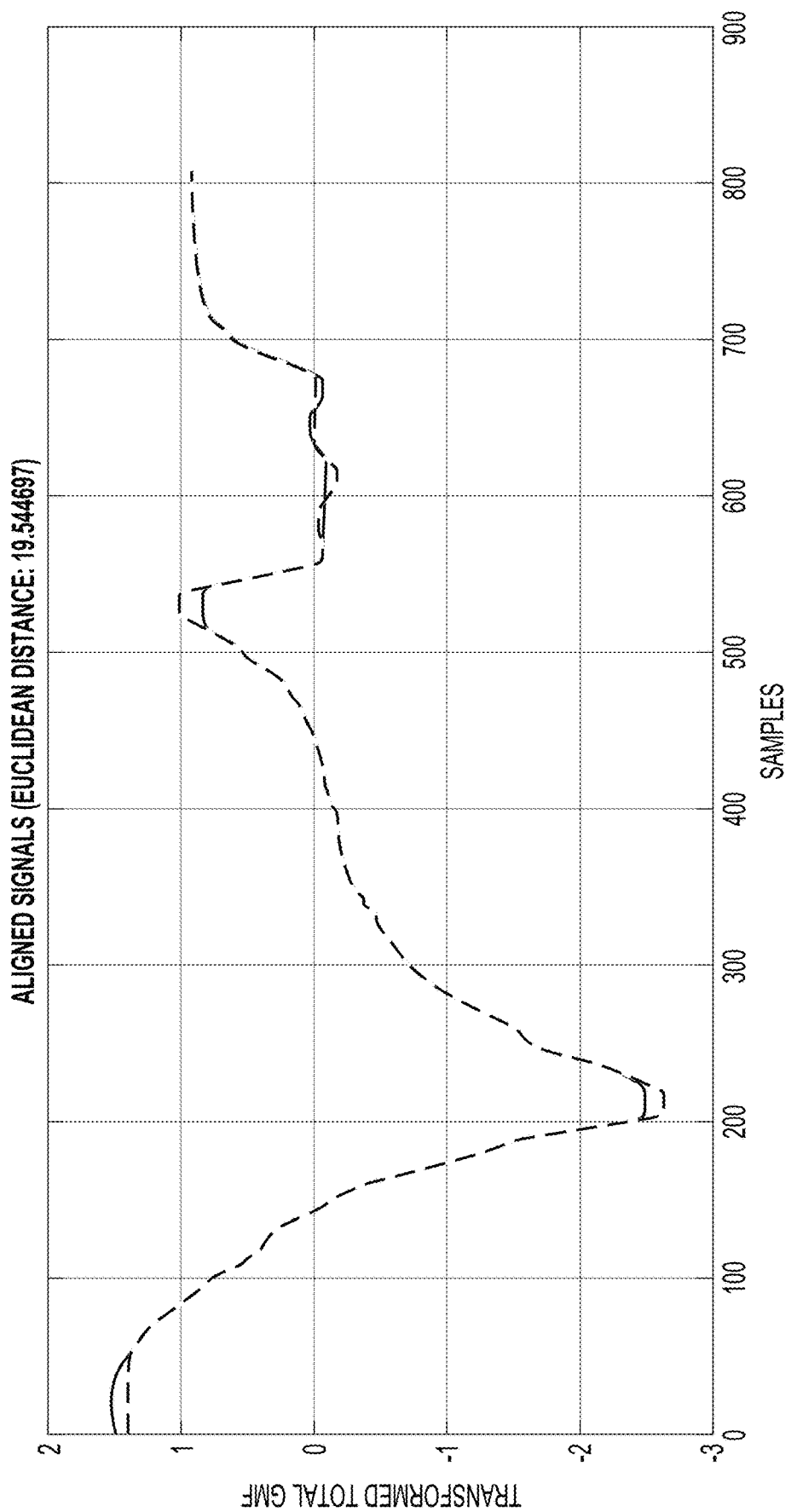

FIGS. 16A-16F illustrate example comparisons of four example magnetic recordings of the trajectory of FIG. 15A with each other. For FIGS. 16A-16F, four different magnetic recordings were made of the same trajectory at four different times. In the example of FIG. 16A, a plot of the first one of those magnetic recordings is compared with a plot of the second one of the magnetic recordings. In the example of FIG. 16B, a plot of the first one of the magnetic recordings of the trajectory of FIG. 15A is compared with a plot of the third one of the magnetic recordings of the trajectory of FIG. 15A. In the example of FIG. 16C, a plot of the second one of the magnetic recordings of the trajectory of FIG. 15A is compared with a plot of the third one of the magnetic recordings of the trajectory of FIG. 15A. In the example of FIG. 16D, a plot of the first one of the magnetic recordings of the trajectory of FIG. 15A is compared with a plot of the fourth one of the magnetic recordings of the trajectory of FIG. 15A. In the example of FIG. 16E, a plot of the second one of the magnetic recordings of the trajectory of FIG. 15A is compared with a plot of the fourth one of the magnetic recordings of the trajectory of FIG. 15A. In the example of FIG. 16F, a plot of the third one of the magnetic recordings of the trajectory of FIG. 15A is compared with a plot of the fourth one of the magnetic recordings of the trajectory of FIG. 15A. In FIGS. 16A-16F, the magnetic recordings have been at least approximately aligned with each other by scaling them to 900 samples and normalizing their magnetic values as described above and differences (or distances d) between the magnetic recordings have been calculated, also as described above. In FIGS. 16A-16F, the units and ranges of the x axes (samples 0-900) and y axes (transformed total GMF from −3 to +3) reflect this alignment. In particular embodiments, such alignment may include spline interpolation. In addition or as an alternative, such alignment may include substantially equalizing the magnetic recordings by or according to the peaks or amplitude differences present in the magnetic recordings. In addition or as an alternative, such alignment may include centering the magnetic recordings by subtracting their respective averages from their respective magnetic values. In addition or as an alternative, such alignment may include scaling the magnetic recordings by dividing their respective magnetic values by respective weighted averages. In addition or as an alternative, such alignment may include filtering the magnetic recordings. After such alignment, the peaks of the magnetic recordings may substantially coincide with each other and the number of samples in each of them may be substantially the same (as can be seen by way of example in FIGS. 16A-16F). Although particular alignment of particular magnetic recordings is described and illustrated, this disclosure contemplates any suitable alignment of any suitable magnetic recordings. After their alignment, the magnetic recordings' difference was calculated as the sum of the Euclidean distances between corresponding points in the plots of the magnetic recordings. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In particular embodiments, a first point in a plot of a first magnetic recording and a second point in a plot of a second magnetic recording may correspond to each other if they have the same position in the order among the points constituting their respective plots. For example, the $53^{rd}$ point in the first plot (e.g. the point corresponding to the $53^{rd}$ sample in the magnetic recording represented by the first plot) may correspond to the $53^{rd}$ point in the second plot (e.g. the point corresponding to the $53^{rd}$ sample in the magnetic recording represented by the second plot); the $812^{th}$ point in the first plot (e.g. the point corresponding to the 812th sample in the magnetic recording represented by the first plot) may correspond to the 812th point in the second plot (e.g. the point corresponding to the 812th sample in the magnetic recording represented by the second plot); and so on.

In FIG. 16A, the difference between the two magnetic recordings is approximately distance d=37.527491. In FIG. 16B, the difference is approximately distance d=34.158132. In FIG. 16C, the difference is approximately distance d=18.056859. In FIG. 16D, the difference is approximately distance d=32.040976. In FIG. 16E, the difference is approximately distance d=26.534144. In FIG. 16F, the difference is approximately distance d=19.544697. Although particular numbers of significant digits are described and illustrated herein, this disclosure contemplates any suitable numbers of significant digits. Although particular measurements, calculations, and operations with particular numbers of significant digits (or levels of precision) are described and illustrated herein, this disclosure contemplates any suitable measurements, calculations, and operations with any suitable numbers of significant digits (or levels of precision). In particular embodiments, two magnetic recordings with a smaller distance d between them may be considered to be less different from (or more similar to) each other than two magnetic recordings with a larger distance d between them. Accordingly, in the example of FIGS. 16A-16F, the second and third ones of the magnetic recordings of the trajectory of FIG. 15A (which are plotted in FIG. 16C) may be the least different from (or most similar to) each other among those compared.

Figure 17A:
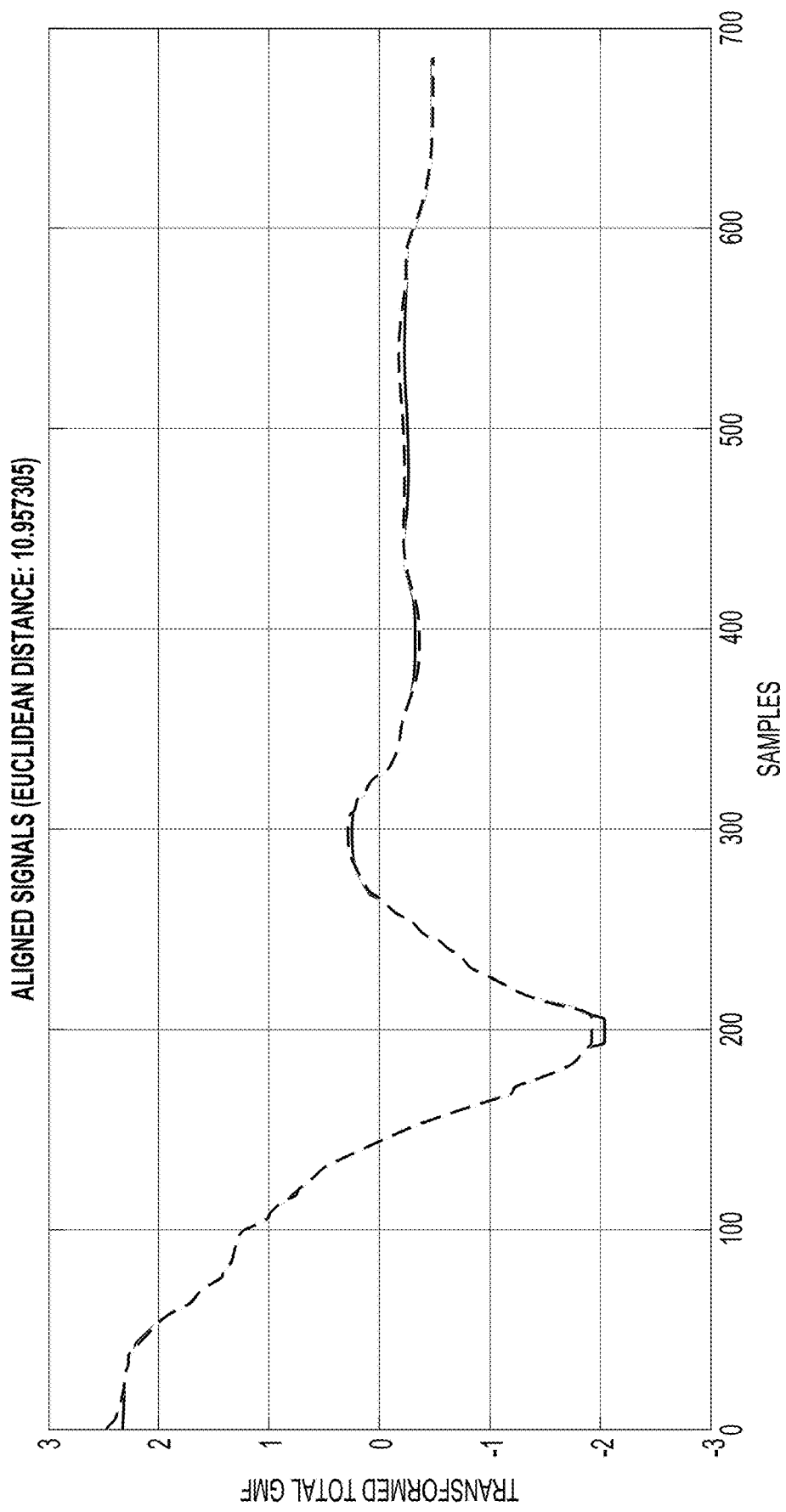
FIGS. 17A-17C illustrate example comparisons of example plots of three example magnetic recordings of the trajectory of FIG. 15B with each other.
Figure 17B:
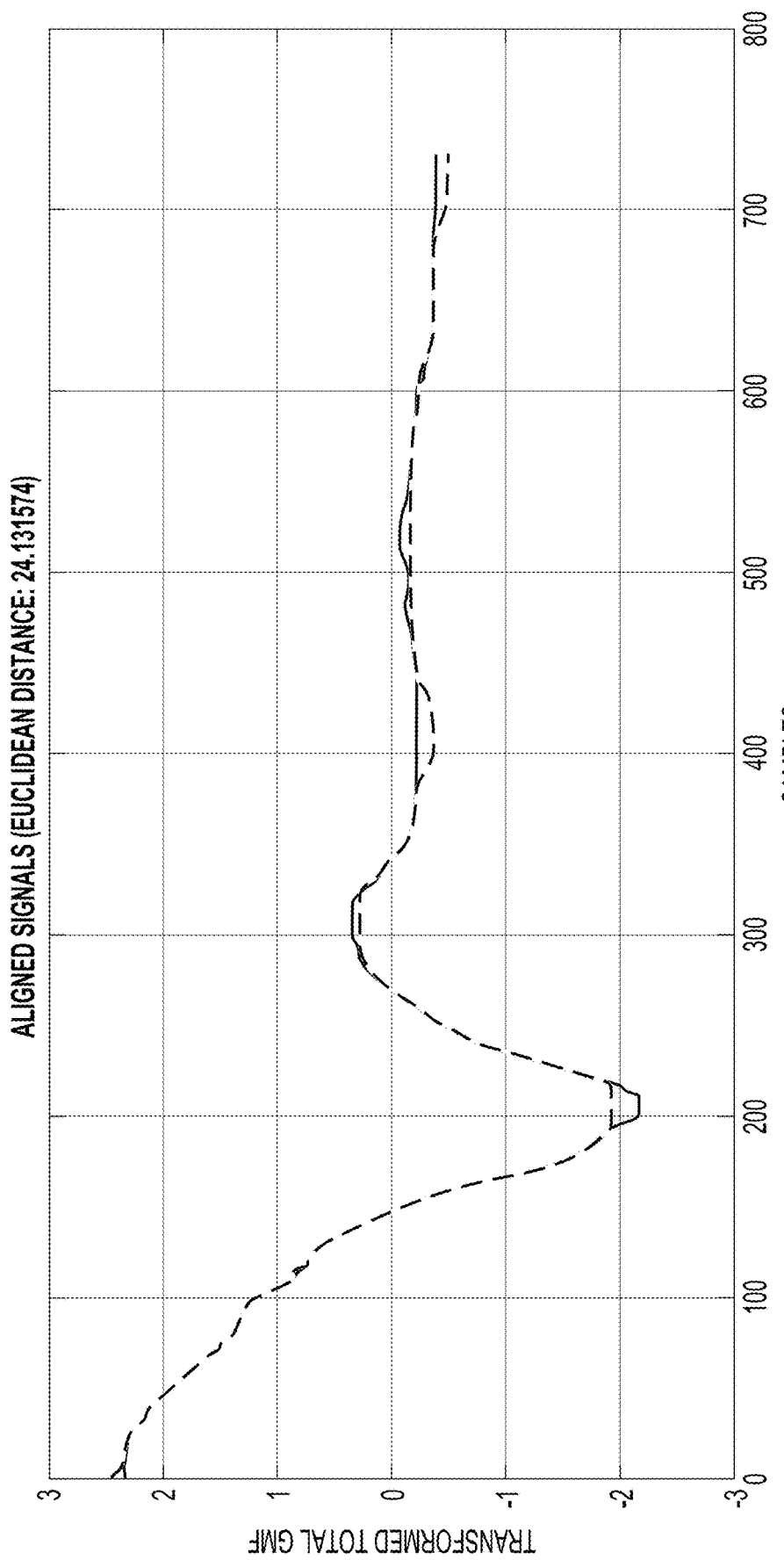
Figure 17C:
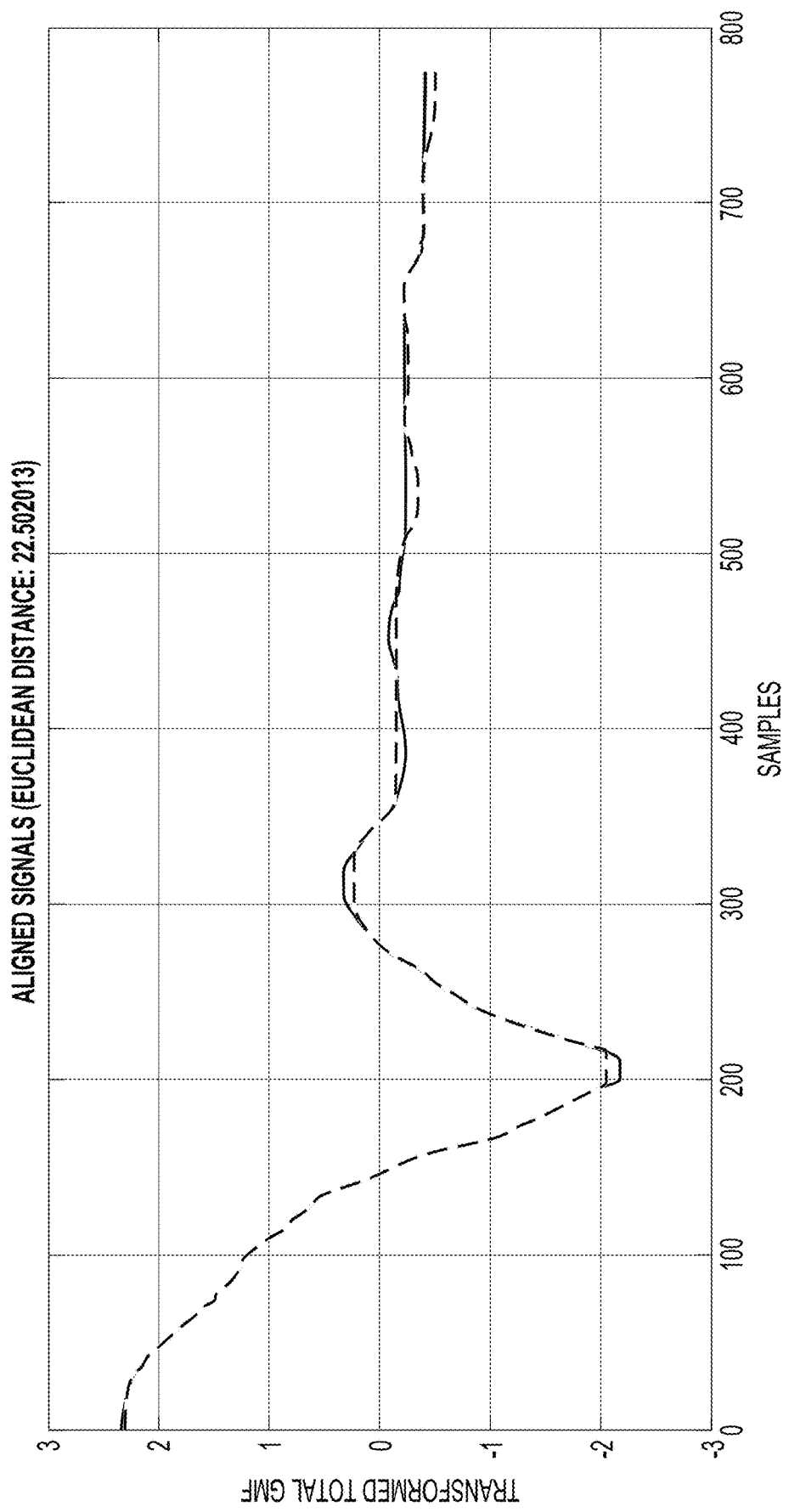

FIGS. 17A-17C illustrate example comparisons of three example magnetic recordings of the trajectory of FIG. 15B. For FIGS. 17A-17C, three different magnetic recordings were made of the same trajectory at three different times. In the example of FIG. 17A, a plot of the second one of those magnetic recordings is compared with a plot of the third one of the magnetic recordings. In the example of FIG. 17B, a plot of the first one of the magnetic recordings of the trajectory of FIG. 15B is compared with a plot of the third one of the magnetic recordings of the trajectory of FIG. 15B. In the example of FIG. 17C, a plot of the first one of the magnetic recordings of the trajectory of FIG. 15B is compared with a plot of the second one of the magnetic recordings of the trajectory of FIG. 15B. In FIGS. 17A-17C, the magnetic recordings have been at least approximately aligned with each other by scaling them to 700 samples and normalizing their magnetic values as described above and differences (or distances d) between the magnetic recordings have been calculated, also as described above. In FIGS. 17A-17C, the units and ranges of the x axes (samples 0-700) and y axes (transformed total GMF from −3 to +3) reflect this alignment. In particular embodiments, such alignment may include spline interpolation. In addition or as an alternative, such alignment may include substantially equalizing the magnetic recordings by or according to the peaks or amplitude differences present in the magnetic recordings. In addition or as an alternative, such alignment may include centering the magnetic recordings by subtracting their respective averages from their respective magnetic values. In addition or as an alternative, such alignment may include scaling the magnetic recordings by dividing their respective magnetic values by respective weighted averages. In addition or as an alternative, such alignment may include filtering the magnetic recordings. After such alignment, the peaks of the magnetic recordings may substantially coincide with each other and the number of samples in each of them may be substantially the same (as can be seen by way of example in FIGS. 17A-17C). Although particular alignment of particular magnetic recordings is described and illustrated, this disclosure contemplates any suitable alignment of any suitable magnetic recordings. After their alignment, the magnetic recordings' difference was calculated as the sum of the Euclidean distances between corresponding points in the plots of the magnetic recordings. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In particular embodiments, a first point in a plot of a first magnetic recording and a second point in a plot of a second magnetic recording may correspond to each other if they have the same position in the order among the points constituting their respective plots.

In FIG. 17A, the difference between the two magnetic recordings is approximately distance d=10.957305. In FIG. 17B, the difference is approximately distance d=24.131574. In FIG. 17C, the difference is approximately distance d=22.502013. In particular embodiments, two magnetic recordings with a smaller distance d between them may be considered to be less different from (or more similar to) each other than two magnetic recordings with a larger distance d between them. Accordingly, in the example of FIGS. 17A-17C, the second and third ones of the magnetic recordings of the trajectory of FIG. 15B (which are plotted in FIG. 17A) may be the least different from (or most similar to) each other among those compared. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision).

Figure 18B:
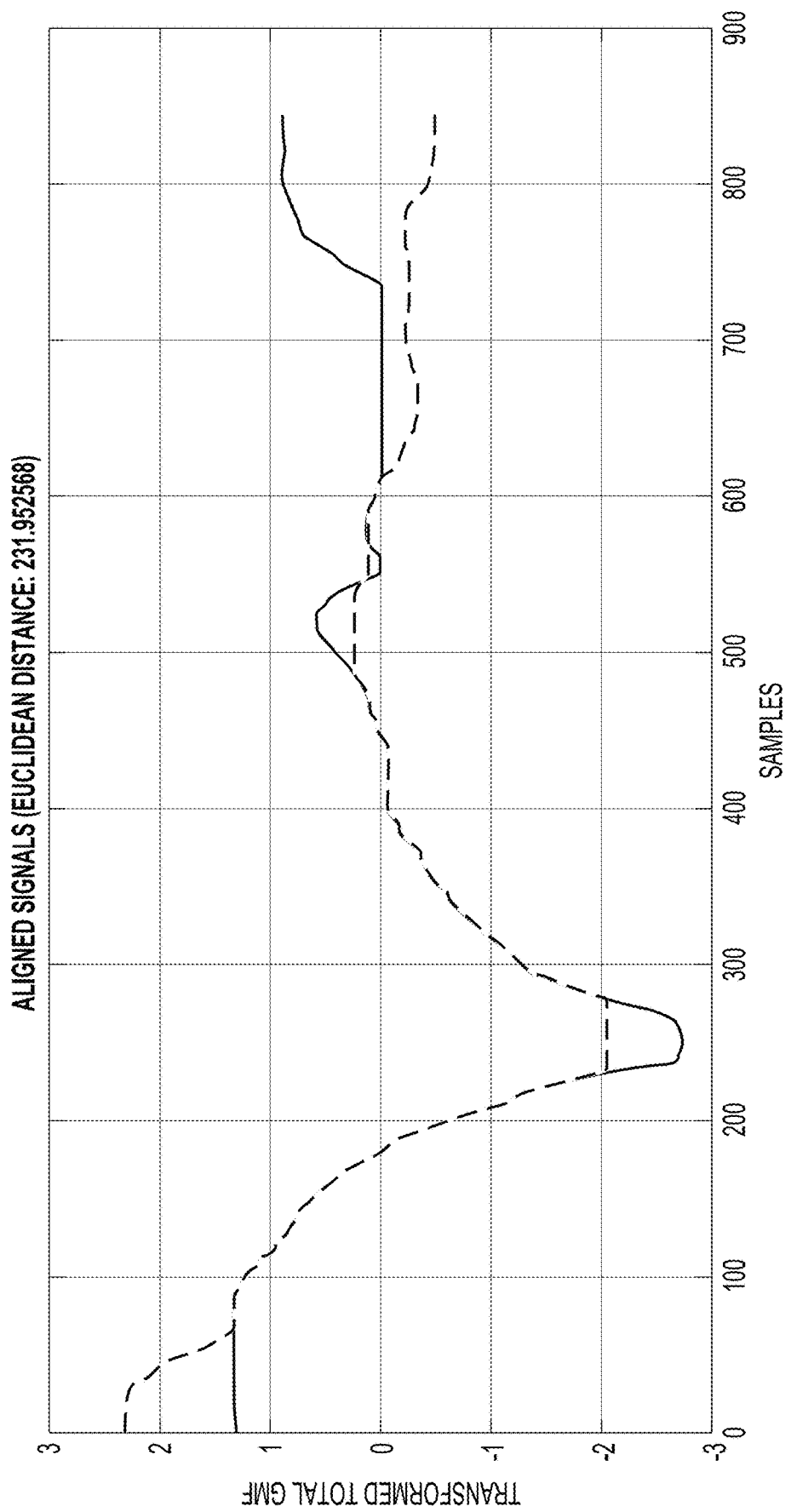
Figure 18C:
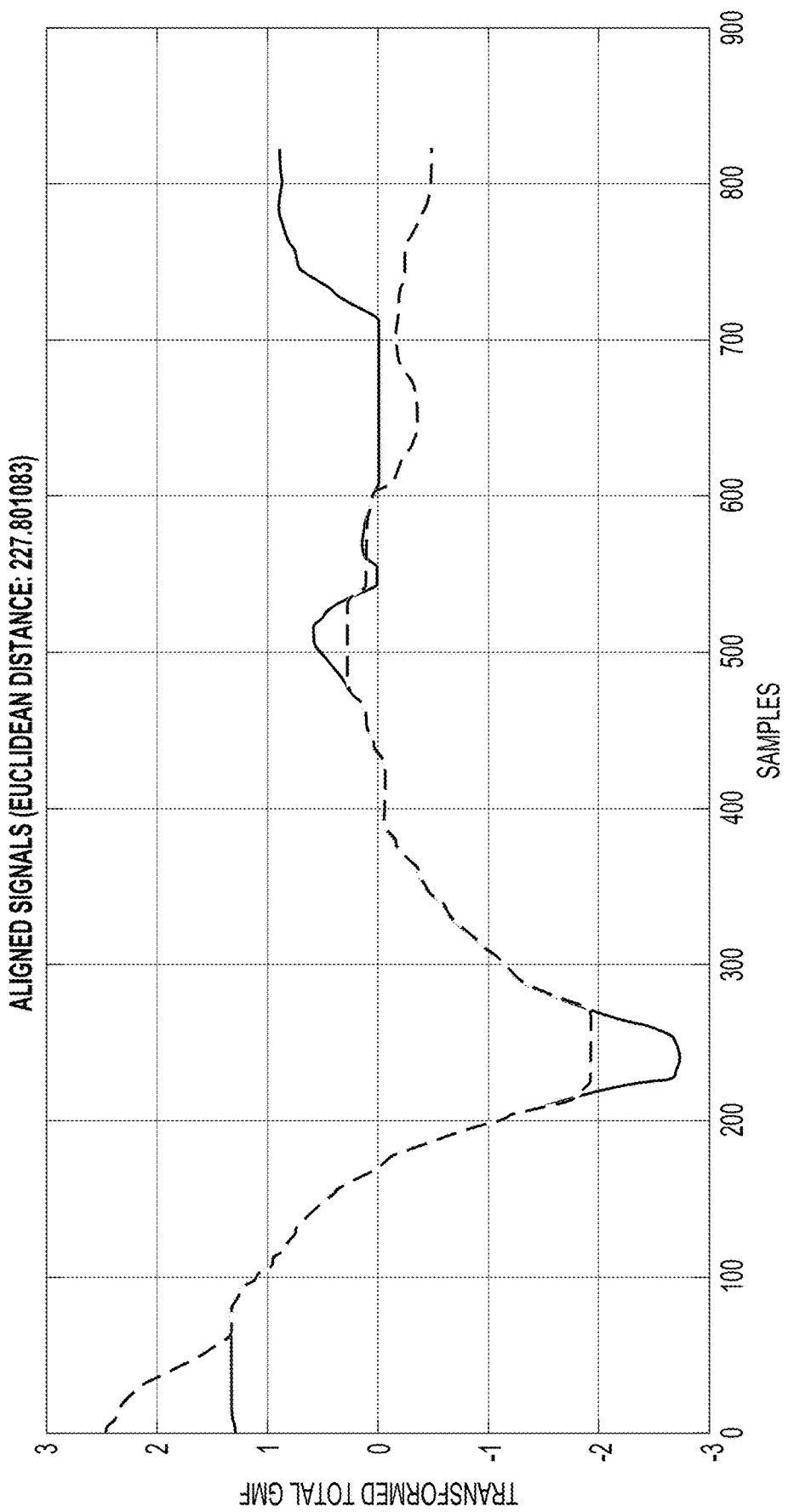
Figure 18D:
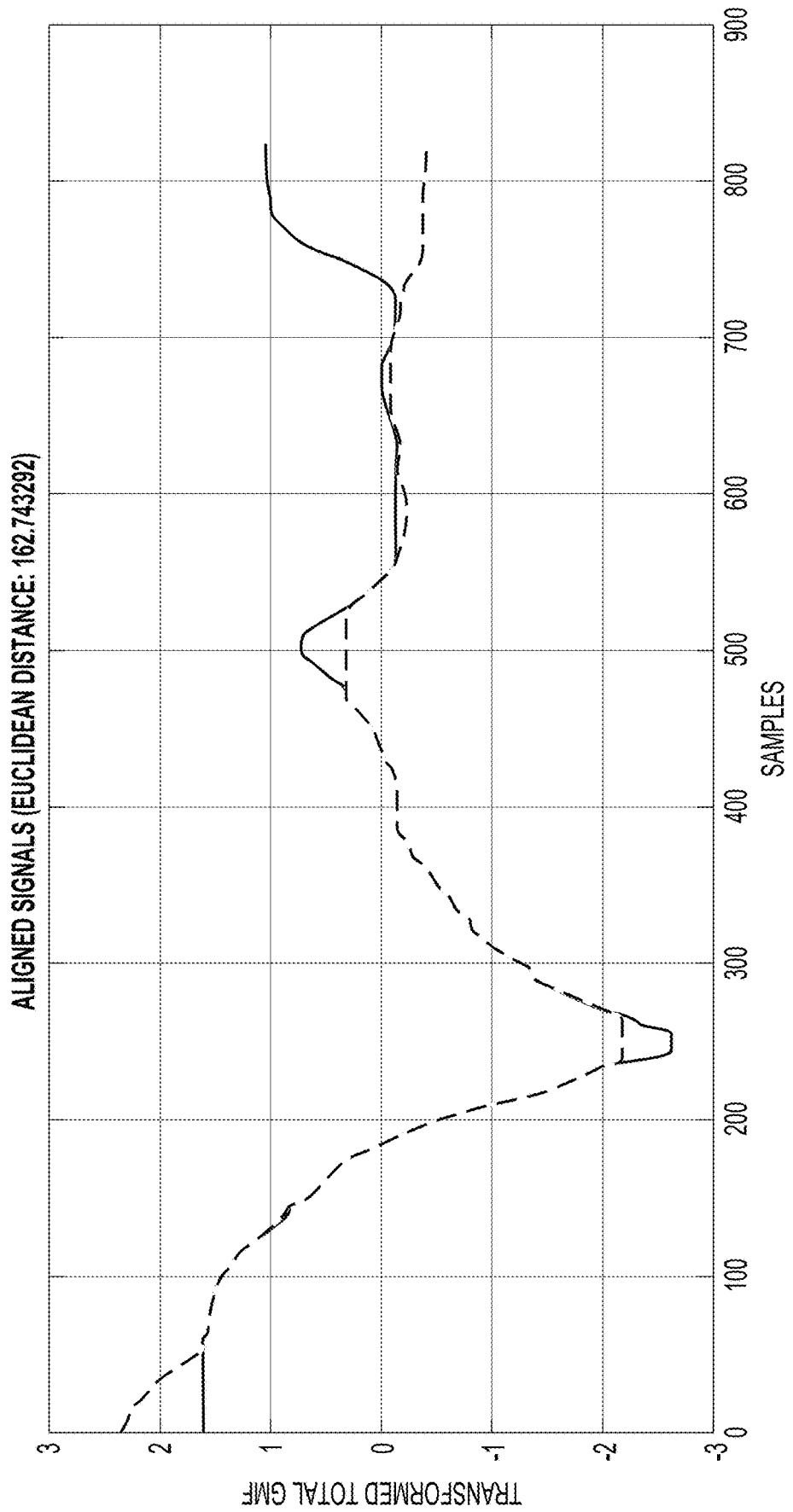
Figure 18E:
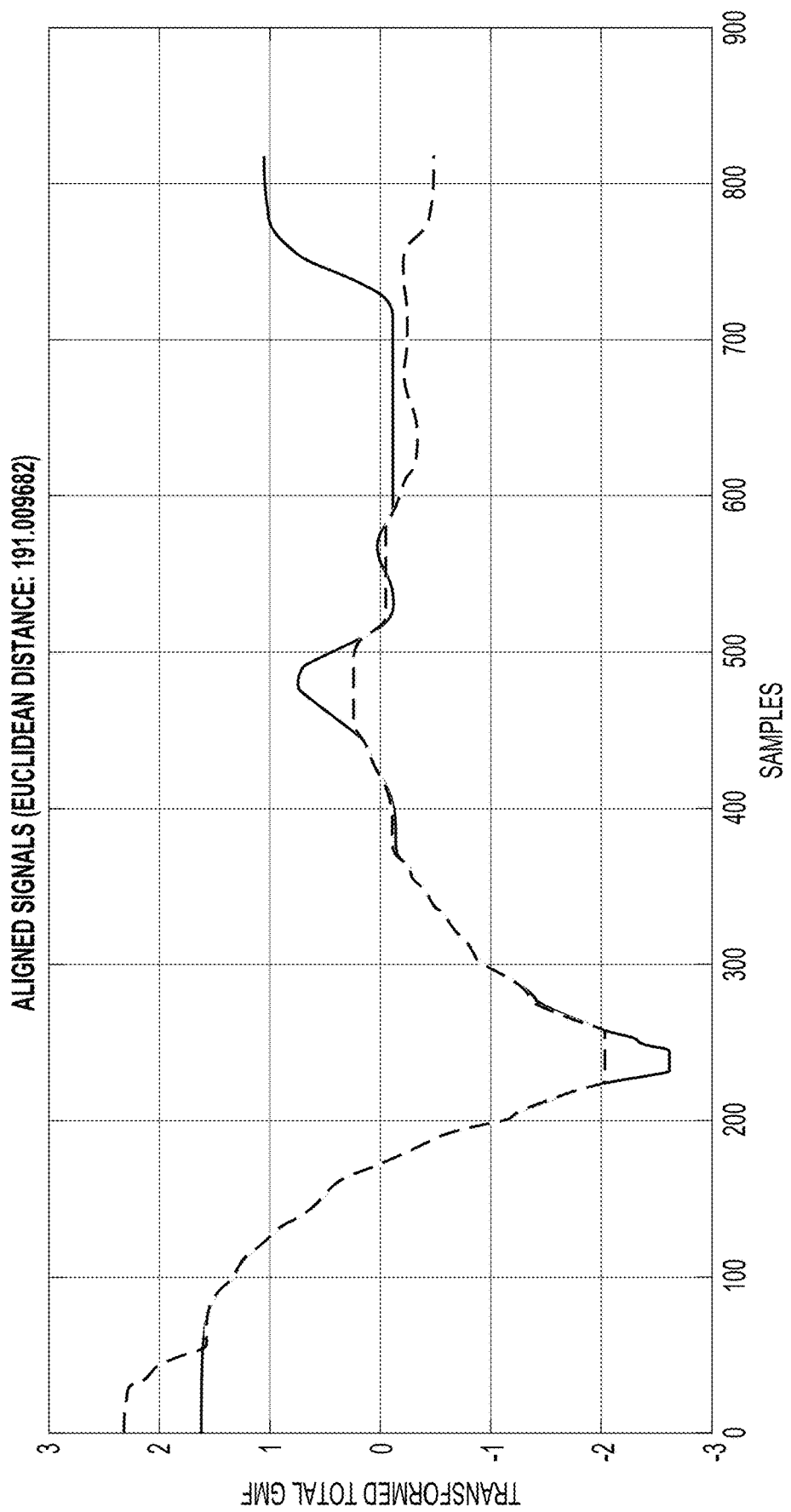
Figure 18F:
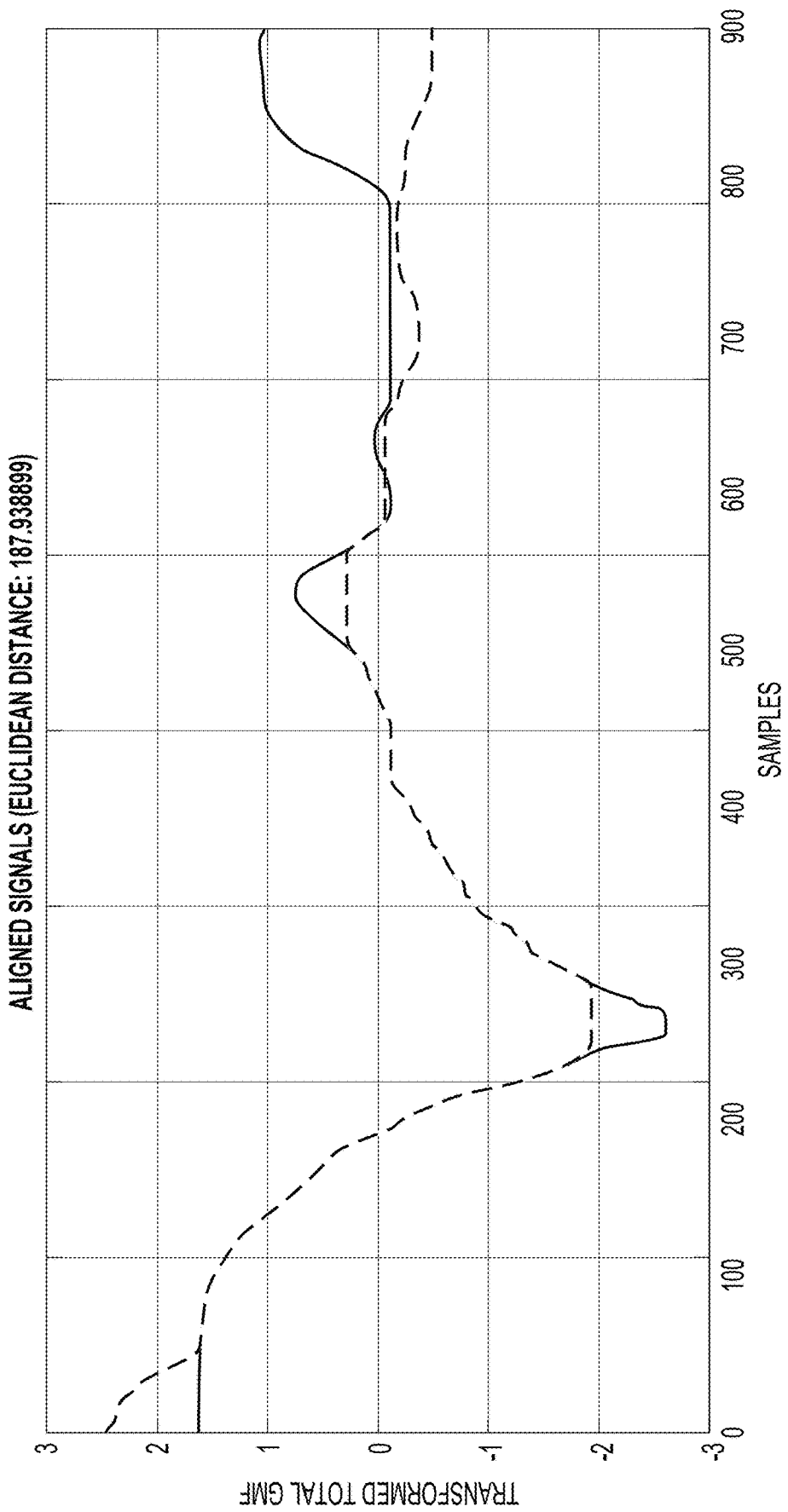

FIGS. 18A-18F illustrate example comparisons of example magnetic recordings of the trajectory of FIG. 15A with example magnetic recordings of the trajectory of FIG. 15B. In the example of FIG. 18A, a plot of the first one of the magnetic recordings of the trajectory of FIG. 15A is compared with a plot of the first one of the magnetic recordings of the trajectory of FIG. 15B. In the example of FIG. 18B, a plot of the first one of the magnetic recordings of the trajectory of FIG. 15A is compared with a plot of the second one of the magnetic recordings of the trajectory of FIG. 15B. In the example of FIG. 18C, a plot of the first one of the magnetic recordings of the trajectory of FIG. 15A is compared with a plot of the third one of the magnetic recordings of the trajectory of FIG. 15B. In the example of FIG. 18D, a plot of the second one of the magnetic recordings of the trajectory of FIG. 15A is compared with a plot of the first one of the magnetic recordings of the trajectory of FIG. 15B. In the example of FIG. 18E, a plot of the second one of the magnetic recordings of the trajectory of FIG. 15A is compared with a plot of the second one of the magnetic recordings of the trajectory of FIG. 15B. In the example of FIG. 18F, a plot of the second one of the magnetic recordings of the trajectory of FIG. 15A is compared with a plot of the third one of the magnetic recordings of the trajectory of FIG. 15B. In FIGS. 18A-18F, the magnetic recordings being compared have been at least approximately aligned with each other by scaling them to 900 samples and normalizing their magnetic values as described above and differences (or distances d) between the magnetic recordings have been calculated, also as described above. In FIGS. 18A-18F, the units and ranges of the x axes (samples 0-900) and y axes (transformed total GMF from −3 to +3) reflect this alignment. In particular embodiments, such alignment may include spline interpolation. In addition or as an alternative, such alignment may include substantially equalizing the magnetic recordings by or according to the peaks or amplitude differences present in the magnetic recordings. In addition or as an alternative, such alignment may include centering the magnetic recordings by subtracting their respective averages from their respective magnetic values. In addition or as an alternative, such alignment may include scaling the magnetic recordings by dividing their respective magnetic values by respective weighted averages. In addition or as an alternative, such alignment may include filtering the magnetic recordings. After such alignment, the peaks of the magnetic recordings may substantially coincide with each other and the number of samples in each of them may be substantially the same (as can also be seen by way of example in FIGS. 18A-18F). Although particular alignment of particular magnetic recordings is described and illustrated, this disclosure contemplates any suitable alignment of any suitable magnetic recordings. After their alignment, the magnetic recordings' difference was calculated as the sum of the Euclidean distances between corresponding points in the plots of the magnetic recordings. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In particular embodiments, a first point in a plot of a first magnetic recording and a second point in a plot of a second magnetic recording may correspond to each other if they have the same position in the order among the points constituting their respective plots.

In FIG. 18A, the difference between the two magnetic recordings is approximately distance d=204.665630. In FIG. 18B, the difference is approximately distance d=231.952568. In FIG. 18C, the difference is approximately distance d=227.801083. In FIG. 18D, the difference is approximately distance d=162.743292. In FIG. 18E, the difference is approximately distance d=191.009682. In FIG. 18F, the difference is approximately distance d=187.938899. In each of FIGS. 18A, 18B, 18C, 18D, 18E, and 18F, the two magnetic recordings shown may be considered to be dissimilar to each other. In particular embodiments, two magnetic recordings with a smaller distance d between them may be considered to be less different from (or more similar to) each other than two magnetic recordings with a larger distance d between them. Two magnetic recordings with a larger distance d between them may be considered to be more different from (or less similar to) each other than two magnetic recordings with a smaller distance d between them. Accordingly, in the example of FIGS. 18A-18F, the second one of the magnetic recordings of the trajectory of FIG. 15A and the first one of the magnetic recordings of the trajectory of FIG. 15B (which are plotted in FIG. 18D) may be the least different from (or most similar to) each other among those compared. Although particular numbers of significant digits are described and illustrated herein, this disclosure contemplates any suitable numbers of significant digits. Although particular measurements and calculations with particular numbers of significant digits (or levels of precision) are described and illustrated herein, this disclosure contemplates any suitable measurements and calculations with any suitable numbers of significant digits (or levels of precision).

Figure 19:
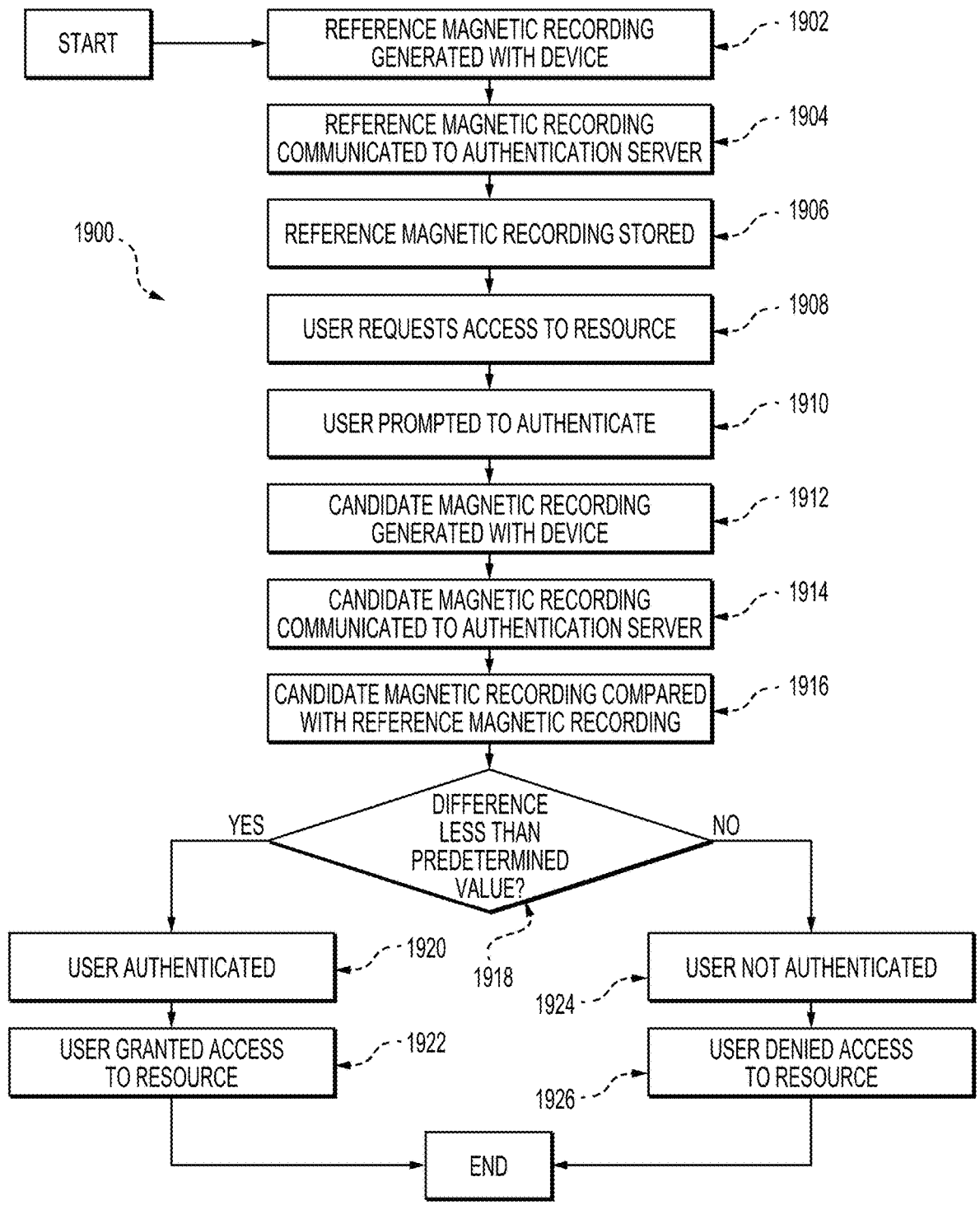
FIG. 19 illustrates an example method for authentication using a magnetic recording.

FIG. 19 illustrates an example method 1900 for authentication using a magnetic recording. Method 1900 begins at step 1902, where a user 202 generates a reference magnetic recording with a device 204. At step 1904, the reference magnetic recording is communicated from device 204 to authentication server 206. At step 1906, authentication server 206 stores the reference magnetic recording in a record associated with user 202 or device 204. At step 1908, user 202 requests access to a resource 208. For example, user 202 may through device 204 request access to data stored in whole or in part locally on device 204 or on a computer or other device remote from device 204. As another example, user 202 may open a software application or other computer program on device 204 and request to access one or more functions of the software application or other computer program, which may be performed in whole or in part on a computer remote from device 204 or locally on device 204. As another example, user 202 may approach a locked door to a building or a room in the building and request entry to the building or room. In particular embodiments, the authentication must be done at a specific location, e.g., the same location where the reference magnetic recording was made. In some such embodiments, the authentication may be done only at the location where the reference magnetic recording was made. However, once device 204 is authenticated that way, user 202 may approach the locked door and open it using authenticated device 204, e.g., using the "key" that was received by device 204 when it or user 202 was authenticated. Although particular authentication scenarios are described and illustrated herein, this disclosure contemplates any suitable authentication scenarios.

At step 1910, in response to user 202 requesting access to resource 208, user 202 is prompted to authenticate himself or herself. At step 1912, in response to the prompt, user 202 generates a candidate magnetic recording with device 204. At step 1914, the candidate magnetic recording is communicated from device 204 to authentication server 206. At step 1916, authentication server 206 compares the candidate magnetic recording with the reference magnetic recording from step 1902. In particular embodiments, to perform this comparison, authentication server 206 may at least approximately align the candidate magnetic recording with the reference magnetic recording as described above and then calculate a difference (or distance d) between them, also as described above. In particular embodiments, the alignment may include spline interpolation. In addition or as an alternative, the alignment may include substantially equalizing one or both of the candidate and reference magnetic recordings by or according to the peaks or amplitude differences present in one or both of the candidate and reference magnetic recordings. In addition or as an alternative, the alignment may include centering one or both of the candidate and reference magnetic recordings by subtracting their respective averages from their respective magnetic values. In addition or as an alternative, the alignment may include scaling one or both of the candidate and reference magnetic recordings by dividing their respective magnetic values by respective weighted averages. In addition or as an alternative, such alignment may include filtering one or both of the candidate and reference magnetic recordings. After such alignment, the peaks of the candidate and reference magnetic recordings may substantially coincide with each other and the number of samples in each of them may be substantially the same. After the alignment, a difference (or distance d) between the candidate magnetic recording and the reference magnetic recording may be calculated as the sum of the Euclidean distances between corresponding points in their plots. Although Euclidean distances are described and illustrated herein, this disclosure contemplates any suitable distance metrics. For example, in addition or as an alternative to Euclidean distances being used, in particular embodiments DTW distances, Fréchet distances, or other suitable distance metrics may be used. In this calculation, a point in the plot of the candidate magnetic recording and a point in the plot of the reference magnetic recording may correspond to each other if they have the same position in the order among the points constituting their respective plots. In particular embodiments, these alignment and difference-calculation operations may be performed mathematically without graphical versions of the plots of the reference and candidate magnetic recordings being generated or presented. At step 1918, if a difference (or distance d) between the candidate and reference magnetic recordings calculated at step 1916 is less than a predetermined value (or threshold value), then method 1900 proceeds to step 1920, where user 202 is deemed authenticated. At step 1922, based on user 202 being deemed authenticated, user 202 is granted access to resource 208 requested at step 1908, at which point method 1900 ends. At step 1918, if a difference between the candidate and reference magnetic recordings is not less than a predetermined value (or threshold value), then method 1900 proceeds to step 1924, where user 202 is deemed not authenticated. At step 1926, based on user 202 being deemed not authenticated, user 202 is denied access to resource 208 requested at step 1908, at which point method 1900 ends.

Particular embodiments may repeat one or more steps of method 1900, where appropriate. Although this disclosure describes and illustrates particular steps of method 1900 as occurring in a particular order, this disclosure contemplates any suitable steps of method 1900 occurring in any suitable order. Moreover, although this disclosure describes and illustrates an example method for using a magnetic recording for authentication including the particular steps of method 1900, this disclosure contemplates any suitable method for using a magnetic recording for authentication including any suitable steps, which may include all, some, or none of the steps of method 1900, where appropriate. Furthermore, although this disclosure describes and illustrates particular components, devices, or systems carrying out particular steps of method 1900, this disclosure contemplates any suitable combination of any suitable components, devices, or systems carrying out any suitable steps of method 1900.

Particular embodiments facilitate the application of varying degrees of confidence in the use of magnetic-sensor data in a fusion filter. Magnetic-sensor data may be any data from one or more magnetic sensors (e.g. magnetometers), including, for example, measurements by one or more of the magnetic sensors of one or more properties of a magnetic field (e.g. the total magnetic field, the inclination angle of the magnetic field, the declination angle of the magnetic field, individual vector components of the magnetic field, etc.), the results of calculations based on those measurements, or both. In particular embodiments, the degree of confidence may vary based on an anomalousness (e.g. an amount of variance in one or more properties or deviation from the regular component of one or more properties) of an ambient magnetic field being measured (such as, for example, the GMF or another magnetic field). In particular embodiments, this results in a more stable and realistic determination of orientation (or one or more other variables) as a combination of an INS and a magnetic-sensor system. Particular embodiments are effective when applied to indoor or other navigation problems. Herein, reference to an orientation of an object (such as, for example, device 100) may include one or more of the object's orientation angles (e.g. heading (or yaw), elevation (or pitch), or roll (or bank)) in a joint rectangular coordinate frame relative to the Earth-Centered, Earth-Fixed (ECEF) coordinate frame or other coordinate frame, where appropriate. Moreover, reference herein to orientation may include bearing, course, direction, or heading, and vice versa, where appropriate.

Herein, reference to a fusion filter includes one or more fusion filters, where appropriate. In addition, reference to a fusion filter includes sensor fusion, multi-sensor data fusion, or information fusion, and vice versa, where appropriate. In particular embodiments, sensor fusion is a process of combining sensor data or data derived from disparate sources such that the resulting information has less uncertainty than would be possible when these sources were used individually. In particular embodiments, the data sources for a fusion process need not originate from identical sensors. Sensor fusion may involve direct fusion, indirect fusion, or the fusion of outputs from the foregoing. In particular embodiments, direct fusion is the fusion of sensor data from a set of heterogeneous or homogeneous sensors, soft sensors, and history values of sensor data. In particular embodiments, indirect fusion uses information sources like a priori knowledge about the environment and human input. Example sensors that may provide input to a fusion filter include, but are not limited to the following: accelerometers and other motion sensors, gyroscopes and other rotation sensors, magnetometers and other magnetic sensors, LIDAR sensors, pressure sensors (such as altimeters, barometers, and bathymeters (or bathometers)), cameras (including infrared and other cameras), GNSS receivers, radio detection and ranging (RADAR) systems, sound navigation and ranging (SONAR) systems and other acoustic sensors, phased or other arrays of antennas, and seismic sensors. Although particular sensors are described and illustrated herein, this disclosure contemplates any suitable sensors.

Figure 20:
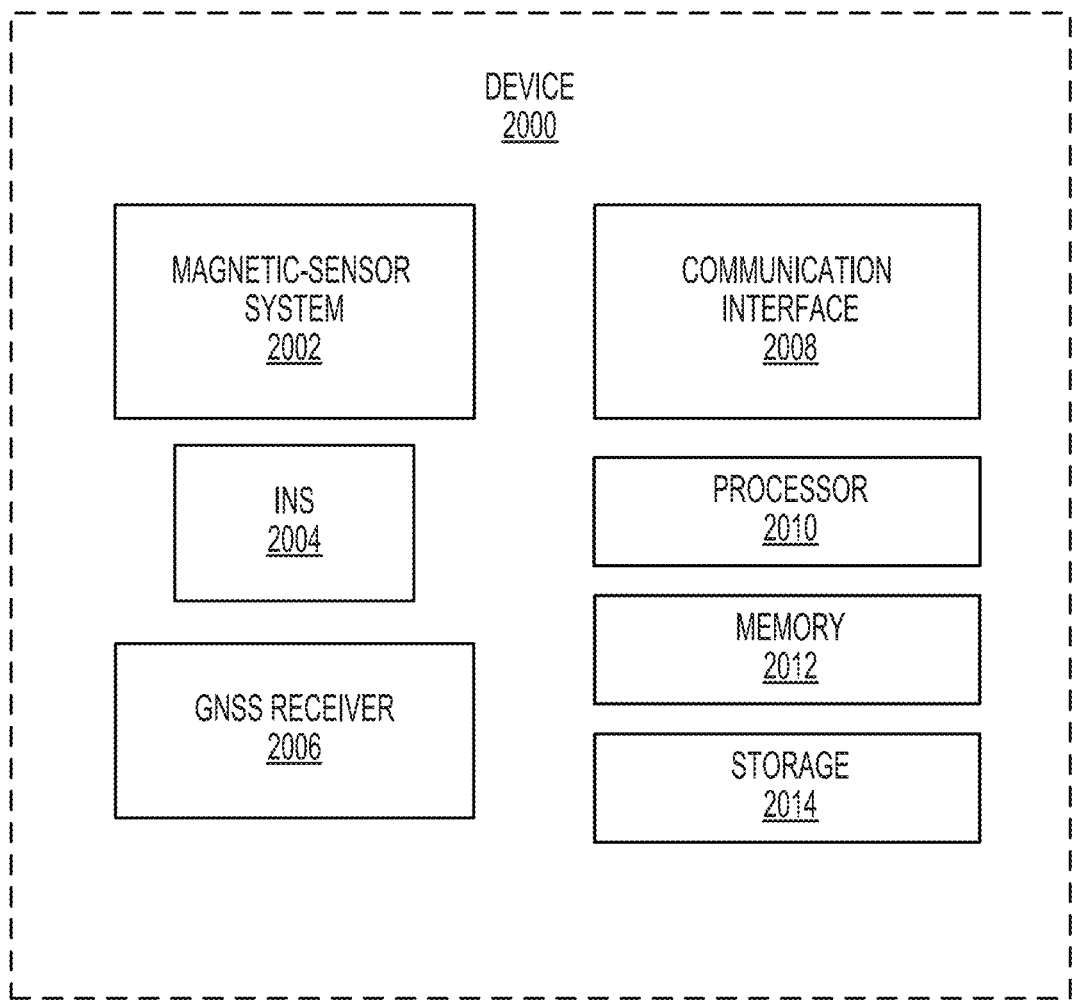
FIG. 20 illustrates an example device including a magnetic-sensor system and inertial navigation system (INS).

FIG. 20 illustrates an example device 2000 including a magnetic-sensor system 2002 and INS 2004. As an example and not by way of limitation, device 2000 may, in particular embodiments, be a vehicle, robot, handheld device, or other device. Examples of handheld or other devices include, but are not limited to smartphones, cellular telephones, PDAs, tablet computers, or laptop or notebook computers. In addition or as an alternative, a device 2000 may be a handheld computer, smartwatch or other wearable computer, or other suitable device. As another example, device 2000 may include a robot. As another example, device 2000 may include a drone. Examples of vehicles include, but are not limited to, manned, unmanned, remotely piloted or driven, or autonomous aircraft (such as, for example, airplanes, airships, balloons, and helicopters), satellites, space probes, spacecraft, ground vehicles, surface vessels or other vehicles, and underwater vehicles (such as, for example, submarines). A ground vehicle may use any suitable method(s) of terrestrial locomotion. For example, a ground vehicle may move from one location to another by rolling, sliding, walking, running, hopping, metachronal motion, slithering, brachiating, or any suitable combination of the foregoing using one or more wheels, treads, legs, or other structures. Examples of ground vehicles include, but are not limited to, conventional land vehicles, such as for example forklifts, cars, trucks, tractors, and tractor-trailer trucks. Other examples of ground vehicles include, but are not limited to, earth-moving, agricultural, or forestry equipment, such as for example excavators, backhoe loaders, bulldozers, skid-steer loaders, motor graders, crawler loaders, trenchers, scrapers, dump trucks, harvesters, mowers, balers, feller bunchers, shovel loggers, and other equipment. A surface vessel or other vehicle may be a boat or ship that operates on the surface of a body of water. One or more functions of a vehicle may be controlled by one or more human operators on board the vehicle, remotely by one or more human operators not on board the vehicle, or with a suitable degree of autonomy (such as autopilot assistance or full autonomy with no provision for human intervention or other control). A vehicle may, but need not (and need not necessarily be able to), carry one or more human passengers or crew. Although particular vehicles are described and illustrated herein, this disclosure contemplates any suitable vehicles.

Examples of robots include, but are not limited to, drones, UAVs, RPAs, UGVs, AGVs, UUVs, ROUVs, AUVs, unmanned or uncrewed surface vessels or vehicles (USVs), ASVs, drone ships, and other robots. One or more functions of a robot may be controlled by one or more human operators on board the robot, remotely by one or more human operators not on board the robot, or with a suitable degree of autonomy (such as autopilot assistance or full autonomy with no provision for human intervention or other control). A robot may, but need not (and need not necessarily be able to), carry one or more human passengers or crew. Although particular robots are described and illustrated herein, this disclosure contemplates any suitable robots. Example of handheld devices include, but are not limited to, mobile telephones, mobile computers, cameras, pagers, personal navigation devices, wearable computers, and smart cards. Although particular handheld devices are described and illustrated herein, this disclosure contemplates any suitable handheld devices with any suitable form factors. Moreover, although particular devices are described and illustrated herein, this disclosure contemplates any suitable machines, instruments, apparatuses, or other devices. Device 2000 may include one or more devices 2000, where appropriate. Reference to device 2000 may include device 204, and vice versa, where appropriate. Reference to a device may include a robot, and vice versa, where appropriate.

In the example of FIG. 20, device 2000 includes magnetic-sensor system 2002, INS 2004, GNSS receiver 2006, communication interface 2008, processor 2010, memory 2012, and storage 2014. Device 2000 may also include one or more other components or systems not illustrated in the example of FIG. 20. For example, if device 2000 is a vehicle, device 2000 may also include one or more engines, motors, or propulsion systems. As another example, if device 2000 is a mobile telephone, then device 2000 may also include one or more batteries, one or more microphones, one or more speakers, and one or more touchscreens with associated controllers. Magnetic-sensor system 2002 may include one or more magnetic sensors (such as, for example, magnetometers) and other hardware, software, or both for controlling and collecting measurements from the magnetic sensors. Herein reference to a magnetic sensor may include a magnetometer, and vice versa, where appropriate. As described below, a magnetometer is a device that measures an external magnetic field or magnetic dipole moment. In particular embodiments, a magnetometer measures the direction, strength, or relative change of a magnetic field at a point in space. Although a particular magnetic-sensor system 2002 is described and illustrated herein, this disclosure contemplates any suitable magnetic-sensor system. Magnetic-sensor system 2002 may include one or more magnetic-sensor systems 2002, where appropriate.

INS 2004 may include one or more motion sensors (e.g. accelerometers), one or more rotation sensors (e.g. gyroscopes), and other hardware, software, or both for controlling and collecting measurements from those sensors and may calculate by dead reckoning the position, orientation, or velocity (e.g. including direction and speed of movement) of device 2000 using those measurements. INS 2004 may also include one or more magnetic sensors (such as, for example, magnetometers), which may serve as a compass or other instrument. INS 2004 may also include one or more pressure sensors, which may serve as an altimeter, barometer, or bathymeter (or bathometer). INS 2004 may include one or more IMUs. An IMU may include one or more motion sensors (e.g. accelerometers), one or more rotation sensors (e.g. gyroscopes), and other hardware, software, or both for controlling and collecting measurements from those sensors and may calculate a specific force, angular rate, and orientation of an object (e.g. device 2000) using those measurements. In addition or as an alternative, the IMU may calculate an absolute spatial displacement of the object using those measurements. The IMU may also include one or more pressure sensors, which may serve as an altimeter, barometer, or bathymeter (or bathometer). Herein, reference to an INS may include an IMU, an inertial guidance system, or an inertial instrument, and vice versa, where appropriate. Although a particular INS is described and illustrated herein, this disclosure contemplates any suitable INS. Although a particular IMU is described and illustrated herein, this disclosure contemplates any suitable IMU. INS 2004 may include one or more INSs 2004, where appropriate.

GNSS receiver 2006 may include hardware, software, or both for receiving signals from GNSS satellites and calculating a position of GNSS receiver 2006 (or, by extension, device 2000 including GNSS receiver 2006) from those signals. GNSS is a general term used to describe a network of satellites that can be used to produce PNT data sets. The GPS is a widely used form of GNSS. Regional applications of such systems are also used to generate more regionally specific PNT data. For example, Galileo can be used in Europe; GLONASS can be used in Russia; and the BDS can be used in China. GNSSs can have failure points. For example, some GNSSs lose reliability when operated inside buildings or in areas where network communication to the device is intermittent. Some GNSSs lose reliability when operated in dense city environments where large buildings interfere with communication signals. Some GNSSs lose reliability when operated in areas such as caves, tunnels, and mountains that impede location devices' reception of signals from GNSS satellites. Moreover, some GNSSs are susceptible to malicious attacks by electronic interference or physical intervention that degrade their reliability. Although a particular GNSS receiver 2006 is disclosed and illustrated, this disclosure contemplates any suitable GNSS receiver. GNSS receiver 2006 may include one or more GNSS receivers 2006, where appropriate.

Communication interface 2008 may include hardware, software, or both providing one or more interfaces for wired communication, wireless communication, or optical communication (such as, for example, fiber-optic communication), or a combination of the foregoing, between device 2000 and one or more other devices or computer systems or one or more networks. As an example and not by way of limitation, communication interface 2008 may provide one or more interfaces for radio communication. In addition or as an alternative, communication interface 2008 may provide one or more interfaces for communication with one or more wireless networks, such as, for example, one or more wireless ad hoc networks; one or more Bluetooth networks or other wireless personal area networks (WPANs); one or more Wi-Fi networks or other WLANs; one or more WANs; one or more WIMAX networks or other wireless metropolitan area networks (WMANs); or one or more other suitable wireless networks. In addition or as an alternative, communication interface 2008 may provide one or more interfaces for communication with one or more cellular networks, such as for example, one or more GSM networks; one or more Code-Division Multiple Access (CDMA) networks; one or more General Packet Radio Service (GPRS) networks; one or more Wideband Code-Division Multiple Access (WCDMA) networks; one or more Enhanced Data rates for GSM Evolution (EDGE) networks; one or more CDMA2000 networks; one or more 3rd Generation Partnership Project (3GPP) 5G networks; or one or more other suitable cellular networks. In addition or as an alternative, communication interface 2008 may provide one or more interfaces for communication with one or more low-power wide-area network (LPWANs). In addition or as an alternative, communication interface 2008 may provide one or more interfaces for communication with one or more mobile-satellite services (MSSs). In addition or as an alternative, communication interface 2008 may provide one or more interfaces for communication with one or more wireless sensor networks (WSNs). In addition or as an alternative, communication interface 2008 may provide one or more interfaces for NFC. Although a particular communication interface 2008 is disclosed and illustrated, this disclosure contemplates any suitable communication interface. Communication interface 2008 may include one or more communication interfaces 2008, where appropriate.

Processor 2010 may include hardware for executing instructions, such as those making up a computer program or other software. As an example and not by way of limitation, to execute instructions, processor 2010 may retrieve (or fetch) the instructions from an internal register, an internal cache, memory 2012, or storage 2014; decode and execute them; and then write one or more results to an internal register, an internal cache, memory 2012, or storage 2014. Although this disclosure describes and illustrates a particular processor 2010, this disclosure contemplates any suitable processor. Processor 2010 may include one or more processors 2010, where appropriate.

Memory 2012 may include main memory for storing instructions for processor 2010 to execute or data for processor 2010 to operate on. As an example and not by way of limitation, instructions may be loaded from storage 2014 or another source to memory 2012. Processor 2010 may then load the instructions from memory 2012 to an internal register or internal cache. To execute the instructions, processor 2010 may retrieve the instructions from the internal register or internal cache and decode them. During or after execution of the instructions, processor 2010 may write one or more results (which may be intermediate or final results) to the internal register or internal cache. Processor 2010 may then write one or more of those results to memory 2012. Although this disclosure describes and illustrates particular memory 2012, this disclosure contemplates any suitable memory. Memory 2012 may include one or more memories 2012, where appropriate.

Storage 2014 may include mass storage for data or instructions. As an example and not by way of limitation, storage 2014 may include a hard disk drive (HDD), a floppy disk drive, flash memory, an optical disc, a magneto-optical disc, magnetic tape, or a Universal Serial Bus (USB) drive or a combination of two or more of these. Storage 2014 may include removable or non-removable (or fixed) media, where appropriate. Storage 2014 may be internal or external to device 2000, where appropriate. Storage 2014 may be non-volatile, solid-state memory. Storage 2014 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2014 taking any suitable physical form. Storage 2014 may include one or more storage control units facilitating communication between processor 2010 and storage 2014, where appropriate. Where appropriate, storage 2014 may include one or more storages 2014. Although this disclosure describes and illustrates particular storage 2014, this disclosure contemplates any suitable storage.

Although a particular device 2000 having a particular arrangement of particular numbers of particular components and systems is described and illustrated herein, this disclosure contemplates any suitable device having any suitable arrangement of any suitable numbers of any suitable components or systems. As an example and not by way of limitation, a device contemplated by this disclosure may include magnetic-sensor system 2002, processor 2010, memory 2012, and storage 2014 and not include INS 2004, GNSS receiver 2006, and communication interface 2008. A device contemplated by this disclosure may include some, all, or none of magnetic-sensor system 2002, INS 2004, GNSS receiver 2006, communication interface 2008, processor 2010, memory 2012, and storage 2014. In addition, as described above, a device contemplated by this disclosure may include one or more components or systems not illustrated in FIG. 20 or described with respect thereto or otherwise described or illustrated herein. A device contemplated by this disclosure may include one or more fusion filters (which may be a set of instructions functioning as fusion filters when executed) stored in memory 2012 or storage 2014 and executable by processor 2010, magnetic-sensor system 2002, INS 2004, or any other suitable component or system of device 2000. The fusion filter(s) may receive or otherwise access data from one or more of magnetic-sensor system 2002, INS 2004, one or more other sensors or sensor systems of device 2000, GNSS receiver 2006, communication interface 2008, or one or more other components, systems, or sub-systems of device 2000 and combine that data to produce a data set indicating position, orientation, or velocity (e.g. including direction and speed of movement) of device 2000 that is more certain and contains fewer errors than the original data. Reference to data may include a data set, and vice versa, where appropriate. The fusion filter(s) may be a component or sub-system of magnetic-sensor system 2002, INS 2004, or another component, system, or sub-system of device 2000. Although a particular fusion filter is described and illustrated herein, this disclosure contemplates any suitable fusion filter.

Two or more of magnetic-sensor system 2002, INS 2004, GNSS receiver 2006, communication interface 2008, processor 2010, memory 2012, storage 2014, or any other component or system of device 2000 may be connected to each other directly or functionally, physically, or logically colocated with each other in whole or in part. For example, magnetic-sensor system 2002 (or one or more components or functions of magnetic-sensor system 2002) may be a component of INS 2004. In addition or as an alternative, INS 2004 may include its own dedicated processor 2010, memory 2012, or storage 2014. In addition or as an alternative, magnetic-sensor system 2002 and INS 2004 may be subsystems of a system or component of device 2000, which may include its own dedicated processor 2010, memory 2012, or storage 2014. One or more functions described or illustrated herein as being provided by one or more particular components or systems of device 2000 may be provided by one or more other suitable components or systems of device 2000 and need not necessarily be provided by the particular components or systems of device 2000 described or illustrated herein as providing those functions.

As described above, INS 2004 may calculate by dead reckoning the position, orientation, or velocity (e.g. including direction and speed of movement) of device 2000 using measurements from one motion sensors and one or more rotation sensors. In particular embodiments, dead reckoning involves calculating a current position of a moving object (e.g. device 2000) by using a previously determined position (or fix) and incorporating estimates of speed, heading (or orientation, direction, or course), and elapsed time. Dead reckoning is often subject to cumulative errors and errors of approximation. For precise positional information, both speed and direction must be accurately known at all times during travel. However, dead reckoning often does not account for directional or other drift during travel through a fluid medium. These errors may compound over time.

As described above, a fusion filter may combine data from multiple sensors (e.g. magnetic-sensor system 2002, INS 2004, GNSS receiver 2006, communication interface 2008, etc.) measuring the same variable(s), such as position or orientation, and then apply statistical techniques to that data to estimate the most likely value of the variables. This can be done using a variety of different methods, including, for example, Kalman filters, particle filters, complementary filters, Bayesian networks, Dempster-Shafer algorithms, convolutional neural networks (CNNs), and Gaussian processes. Particular embodiments facilitate the application of varying degrees of confidence in the use of magnetic-sensor data in a fusion filter. In particular embodiments, this may involve the following steps:

The sensors of magnetic-sensor system 2002 and INS 2004 may be installed on a substantially flat, substantially stationary surface (e.g. in or on device 2000), and the sensors' output may be recorded. This data may be used to calibrate the motion sensor(s) and rotation sensor(s) of INS 2004. This calibration may be done to determine the parameters of instrument errors in INS 2004 (e.g. deterministic errors such as bias, scale factor, and nonorthogonality). Although particular calibration of a particular INS is described and illustrated herein, this disclosure contemplates any suitable calibration of any suitable INS.

The magnetic sensor(s) of magnetic-sensor system 2002 may be calibrated using recorded data obtained while rotating them together as installed around various axes. In particular embodiments, five full rotations with respect to each of the axes may be sufficient. Although particular calibration of a particular magnetic-sensor system is described and illustrated herein, this disclosure contemplates any suitable calibration of any suitable magnetic-sensor system.

During operation (which may include navigation or localization), the total magnetic field (as measured by the magnetic sensor(s) of magnetic-sensor system 2002) or one or more other properties of the magnetic field may be analyzed to determine how anomalous the magnetic field is. This may be done by determining the amount of deviation in the magnetic field from the regular component of the magnetic field (e.g. above a predetermined threshold relative one or more values of the regular component of the magnetic field). In addition or as an alternative, this may be done by calculating a variance of the total magnetic field (or one or more other properties of the magnetic field in addition or as alternative to the total magnetic field), for example, over a sliding window of a predetermined length k (e.g. 200-300 samples at a sampling rate of 50 Hz), which may represent a current variance of the magnetic field. In particular embodiments, the variance may be calculated as the squared deviation from the mean of the value of the total magnetic field (or one or more other properties of the magnetic field in addition or as alternative to the total magnetic field) over the sliding window. In particular embodiments, the variance may be calculated as the square of the standard deviation of the value of the total magnetic field (or one or more other properties of the magnetic field in addition or as alternative to the total magnetic field) over the sliding window. In particular embodiments, the variance may be a measure of dispersion within the sliding window, indicating how far the values in the sliding window spread out from their mean of median value. In particular embodiments, the variance may be calculated using a difference (or distance) calculation as described above. In particular embodiments, the variance may be calculated using correlation optimized warping (COW) or DTW. Although particular calculations of particular variances of a magnetic field are described and illustrated herein, this disclosure contemplates any suitable calculations of any suitable of a magnetic field.

A greater calculated variance may indicate that the magnetic field is more anomalous in the area or space where the magnetic measurements used to calculate the variance were made. In areas or spaces where the magnetic field is more anomalous, calculations of position or orientation based on magnetic-sensor data may be less reliable and more prone to error. This may reduce the accuracy of position, orientation, or velocity calculated by dead reckoning by an INS based in part on magnetic-sensor data in such areas or spaces. To address this, particular embodiments may dynamically or otherwise adjust the weight of magnetic-sensor data in a fusion filter used to determine position, orientation, or velocity (or other location or navigation information) based on data from multiple sensors. For example, in particular embodiments, the weight of magnetic-sensor data in the fusion filter may be reduced (possibly to zero) when the current variance of the magnetic field increases and increased when the current variance of the magnetic field decreases. Different approaches may be used to determine the weight of the magnetic field in the fusion filter process. In particular embodiments, one option is based on quantization (e.g. when a given weight corresponds to a certain range of variance values) and another is based on continuous variance (e.g. when a change in variance leads to a change in the weight of the magnetic field). Although particular adjustment to particular weight of particular sensor data in a particular fusion filter is described and illustrated herein, this disclosure contemplates any suitable adjustment to any suitable weight of any suitable sensor data in any suitable fusion filter. For example, in particular embodiments, the weight of data from a magnetic sensor in a fusion filter may be adjusted based on the magnetic sensor's type, model, manufacturer, or other characteristic (which may be indicative of the magnetic sensor's reliability) of the magnetic sensor.

A confidence factor for the magnetic field in the fusion filter may be adjusted based on the current variance value. As a result, in particular embodiments, when the magnetic field is more anomalous (which may tend to occur in an indoor environment), the fusion filter may rely more on data from INS 2004 and rely less on data from magnetic-sensor system 2002. When the magnetic field is less anomalous (which may tend to occur in an outdoor environment), the fusion filter may rely more equally on data from magnetic-sensor system 2002 and data from INS 2004 (and possibly one or more other sensor systems or components of device 2000), which may provide greater accuracy and stability. In some cases, when the magnetic field is less anomalous, the fusion filter may rely on data from magnetic-sensor system 2002 without data from INS 2004, where appropriate.

In addition or as an alternative to applying varying degrees of confidence in the use of magnetic-sensor data in a fusion filter, particular embodiments may compare one or more portions of a magnetic recording (e.g. from magnetic-sensor system 2002) corresponding to one or more first portions of a trajectory (e.g. of device 2000) with one or more second portions of the magnetic recording (or another magnetic recording) corresponding to one or more second portions of the trajectory to determine whether one or more portions of the trajectory were repeated, e.g., whether device 2000 is moving through a set of locations or positions in an area or space that device 2000 has moved through before or device 2000 has moved through a set of locations or points in an area or space multiple times. This determination may be made by determining differences or similarities between or among the magnetic recordings of those portions of the trajectory.

In particular embodiments, differences or similarities between or among magnetic recordings may be determined using distance (or difference) values, as described above. In addition or as an alternative, differences or similarities between or among magnetic recordings may be determined using computer vision, human vision, or both. Although particular systems and methods are disclosed herein for determining differences or similarities between or among magnetic recordings, this disclosure contemplates any suitable systems and methods for determining differences or similarities between or among magnetic recordings. In particular embodiments, two or more properties of a magnetic field may be used to determine such differences or similarities. For example, the total magnetic field, the inclination angle of the magnetic field, or both may be used to determine differences or similarities between or among magnetic recordings. In addition or as an alternative, other properties of the magnetic field (e.g. the declination angle of the magnetic field, individual vector components of the magnetic field, etc.) may be used. For example, consider two different magnetic recordings that may correspond to the same trajectory with multiple "legs" or other portions. The magnetic recordings may be compared with each other in whole or in part to determine a degree of difference or similarity between them. For example, portions of the magnetic recordings corresponding to particular portions of the trajectory may be compared with each other to determine a degree of difference or similarity between those portions of the magnetic recordings. If the degree of difference or similarity is above a predetermined threshold (e.g. a calculated difference between those portions of the magnetic recordings is less than a predetermined value), then it may be determined with a higher degree of confidence that those portions correspond to the same physical path in space. If only data from INS 2004 were relied on to make this determination, then confidence in the resulting determination would be much lower.

If it is determined that one or more portions of the trajectory were repeated, then the positions or locations of one or more points along the trajectory (e.g. in a graphical or other representation of the trajectory) may be adjusted based on those overlapping portions of the trajectory. Based on this determination, it may be determined that the length, bearing, or other characteristic(s) of the overlapping portions of the trajectory are approximately the same as or approximately similar to each other (or the movements could be in opposite directions but still over the same physical path). Positions or locations of points along one or both of the overlapping portions of the trajectory may then be adjusted. In addition or as an alternative, positions or locations of points along one or more other portions of the trajectory may be adjusted. The positions or locations of points along the trajectory may be defined using any suitable 2D or 3D coordinate system (such as, for example, the Geographic Coordinate System (GCS), which identifies positions on the Earth in degrees of latitude and longitude; the ECEF coordinate system; the Military Grid Reference System (MGRS); the Universal Transverse Mercator (UTM) grid system; or the Universal Polar Stereographic (UPS) grid system; or any other suitable coordinate system) and may be defined with any suitable resolution. Such adjustment to positions or locations of points along the trajectory may facilitate correction of INS drift in the calculation of positions or locations of one or more points along the trajectory (including in particular embodiments effectively eliminating such drift). Such drift may result in errors in calculation of positions or locations of one or more points along the trajectory and may occur as a result of cumulative errors or errors of approximation (which may compound over distance) in dead reckoning performed with INS 2004 or other components or systems of device 2000. Determining whether one or more portions of the trajectory overlap based on magnetic data and the adjustments based on that overlap may be part of the fusion-filter process. In addition or as an alternative, it may occur after the fusion-filter process.

Figure 21B:
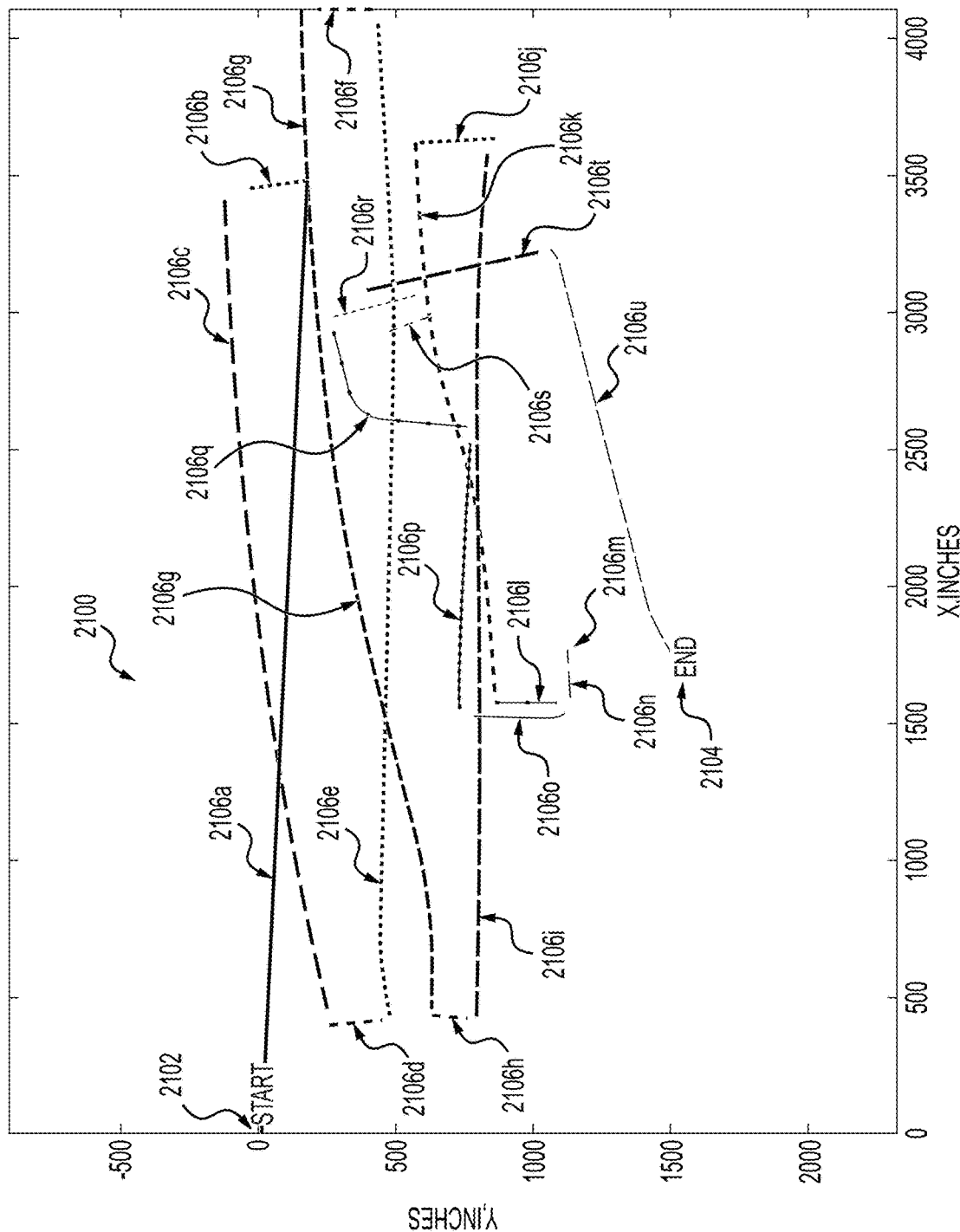
FIGS. 21A-21T illustrate example correction of INS drift.
Figure 21C:
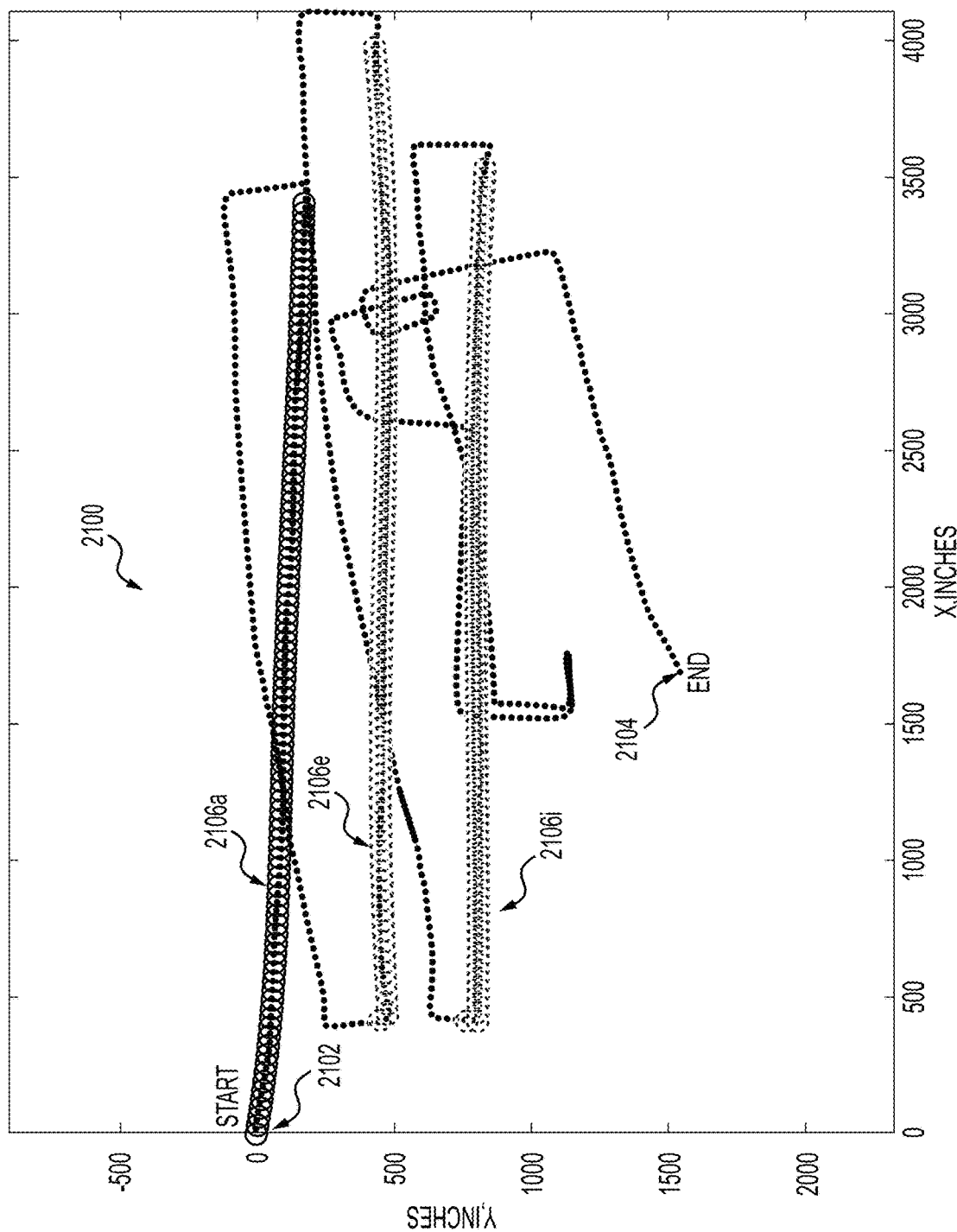
Figure 21D:
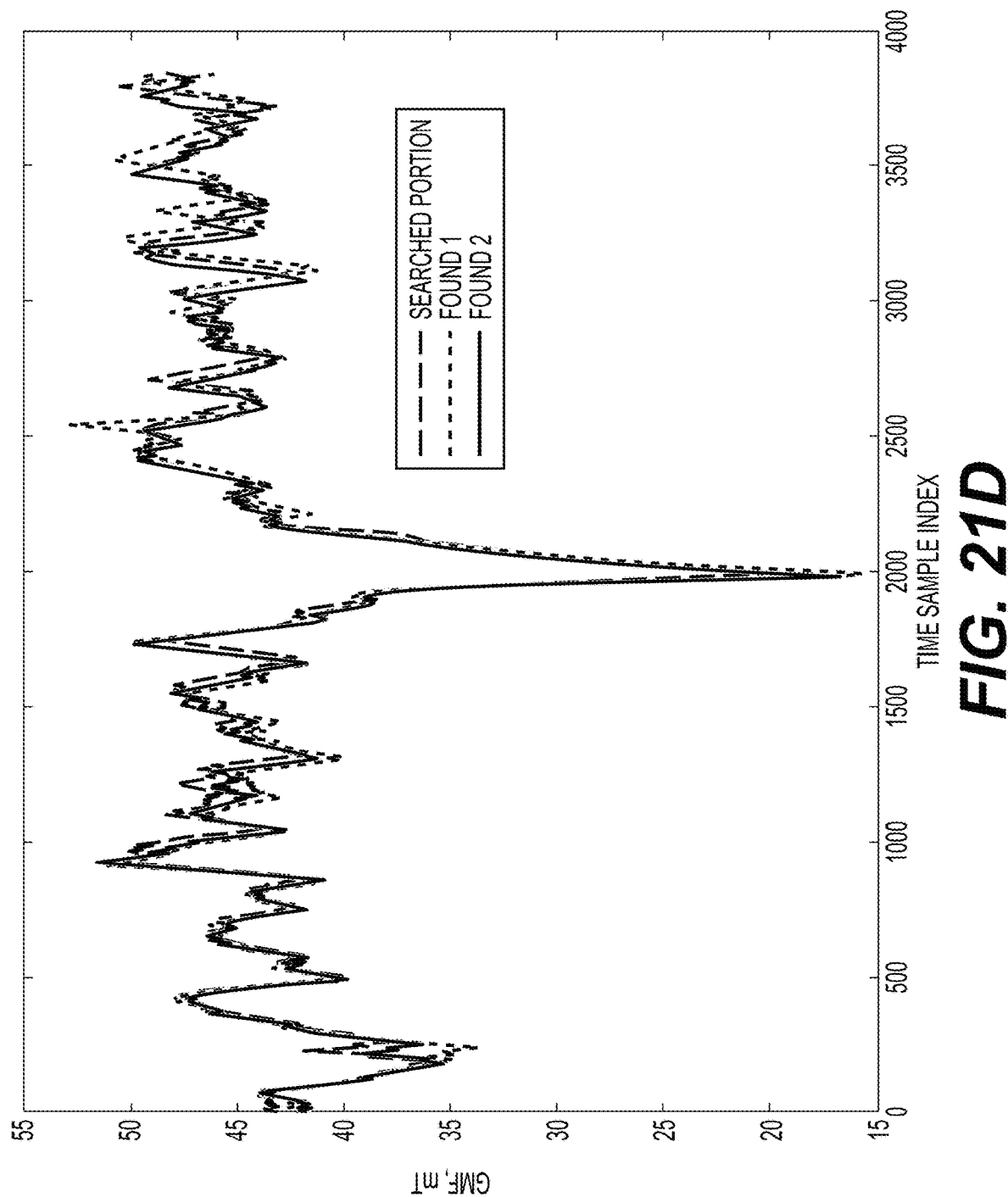
Figure 21E:
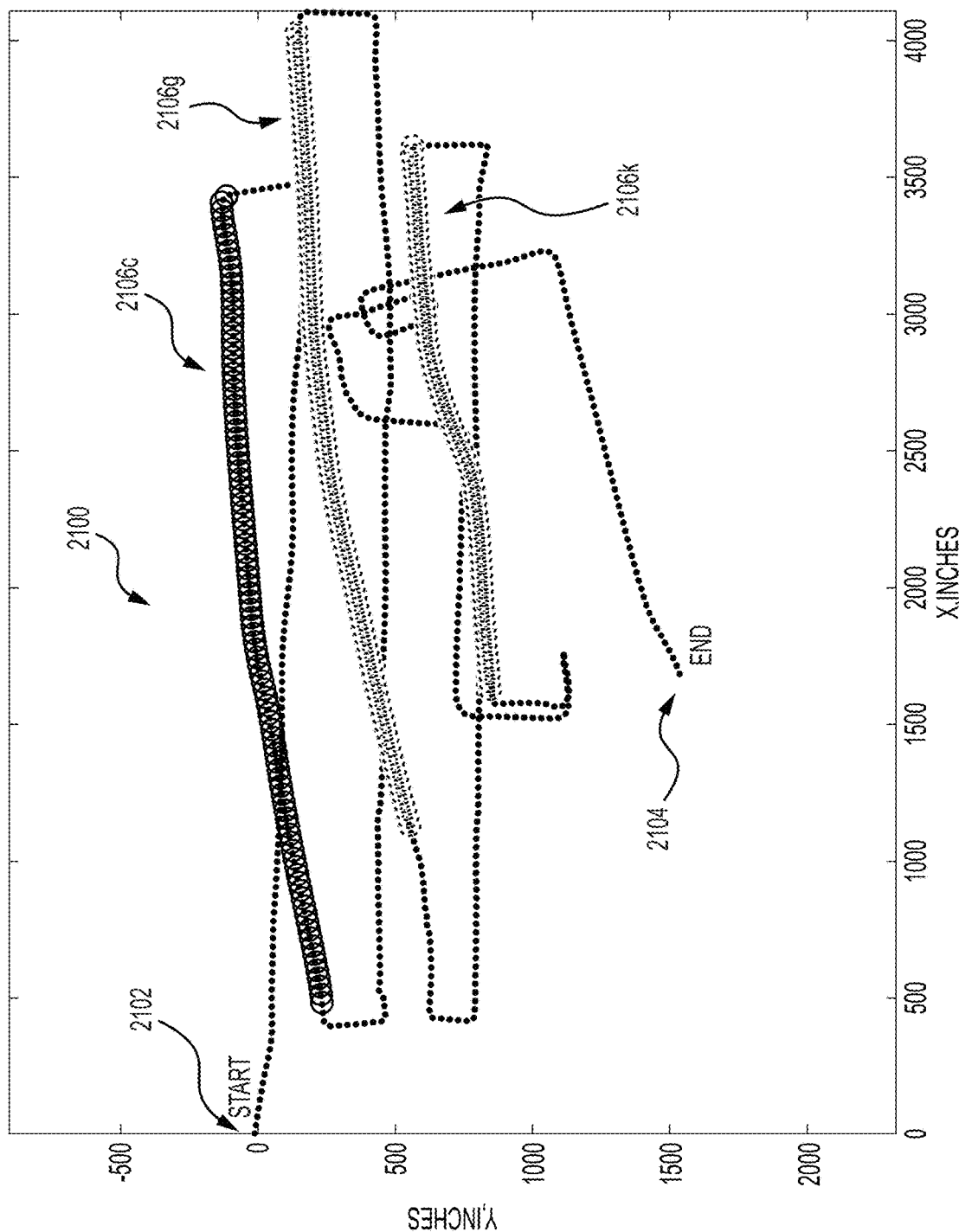
Figure 21F:
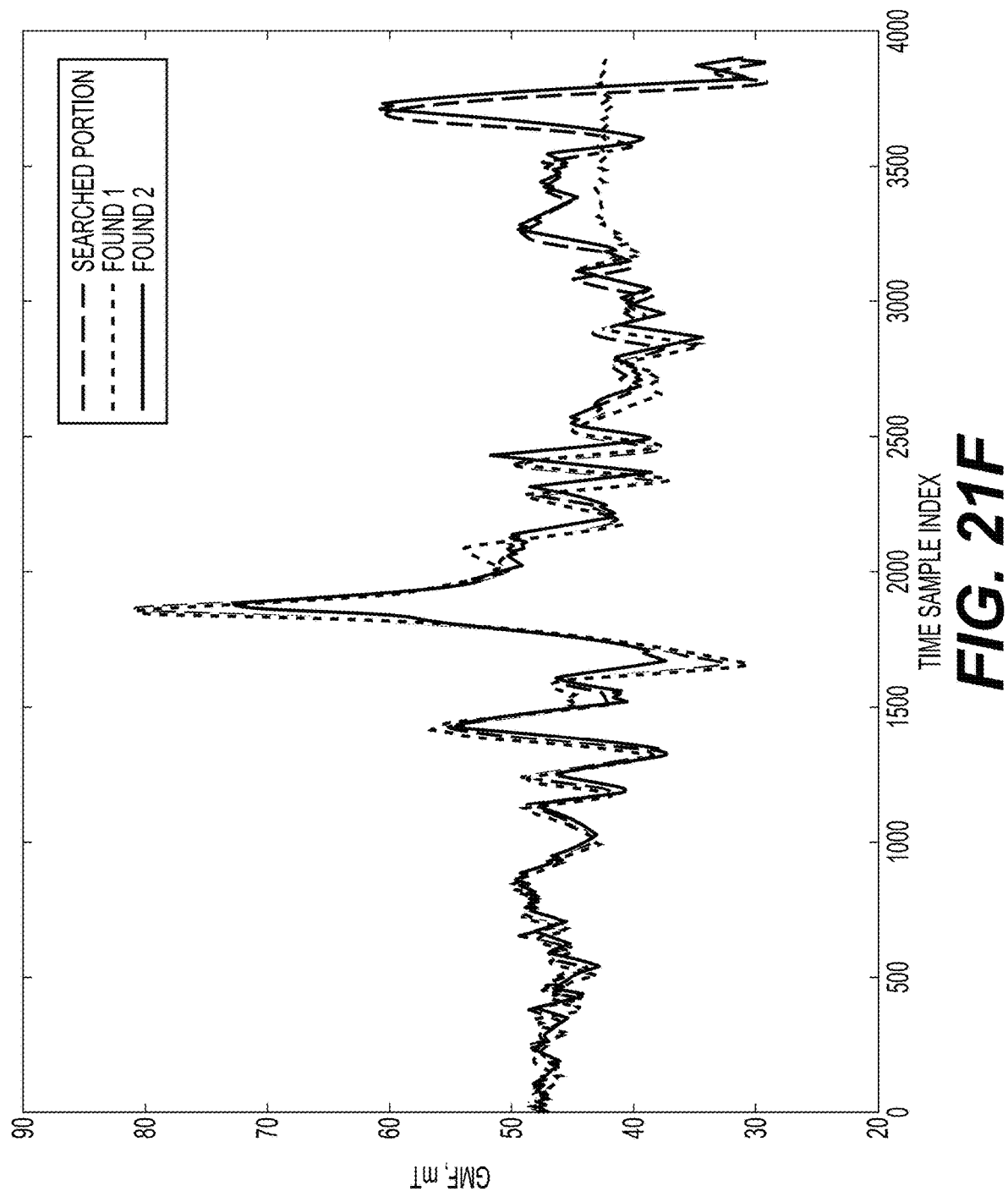
Figure 21G:
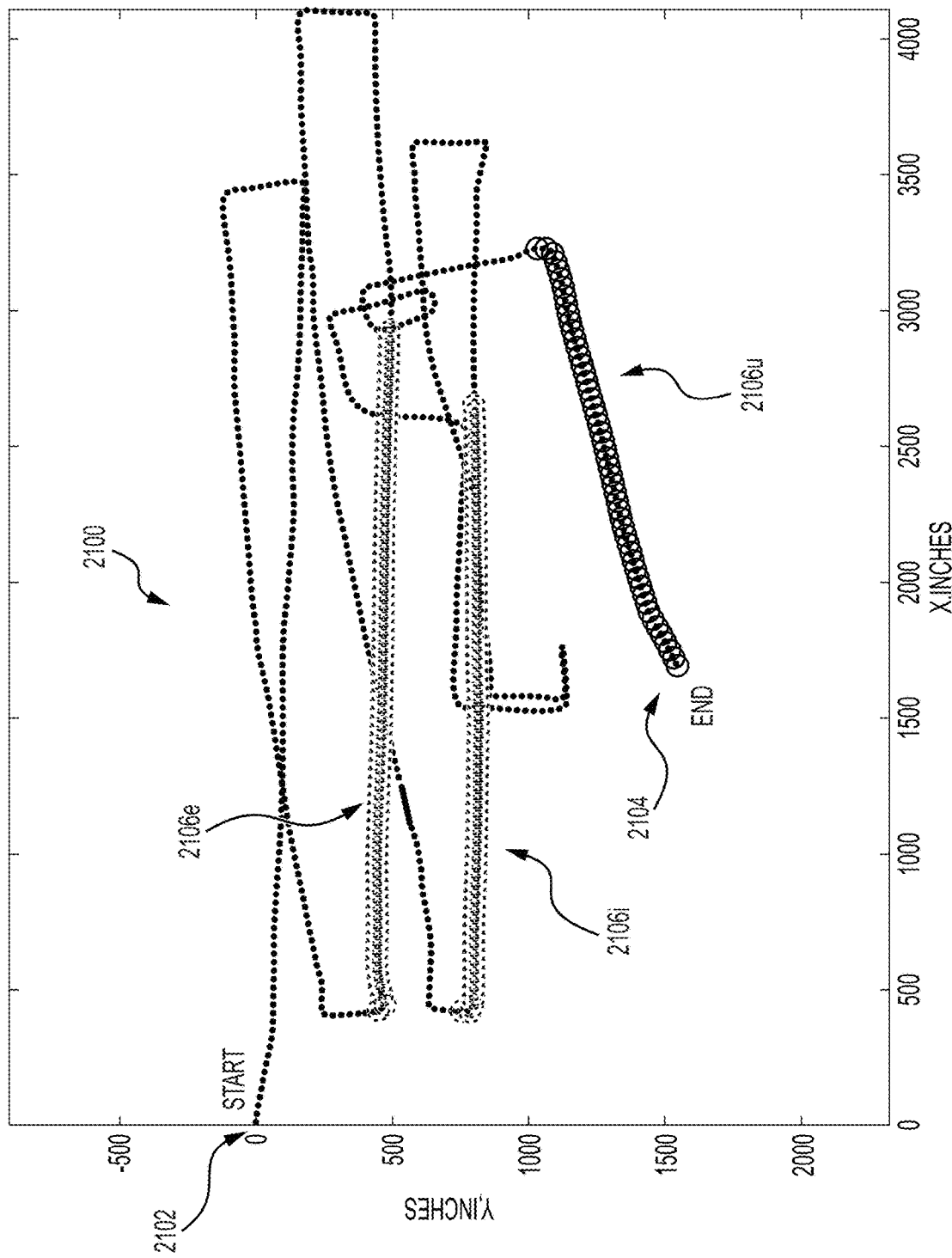
Figure 21H:
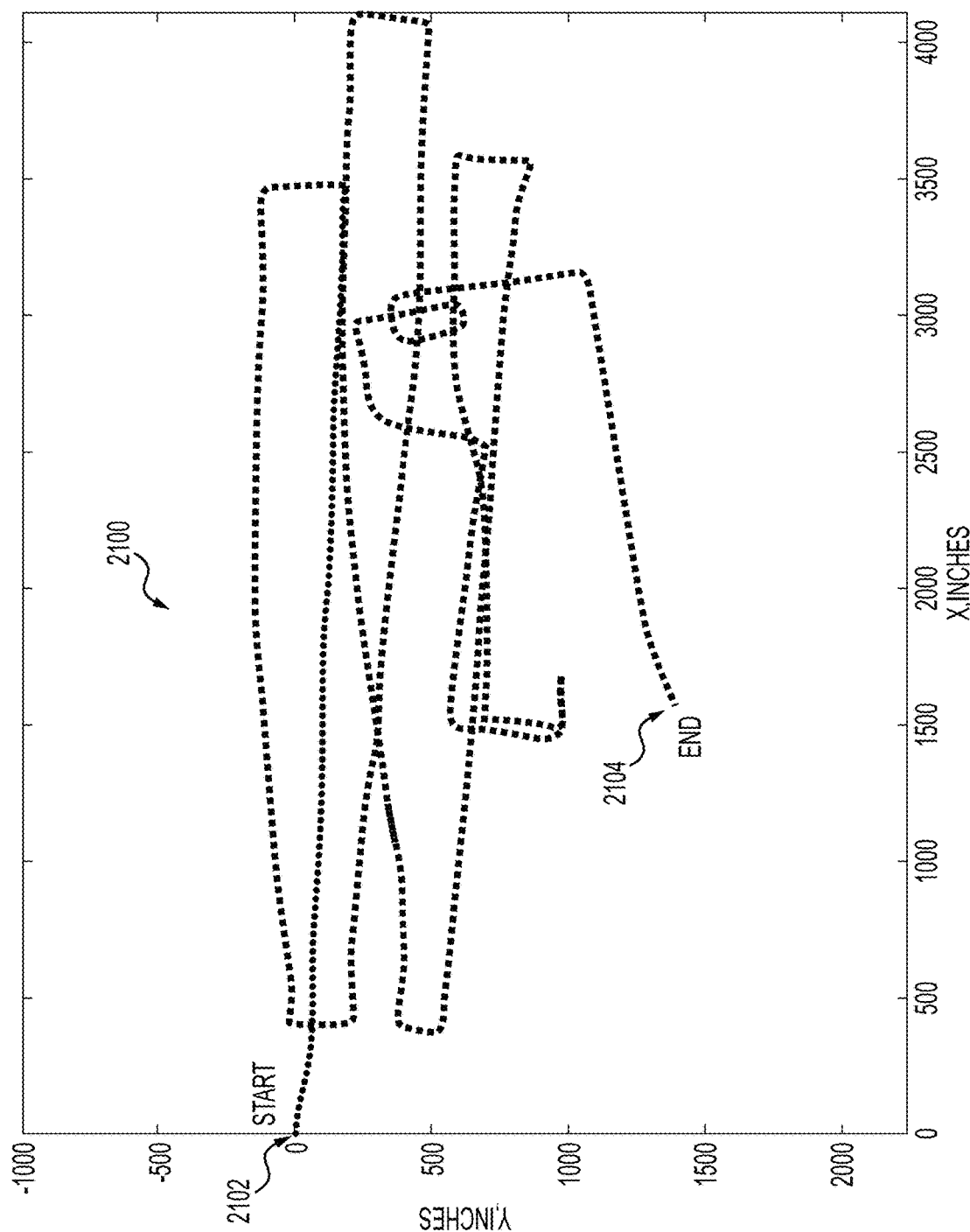
Figure 21I:
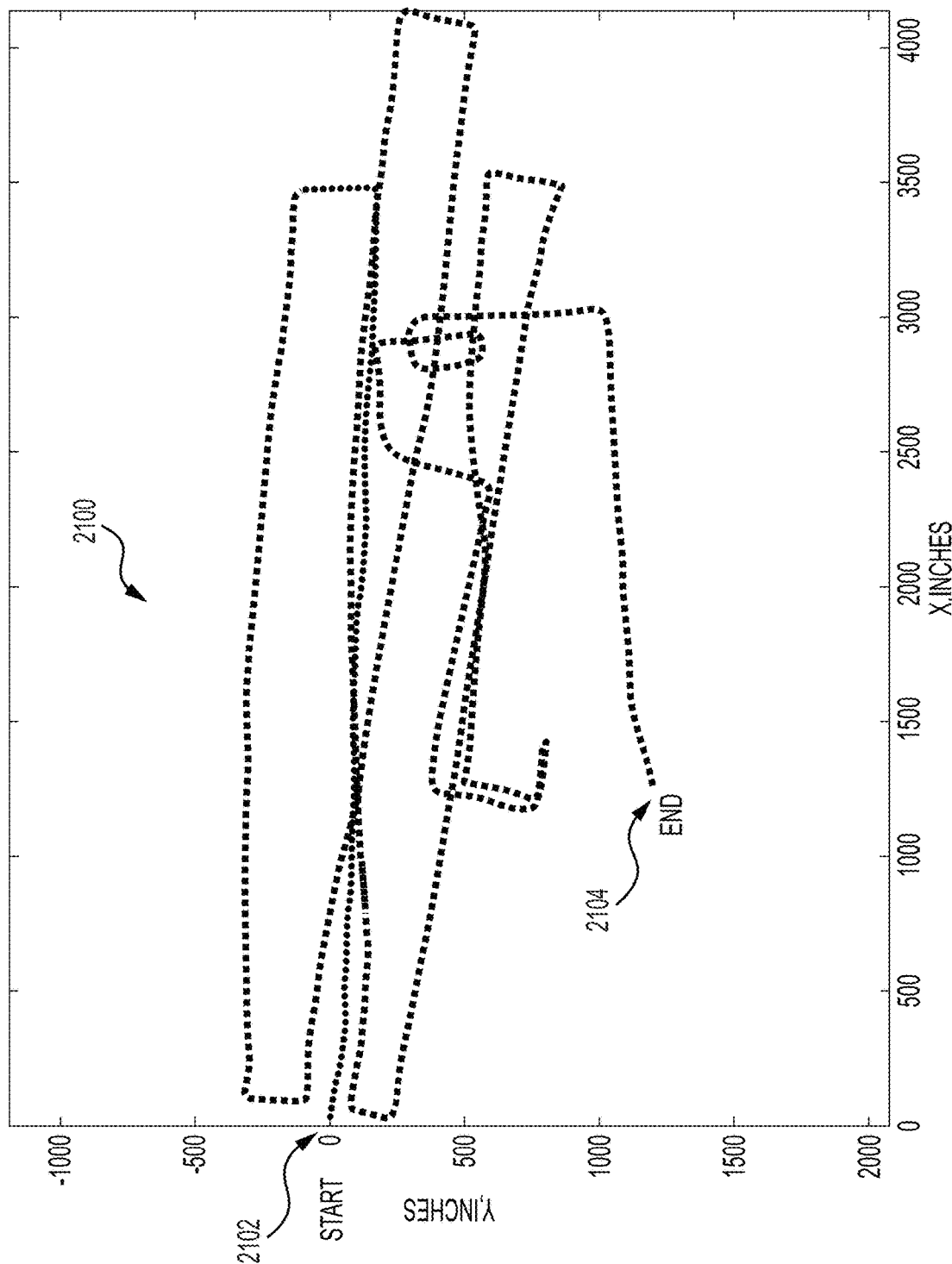
Figure 21J:
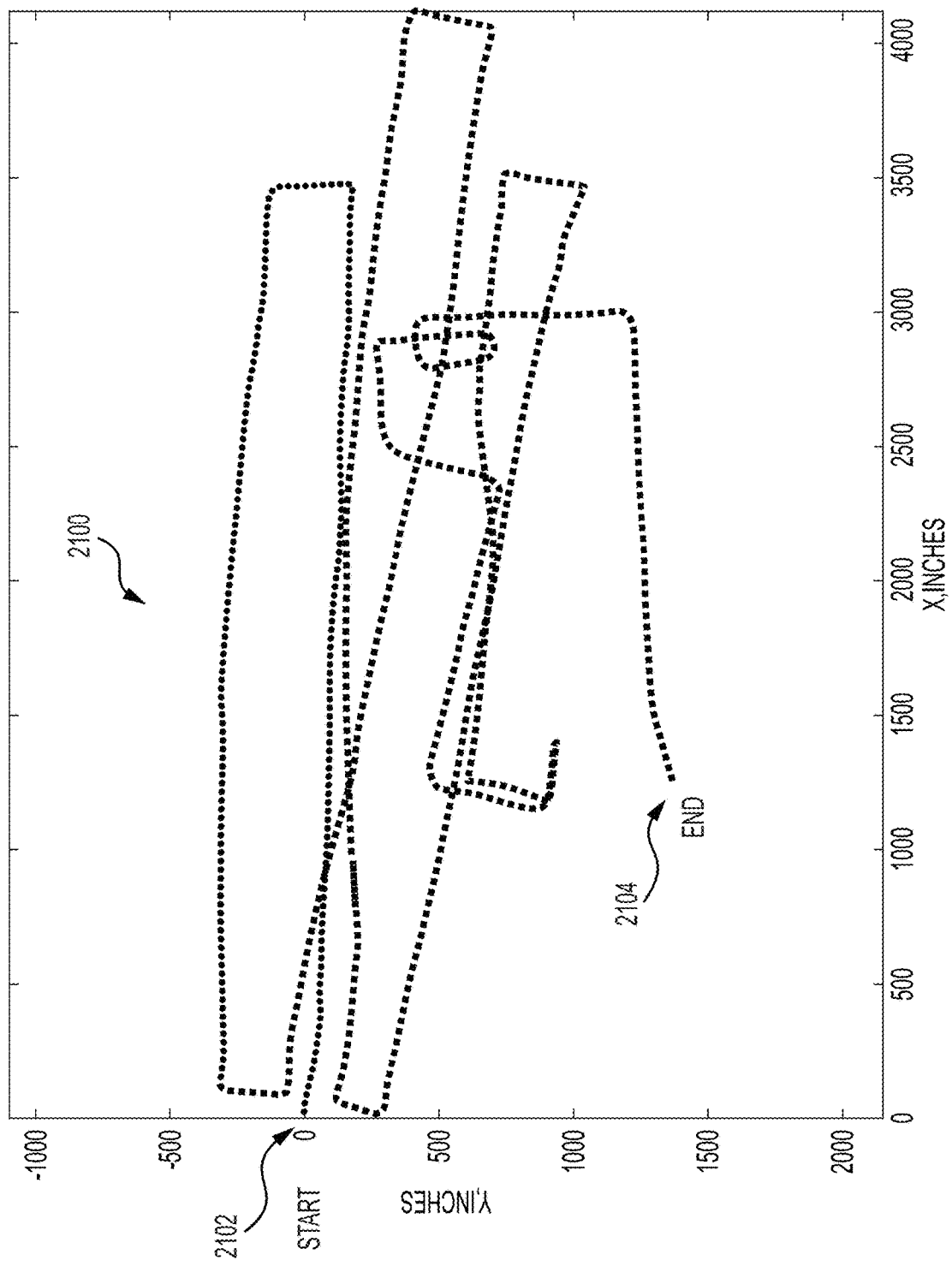
Figure 21K:
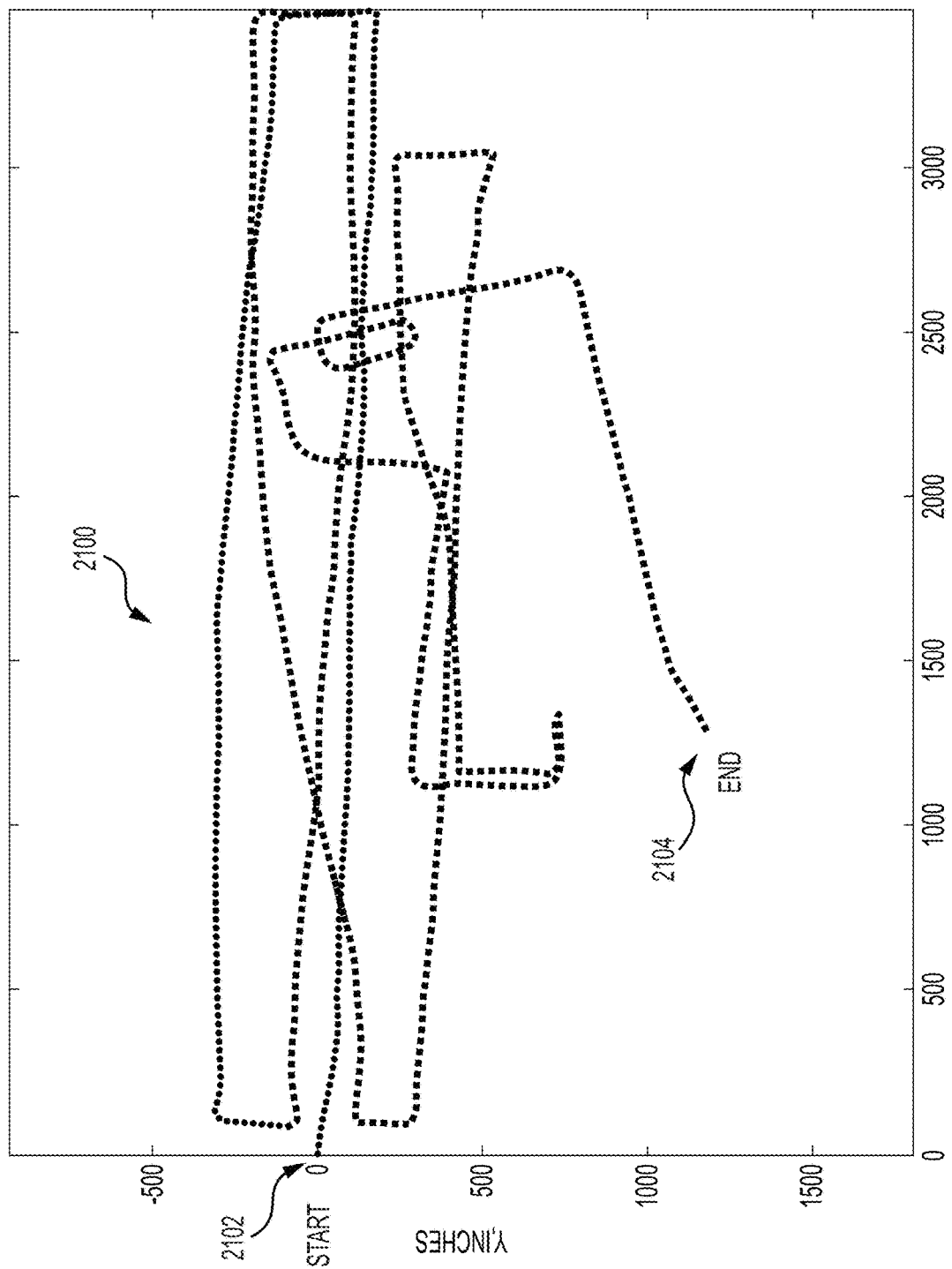
Figure 21M:
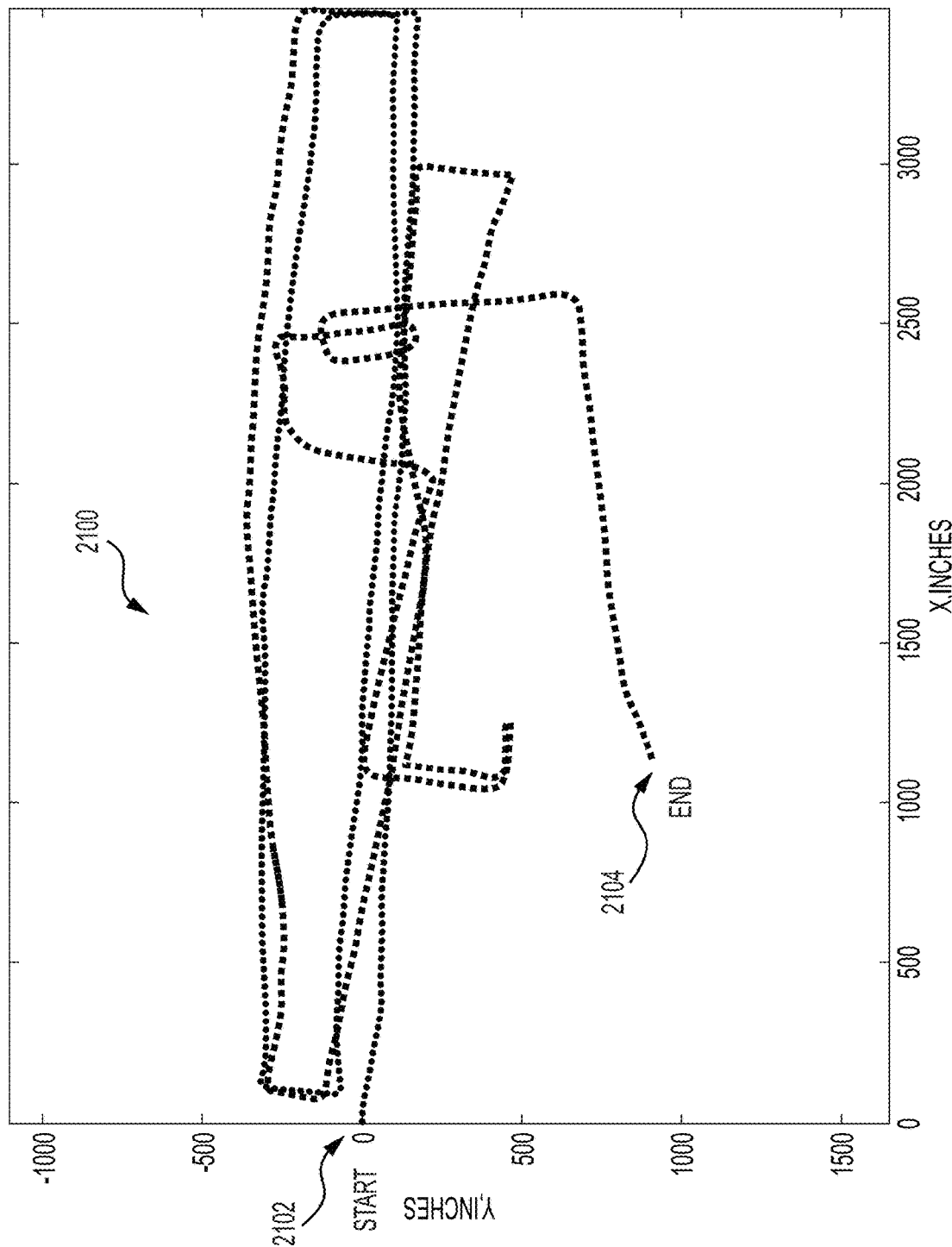
Figure 21N:
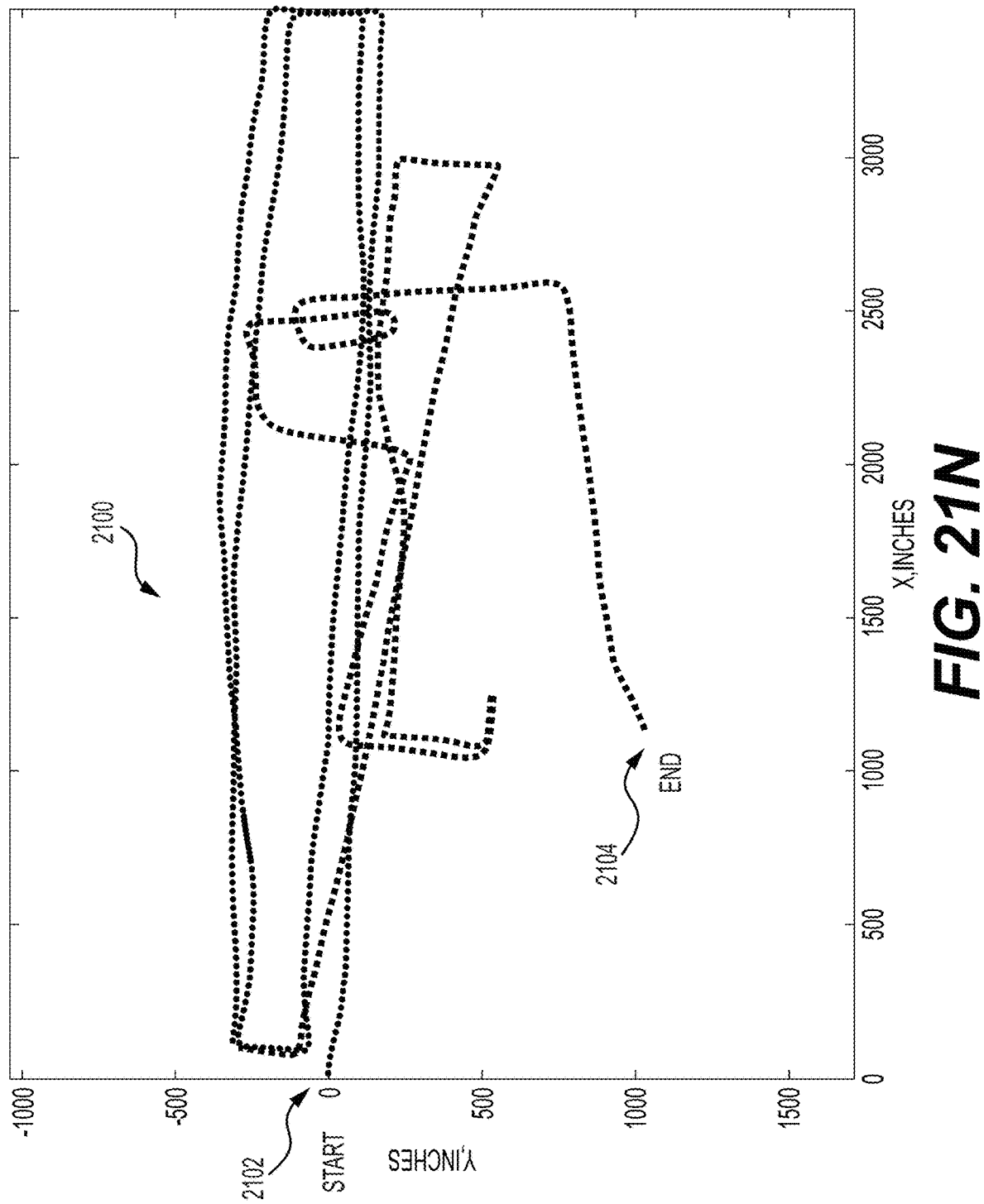
Figure 21O:
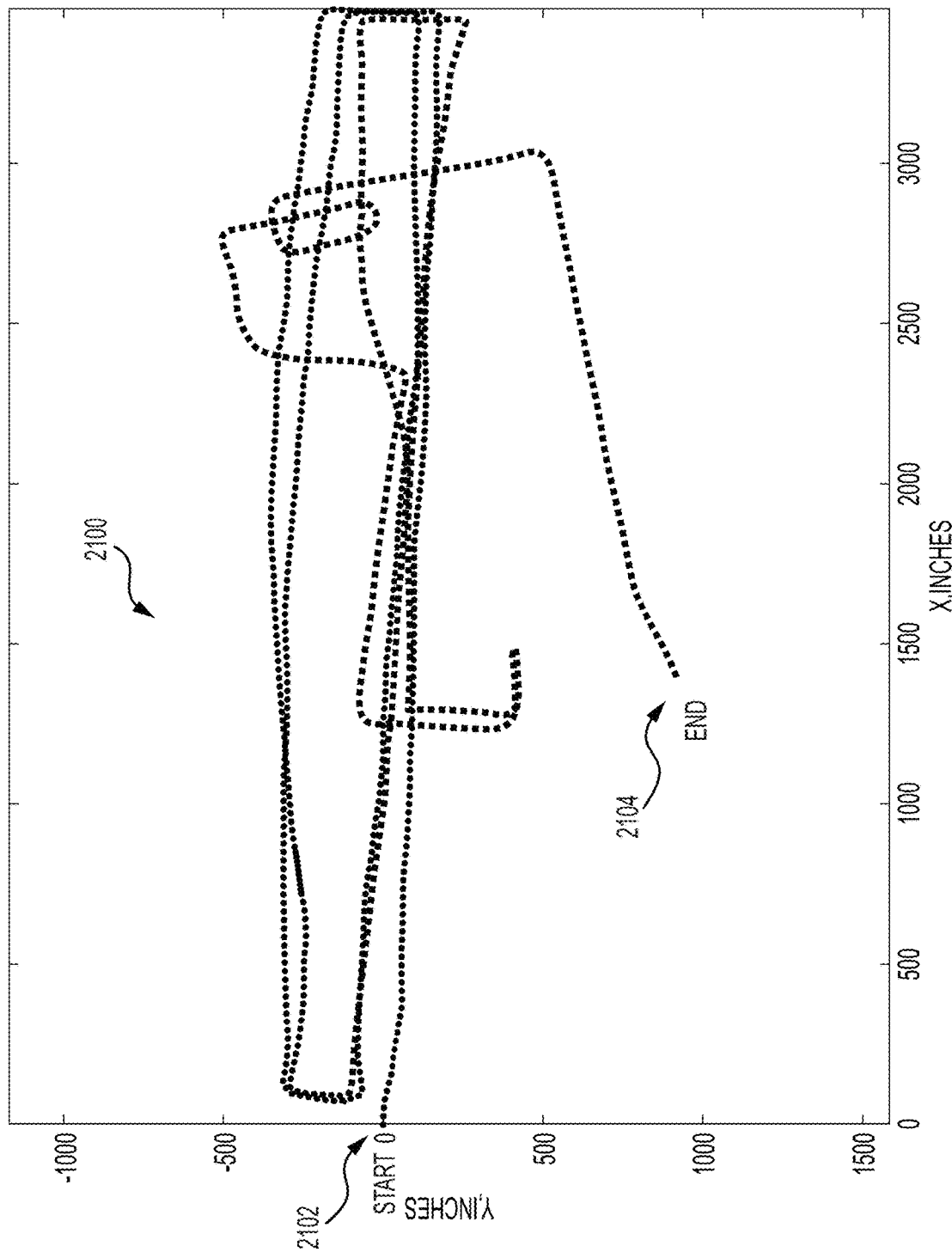
Figure 21P:
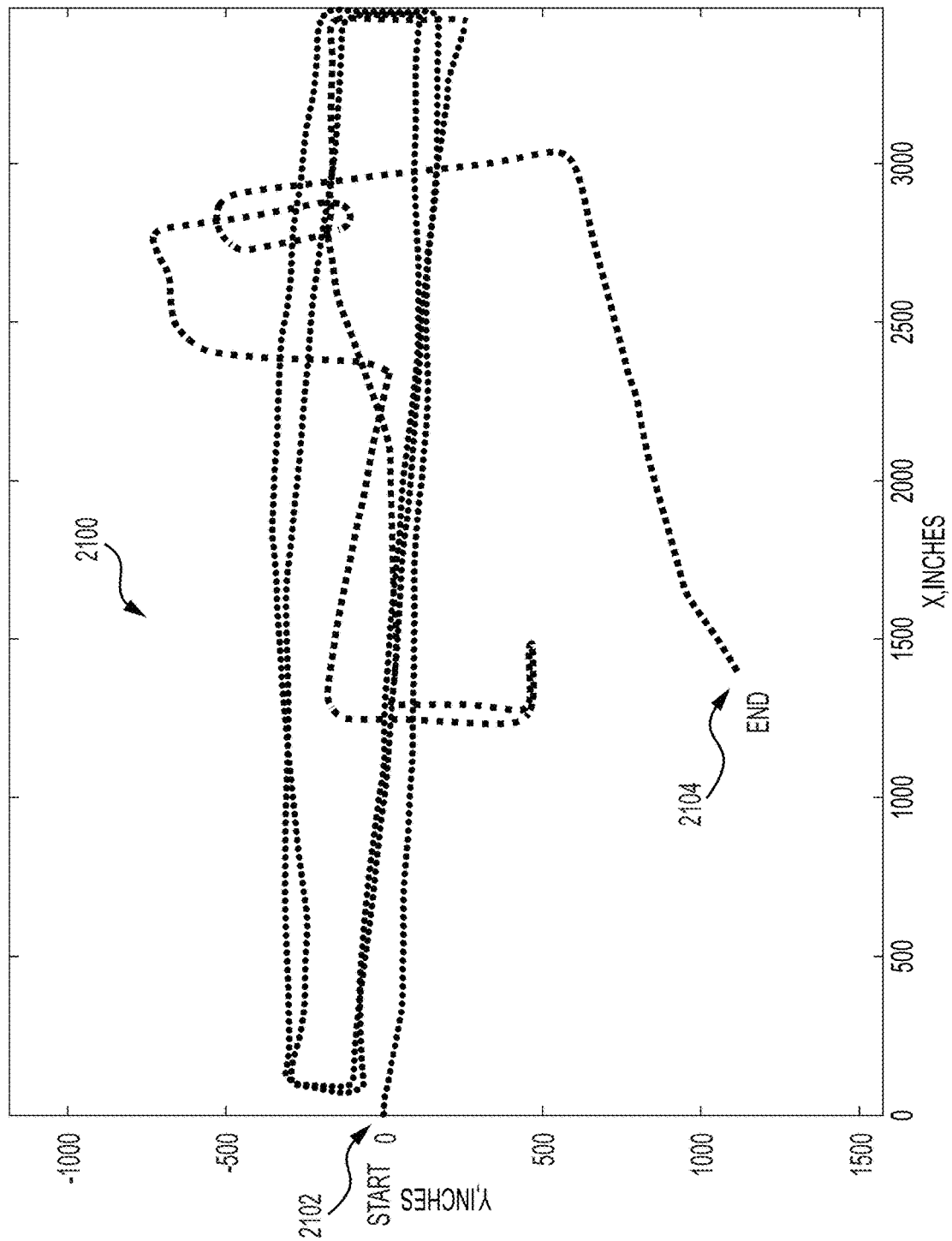
Figure 21Q:
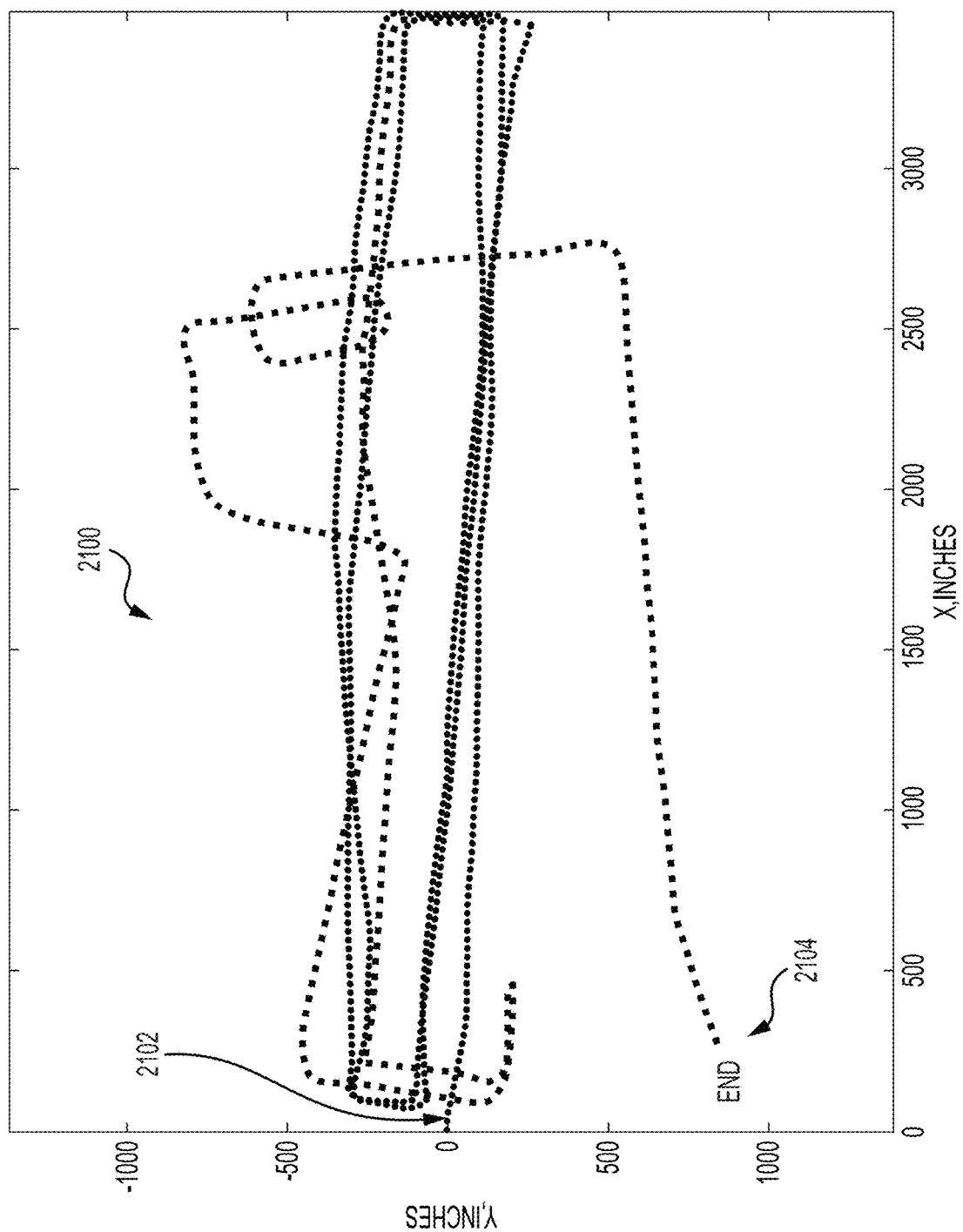
Figure 21R:
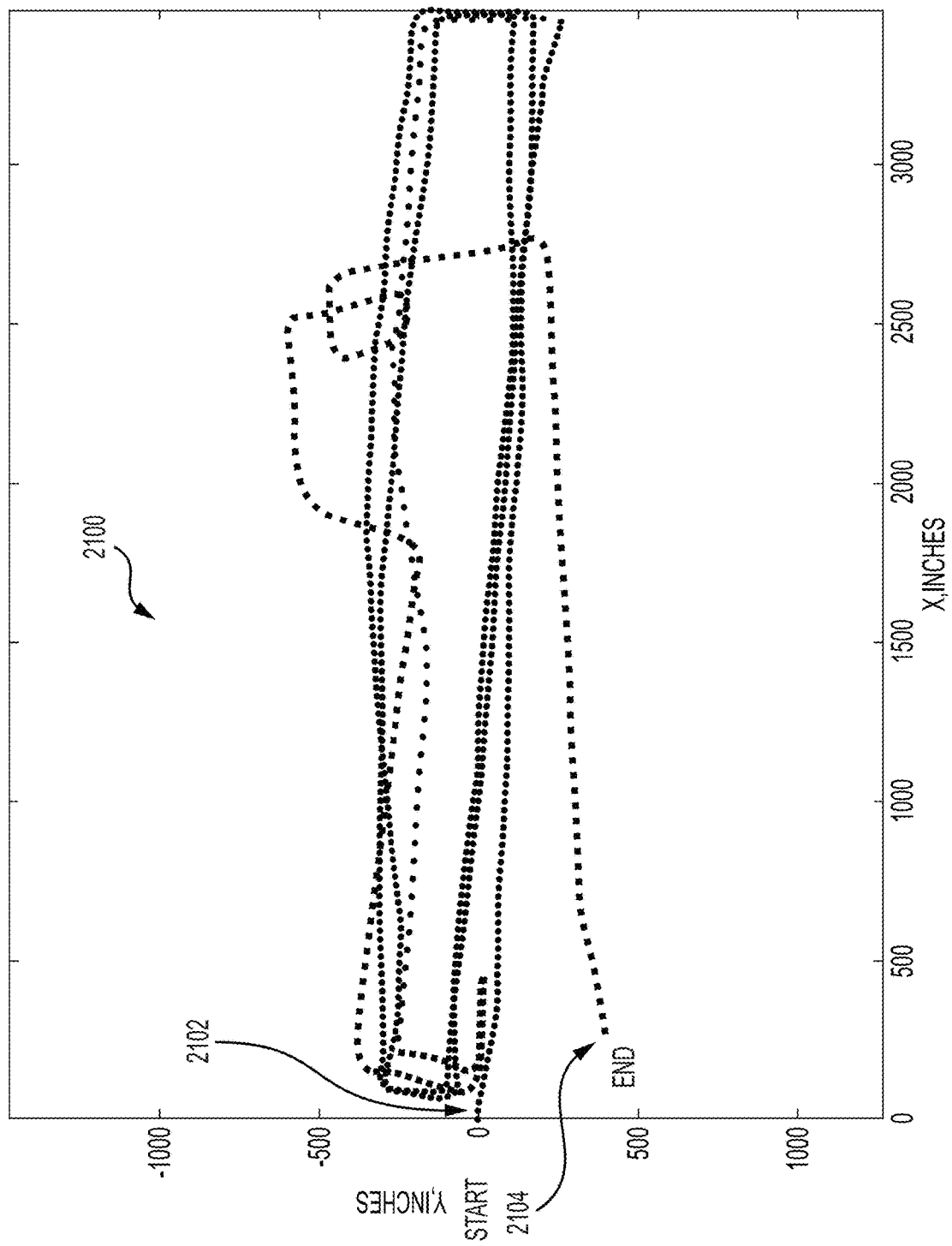
Figure 21S:
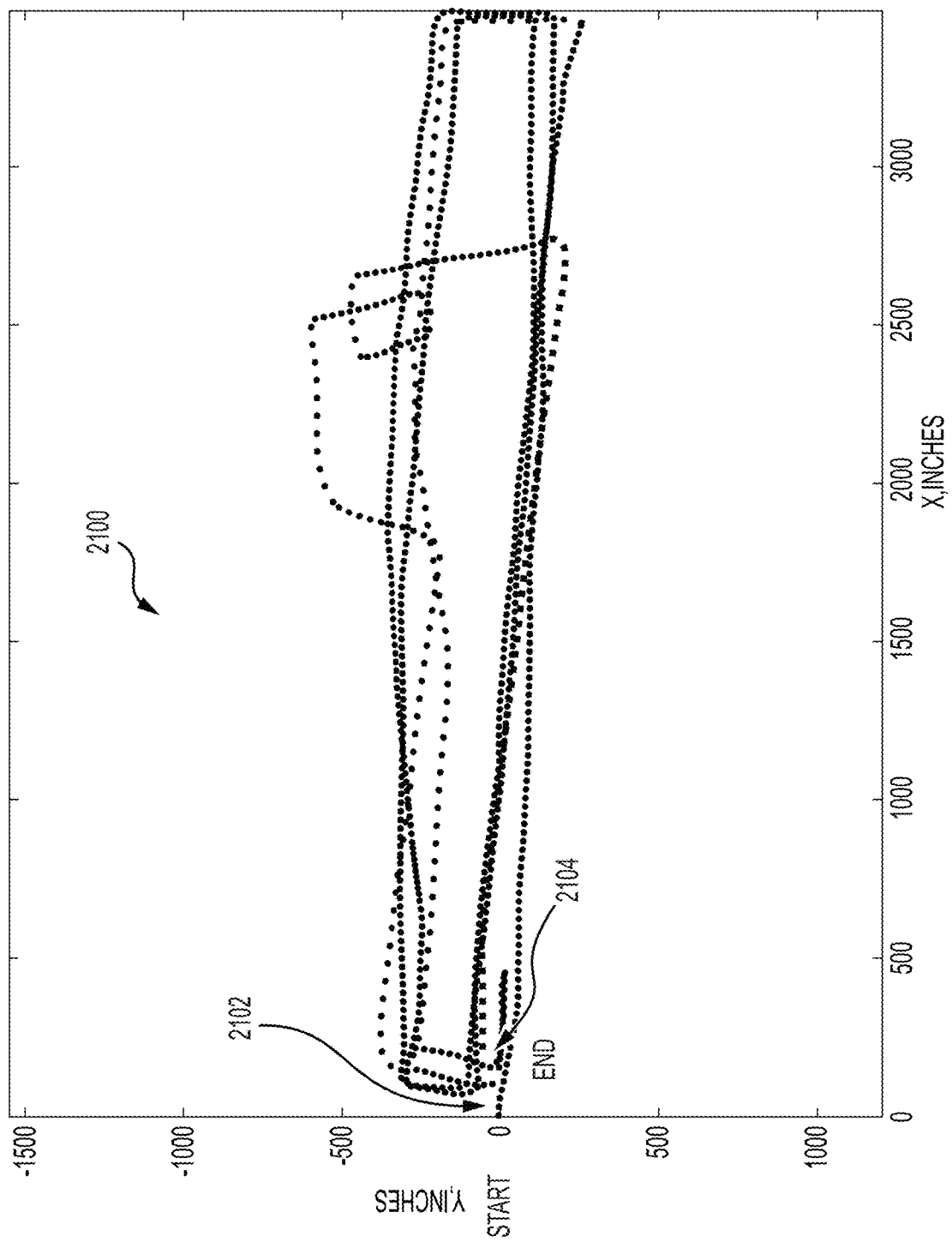
Figure 21T:
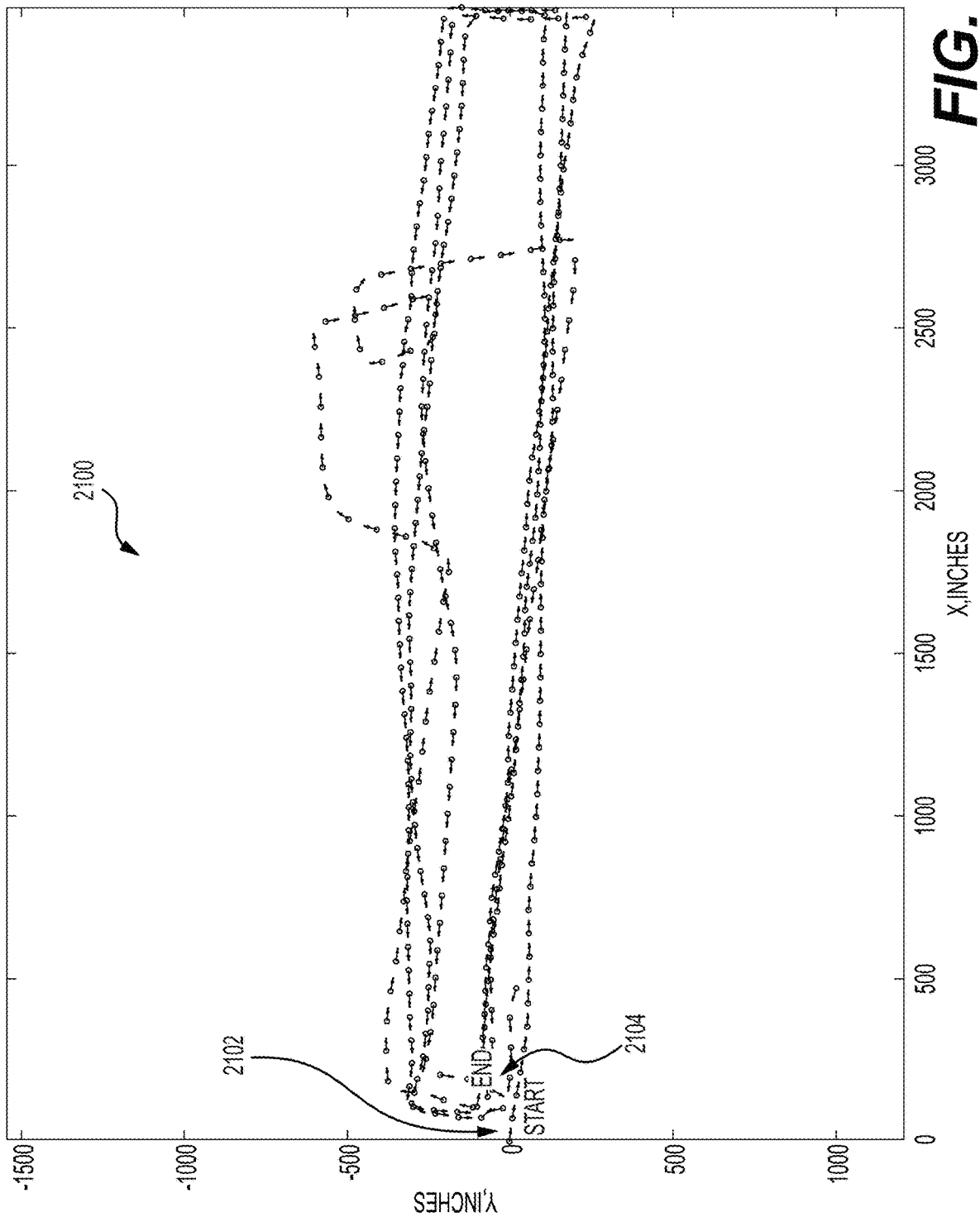

FIGS. 21A-21T illustrate example correction of INS drift. FIG. 21A illustrates an example graphical representation of an example trajectory 2100 determined by dead reckoning or a similar process by an INS (e.g. INS 2004). In the example of FIG. 21A, the circled points indicate the determined locations (e.g. as determined by INS 2004) along the trajectory and the arrows extending out from the circled points indicate the determined headings (e.g. as determined by magnetic-sensor system 2002 or INS 2004) at those locations. As an example and not by way of limitation, the trajectory may have been formed by a person walking with a device (e.g. device 2000) from start point 2102 to end point 2104. The determined locations may have been determined by dead reckoning by an INS of the device (e.g. INS 2004), and the determined headings at those locations may have been determined by a magnetic-sensor system of the device (e.g. magnetic-sensor system 2002) or the INS. In the example of FIG. 21A, INS drift has occurred in the determination of the locations and headings along the trajectory and the calculated trajectory, as represented using those determinations, differs significantly from the actual trajectory. FIG. 21T illustrates an example graphical representation of trajectory 2100 determined after correction of that drift.

FIG. 21B illustrates an example graphical representation of trajectory 2100 in multiple portions 2106. Although particular portions of a particular trajectory as described and illustrated herein, this disclosure contemplates any suitable portions of any suitable trajectory. In the example of FIG. 21B, portion 2106a is the closest to start point 2102, portion 2106b is the second closest to start point 2102, portion 2106c is the third closest to start point 2102, and so on. Portion 2106u is the last portion of 2106, farthest from start point 2102.

Magnetic recordings corresponding to portions 2106 of trajectory 2100 may be compared with each other to determine differences or similarities between or among them, which may as described above indicate whether any portions 2106 correspond to the same physical path in space. FIG. 21C illustrates three portions 2106*a*, 2106*e*, and 2106*i* that have been determined to have similar magnetic recordings. FIG. 21D illustrates an example comparison of example magnetic recordings of portions 2106*a*, 2106*e*, and 2106*i* with each other, labeled as "Search portion," "Found 1," and "Found 2," respectively. In particular embodiments, it may be determined from that comparison that portions 2106*a*, 2106*e*, and 2106*i* approximately magnetically coincide with each other. In particular embodiments, this comparison may involve calculating one or more distance (or difference) values calculated between or among those portions. If the distance (or difference) values are less than one or more predetermined values, then it may be determined that those portions approximately magnetically coincide with each other. FIG. 21E illustrates three other portions 2106*c*, 2106*g* (or part of portion 2106*g*), and 2106*k* that have also been determined to have similar magnetic recordings. FIG. 21F illustrates an example comparison of example magnetic recordings of portions 2106*c*, 2106*g* (or part of portion 2106*g*), and 2106*k* with each other, labeled as "Search portion," "Found 1," and "Found 2," respectively. In particular embodiments, it may be determined from that comparison that portions 2106*c*, 2106*g* (or part of portion 2106*g*), and 2106*k* approximately magnetically coincide with each other. FIG. 21G illustrates three other portions 2106*e* (or part of portion 2106*e*), 2106*i* (or part of portion 2106*i*), and 2106*u* that have also been determined to have similar magnetic recordings. Although particular comparisons between or among particular magnetic recordings is described and illustrated herein, this disclosure contemplates any suitable comparisons between or among any suitable magnetic recordings. Similarly, although particular magnetic coincidence between or among particular portions of particular trajectories is described and illustrated herein, this disclosure contemplates any suitable magnetic coincidence between or among any suitable portions of any suitable trajectories.

When it is determined, based on difference or similarity analyses between or among magnetic recordings corresponding to portions 2106 of trajectory 2100 (as described above), that certain portions 2106 of trajectory 2100 correspond to the same physical path(s) in space—but those certain portions 2106 were determined by dead reckoning or a similar process by an INS (e.g. INS 2004) to correspond to different physical paths in space (as shown in FIG. 21A)—then one or more portions 2106 of trajectory 2100 (or locations, points, or headings along one or more portions 2106 of trajectory 2100) may be adjusted in one or more steps so that at least portions 2106 determined to correspond to the same physical path(s) in space are represented as corresponding to the same physical path(s). FIGS. 21H-21S illustrate example adjustment of portions 2106 of trajectory 2100 based on difference or similarity analyses between or among magnetic recordings corresponding to portions 2106. FIG. 21T illustrates a result of the example adjustment of FIGS. 21H-21S. FIG. 21T is a more accurate representation of trajectory 2100 (as it was actually formed by the person walking with device 2000 from start point 2102 to end point 2104) than the representation of trajectory 2100 illustrated in FIG. 21A, which exhibits uncorrected INS drift. In particular embodiments, when two or more portions 2106 of trajectory 2100 are determined to correspond to the same physical path(s) in space, then the farther ones of portions 2106 from start point 2102 are moved or otherwise adjusted (in whole or in part) to be substantially colocated (in whole or in part) with the closer one of portions 2106 to start point 2102. In addition or as an alternative, in particular embodiments, this order may be changed. For example, if there is a greater level of confidence in the location of a portion farther from the start point of the trajectory, then that portion may be given priority over another portion closer to the trajectory. For example, if the location of a portion of the trajectory farther from the start point of the trajectory has known correct GPS or other GNSS coordinates (or other reliable location information associated with it), then other portions of the trajectory determined to correspond to the same physical path(s) in space as that farther portion may be moved or otherwise adjusted (in whole or in part) to be substantially colocated (in whole or in part) with that farther portion, even if one or more of those other portions are closer to the start point. As portions 2106 of trajectory 2100 are adjusted in this way, the relative headings of locations or points along trajectory 2100 may be kept substantially constant (and not adjusted) and other portions 2106 of trajectory 2100 may be moved or otherwise adjusted accordingly. Although particular techniques for particular adjustments of particular portions of particular trajectories are described and illustrated herein, this disclosure contemplates any suitable techniques for any suitable adjustments of any suitable portions of any suitable trajectories.

Particular embodiments facilitate autonomous or other motion of a device (which may be a vehicle, robot, handheld device, or other device) along a recorded route. In particular embodiments, one or more magnetic fields are recorded along the route and the device then navigates that route based at least in part on data received from magnetometers or other sensors on the device. In particular embodiments, recorded magnetic data along a route may be used for information support of navigation and motion-control systems of devices. In particular embodiments, a device autonomously or semi-autonomously navigates a route using a magnetic map of the route or an environment of the route. In particular embodiments, a person navigates a route using a magnetic map of the route or an environment of the route. Particular embodiments may substantially obviate one or more functions of an INS or GNSS receiver on the device. Particular embodiments may supplement or facilitate the function of an INS or GNSS receiver on the device.

Figure 22:
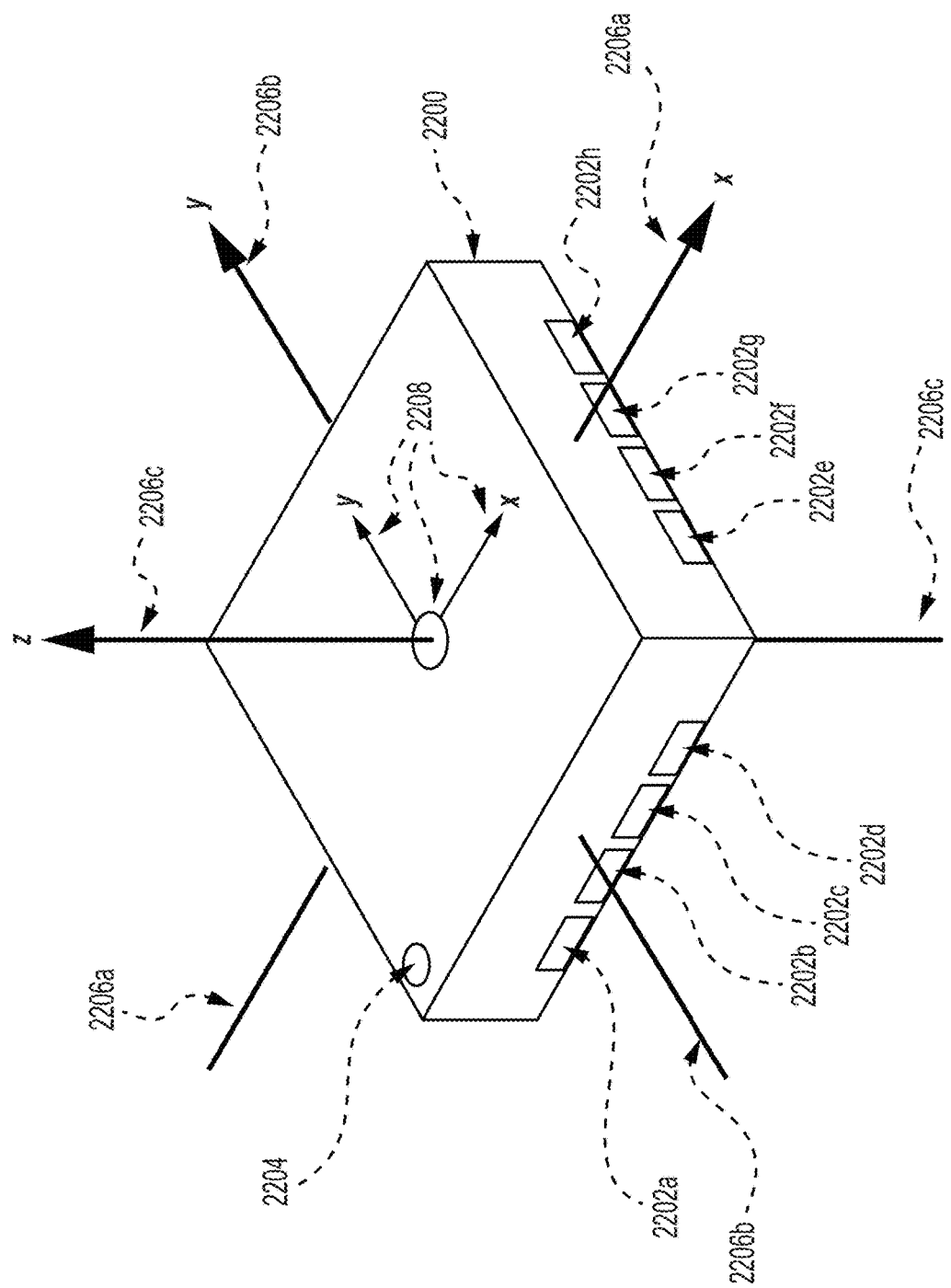
FIG. 22 illustrates an example magnetometer.

FIG. 22 illustrates an example semiconductor package 2200 containing one or more example magnetometers. Although a particular semiconductor package with one or more particular magnetometers is described and illustrated herein, this disclosure contemplates any suitable semiconductor packages with any suitable number of any suitable magnetometers. Semiconductor package 2200 may also be referred to as magnetometer 2200. In the example of FIG. 22, magnetometer 2200 has 16 pins 2202, with four on each side. Pin 2202*a* is pin 1, pin 2202*b* is pin 2, pin 2202*c* is pin 3, pin 2202*d* is pin 4, pin 2202*e* is pin 5, pin 2202*f* is pin 6, pin 2202*g* is pin 7, and pin 2202*h* is pin 8. The remaining pins are not shown in FIG. 22. Each of these pins may have a predefined function, such as connecting magnetometer 2200 to a clock signal, connecting magnetometer 2200 to a power supply, defining a voltage swing for digital input and output to and from magnetometer 2200, carrying input to magnetometer 2200, or carrying output from magnetometer 2200. Although particular functions of particular pins are described and illustrated herein, this disclosure contemplates any suitable functions of any suitable pins. Magnetometer 2200 includes a first-pin indicator 2204 that visually indicates the location of pin 1, which is the first pin moving counter-clockwise from first-pin indicator 2204. The pin numbers increase moving counter-clockwise from pin 1. In the example of FIG. 22, first-pin indicator 2204 is a printed dot on the top of magnetometer 2200. Although a particular pin indicator in a particular location on a particular magnetometer indicating a particular pin is described and illustrated herein, this disclosure contemplates any suitable number of any suitable pin indicators in any suitable locations on any suitable magnetometer indicating any suitable pins. For example, in addition or as an alternative to being a printed dot, first-pin indicator 2204 may be an indented dot or a notch.

In the example of FIG. 22, magnetometer 2200 has a body-fixed coordinate frame that includes x axis 2206a, y axis 2206b, and z axis 2206c. Axes 2206a, 2206b, and 2206c are shown in FIG. 22 for explanatory purposes only and are not physical structures of magnetometer 2200. Magnetometer 2200 includes an orientation indicator 2208 (which may be printed on the top of magnetometer 2200) that visually indicates the orientation of the body-fixed coordinate frame of magnetometer 2200. In orientation indicator 2208, an arrow indicates the magnetic-field direction that generates a positive output reading in a normal-measurement configuration (or mode) of magnetometer 2200. Although a particular magnetometer with a particular orientation indicator visually indicating a particular orientation of a particular coordinate frame is described and illustrated herein, this disclosure contemplates any suitable magnetometer with any suitable orientation indicator visually indicating any suitable orientation of any suitable coordinate frame. This disclosure also contemplates any suitable magnetometer with no orientation indicator.

In the presence of an external magnetic field, magnetometer 2200 may determine the x, y, and z vector components of the magnetic field, $B_x$, $B_y$, and $B_z$, and output those values to a controller. For example, those values may be communicated, via a TCA9548A switch made by TEXAS INSTRUMENTS, to an ATMEGA2560 microcontroller made by MICROCHIP TECHNOLOGY mounted on an ARDUINO MEGA 2560 microcontroller board made by ARDUINO. $B_x$, $B_y$, and $B_z$ may be used to determine the magnitude of the magnetic-induction vector, $|B|$, the magnitude of the horizontal component of B, $|B_h|$, the declination angle of the magnetic field, D, and the inclination angle of the magnetic field, I, using equations (1), (2), (3), and (4) as described above.

Figure 23B:
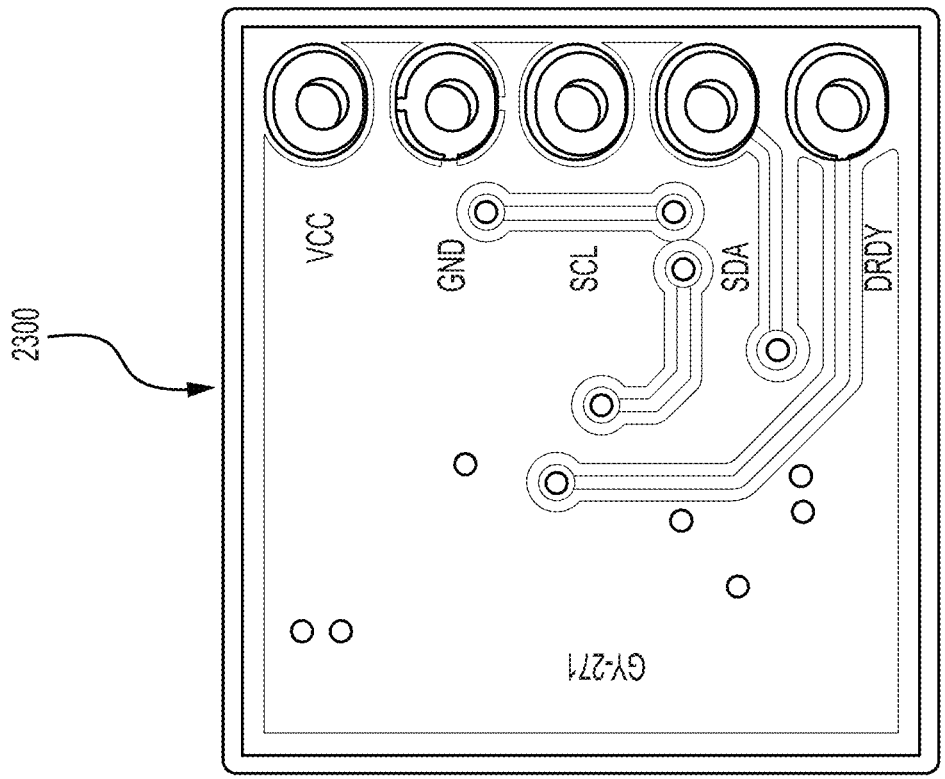
FIGS. 23A-23B illustrate an example module with an example magnetometer.
Figure 23A:
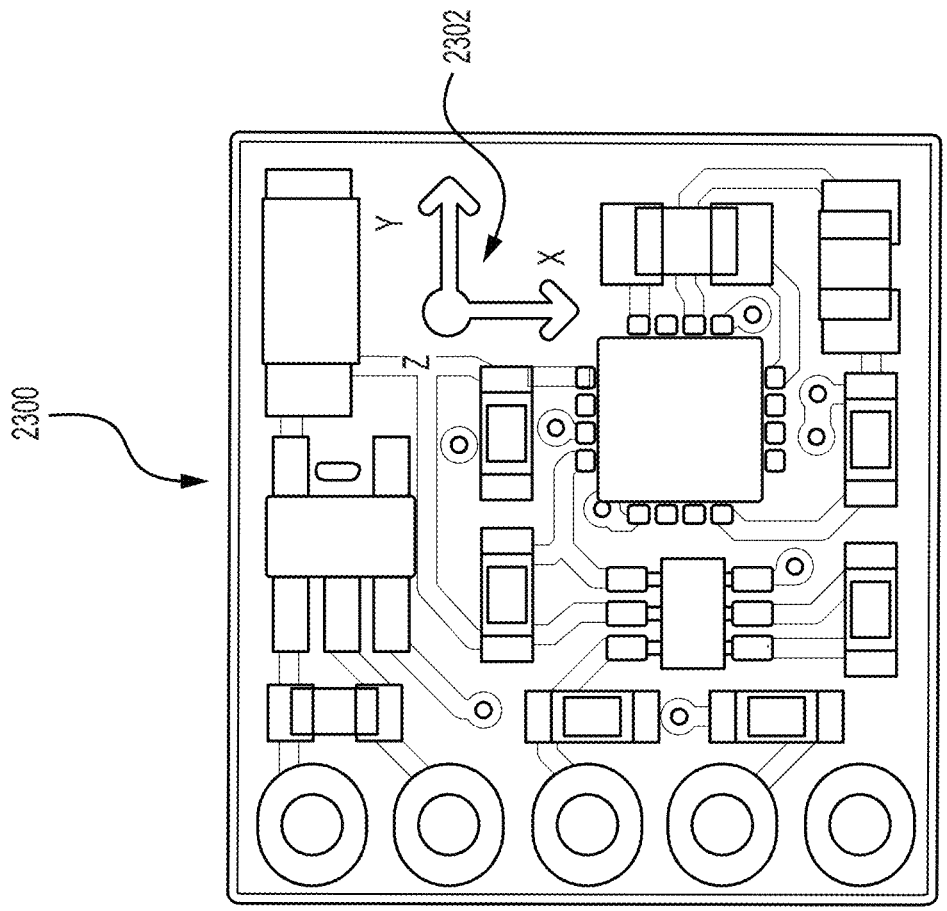

FIGS. 23A-23B illustrate an example module 2300 with an example magnetometer. In the example of FIGS. 23A-23B, module 2300 is a GY-271L electronic compass including an HMC5883L three-axis digital-compass IC made by HONEYWELL. FIG. 23A is a top view of module 2300, and FIG. 23B is a bottom view of module 2300. Although a particular module with a particular magnetometer is described and illustrated herein, this disclosure contemplates any suitable module with any suitable magnetometer. Similar to magnetometer 2200, module 2300 has a body-fixed coordinate frame and includes an orientation indicator 2302 that visually indicates the orientation of the body-fixed coordinate frame of module 2300.

Figure 24:
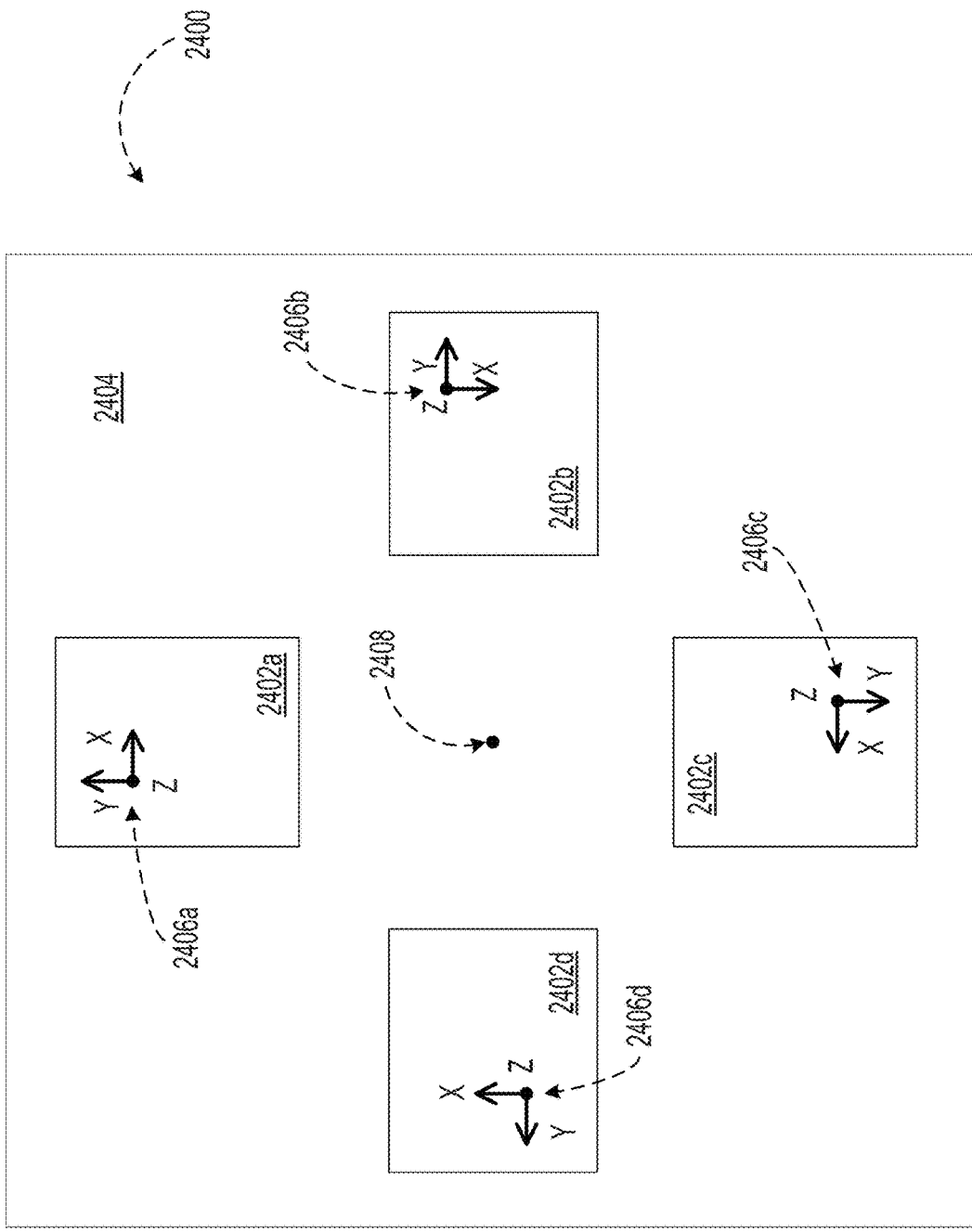
FIG. 24 illustrates an example sensor set including four example magnetometers.
Figure 25:
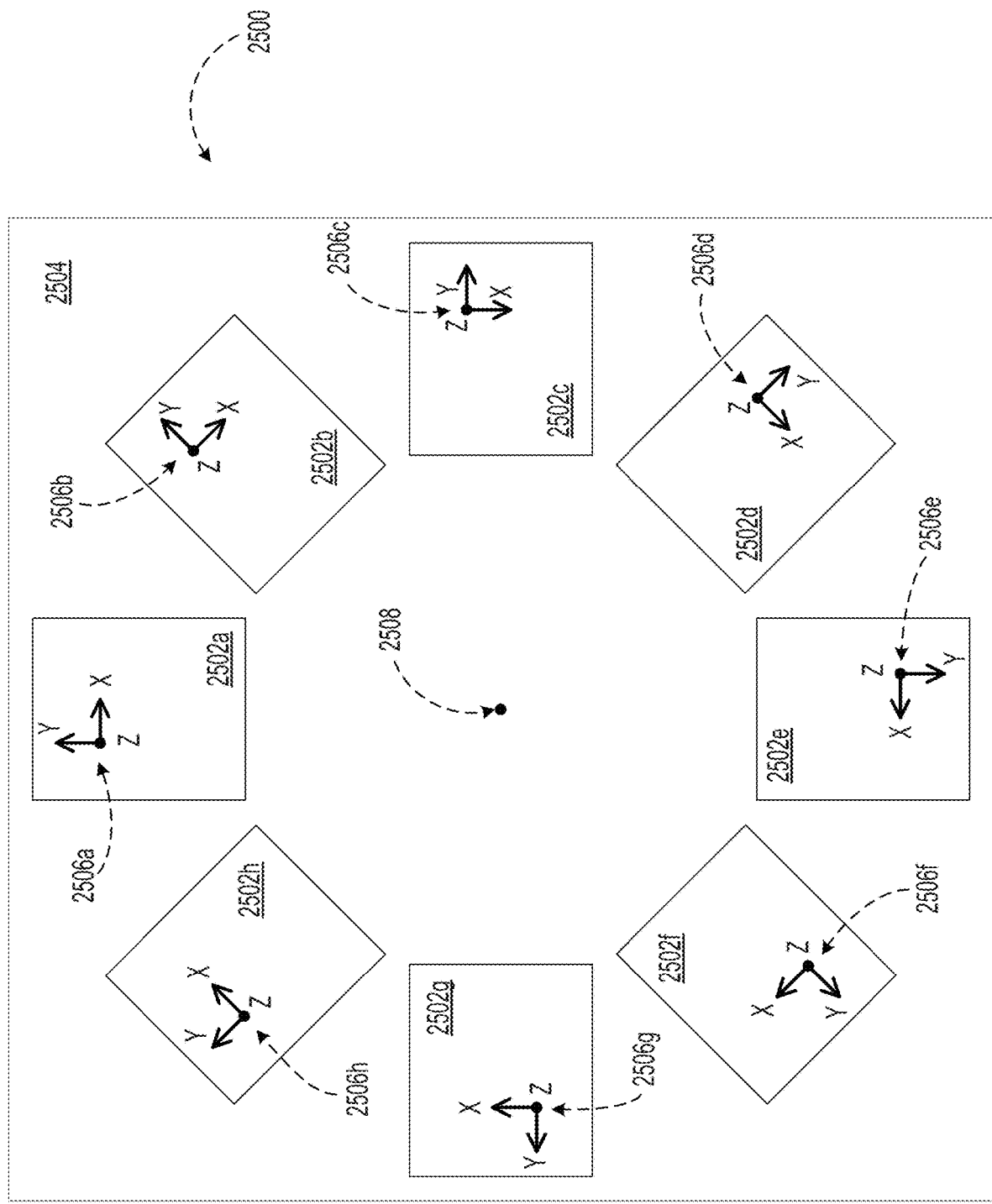
FIG. 25 illustrates an example sensor set including eight example magnetometers.

FIG. 24 illustrates an example sensor set 2400 including four example magnetometers 2402. In the example of FIG. 24, magnetometers 2402 are arranged and oriented on a plane with a step of 90°. In particular embodiments, increasing the number of pairs of magnetometers decreases this step to 450 (as shown in FIG. 25), 22.5°, 11.5°, etc. In the example of FIG. 24, magnetometers 2402 are mounted on a PCB or other board 2404. One or more other components not shown in FIG. 24 may also be mounted on board 2404. For example, magnetometers 2402 may be coupled to a TCA9546A switch made by TEXAS INSTRUMENTS that is also mounted on board 2404. Magnetometers 2402 may each be a GY-271L electronic compass including an HMC5883L three-axis digital-compass IC made by HONEYWELL. In particular embodiments, the maximum number of GY-271L electronic compasses for a TCA9546A switch board is eight. For every additional eight GY-271L electronic compasses, an additional TCA9546A switch board may, but need not necessarily, be required.

Each magnetometer 2402 has a body-fixed coordinate frame, and the orientation of the body-fixed coordinate frame of each magnetometer 2402 is indicated by an orientation indicator 2406. Board 2404 may be substantially flat and define a plane. One or more magnetometers 2402 may each be mounted on board 2404 such that the plane defined by the x and y axes of the body-fixed coordinate frame of magnetometer 2402 is substantially parallel to the plane defined by board 2404. In addition or as an alternative, one or more magnetometers 2402 may each be mounted on board 2404 such that there is an acute angle between the plane defined by the x and y axes of the body-fixed coordinate frame of magnetometer 2402 and the plane defined by board 2404. By the angle of inclination of a magnetometer 2402, the following is meant:

1. The optimal angle of orientation (only along the y axis (north) or only along the x axis) of magnetometer 2402 when the device (such as, for example, device 2000) moves at certain latitudes. This depends on I, but need not always match. It may range from 0° to about 90°.
2. The "technical" angle associated with an uneven fit of the chip (misalignment, etc.) on magnetometer 2402 (a small "board" of a GY-271M module). To ensure alignment of the axes of magnetometer 2402 with the substrate in the plane defined by board 2404, magnetometer 2402 may have a "technical" angle of inclination along the x or y axes relative to the plane defined by board 2404.

Magnetometers 2402 may be approximately equidistant from a center 2408 (or an axis of rotation) of board 2404. Magnetometers 2402 may be installed parallel to the plane defined by board 2404. As an alternative, the inner side of each of one or more magnetometers 2402 may be raised by the value h above the plane defined by board 2404 (as described above).

Magnetometers 2402 in sensor set 2400 may be arranged in subsets, and magnetometers 2402 in each subset may be oriented or configured relative to each other to generate predetermined combinations of output readings. For example, magnetometers 2402 in sensor set 2400 may be arranged in pairs. A first magnetometer 2402 in each pair may be oriented or configured relative to a second magnetometer 2402 in the pair such that the output readings of first magnetometer 2402 coincide with the output readings of second magnetometer 2402, if second magnetometer 2402 is rotated 180° and set strictly in place of first magnetometer 2402. Although particular magnetometers are described and illustrated as being arranged in particular ways and having particular rotations or orientations with respect to other magnetometers (e.g. having one or more axes that are 180° from the same or different axes of other magnetometers), this disclosure contemplates any suitable magnetometers having any suitable arrangements and any suitable rotations or orientations with respect to any other suitable magnetometers. The axis of rotation is a point equal to half the distance between the chips (sensing elements) of magnetometers 2402 (modules GY-271M). In the example of FIG. 24, magnetometers 2402a and 2402c are arranged in a pair and oriented relative to each other such that the x axis of the body-fixed coordinate frame of magnetometer 2402a is 180° from the x axis of the body-fixed coordinate frame of magnetometer 2402c, with the x-axis arrow in orientation indicator 2406a and the x-axis arrow in orientation indicator 2406c pointing in opposite directions. Magnetometers 2402a and 2402c are also oriented relative to each other such that the y axis of the body-fixed coordinate frame of magnetometer 2402a is 180° from the y axis of the body-fixed coordinate frame of magnetometer 2402c, with the y-axis arrow in orientation indicator 2406a and the y-axis arrow in orientation indicator 2406c pointing in opposite directions. Similarly, in the example of FIG. 24, magnetometers 2402b and 2402d are arranged in a pair and oriented relative to each other such that the x axis of the body-fixed coordinate frame of magnetometer 2402b is 180° from the x axis of the body-fixed coordinate frame of magnetometer 2402d, with the x-axis arrow in orientation indicator 2406b and the x-axis arrow in orientation indicator 2406d pointing in opposite directions. Magnetometers 2402b and 2402d are also oriented relative to each other such that the y axis of the body-fixed coordinate frame of magnetometer 2402b is 180° from the y axis of the body-fixed coordinate frame of magnetometer 2402d, with the y-axis arrow in orientation indicator 2406a and the y-axis arrow in orientation indicator 2406c pointing in opposite directions. Although a particular number of particular subsets of particular magnetometers with particular orientations or configurations relative to each other to generate particular predetermined combinations of particular output readings are described and illustrated herein, this disclosure contemplates any suitable number of any suitable subsets of any suitable magnetometers with any suitable orientations or configurations relative to each other generating any suitable predetermined combinations of any suitable output readings. For example, in particular embodiments, sensor set 2400 may include a single pair of opposing magnetometers (e.g. magnetometers 2402a and 2402c or magnetometers 2402b and 2402d) and need not include two pairs of opposing magnetometers (e.g. magnetometers 2402a and 2402c and magnetometers 2402b and 2402d as illustrated in the example of FIG. 24).

FIG. 25 illustrates an example sensor set 2500 including eight example magnetometers 2502. In the example of FIG. 25, magnetometers 2502 are arranged and oriented on a plane with a step of 45°. Magnetometers 2502 are mounted on a PCB or other board 2504. One or more other components not shown in FIG. 25 may also be mounted on board 2504. For example, magnetometers 2502 may be coupled to a TCA9548A switch made by TEXAS INSTRUMENTS that is also mounted on board 2504. Magnetometers 2502 may each be a GY-271L electronic compass including an HMC5883L three-axis digital-compass IC made by HONEYWELL.

In particular embodiments, the sensors are approximately equidistant from a center 2508 (or an axis of rotation) of board 2504. The distance from the axis to a magnetometer 2502 is minimized when using planar technology (e.g. lithography). In such cases, each sensor may be dimensionless (i.e. a point). In particular embodiments, a sensor set (such as for example sensor set 2400 or sensor set 2500) may be presented as a single microchip.

Magnetometers 2502 in sensor set 2500 may be arranged in subsets, and magnetometers 2502 in each subset may be oriented or configured relative to each other to generate predetermined combinations of output readings. For example, magnetometers 2502 in sensor set 2502 may be arranged in pairs. A first magnetometer 2502 in each pair may be oriented or configured relative to a second magnetometer 2502 in the pair such that the output readings of first magnetometer 2502 coincide with the output readings of second magnetometer 2502, if second magnetometer 2502 is rotated 180° and set strictly in place of first magnetometer 2502. Although particular magnetometers are described and illustrated as being arranged in particular ways and having particular rotations or orientations with respect to other magnetometers (e.g. having one or more axes that are 180° from the same or different axes of other magnetometers), this disclosure contemplates any suitable magnetometers having any suitable arrangements and any suitable rotations or orientations with respect to any other suitable magnetometers. The axis of rotation is a point equal to half the distance between the chips (sensing elements) of the GY-271M modules. In the example of FIG. 25, magnetometers 2502a and 2502e are arranged in a pair and oriented with respect to each other such that the x axis of the body-fixed coordinate frame of magnetometer 2502a is 180° from the x axis of the body-fixed coordinate frame of magnetometer 2502e, with the x-axis arrow in orientation indicator 2506a and the x-axis arrow in orientation indicator 2506e pointing in opposite directions. Magnetometers 2502a and 2502e are also oriented with respect to each other such that the y axis of the body-fixed coordinate frame of magnetometer 2502a is 180° from the y axis of the body-fixed coordinate frame of magnetometer 2502e, with the y-axis arrow in orientation indicator 2506a and the y-axis arrow in orientation indicator 2506e pointing in opposite directions. In the example of FIG. 25, magnetometers 2502b and 2502f are similarly arranged and oriented relative to each other; magnetometers 2502c and 2502g are similarly arranged and oriented relative to each other; and magnetometers 2502d and 2502h are similarly arranged and oriented relative to each other. Although a particular number of particular subsets of particular magnetometers with particular orientations or configurations relative to each other to generate particular predetermined combinations of particular output readings are described and illustrated herein, this disclosure contemplates any suitable number any suitable subsets of any suitable magnetometers with any suitable orientations or configurations relative to each other generating any suitable predetermined combinations of any suitable output readings.

Figure 26:
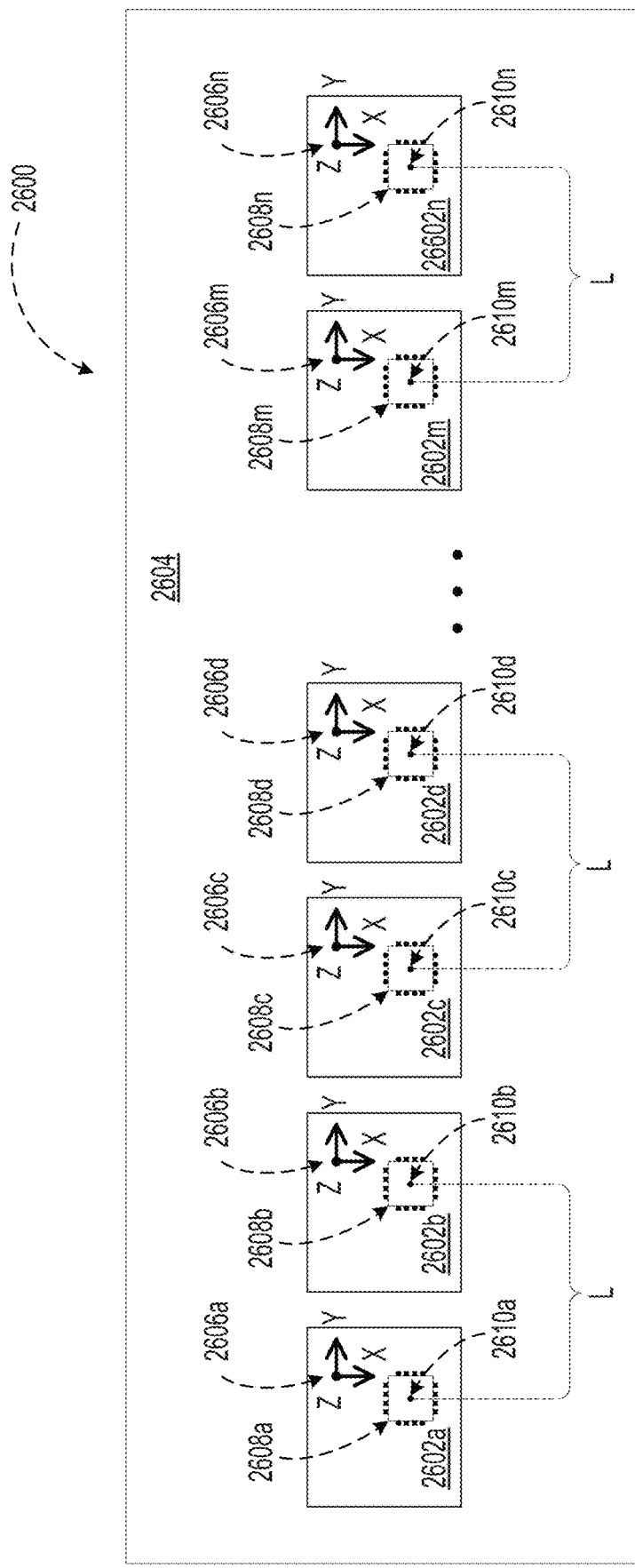
FIG. 26 illustrates an example sensor set including magnetometers for measuring a distance traversed or speed.

Although particular sensor sets including particular numbers of magnetometers in particular arrangements are described and illustrated herein, this disclosure contemplates any suitable sensor sets including any suitable numbers of any suitable magnetometers in any suitable arrangements. A sensor set may include magnetometers arranged and oriented on a two-dimensional shape, such as a square or octagon. For example, as shown in FIG. 26, a sensor set may include four magnetometers arranged and oriented on or in a square, with each of the magnetometers located in whole or in part on or along a side of the square. As shown in FIG. 25, a sensor set may include eight magnetometers arranged and oriented on or in an octagon (with each of the magnetometers located in whole or in part on or along a side of the octagon), but the same approach may be extended to cases of 16-sided figures, 32-sided figures, 64-sided figures, or figures with more than 64 sides. Although particular sensor sets arranged and oriented on particular two-dimensional shapes are described and illustrated herein, this disclosure contemplates any suitable sensor sets arranged and oriented on any suitable two-dimensional shapes. In addition or as an alternative, a sensor set may include magnetometers arranged and oriented on a three-dimensional shape, such as a polyhedron or a faceted sphere. For example, a sensor set may include eight or more magnetometers arranged and oriented on the facets of an octahedron, with each facet of the octahedron including one or more of the magnetometers. The sensor set may include four or more pairs of opposing magnetometers, with the magnetometers in each pair being oriented with respect to each other such that the x, y, or z axes of their respective body-fixed coordinate frames are 180° or other suitable degree apart (including 0°). Although particular magnetometers are described and illustrated as being arranged in particular ways and having particular rotations or orientations with respect to other magnetometers (e.g. having one or more axes that are 180° from the same or different axes of other magnetometers), this disclosure contemplates any suitable magnetometers having any suitable arrangements and any suitable rotations or orientations with respect to any other suitable magnetometers. As another example, a sensor set may include 12 or more magnetometers arranged and oriented on the facets of a dodecahedron, with each facet of the dodecahedron including one or more of the magnetometers. The sensor set may include two or more pairs of opposing magnetometers, with the magnetometers in each pair being oriented with respect to each other such that the x, y, or z axes of their respective body-fixed coordinate frames are 180° or other suitable degree apart (including 0°). As another example, a sensor set may include 20 or more magnetometers arranged and oriented on the facets of an icosahedron, with each facet of the icosahedron including one or more of the magnetometers. The sensor set may include two or more pairs of opposing magnetometers, with the magnetometers in each pair being oriented with respect to each other such that the x, y, or z axes of their respective body-fixed coordinate frames are 180° or other suitable degree apart (including 0°). As another example, a sensor set may include 360 or more magnetometers arranged and oriented around a faceted sphere. The sensor set may include 180 or more pairs of opposing magnetometers, with the magnetometers in each pair being oriented with respect to each other such that the x, y, or z axes of their respective body-fixed coordinate frames are 180° or other suitable degree apart (including 0°). In a sensor set with magnetometers arranged and oriented on a three-dimensional shape, one or more of the facets of the three-dimensional shape may include one magnetometer. In addition or as an alternative, one or more of the facets of the three-dimensional shape may include two or more opposing or non-opposing magnetometers, which may be arranged and oriented on a two-dimensional shape, such as a square or octagon or polygon or even a sphere. A resulting chip including a set of pairs of magnetometers (four, eight, 16, etc.) may be implemented using a planar technology (e.g. lithography).

In particular embodiments, a sensor set includes M magnetometers that form N=M/2 pairs of magnetometers. In each of one or more of the N pairs of magnetometers j and j+1, the first (j) magnetometer of the pair measures the strength (magnitude) and direction of a magnetic field and has a coordinate frame including axes $x_j$, $y_j$, $z_j$, which are 900 degrees from each other. The second (j+1) magnetometer of the pair measures the strength (magnitude) and direction of the magnetic field and has a coordinate frame including axes $x_{j+1}$, $y_{j+1}$, and $z_{j+1}$ axis, which are also 90° from each other. The $x_{j+1}$ axis and the $y_{j+1}$ axis are each approximately 180° or other suitable degree (including 0°) from the $x_j$ axis and the $y_j$ axis, respectively. Although particular magnetometers are described and illustrated as being arranged in particular ways and having particular rotations or orientations with respect to other magnetometers (e.g. having one or more axes that are 180° from the same or different axes of other magnetometers), this disclosure contemplates any suitable magnetometers having any suitable arrangements and any suitable rotations or orientations with respect to any other suitable magnetometers. In particular embodiments, each of one or more of the magnetometers in each of one or more of the N pairs of magnetometers is installed on a base (such as for example board 2404, 2404, or 2604) with an acute angle between the plane defined by the base and the plane defined by the x and y axes of the coordinate frame of the magnetometer. The edge of the magnetometer closest to the center (or the axis of rotation) of the pair of magnetometers may be raised above the plane defined by the base and form an acute angle with it, and the edge of the magnetometer farthest from the center (or the axis of rotation) of the pair of magnetometers may be closer to the plane defined by the base. In particular embodiments, the magnetometers in each of one or more of the N pairs of magnetometers are at least approximately equidistant from the center (or the axis of rotation) of the pair of magnetometers. In particular embodiments, the N pairs of magnetometers all have the same axis of rotation and the angle about that axis between adjacent pairs of magnetometers is 360/N degrees.

In particular embodiments, in each of one or more of the N pairs of magnetometers, the second (j+1) magnetometer is positioned relative to the first (j) magnetometer such that the measurements of the magnetic field recorded by the second (j+1) magnetometer along each of the $x_{j+1}$ axis, the $y_{j+1}$ axis, and the $z_{j+1}$ axis when the second (j+1) magnetometer is rotated by 180° (and set at least approximately in the place of the first (j) magnetometer) are at least approximately equal. If, during the rotation of the $j^{th}$ magnetometer around its axis at point Q, the corresponding recorded values of the magnetic induction are $B_{x1}$, $B_{y1}$, and $B_{z1}$, then, by rotating the adjacent magnetometer by 360/N degrees and moving it to the location of the $j^{th}$ magnetometer, the corresponding values $B_{x2}$, $B_{y2}$, and $B_{z2}$ will be at least approximately identical to $B_{x1}$, $B_{y1}$, and $B_{z1}$. In particular embodiments, the N pairs of magnetometers are located on the facets of a three-dimensional W-faceted surface.

A device (such as, for example, device 2000) may include one or more sensor sets that each include one or more magnetometers and use those sensor sets to generate a magnetic map or for navigation or localization using an existing magnetic map. A magnetic map of an area may be created using a sensor set in a recording mode in which $B_x$, $B_y$, and $B_z$ at each point i along a route are received from the sensor set (e.g. from each magnetometer in the sensor set), processed by a processing module, and stored for each point i in the form of $B_{xki}$, $B_{yki}$, and $B_{zki}$, with k indicating the map, e.g., on a secure digital (SD) card or other storage medium onboard or on or in the device (such as, for example, device 2000). The magnetic map may be created by trawling the area and forming a database from the current $B_x$, $B_y$, and $B_z$ for one or more selected regions of the area. Data may be recorded at each point of the magnetic map of the region with a step from point i to point i+1 with sufficient accuracy to form a magnetic map of the region.

FIG. 26 illustrates an example sensor set 2600 including magnetometers 2602 for measuring a distance traversed by or a speed (e.g. an average speed) of a device (such as, for example, device 2000). In the example of FIG. 26, magnetometers 2602 are mounted on a PCB or other board 2604. One or more other components not shown in FIG. 26 may also be mounted on board 2604. For example, magnetometers 2602 may be coupled to a TCA9548A switch made by TEXAS INSTRUMENTS that is also mounted on board 2604. Magnetometers 2602 may each be a GY-271L electronic compass including an HMC5883L three-axis digital-compass IC made by HONEYWELL. In particular embodiments, the maximum number of GY-271L electronic compasses for a TCA9546A switch board is eight. For every additional eight GY-271L electronic compasses, an additional TCA9546A switch board is required.

In the example of FIG. 26, each magnetometer 2602 has a body-fixed coordinate frame, and the orientation of the body-fixed coordinate frame of each magnetometer 2602 is indicated by an orientation indicator 2606. Magnetometers 2602 in sensor set 2600 may be arranged in subsets. For example, magnetometers 2602 in sensor set 2600 may be arranged in pairs. In the example of FIG. 26, magnetometers 2602a and 2602b are arranged in a pair and oriented relative to each other such that the y axis of the body-fixed coordinate frame of magnetometer 2602a is substantially aligned with the y axis of the body-fixed coordinate frame of magnetometer 2602b (at approximately 0° relative to each other or, alternatively, approximately 180° relative to each other), with the y-axis arrow in orientation indicator 2606a and the y-axis arrow in orientation indicator 2606b aligned with each other and pointing in the same direction (or alternatively in substantially opposite directions). Although particular magnetometers are described and illustrated as being arranged in particular ways and having particular rotations or orientations with respect to other magnetometers (e.g. having one or more axes that are 180° from the same or different axes of other magnetometers), this disclosure contemplates any suitable magnetometers having any suitable arrangements and any suitable rotations or orientations with respect to any other suitable magnetometers. Magnetometers 2602a and 2602b are also arranged relative to each other such that a center 2610a of semiconductor package 2608a containing the magnetic-field-sensing element(s) of magnetometer 2602a is a predetermined distance L from a center 2610b of semiconductor package 2608b containing the magnetic-field-sensing element(s) of magnetometer 2602b. Similarly, magnetometers 2602c and 2602d are arranged in a pair and oriented relative to each other such that the y axis of the body-fixed coordinate frame of magnetometer 2602c is substantially aligned with the y axis of the body-fixed coordinate frame of magnetometer 2602d (at approximately 0° relative to each other or, alternatively, approximately 180° relative to each other), with the y-axis arrow in orientation indicator 2606c and the y-axis arrow in orientation indicator 2606d aligned with each other and pointing in the same direction (or alternatively in substantially opposite directions). Magnetometers 2602c and 2602d are also arranged relative to each other such that a center 2610c of semiconductor package 2608c containing the magnetic-field-sensing element(s) of magnetometer 2602c is a predetermined distance L from a center 2610d of semiconductor package 2608d containing the magnetic-field-sensing element(s) of magnetometer 2602d. Similarly, magnetometers 2602m and 2602n are arranged in a pair and oriented relative to each other such that the y axis of the body-fixed coordinate frame of magnetometer 2602m is substantially aligned with the y axis of the body-fixed coordinate frame of magnetometer 2602n (at approximately 0° relative to each other or, alternatively, approximately 180° relative to each other), with the y-axis arrow in orientation indicator 2606m and the y-axis arrow in orientation indicator 2606n aligned with each other and pointing in the same direction (or alternatively in substantially opposite directions). Magnetometers 2602m and 2602n are also arranged relative to each other such that a center 2610m of semiconductor package 2608m containing the magnetic-field-sensing element(s) of magnetometer 2602m is a predetermined distance L from a center 2610n of semiconductor package 2608n containing the magnetic-field-sensing element(s) of magnetometer 2602n. Although a particular number of particular subsets of particular magnetometers with particular orientations or arrangements relative to each other to measure a distance traversed by or a speed of a device (such as, for example, device 2000) are described and illustrated herein, this disclosure contemplates any suitable number of any suitable subsets of any suitable magnetometers with any suitable orientations or arrangement relative to each other to measure a distance traversed by or a speed of a device (such as, for example, device 2000).

In particular embodiments, magnetometers 2602 sense a magnetic field and detect pulses corresponding to peaks of the corresponding magnetic values and the number of pulses corresponds to the device (such as, for example, device 2000) traversing a fixed distance, which may be referred to as a step (e.g. L). In particular embodiments, sensor set 2006 is associated with a microcontroller or other processor to count the number of pulses and convert them into a measure of a traversed distance (number of pulses×L) or an average speed of movement of the device (such as, for example, device 2000). Particular embodiments use the measurements from a pair of substantially equivalent magnetometers 2602 (to calculate an average speed or traversed distance) fixed in the same (or opposite, e.g., rotated by 180° in a horizontal plane) orientation in front of each other (as shown in FIG. 26). Magnetometers 2602 in each pair of magnetometers 2602 are located at a fixed, predetermined distance L from each other. In particular embodiments, the value of L is selected based on the technological possibility of manufacturing of magnetometers 2602 and may be from fractions of a micrometer to several meters.

Figure 27:
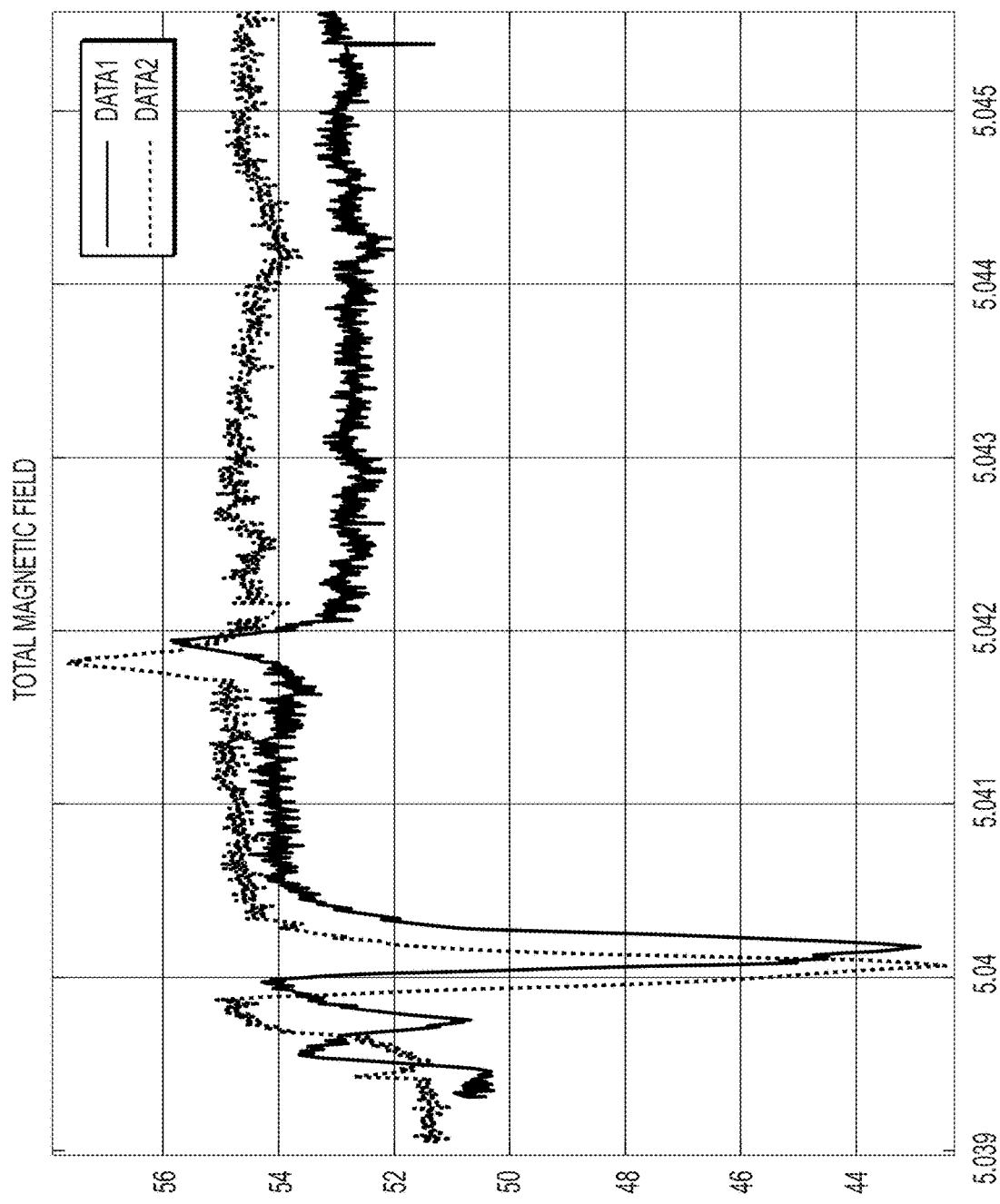
FIG. 27 illustrates example magnetic measurements by an example pair of magnetometers.

As an example and not by way of limitation, magnetometers 2602a and 2602b may be precisely positioned and have a fixed, predetermined distance L between semiconductor packages 2608a and 2608b containing the magnetic-field-sensing element(s) of magnetometers 2602a and 2602b. One or more axes of the body-fixed coordinate frames of magnetometers 2602a and 2602b substantially coincide with or are substantially parallel to each other, e.g., they have identical orientations (as shown in FIG. 26). When the device (such as, for example, device 2000) including magnetometers 2602a and 2602b moves in a straight line in the direction of a point Q (which is arbitrarily selected), magnetometers 2602a and 2602b pass through point Q sequentially. At any given point in space (e.g. Q) for magnetometer 2602a, the values of $B_{x1}$, $B_{y1}$, and $B_{z1}$ of the magnetic field are close to or coincide with the values of $B_{x2}$, $B_{y2}$, $B_{z2}$ for magnetometer 2602b at point Q. (FIG. 27 illustrates example magnetic measurements by an example pair of magnetometers.) When magnetometer 2602a passes point Q(q), the microcontroller processes and records the data $B_{x1q}$, $B_{y1q}$, and $B_{z1q}$ and values calculated based on them (e.g. B, D, and I). With continued movement of the device (such as, for example, device 2000), the microcontroller compares the current values of magnetometer 2602b ($B_{x2cur}$, $B_{y2cur}$, $B_{z2cur}$, B, D, and I) with the recorded $B_{x1q}$, $B_{y1q}$, $B_{z1q}$ (and B, D, and I). The values of $B_{x2cur}$, $B_{y2cur}$, and $B_{z2cur}$ and $B_{x1q}$, $B_{y1q}$, $B_{z1q}$, respectively, will substantially coincide when magnetometer 2602b passes through point Q.

When magnetometer 2602a passes point Q(q), the microcontroller processes and records the data $B_{x1p}$, $B_{y1p}$, and $B_{z1p}$ and the corresponding values based on them (e.g. B, D, and I). With continuous movement of the device (such as, for example, device 2000) including magnetometers 2602a and 2602b, the microcontroller compares the current values of magnetometer 2602b ($B_{x2cur}$, $B_{y2cur}$, $B_{z2cur}$ and corresponding calculated B, D, and I) with the recorded $B_{x1p}$, $B_{y1p}$, $B_{z1p}$ (and B, D, and I). If the values of $B_{x2cur}$, $B_{y2cur}$, and $B_{z2cur}$ and $B_{x1p}$, $B_{y1p}$, $B_{z1p}$, respectively, substantially coincide, then magnetometer 2602a has crossed point Q(q). The controller records the transition of magnetometer 2602b to point P and adds the value of L to the path already traversed. The controller may then calculate the average speed using V=L/t, with t being the time between magnetometer 2602a and magnetometer 2602b reaching point Q, which may be obtained from a clock signal in magnetometers 2602a and 2602b or in another component of sensor set 2600 or in a controller associated with sensor set 2600.

Sensor set 2600 includes n magnetometers 2602 in n/2 substantially equivalent pairs of magnetometers 2602 located on a horizontal platform. Magnetometers 2602 in each pair are located a fixed, predetermined distance L from each other. In particular embodiments, for a first magnetometer 2602 and a second magnetometer 2602 making up a pair of magnetometers 2602, the following is true: the axes of first magnetometer 2602 and the axes of second magnetometer 2602 are equally oriented at any given point in space. (Alternatively, in particular embodiments, first and second magnetometers 2602 may be oriented relative to each other such that each of one or more axes of first magnetometer 2602 is opposite in direction from a corresponding axis of second magnetometer 2602.) The measured magnetic field values for first and second magnetometers 2602 will substantially coincide when first and second magnetometers 2602 pass through the same point in space. When first and second magnetometers 2602 pass through a given point $Q_1$ (e.g. sequentially first magnetometer 2602 and then second magnetometer 2602), the device (such as, for example, device 2000) including first and second magnetometers 2602 has traversed the distance L. The events when the magnetic measurements of each magnetometer in the pair coincide may be recorded by the device (such as, for example, device 2000) and processed by the controller. The average speed of the device (such as, for example, device 2000) over that distance L may be determined by V=L/t, with t being the elapsed time of movement of the device (such as, for example, device 2000) over that distance L (which may be obtained from a clock signal in first or second magnetometer 2602 or 2602 or in another component of sensor set 2600 or in a controller associated with sensor set 2600).

Figure 28:
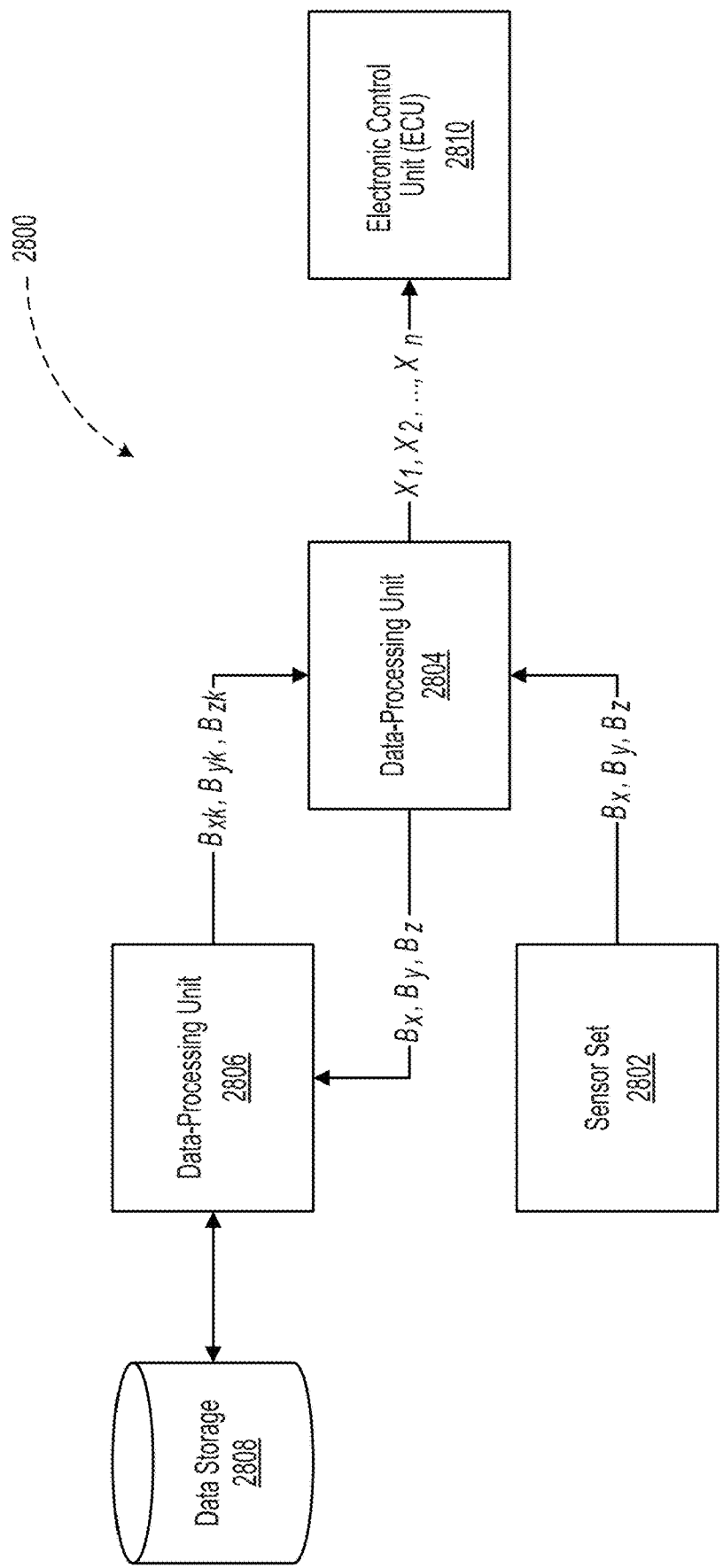
FIG. 28 illustrates an example system for controlling motion with magnetometers.

FIG. 28 illustrates an example system 2800 for controlling motion of a device (such as, for example, device 2000) with magnetometers. System 2800 may be used to generate a magnetic map of an area or region. In addition or as an alternative, system 2800 may be used for navigation or localization of a device (such as, for example, device 2000) within an area based on a magnetic map of that area that has already been generated. In addition or as an alternative, system 2800 may be used to measure a distance traversed by or a speed (e.g. an average speed) of a device (such as, for example, device 2000). In the example of FIG. 28, system 2800 includes a sensor set 2802, data processing units 2804 and 2806, data storage 2808, and electronic control unit (ECU) 2810. All or some of the components of system 2800 may be on board the device (such as, for example, device 2000) being controlled. As an example, sensor set 2802, data processing units 2804 and 2806, data storage 2808, and ECU 2810 may all be entirely on board the device (such as, for example, device 2000). As another example, sensor set 2802, data processing units 2804 and 2806, and ECU 2810 may all be entirely on board the device (such as, for example, device 2000), while one or more portions of data storage 2808 are remote from and not on board the device (such as, for example, device 2000) and one or more other portions of data storage 2808 are on board the device (such as, for example, device 2000). Although particular components of system 2800 are described and illustrated herein as having particular locations relative to the device (such as, for example, device 2000) being controlled, this disclosure contemplates any suitable components of system 2800 having any suitable locations relative to the device (such as, for example, device 2000) being controlled.

Sensor set 2802 may include a set of magnetometers organized into two or more subsets of magnetometers. For example, sensor set 2802 may include a set of magnetometers for measuring a distance traversed by or a speed (e.g. an average speed) of a device (such as, for example, device 2000), as described above with reference to FIG. 26. As another example, in addition or as an alternative, sensor set 2802 may include eight magnetometers arranged and oriented on a plane with a step of 45°, organized into four pairs of opposing magnetometers, as described above with reference to FIG. 25. As the device (such as, for example, device 2000) including system 2800 moves along a route (which may but need not be predetermined), sensor set 2802 may measure the external magnetic field at each of one or more points along the route. At each such point, each magnetometer of sensor set 2802 may determine the x, y, and z vector components of the magnetic field ($B_x$, $B_y$, and $B_z$) at that point, as measured by that magnetometer, and those values from each magnetometer may be communicated to data-processing unit 2804. Although system 2800 is described and illustrated herein as including a particular sensor set operating in a particular manner, this disclosure contemplates system 2800 including any suitable sensor set operating in any suitable manner.

Data-processing unit 2804 is coupled to sensor set 2802. Data-processing unit 2804 may process data from sensor set 2802. Data-processing unit 2804 may also process data from data-processing unit 2806 and communicate data to data-processing unit 2806 for storage in data storage 2808. Data-processing unit 2804 may include an ATMEGA2560 microcontroller made by MICROCHIP TECHNOLOGY mounted on an ARDUINO MEGA 2560 microcontroller board made by ARDUINO. The magnetometers in sensor set 2802 may be coupled to data-processing unit 2804 via a TCA9548A switch made by TEXAS INSTRUMENTS, which may be mounted on a board with those magnetometers. Data-processing unit 2804 may receive $B_x$, $B_y$, and $B_z$ values from each of one or more of the magnetometers in sensor-set 2802 at each of one or more points along a route (which may but need not be predetermined) as the device (such as, for example, device 2000) including system 2800 moves along the route. When system 2800 is being used to generate a magnetic map, data-processing unit 2804 may communicate those values from each magnetometer for each point along the route to data-processing unit 2806 for storage in data storage 2808, correlated with that point along the route and with the magnetometer that those values were received from. When system 2800 is being used for navigation or localization based on a magnetic map that has already been generated, data-processing unit 2804 may compare those values with corresponding $B_{xk}$, $B_{yk}$, and $B_{zk}$ values from data storage 2808 and, based on the results of those comparisons, generate control parameters $X_1$, $X_2$, ...

$X_n$, which are communicated to ECU 2810. For example, data $B_{xkj}$, $B_{ykj}$, and $B_{zkj}$ may be received from magnetometer k in sensor set 2802) for space point j (route on the map) via the I²C bus and enter data-processing unit 2804, where the data is translated into the desired arithmetic-logic-unit (ALU) format and sent by the (serial peripheral interface) SPI bus to data-processing unit 2806. Similarly, the data of all k magnetometers are processed and sent. Data-processing unit 2806 processes the information and writes the data to data storage 2808 in the desired format. At the end of each line, the ALU in data-processing unit 2804 adds a notification of a successful recording of magnetic-card data at a specific point by adding the value of one. As a result, a string of 24 values (for k=8) $B_{xkj}$, $B_{ykj}$ and $B_{zkj}$ (where k is the number of magnetometers) of the magnetic situation at points (j=1 in data storage 2808) in space is formed on data-processing unit 2806: $B_{x0j}$, $B_{y0j}$, $B_{z0j}$, $B_{x1j}$, $B_{y1j}$, $B_{z1j}$, $B_{x2j}$, $B_{y2j}$, $B_{z2j}$, $B_{x3j}$, $B_{y3j}$, $B_{z3j}$, $B_{x4j}$, $B_{y4j}$, $B_{z4j}$, $B_{x5j}$, $B_{y5j}$, $B_{z5j}$, $B_{x6j}$, $B_{y6j}$, $B_{z6j}$, $B_{x7j}$, $B_{y7j}$, $B_{z7j}$, 1. If data-processing unit 2804 instructs the device (such as, for example, device 2000) to take a step forward and sensor set 2802 transmits new magnetic-field values at point 2, then the next line entry (j=2, the second in data storage 2808) is $B_{x0j}$, $B_{y0j}$, $B_{z0j}$, $B_{x1j}$, $B_{y1j}$, $B_{z1j}$, $B_{x2j}$, $B_{y2j}$, $B_{z2j}$, $B_{x3j}$, $B_{y3j}$, $B_{z3j}$, $B_{x4j}$, $B_{y4j}$, $B_{z4j}$, $B_{x5j}$, $B_{y5j}$, $B_{z5j}$, $B_{x6j}$, $B_{y6j}$, $B_{z6j}$, $B_{x7j}$, $B_{y7j}$, $B_{z7j}$, 1 and forms a second point on the magnetic map. Step-by-step recording of the values $B_{xkj}$, $B_{ykj}$, $B_{zkj}$ creates a magnetic map of the route consisting of j points (positions). As another example, the magnetic-field state data recorded at data storage 2808 at this point is read by data-processing unit 2806 and transmitted to data-processing unit 2804. At the same time, data from sensor set 2802 transmitted to data-processing unit 2804 in the form of current values of $B_{x0curr}$, $B_{y0curr}$, $B_{z0curr}$, $B_{x1curr}$, $B_{y1curr}$, $B_{z1curr}$, $B_{x2curr}$, $B_{y2curr}$, $B_{z2curr}$, $B_{z2curr}$, $B_{x3curr}$, $B_{y3curr}$, $B_{z3curr}$, $B_{x4curr}$, $B_{y4curr}$, $B_{z4curr}$, $B_{x5curr}$, $B_{y5curr}$, $B_{z5curr}$, $B_{x6curr}$, $B_{y6curr}$, $B_{z6curr}$, $B_{x7curr}$, $B_{y7curr}$, $B_{z7curr}$, $B_{z7curr}$. In data-processing unit 2804, the data $B_{xkj}$, $B_{ykj}$, and $B_{zkj}$ are compared with the incoming real time data from magnetometers in sensor set 2802, $B_{xkcurr}$, $B_{ykcurr}$, and $B_{zkcurr}$. The ALU in data-processing unit 2804 compares the real-time data from sensor set 2802 and then issues control commands to the actuators (motor drivers) of the device (such as, for example, device 2000) through ECU 2810.

Data-processing unit 2806 is also coupled to data-processing unit 2804. Data-processing unit 2806 may read or write magnetic-map data from or to data storage 2808. Data-processing unit may also include an ATMEGA2560 microcontroller made by MICROCHIP TECHNOLOGY mounted on an ARDUINO MEGA 2560 microcontroller board made by ARDUINO. Data processing units 2804 and 2806 may be physically or logically separate from each other. For example, one or more microcontrollers or other processors may function as data-processing unit 2804 and one or more other microcontrollers or other processors may function as data-processing unit 2806. Alternatively, data-processing units 2804 and 2806 may be physically or logically combined with each other in whole or in part. For example, a single microcontroller or other processor (or multiple microcontrollers or other processors operating together) may function as both data-processing units 2804 and 2806. When system 2800 is being used to generate a magnetic map, data-processing unit 2806 may receive $B_x$, $B_y$, and $B_z$ values correlated with points along a route and with magnetometers in sensor set 2802 and store that data in data storage 2808. When system 2800 is being used for navigation or localization based on a magnetic map that has already been generated, data-processing unit 2806 may read $B_{xk}$, $B_{yk}$, and $B_{zk}$ values from data storage 2808 corresponding to $B_x$, $B_y$, and $B_z$ values from sensor set 2802 and communicate those $B_{xk}$, $B_{yk}$, and $B_{zk}$ values to data-processing unit 2804. Although system 2800 is described and illustrated herein as including particular data-processing units operating in a particular manner, this disclosure contemplates system 2800 including any suitable data-processing units operating in any suitable manner.

Data-storage 2808 is coupled to data-processing unit 2806. Data storage 2808 may be used to store magnetic-map data and may, for example, include a micro SD module with a micro SD card. Magnetic-map data may be read from or written to the micro SD card, and the micro SD card may be removed from one device (such as, for example, device 2000) and installed in another device (such as, for example, device 2000). When system 2800 is being used to generate a magnetic map, data-processing unit 2806 may store in data storage 2808 $B_x$, $B_y$, and $B_z$ values correlated with points along a route and with magnetometers in sensor set 2802. When system 2800 is being used for navigation or localization based on a magnetic map that has already been generated, data-processing unit 2806 may read $B_{xk}$, $B_{yk}$, and $B_{zk}$ values from data storage 2808 corresponding to $B_x$, $B_y$, and $B_z$ values from sensor set 2802. Although system 2800 is described and illustrated herein as including particular data storage, this disclosure contemplates system 2800 including any suitable data storage.

ECU 2810 is coupled to data-processing unit 2804. ECU 2810 may be an electronic engine-control unit and may include one or more L9110 motor-control drivers. ECU 2810 may receive control parameters $X_1$, $X_2$, . . . $X_n$, from data-processing unit 2804 and, based on those control parameters, generate instructions for one or more motors or other devices that cause the device (such as, for example, device 2000) including system 2800 to move. For example, after reading the i values of the SD line, $B_{x0i}$, $B_{y0i}$, $B_{z0i}$, $B_{x1i}$, $B_{y1i}$, $B_{z1i}$, $B_{x2i}$, $B_{y2i}$, $B_{z2i}$, $B_{x3i}$, $B_{y3i}$, $B_{z3i}$, $B_{x4i}$, $B_{y4i}$, $B_{z4i}$, $B_{x5i}$, $B_{y5i}$, $B_{z5i}$, $B_{x6i}$, $B_{y6i}$, $B_{z6i}$, $B_{x7i}$, $B_{y7i}$, $B_{z7i}$, 1, from data storage 2808 using data-processing unit 2806, data-processing unit 2804 receives read data from $B_{xki}$, $B_{yki}$, and $B_{zki}$. At the same time, the current values of $B_{ycurr}$, $B_{zkcurr}$, and $B_{xkcurr}$ (in real time) are received by data-processing unit 2804. Each $B_{xki}$, $B_{ykzi}$, and $B_{zki}$ are compared with data from the magnetometers of sensor set 2802 from $B_{xcurr}$, $B_{ykcurr}$, and $B_{zkcurr}$. The ALU of data-processing unit 2804 performs calculations according to an algorithm and then issues control commands to the actuators (motor drivers) of the device (such as, for example, device 2000) through ECU 2810. Although system 2800 is described and illustrated herein as including a particular ECU operating in a particular manner, this disclosure contemplates system 2800 including any suitable ECU operating in any suitable manner.

Although a particular system for controlling particular motion of a device (such as, for example, device 2000) with magnetometers, including particular components or sub-systems in a particular arrangement, is described and illustrated herein, this disclosure contemplates any suitable system for controlling any suitable motion of a device (such as, for example, device 2000) with magnetometers, including any suitable components or sub-systems in any suitable arrangement. For example, two or more components or sub-systems of system 2800 may be physically or logically combined with each other in whole or in part instead of being physically or logically separate from each other.

In particular embodiments, execution of the motion of the device (such as, for example, device 2000) along a given route within a magnetic map of an area is carried out on the basis of data received from sensor set 2802 and processed by data-processing unit 2804 according to equations (1), (2), (3), and (4) above. All given values may be calculated for each specific point i of the magnetic map of the region. Each point may correspond to some position on a map of the Earth's surface. B is the modulus of the value of the magnetic induction at a given point of the magnetic map of the region; $B_h$ is the modulus of the value of the magnetic-field strength for the x-y (horizontal) plane; $B_x$, $B_y$, and $B_z$ are the values of the magnetic induction in the body-fixed frame; D is the value of declination angle; and I is the value of inclination angle.

In particular embodiments, during the process of magnetic-map creation (during the motion of the device (such as, for example, device 2000) along a specified route with data recording), data-processing unit 2804 produces control parameters $X_1, X_2, \ldots X_n$ for ECU 2810. At the same time, data from sensor set 2802 (e.g. $B_x$, $B_y$, and $B_z$ from each it point) may be communicated to and processed by data-processing unit 2804 and then recorded for each point i in data storage 2808 by data-processing unit 2806 (e.g. values of $B_{xk}$, $B_{yk}$, and $B_{zk}$, index k map). When the device (such as, for example, device 2000) navigates the specified route (e.g. with a piece-wise linear trajectory), the data may be read sequentially (from i=1 to i=n). For the data for point i=1, $B_{xk1}$, $B_{yk1}$, and $B_{zk1}$ are read from data storage 2808 to data-processing unit 2804 and processed by means of comparison with the actual data at point i=1 (e.g. $B_{x1}$, $B_{y1}$, and $B_{z1}$) which are continuously determined by sensor set 2802. When the data coincides, the device (such as, for example, device 2000) goes to the next point of the magnetic map of the region with the parameters $B_{xk2}$, $B_{yk2}$, and $B_{zk2}$. This sequence is repeated until the end of the route at point $B_{xkn}$, $B_{ykn}$, and $B_{zkn}$.

In particular embodiments, after the data of a current point of a route ($B_{xki}$, $B_{yki}$, and $B_{zki}$) is read from data storage 2808, the comparison of that data with the actual current data ($B_{xi}$, $B_{yi}$, and $B_{zi}$) is performed by data-processing unit 2804. In the case of data inequality between the reading from data storage 2808 ($B_{xki}$, $B_{yki}$, and $B_{zki}$) and the actual current values ($B_{xi}$, $B_{yi}$, and $B_{zi}$), an algorithm in data-processing unit 2804 may produce control parameters, $X_1$, $X_2, \ldots X_n$, that provide information to ECU 2810 regarding a next maneuver by the device (such as, for example, device 2000) to address the inequality. After some iterations, data-processing unit 2804 may reduce and even eliminate the data inequality and achieve substantial coincidence between recorded $B_{xki}$, $B_{yki}$, and $B_{zki}$ and current values $B_{xi}$, $B_{yi}$, and $B_{zi}$ as the device (such as, for example, device 2000) maneuvers. After this, the device (such as, for example, device 2000) may start a motion-maneuver to the next route point $B_{xki+1}$, $B_{yki+1}$, and $B_{zki+1}$ read from data storage 2808.

Particular embodiments make it possible to repeat a previously recorded route in forward or reverse directions. Particular embodiments may facilitate simultaneous localization and mapping (SLAM). For example, when a device (such as, for example, device 2000) is repeating a previously recorded route in forward or reverse direction (which the device (such as, for example, device 2000) may have itself recorded or may have received from another device (such as, for example, device 2000) or other source), that device (such as, for example, device 2000) may simultaneously measure and record the magnetic field around the device (such as, for example, device 2000) and those measurements may be used to update or create a magnetic map of the route. In particular embodiments, when reinstalling an SD card (or other storage media) with a recorded route to another device (such as, for example, device 2000), that device (such as, for example, device 2000) can accurately repeat the specified route in forward or reverse directions. Particular embodiments are effective for use by ground and aerial vehicles, on water surface, and submarine vessels. Particular embodiments may obviate special onboard radio control or satellite navigation systems.

Figure 29:
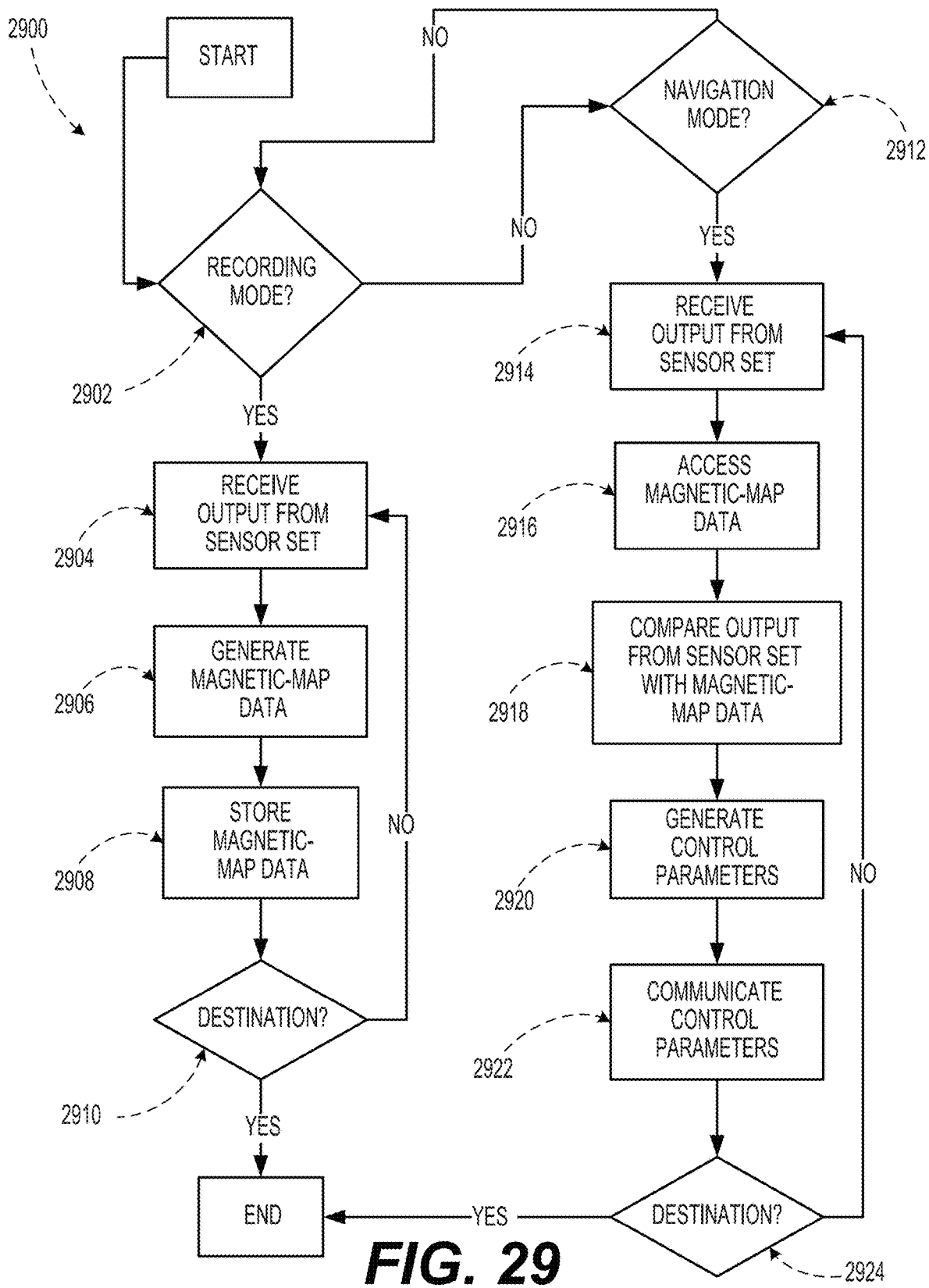
FIG. 29 illustrates an example method for controlling motion with magnetometers.

FIG. 29 illustrates an example method 2900 for controlling motion of a device (such as, for example, device 2000) with magnetometers. Method 2900 begins at step 2902, where data-processing unit 2804 determines whether system 2800 is in recording mode. If system 2800 is in recording mode (e.g. the device (such as, for example, device 2000) including system 2800 is traversing a path or region to magnetically map the path or region), then method 2900 proceeds to step 2904, where data-processing unit 2804 receives output from sensor set 2802. As described above, the output may include the x, y, and z vector components of an external magnetic field ($B_x$, $B_y$, and $B_z$) as measured by each magnetometer in sensor set 2802 at a point i along the path or within the region being magnetically mapped. At step 2906, data-processing unit 2804 generates magnetic-map data based on the output from sensor set 2802. The magnetic-map data may include $B_x$, $B_y$, and $B_z$ values from each magnetometer in sensor set 2802 indexed according to the point i where those values were determined, the map k they correspond to, and the magnetometer m they were generated by. At step 2908, data-processing unit 2804 communicates the magnetic-map data to data-processing unit 2806, which stores the magnetic-map data in data storage 2808. At step 2910, if the device (such as, for example, device 2000) including system 2800 has reached its destination (e.g. the device (such as, for example, device 2000) has completed traversing the path or region to be magnetically mapped), then method 2900 ends. At step 2910, if the device (such as, for example, device 2000) has not reached its destination, then method 2900 returns to step 2904, where data-processing unit 2804 receives output from sensor set 2802 at a next point i+1 along the path or within the region being magnetically mapped as the device (such as, for example, device 2000) traverses the path or region.

At step 2902, if system 2800 is not in recording mode, then method 2900 proceeds to step 2912, where data-processing unit 2804 determines whether system 2800 is in navigation mode. If system 2800 is not in navigation mode, then method 2900 returns to step 2902. If system 2800 is in navigation mode (e.g. the device (such as, for example, device 2000) including system 2800 is navigating a route), then method 2900 proceeds to step 2914, where data-processing unit 2804 receives output from sensor set 2802. As described above, the output includes the x, y, and z vector components of an external magnetic field ($B_x$, $B_y$, and $B_z$) as measured by each magnetometer in sensor set 2802 at a point j along the route being navigated. At step 2916, data-processing unit 2804 accesses magnetic-map data for the area corresponding to the output from sensor set 2802. The magnetic-map data corresponding to the output from sensor set 2802 includes $B_x$, $B_y$, and $B_z$ values corresponding to each magnetometer m in sensor set 2802 for point j as indicated by the map l of the region that the device (such as, for example, device 2000) is navigating in. At step 2918, data-processing unit 2804 compares the output of sensor set 2802 with the corresponding magnetic-map data. To perform this comparison, data-processing unit 2804 may compare all data for point j, $B_{xkj}$, $B_{ykj}$, and $B_{zkj}$, of the map against incoming values from sensor set 2802, $B_{xkcurr}$, $B_{ykcurr}$, and $B_{zkcurr}$ in real time. The ALU of data-processing unit 2804 compares the data and issues control commands to the actuators (motor drivers) of the device (such as, for example, device 2000). At step 2920, data-processing unit 2804 generates one or more control parameters based on the comparison at step 2918. As described above, the control parameters may include instructions or other information regarding a next maneuver to be made by the device (such as, for example, device 2000) including system 2800. If the comparison at step 2918 indicates there is a material inequality between measurement of the external magnetic field at point j and the corresponding magnetic-map data, then the maneuver may attempt to put the device (such as, for example, device 2000) on the route being navigated to correct or otherwise address the inequality. If the comparison at step 2918 indicates there is not a material inequality between measurement of the external magnetic field at point j and the corresponding magnetic-map data, then the maneuver may attempt to take the device (such as, for example, device 2000) including system 2800 to a next point j+1 along the route being navigated. At step 2922, data-processing unit 2804 communicates the control parameters to ECU 2810, which may cause the device (such as, for example, device 2000) to execute one or more maneuvers based on the control parameters. For example, in data-processing unit 2804, the command is generated to perform a step from point j=9. From data storage 2808, a map data string for point j=9 is passed (via data-processing unit 2806) to data-processing unit 2804. The data for j=9 is read from the ninth row of the SD card, $B_{x0j}$, $B_{y0j}$, $B_{z0j}$, $B_{x1j}$, $B_{y1j}$, $B_{z1j}$, $B_{x2j}$, $B_{y2j}$, $B_{z2j}$, $B_{x3j}$, $B_{y3j}$, $B_{z3j}$, $B_{x4j}$, $B_{y4j}$, $B_{z4j}$, $B_{x5j}$, $B_{y5j}$, $B_{z5j}$, $B_{x6j}$, $B_{y6j}$, $B_{z6j}$, $B_{x7j}$, $B_{y7j}$, $B_{z7j}$ (hereinafter $B_{xkj}$ $B_{ykj}$, $B_{zkj}$). In data-processing unit 2804, the data of $B_{xkj}$, $B_{ykj}$, and $B_{zkj}$ for point j=9 is compared with real-time data from sensor set 2802 in the form of current values of $B_{x0curr}$, $B_{y0curr}$, $B_{z0curr}$, $B_{x1curr}$, $B_{y1curr}$, $B_{z1curr}$, $B_{x2curr}$, $B_{y2curr}$, $B_{z2curr}$, $B_{x3curr}$, $B_{y3curr}$, $B_{z3curr}$, $B_{x4curr}$, $B_{y4curr}$, $B_{z4curr}$, $B_{x5curr}$, $B_{y5curr}$, $B_{z5curr}$, $B_{x6curr}$, $B_{y6curr}$, $B_{z6curr}$, $B_{z6curr}$, $B_{x7curr}$, $B_{y7curr}$, and $B_{z7curr}$. The ALU of data-processing unit 2804 makes a comparison and issues a control command, for example, rotating one degree clockwise around the sensor axis (of eight magnetometers). Then data-processing unit 2804 receives from sensor set 2802 new data $B_{x1curr}'$, $By_{kcurr}'$, and $B_{zkcurr}'$. The ALU of data-processing unit 2804 compares them with the values of $B_{xk}j$, $B_{yk}j$, and $B_{zk}j$ from the map. Then data-processing unit 2804 issues another control command, e.g., a rotation of one degree clockwise around the axis. The process continues according to the given algorithm until the material inequality between the measurement of the external magnetic field at point j and the corresponding magnetic-card data is eliminated. After that, the device (such as, for example, device 2000) takes a step from point j in a given direction. Data-processing unit 2804 generates the execution of the next step from the point j=j+1 (i.e. point j=10). At step 2924, if the device (such as, for example, device 2000) including system 2800 has reached its destination (e.g. the device (such as, for example, device 2000) has completed traversing the route to be navigated), then method 2900 ends. At step 2924, if the device (such as, for example, device 2000) including system 2800 has not reached its destination (e.g. the device (such as, for example, device 2000) has not completed traversing the route to be navigated), then method 2900 may return to step 2914.

Particular embodiments may repeat one or more steps of method 2900, where appropriate. Although this disclosure describes and illustrates particular steps of method 2900 as occurring in a particular order, this disclosure contemplates any suitable steps of method 2900 occurring in any suitable order. Moreover, although this disclosure describes and illustrates an example method for controlling motion of a device (such as, for example, device 2000) with magnetometers including the particular steps of method 2900, this disclosure contemplates any suitable method for controlling motion of a device (such as, for example, device 2000) with magnetometers including any suitable steps, which may include all, some, or none of the steps of method 2900, where appropriate. Furthermore, although this disclosure describes and illustrates particular components, devices, or systems carrying out particular steps of method 2900, this disclosure contemplates any suitable combination of any suitable components, devices, or systems carrying out any suitable steps of method 2900.

Figure 30:
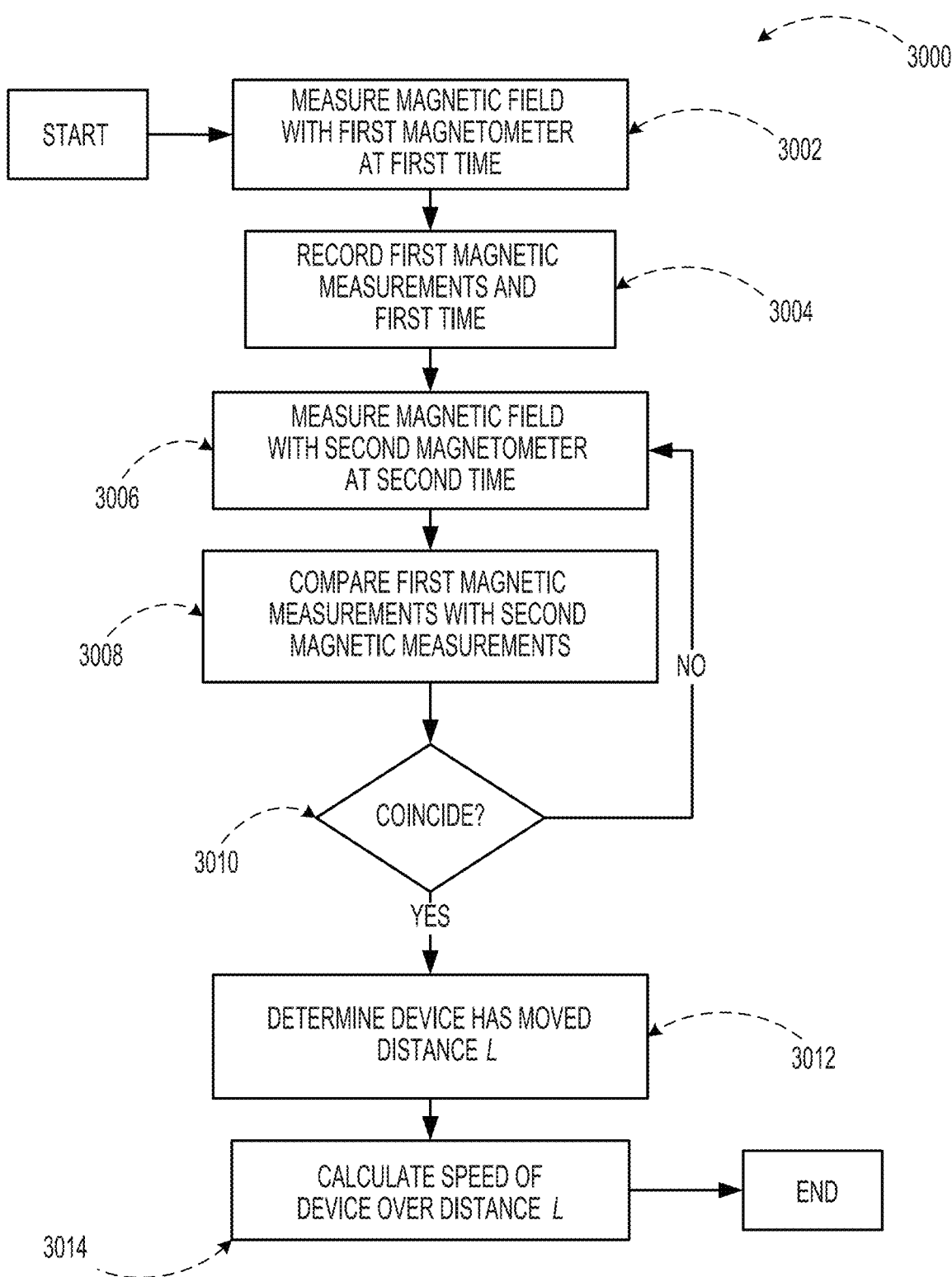
FIG. 30 illustrates an example method for measuring a distance traversed or a speed.

FIG. 30 illustrates an example method 3000 for measuring a distance traversed by or a speed of a device (such as, for example, device 2000). Method 3000 begins at step 3002, where system 2800 measures a magnetic field with a first magnetometer of a pair of magnetometers in sensor set 2802. The first and second magnetometers are located a fixed, predetermined distance L from each other. The first magnetometer has a first body-fixed coordinate frame, and the second magnetometer has a second body-fixed coordinate frame. Each of one or more axes of the first body-fixed coordinate frame coincide with or are parallel to a corresponding axis of the second body-fixed coordinate frame at any given point in space. Method 3000 then proceeds to step 3004, where system 2800 records the magnetic measurements made at step 3004 along with an indication of a time when those magnetic measurements were made. Method 3000 then proceeds to step 3006, where system 2800 measures the magnetic field with the second magnetometer as the device (such as, for example, device 2000) including system 2800 moves. Method 3000 then proceeds to step 3008, where system 2800 compares the magnetic measurements made at step 3004 with the magnetic measurements made at step 3006. At step 3010, if the magnetic measurements made at step 3004 do not substantially coincide with the magnetic measurements made at step 3006, then method 3000 returns to step 3006. At step 3010, if the magnetic measurements made at step 3004 substantially coincide with the magnetic measurements made at step 3006, then method 3000 proceeds to step 3012, where, based on the substantial coincidence, system 2800 determines that the device (such as, for example, device 2000) including system 2800 has traversed distance L. Method 3000 then proceeds to step 3014, where system 2800 calculates the average speed of that traversal using V=L¦t, with t being the time between the magnetic measurements at step 3006 and the magnetic measurements at step 3004, at which point method 3000 ends.

Particular embodiments may repeat one or more steps of method 3000, where appropriate. Although this disclosure describes and illustrates particular steps of method 3000 as occurring in a particular order, this disclosure contemplates any suitable steps of method 3000 occurring in any suitable order. Moreover, although this disclosure describes and illustrates an example method for measuring a distance traversed by or a speed of a device (such as, for example, device 2000) including the particular steps of method 3000, this disclosure contemplates any suitable method for measuring a distance traversed by or a speed of a device (such as, for example, device 2000) including any suitable steps, which may include all, some, or none of the steps of method 3000, where appropriate. Furthermore, although this disclosure describes and illustrates particular components, devices, or systems carrying out particular steps of method 3000, this disclosure contemplates any suitable combination of any suitable components, devices, or systems carrying out any suitable steps of method 3000.

Figure 31:
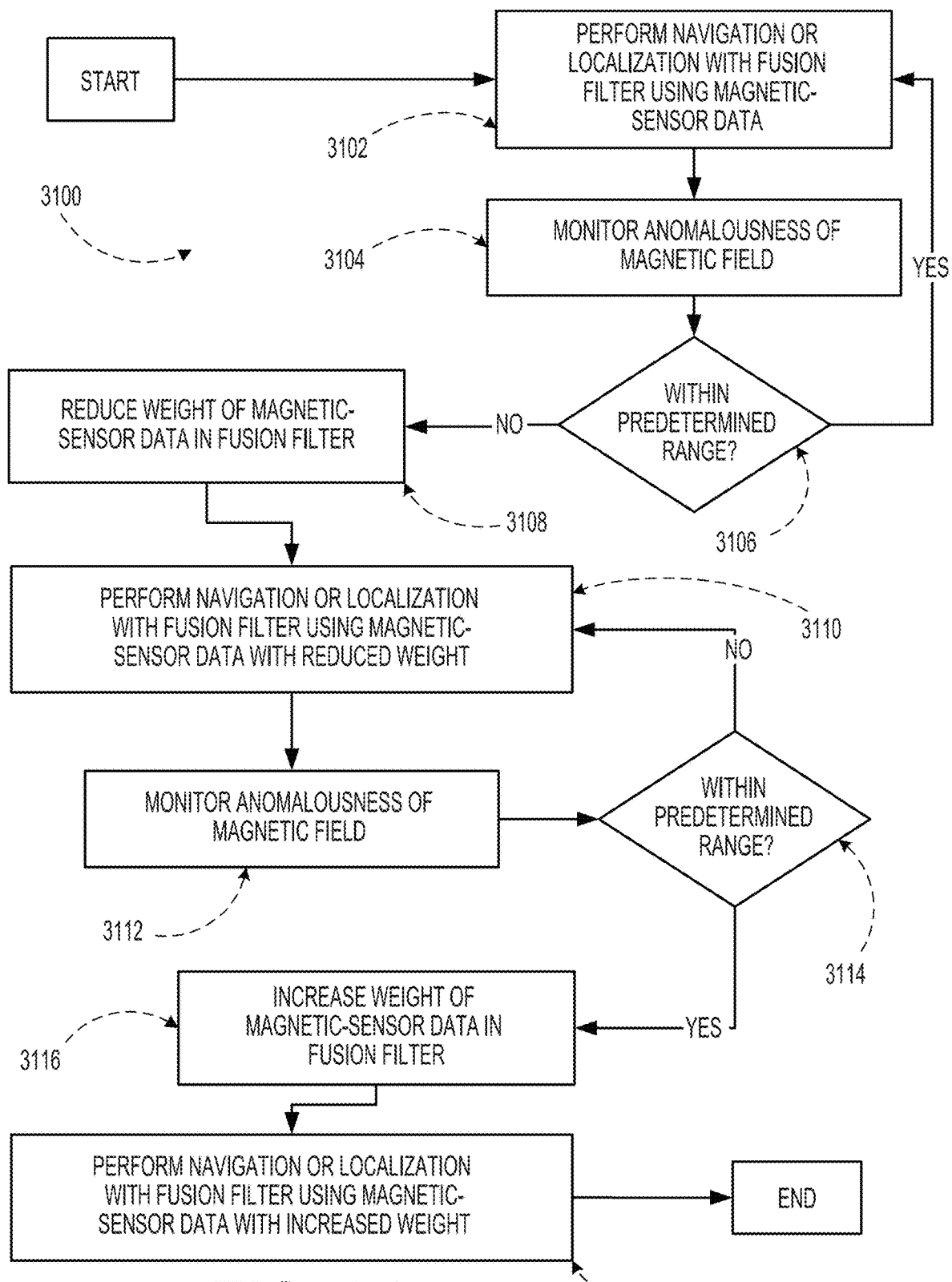
FIG. 31 illustrates an example method for determining confidence in magnetic-sensor data.

FIG. 31 illustrates an example method 3100 for determining confidence in magnetic-sensor data. Method 3100 begins at step 3102, where navigation or localization is performed for device 2000 by a fusion filter using magnetic-sensor data from magnetic-sensor system 2002 and other data, e.g., from one or more of INS 2004, GNSS receiver 2006, or communication interface 2008. At step 3104, the fusion filter or another component or subcomponent of device 2000 monitors the anomalousness of the GMF or other magnetic field being measured by magnetic-sensor system 2002 to generate the magnetic-sensor data. As described above, this may involve determining the amount of deviation in the magnetic field from the regular component of the magnetic field (e.g. above a predetermined threshold relative one or more values of the regular component of the magnetic field). In addition or as an alternative, this may involve calculating a variance of the total magnetic field (or one or more other properties of the magnetic field in addition or as alternative to the total magnetic field) over a sliding window of a predetermined length.

At step 3106, if the anomalousness of the magnetic field as monitored at step 3104 is within a predetermined range (which may indicate that the anomalousness of the magnetic is conducive to accurate magnetic-sensor data), then method 3100 returns to step 3102. At step 3106, if the anomalousness of the magnetic field as monitored at step 3104 is not within the predetermined range (which may indicate that the anomalousness of the magnetic is not conducive to accurate magnetic-sensor data), then method 3100 proceeds to step 3108. At step 3108, the fusion filter reduces the weight of the magnetic-sensor data from magnetic-sensor system 2002 in navigation and localization being performed for device 2000 by the fusion filter. The weight of the magnetic-sensor data may be reduced by a suitable amount or to a suitable level (including potentially to zero) depending on how anomalous the magnetic field is determined to be or the range its anomalousness is determined to be in. At step 3110, navigation or localization is performed for device 2000 by the fusion filter using the magnetic-sensor data (with its weight as adjusted at step 3108) and other data, e.g., from one or more of INS 2004, GNSS receiver 2006, or communication interface 2008.

At step 3112, the fusion filter or another component or subcomponent of device 2000 returns to monitoring the anomalousness of the GMF or other magnetic field being measured by magnetic-sensor system 2002 to generate the magnetic-sensor data. At step 3114, if the anomalousness of the magnetic field as monitored at step 3112 is still not within the predetermined range, then method 3100 returns to step 3110. At step 3114, if the anomalousness of the magnetic field as monitored at step 3112 is within the predetermined range, then method 3100 proceeds to step 3116. At step 3116, the fusion filter increases the weight of the magnetic-sensor data from magnetic-sensor system 2002 in navigation and localization being performed for device 2000 by the fusion filter. The weight of the magnetic-sensor data may be increased by a suitable amount or to a suitable level depending on how anomalous the magnetic field is determined to be or the range its anomalousness is determined to be in. The weight of the magnetic-sensor data may be returned to the level it was at before it was reduced at step 3108. At step 3118, navigation or localization is performed for device 2000 by the fusion filter using the magnetic-sensor data (with its weight as adjusted at step 3116) and other data, e.g., from one or more of INS 2004, GNSS receiver 2006, or communication interface 2008, at which point method 3100 ends.

Particular embodiments may repeat one or more steps of method 3100, where appropriate. Although this disclosure describes and illustrates particular steps of method 3100 as occurring in a particular order, this disclosure contemplates any suitable steps of method 3100 occurring in any suitable order. Moreover, although this disclosure describes and illustrates an example method for determining confidence in magnetic-sensor data including the particular steps of method 3100, this disclosure contemplates any suitable method for determining confidence in magnetic-sensor data including any suitable steps, which may include all, some, or none of the steps of method 3100, where appropriate. Furthermore, although this disclosure describes and illustrates particular components, devices, or systems carrying out particular steps of method 3100, this disclosure contemplates any suitable combination of any suitable components, devices, or systems carrying out any suitable steps of method 3100.

Figure 32:
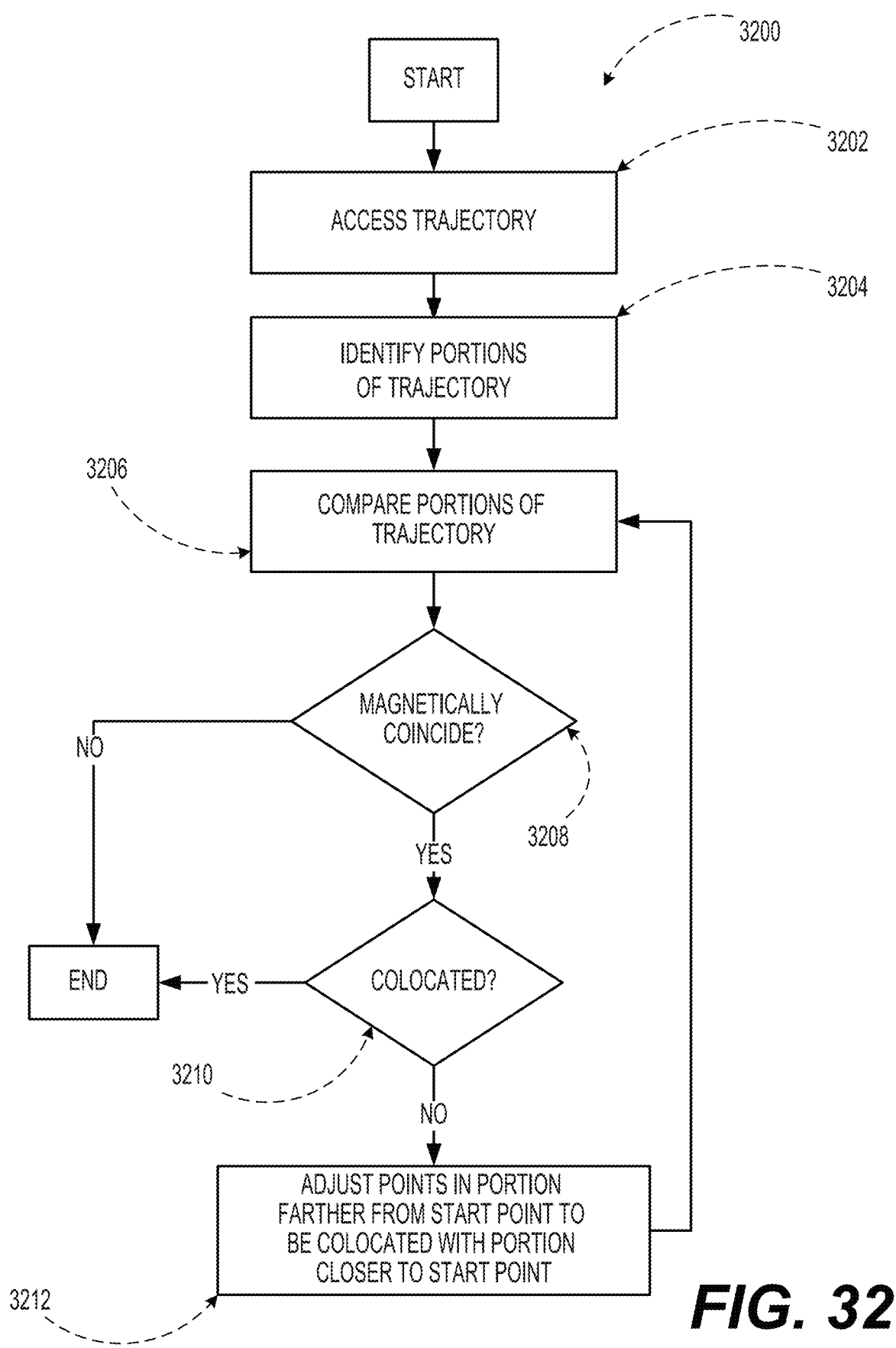
FIG. 32 illustrates an example method for using magnetic-sensor data to correct for INS drift.

FIG. 32 illustrates an example method 3200 for using magnetic-sensor data to correct for INS drift. Method 3200 begins at step 3202, where a trajectory (or a graphical representation of the trajectory, the data associated with the trajectory, or both) of device 2000 is accessed, e.g., by processor 2010 or another component of device 2000 or by another device. The trajectory may be a current trajectory of device 2000 (e.g. a trajectory that device 2000 is currently on or creating) or a past trajectory of device 2000 (e.g. a trajectory that device 2000 has completed). At step 3204, portions of the trajectory are identified. In particular embodiments, this may involve dividing the trajectory into portions based on one or more criteria. For example, a portion may be identified as a substantially straight segment between two turns in the trajectory. In addition or as an alternative, a portion may be identified as a substantially straight segment of the trajectory of a predetermined length. A turn may be a point or location where a change in heading within a predetermined range (e.g. approximately 1° to 359°, approximately 150 to 345°, approximately 90° to 270°, or another suitable range) occurs along the trajectory. The change in heading may be indicated, e.g., by data from INS 2004, magnetic-sensor system 2002, or any other sensor or sensor system of device 2000. Turns may be seen in FIG. 21B separating adjacent portions 2106 of trajectory 2100.

At step 3206, portions of the trajectory are compared with each other. As described above, this may involve determining differences or similarities between or among magnetic recordings corresponding to those portions of the trajectory. Differences or similarities between or among magnetic recordings may be determined using distance (or difference) values, as described above. In addition or as an alternative, differences or similarities between or among magnetic recordings may be determined using computer vision, human vision, or both. At step 3208, if no portions of the trajectory magnetically coincide with each other (e.g. one or more distance (or difference) values calculated between or among them are greater than one or more predetermined values), then method 3200 ends. At step 3208, if some of the portions of the trajectory magnetically coincide with each other (e.g. one or more distance (or difference) values calculated between or among them are less than one or more predetermined values), then method 3200 proceeds to step 3210. At step 3210, if all portions of the trajectory that magnetically coincide with each other are substantially colocated with each other (e.g. they are represented in the trajectory as occupying substantially the same physical points, locations, or paths in space), then method 3200 ends. At step 3210, if portions of the trajectory that magnetically coincide with each other are not substantially colocated with each other (e.g. they are represented in the trajectory as occupying different physical points, locations, or paths in space), then method 3200 proceeds to step 3212. At step 3212, the portion of the trajectory that is farther from a start point of the trajectory is moved or otherwise adjusted (in whole or in part) to be substantially colocated (in whole or in part) with the portion of the trajectory that is closer to the start point of the trajectory. Method 3200 then returns to step 3206. As described above, as portions of the trajectory are adjusted in this way, the relative headings of locations or points along the trajectory may be kept substantially constant (and not adjusted) and other portions of the trajectory may be moved or otherwise adjusted accordingly.

Particular embodiments may repeat one or more steps of method 3200, where appropriate. Although this disclosure describes and illustrates particular steps of method 3200 as occurring in a particular order, this disclosure contemplates any suitable steps of method 3200 occurring in any suitable order. Moreover, although this disclosure describes and illustrates an example method for using magnetic-sensor data to correct for INS drift including the particular steps of method 3200, this disclosure contemplates any suitable method for using magnetic-sensor data to correct for INS drift including any suitable steps, which may include all, some, or none of the steps of method 3200, where appropriate. Furthermore, although this disclosure describes and illustrates particular components, devices, or systems carrying out particular steps of method 3200, this disclosure contemplates any suitable combination of any suitable components, devices, or systems carrying out any suitable steps of method 3200.

Figure 33:
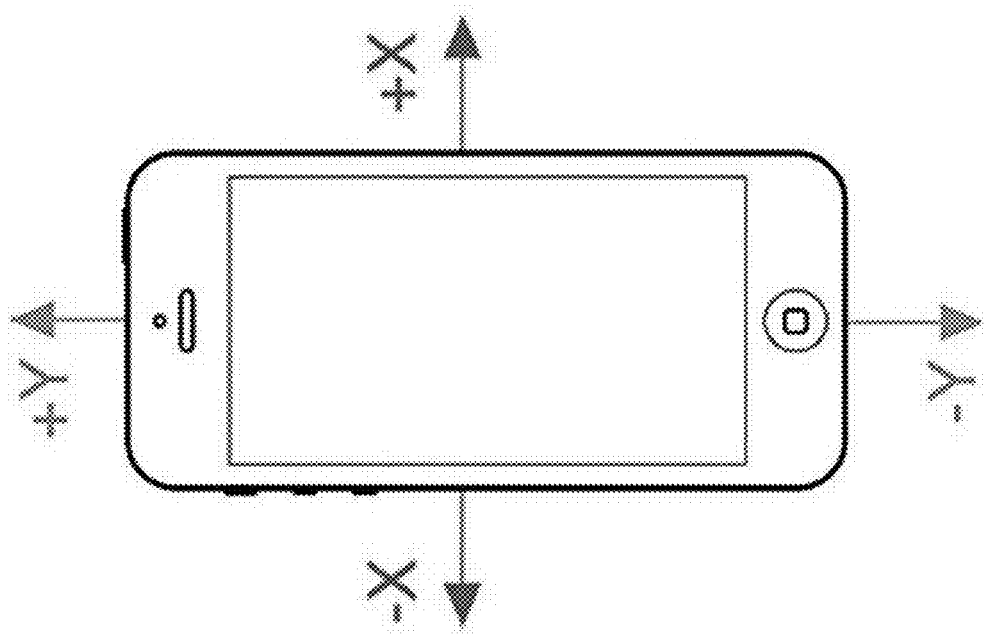
FIG. 33 illustrates example axes of an example smartphone.

There is a need for a reliable solution to the problem of detecting the direction of motion of a device (e.g. a smartphone) regardless of the device's orientation. For example, if a person is holding the smartphone in front and walks forward, it may be assumed that the direction of movement is along the positive direction of the y axis of the smartphone's body frame, as illustrated by way of example in FIG. 33. What happens when the person stops and starts backing up (e.g. walking backwards) without changing the orientation of the smartphone, such that the positive direction of the y axis is still pointing in the same direction the user was facing before the stop?Due to the noise level in the smartphone's accelerometer, it may be difficult to determine the change in the direction of the movement just by looking at the accelerometer's values. This problem is not limited to pedestrian movement or smartphones. In many cases, with a different combination of platforms and devices, when there are no other sensors present (e.g. wheel encoders, GPS, etc.), a similar issue may also occur. An example of this is a drifting boat or a slow flying aircraft.

Particular embodiments facilitate detecting a direction of movement of a smartphone or other mobile device (such as device 204 or device 2000) relative to a previous direction of movement of the mobile device. In particular embodiments, this may be done regardless of the orientation of the mobile device. For example, particular embodiments may facilitate determination of whether the mobile device has moved or is moving in an opposite direction (e.g. backwards) relative to previous movement of the mobile device. A user carrying a smartphone may walk in a first direction (e.g. north) for a first period of time and then walk in a second direction (e.g. south) that is approximately 180° from the first direction for a second period of time. This may happen when the user walks forward (e.g. facing north and moving northward) and then walks backwards (e.g. facing north and moving southward). This may also happen when the user walks forward in a direction (e.g. facing north and moving northward) and then turns around and walks forward in an opposite direction (e.g. facing south and moving southward). Although particular examples of backward movement or movement in opposite direction of particular devices are described and illustrated herein, this disclosure contemplate any suitable backward movement or movement in opposite direction of any suitable devices.

To detect a direction of movement of a mobile device relative to a previous direction of movement of the mobile device regardless of the orientation of the mobile device, particular embodiments may compare portions of a magnetic recording with each other. For example, in particular embodiments, a first portion of a magnetic recording of a trajectory of the mobile device (e.g. a portion of the magnetic recording before a change in direction of the movement of the mobile device) may be compared with a second portion of the magnetic recording (e.g. a portion of the magnetic recording after the change in direction). Based on the comparison, if the second portion substantially repeats the first portion in reverse order, then it may be determined that, relative to its movement during the first period of time corresponding to the first portion of the magnetic recording, the mobile device moved in an opposite direction (e.g. backwards) during the second period of time corresponding to the second portion of the magnetic recording. One or more portions of a magnetic recording may be reversed and compared with one or more other portions of the magnetic recording using quantitative comparison, difference or similarity measures, or any other method for comparing magnetic recordings or portions of magnetic recordings disclosed or illustrated herein or any other suitable method. In particular embodiments, to account or adjust for variation in speed (e.g. walking backwards slower than walking forward), this comparison may also involve centering or scaling of one or more the portions being compared with each other using one or more normalization or standardization methods disclosed or illustrated herein or any other suitable normalization or standardization method.

Figure 34:
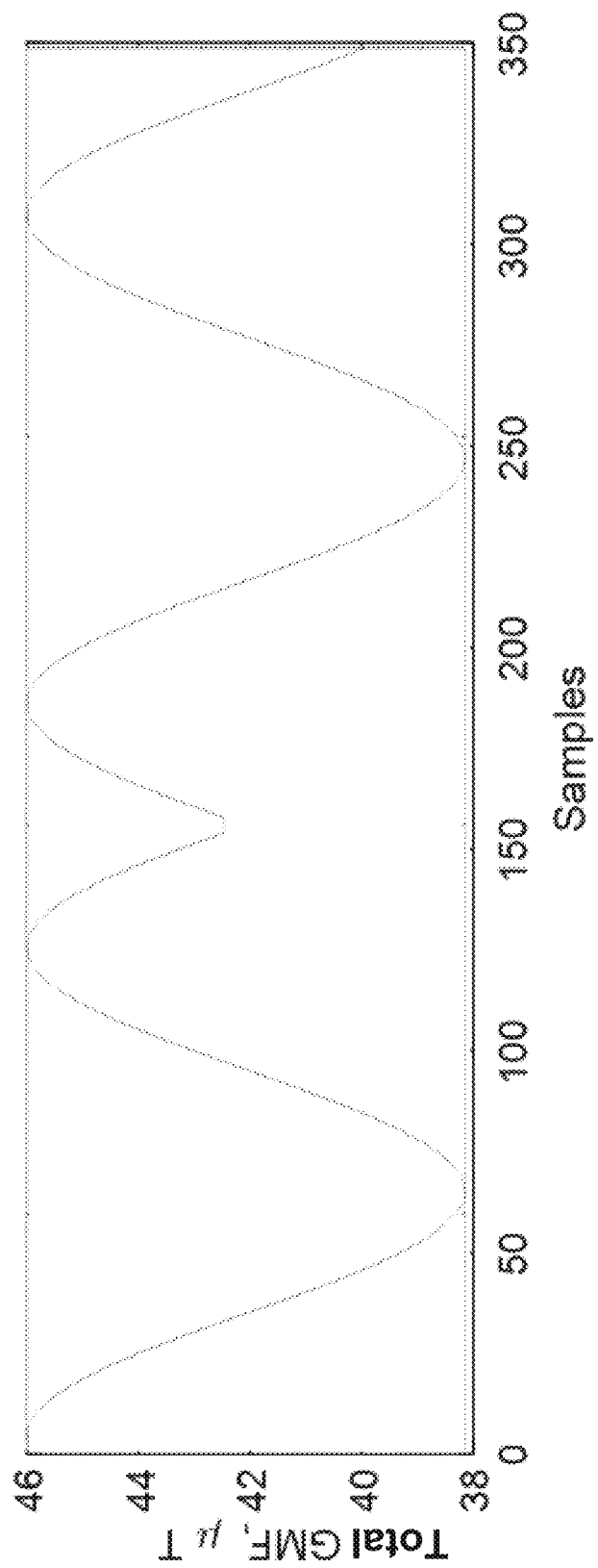
FIG. 34 illustrates an example plot of an example magnetic recording of an example trajectory of a mobile device that has moved in an opposite direction.
Figure 35:
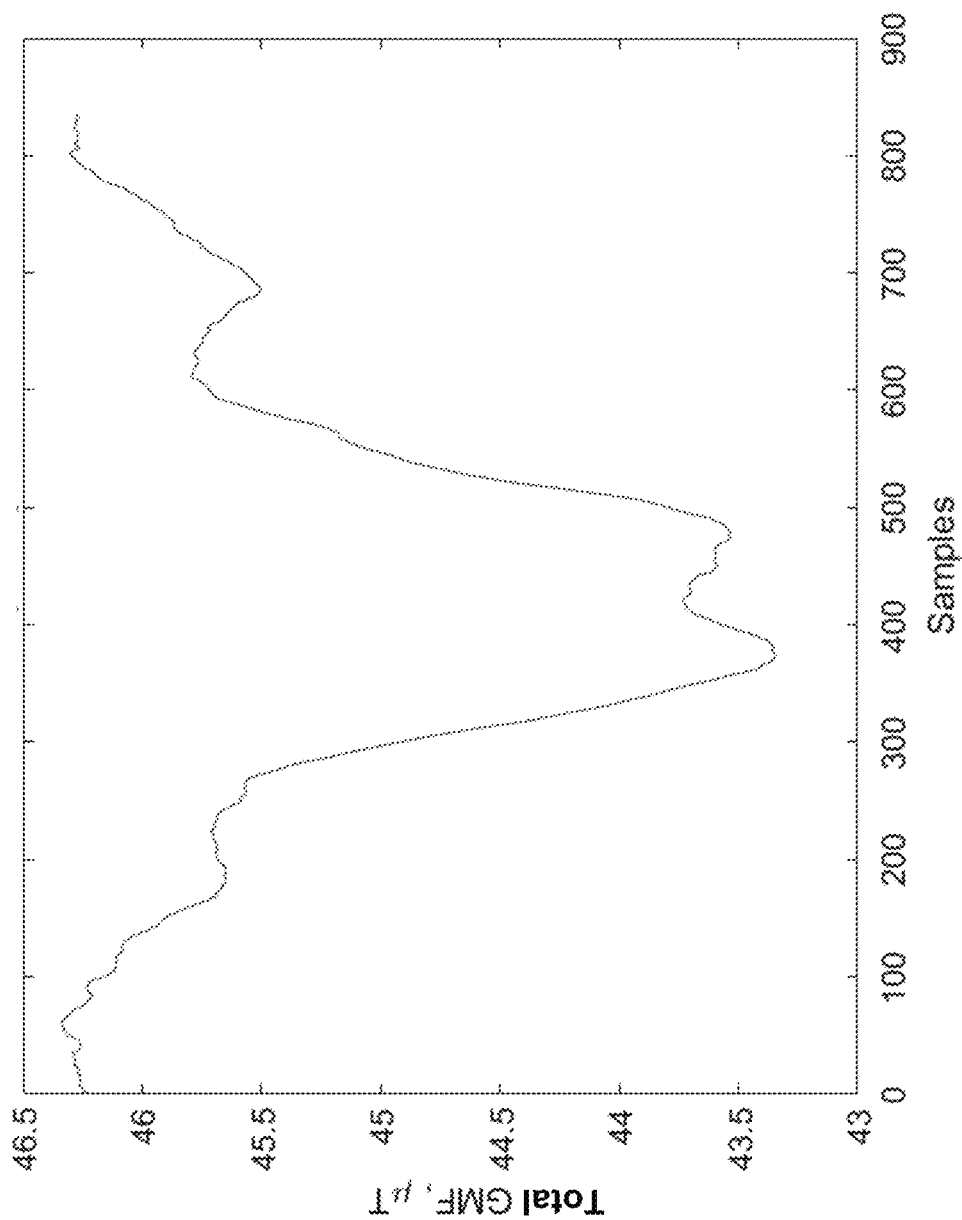
FIG. 35 illustrates another example plot of an example magnetic recording of an example trajectory of a mobile device that has moved in an opposite direction.

FIG. 34 illustrates an example plot of an example magnetic recording of an example trajectory of a mobile device that has moved in an opposite direction (e.g. backwards). In the trajectory of FIG. 34, the user was moving forward during the first 160 recorded samples (samples 1-160) and then was backing up during the subsequent 190 recorded samples (samples 161-350). It can be seen from a comparison of samples 1-160 with samples 161-350 that the magnetic values (total strength of the ambient magnetic field) are repeated in reverse order. FIG. 35 illustrates another example plot of an example magnetic recording of an example trajectory of a mobile device that has moved in an opposite direction (e.g. backwards). In the trajectory of FIG. 35, the user was moving forward during the first 420 recorded samples (samples 1-420) and then was backing up during the subsequent 430 recorded samples (samples 421-810). It can be seen from a comparison of samples 1-420 with samples 421-810 that the magnetic values (total strength of the ambient magnetic field) are repeated in reverse order.

Figure 36:
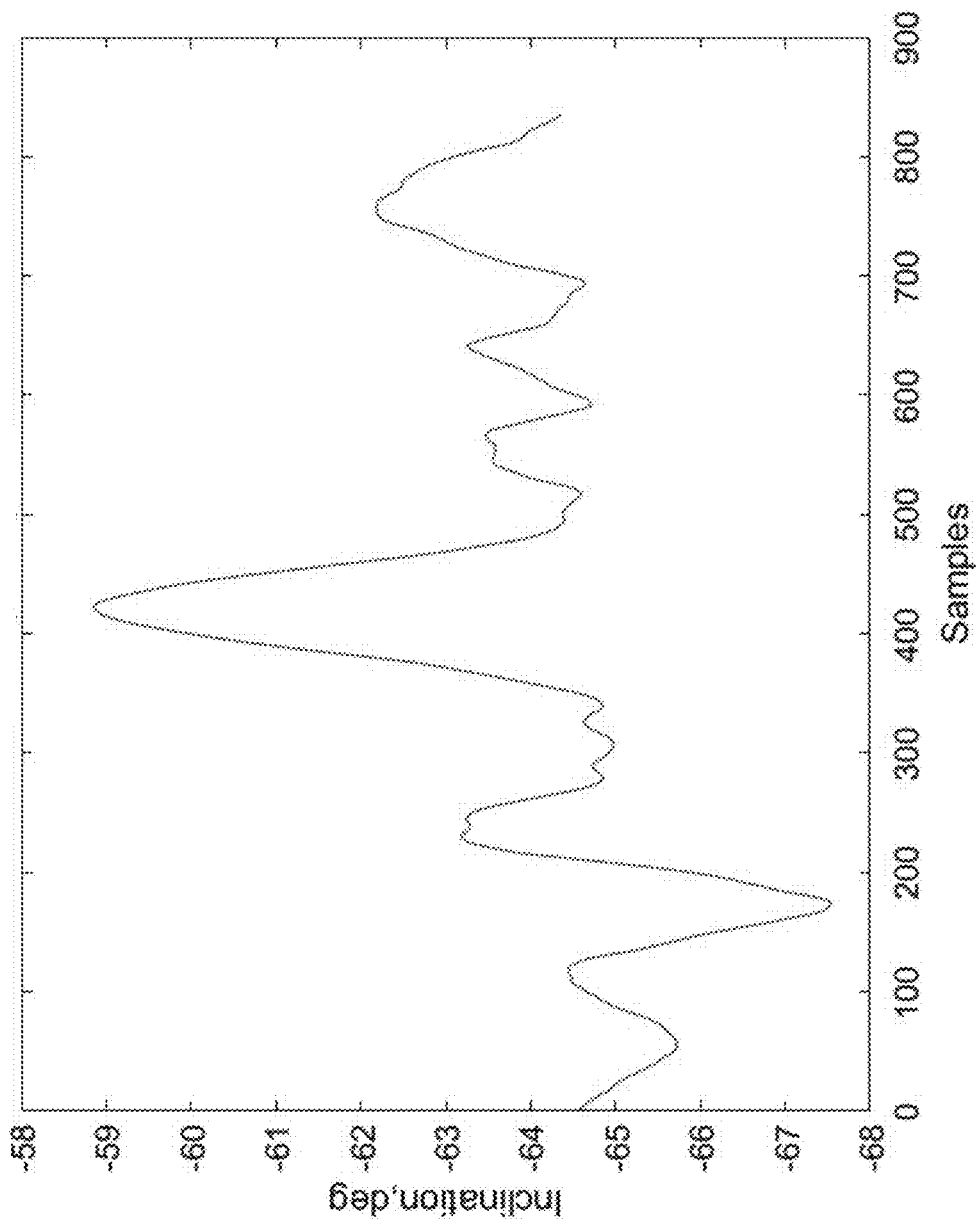
FIG. 36 illustrates example values of inclination angle corresponding to the magnetic recording plotted in FIG. 35.

In particular embodiments, in contrast to the total values of the magnetic field substantially repeating in reverse order, inclination angles do not repeat in reverse order during movement in an opposite direction (e.g. backward movement). For example, if the values of the total magnetic field substantially repeat in reverse order but the corresponding values of the inclination angle do not substantially repeat in reverse order, then it may be determined with greater confidence that the mobile device is moving or has moved in an opposite direction (e.g. backwards). FIG. 36 illustrates example values of inclination angle corresponding to the magnetic recording plotted in FIG. 35. While in FIG. 35 the values of the total magnetic field in samples 1-420 are substantially repeated in reverse in samples 421-810, in FIG. 36 the values of inclination angle in corresponding samples 1-420 are not substantially repeated in corresponding samples 421-810. In particular embodiments, this lack of correlation may further indicate that the mobile device did in fact move in an opposite direction (e.g. backwards) during samples 421-810 relative to its movement during samples 1-420.

Figure 37:
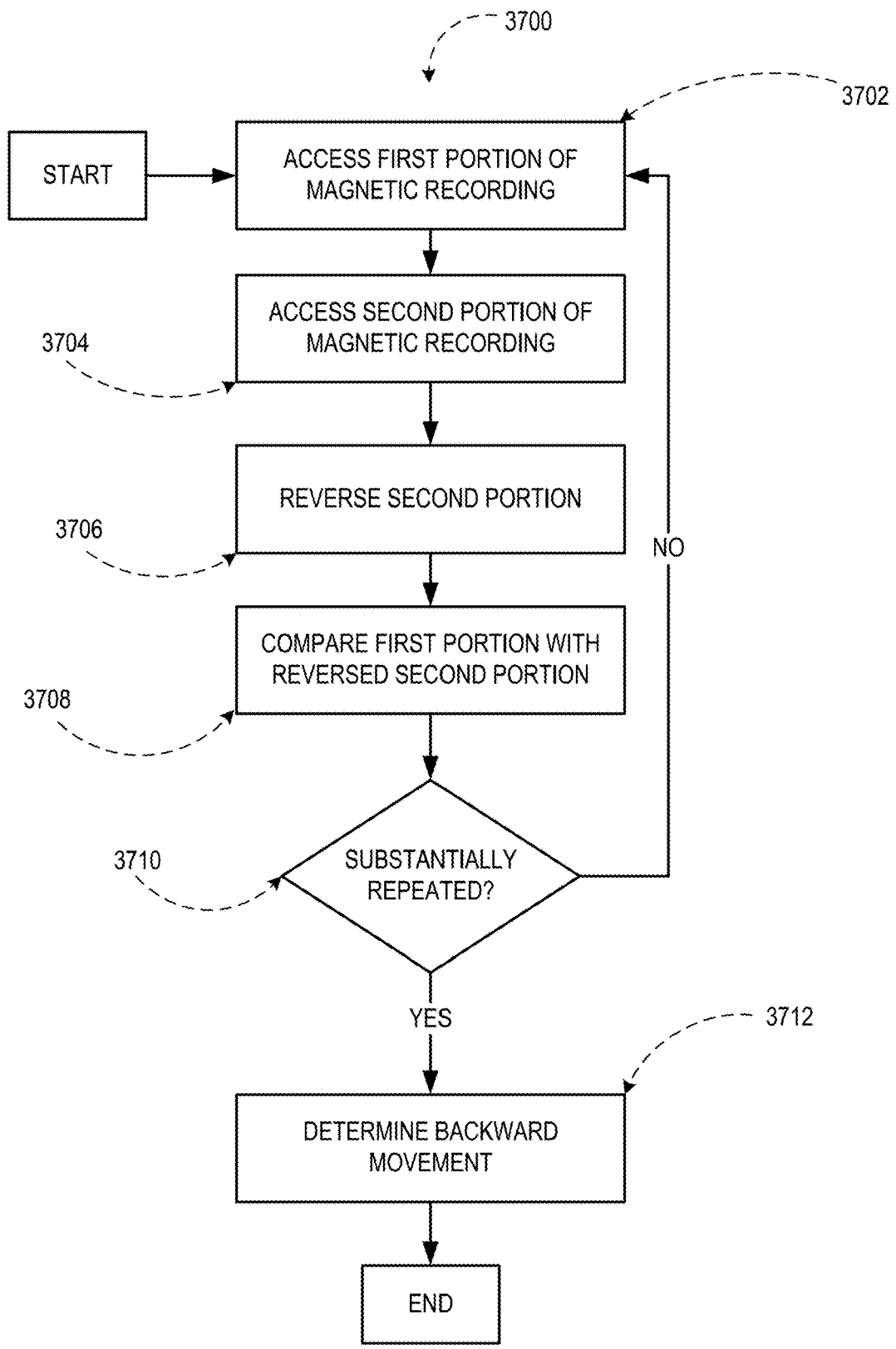
FIG. 37 illustrates an example method for determining whether a mobile device moved in an opposite direction relative to a previous movement of the mobile device.

FIG. 37 illustrates an example method 3700 for determining whether a smartphone or other mobile device (such as device 204 or device 2000) moved in an opposite direction (e.g. backwards) relative to a previous movement of the mobile device. Method 3700 begins at step 3702, where a first portion of a magnetic recording is accessed. The magnetic recording may correspond to a trajectory of the mobile device, and the first portion of the magnetic recording may correspond to a first period of time. The end of the first portion of the magnetic recording may correspond to a stop in movement of the mobile device. At step 3704, a second portion of the magnetic recording is accessed. The second portion of the magnetic recording may correspond to a second period of time after the first period of time. The beginning of the second portion of the magnetic recording may correspond to the stop in movement of the mobile device that corresponds to the end of the first portion of the magnetic recording. In particular embodiments, a mobile device's movement along a trajectory may stop before its direction of movement is reversed. For example, the first portion may be the former portion of a sliding window (e.g. samples 1-160 of 350 or samples 1-420 of 810) and the second portion may be the latter portion of the sliding window (e.g. samples 161-350 of 350 or samples 421-810 of 810). At step 3706, the second portion of the magnetic recording is reversed. At step 308, the first portion of the magnetic recording is compared with the reversed second portion of the magnetic recording. This comparison may involve centering or scaling of either or both of the first and second portions using one or more normalization or standardization methods disclosed or illustrated herein or any other suitable normalization or standardization methods. This comparison may also involve quantitative comparison, difference or similarity measures, or another method for comparing magnetic recordings or portions of magnetic recordings disclosed or illustrated herein or any other suitable methods for comparing magnetic signatures or portions of magnetic signatures with each other.

At step 3710, if it is determined based on the comparison at step 3708 that the first portion of the magnetic recording is substantially repeated in reverse order in the second portion of the magnetic recording, then method 3700 proceeds to step 3712. At step 3712, it is determined that the mobile device moved in an opposite direction (e.g. backward) during the second period of time relative to its movement during the first period of time, at which point method 3700 ends. At step 3710, if it is determined based on the comparison at step 3708 that the first portion of the magnetic recording is not substantially repeated in reverse order in the second portion of the magnetic recording, then method 3700 returns to step 3702, where other first and second portions of the magnetic recording (e.g. as the mobile device continues to move along its trajectory) are accessed and compared with each other.

Particular embodiments may repeat one or more steps of method 3700, where appropriate. Although this disclosure describes and illustrates particular steps of method 3700 as occurring in a particular order, this disclosure contemplates any suitable steps of method 3700 occurring in any suitable order. Moreover, although this disclosure describes and illustrates an example method for detecting a direction of movement of a smartphone or other mobile device relative to a previous direction of movement of the mobile device including the particular steps of method 3700, this disclosure contemplates any suitable method for detecting a direction of movement of a smartphone or other mobile device relative to a previous direction of movement of the mobile device including any suitable steps, which may include all, some, or none of the steps of method 3700, where appropriate. Furthermore, although this disclosure describes and illustrates particular components, devices, or systems carrying out particular steps of method 3700, this disclosure contemplates any suitable combination of any suitable components, devices, or systems carrying out any suitable steps of method 3700.

Figure 38:
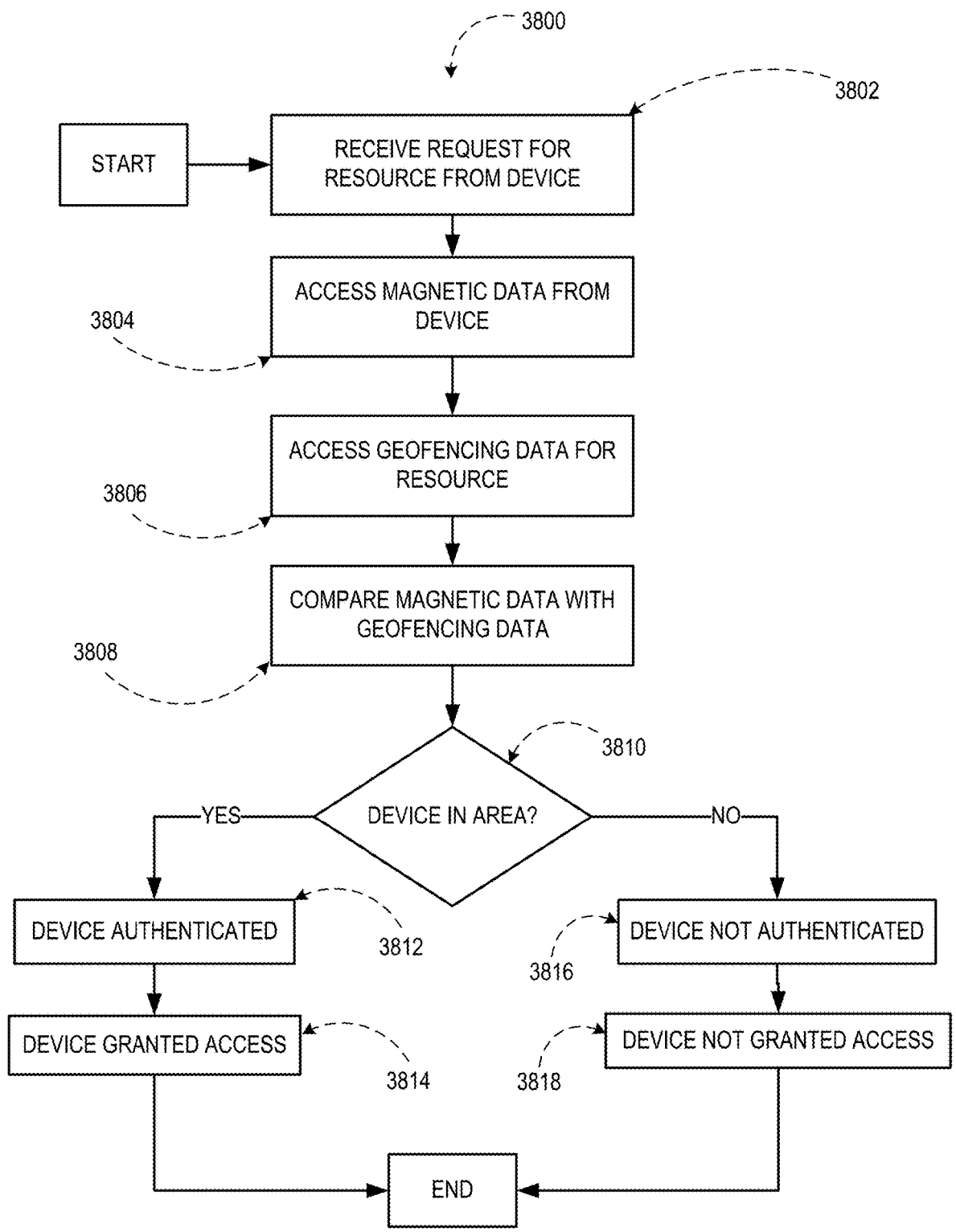
FIG. 38 illustrates an example method for authenticating a device using geofencing data.

FIG. 38 illustrates an example method 3800 for authenticating a device 204 using geofencing data. Method 3800 begins at step 3802, where authentication server 206 receives from device 204 a request for access to a resource 208. At step 3804, authentication server 206 accesses magnetic data from device 204. As described above, the magnetic data from device 204 may be generated and communicated along with the request. In addition or as an alternative, the magnetic data from device 204 may be communicated prior to or otherwise separate from the request. For example, the magnetic data may be generated and communicated to authentication server 206 by an automatic or background operation running in the background on device 204, and may run continually or semi-continually, without being requested or otherwise manually initiated by user 202. As further described above, the magnetic data may include one or more candidate magnetic recordings generated by device 204. In addition or as an alternative, the magnetic data may be one or more magnetic-field values collected by device 204.

At step 3806, authentication server 206 accesses geofencing data corresponding to resource 208 requested by device 204. The geofencing data corresponds to an area that device 204 must be located in to access resource 208. As described above, the geofencing data may include one or more magnetic recordings corresponding to that area. In addition or as an alternative, the geofencing data may include one or more values of the magnetic field in that area. The magnetic recordings or magnetic-field values may have been generated or collected by device 204 or one or more other devices 204 when they were located in that area. One or more of the magnetic recordings or magnetic-field values may have been generated or collected by an automatic or background operation running in the background on device 204 or other devices 204, without being requested or otherwise manually initiated by users 202. In addition or as an alternative, one or more of the magnetic-field values may have been obtained from a third-party or other source, such as the WMM, IGRF model, or EMM.

At step 3808, authentication server 206 compares the magnetic data accessed at step 3804 with the geofencing data accessed at step 3806 to determine whether device 204 is located in the area corresponding to the geofencing data for resource 208. As described above, this comparison may include comparing one or more candidate magnetic recordings with one or more reference magnetic recordings and may include one or more difference or similarity measures. By way of example, if a difference or similarity (or distance) calculated between the candidate and reference magnetic recordings is less than a predetermined value (or threshold value), then it may be determined that device 204 is located in the area corresponding to the geofencing data. If the difference or similarity (or distance) is not less than the predetermined value (or threshold value), then it may be determined that device 204 is not located in the area corresponding to the geofencing data.

In addition or as an alternative to including one or more comparisons of one or more candidate magnetic recordings with one or more reference magnetic recordings, the comparison at step 3808 may include comparing one or more magnetic-field values in the magnetic data accessed at step 3804 with one or more magnetic-field values in the geofencing data accessed at step 3806, as described above. By way of example, if one or more differences (or a predetermined sufficient number or percentage of the differences) calculated between the magnetic-field values being compared are less than predetermined values (or threshold values) for those comparisons, then it may be determined that device 204 is located in the area corresponding to the geofencing data. If one or more differences (or a predetermined number or percentage of the differences) are not less than the predetermined values (or threshold values) for those comparisons, then it may be determined that device 204 is not located in the area corresponding to the geofencing data.

At step 3810, if it is determined at step 3808 that device 204 is located in the area corresponding to the geofencing data for resource 208, then method 3800 proceeds to step 3812, where device 204 is deemed authenticated by authentication server 206. At step 3814, device 204 is granted access to resource 208, where method 3800 ends. At step 3810, if it is determined at step 3808 that device 204 is not located in the area corresponding to the geofencing data for resource 208, then method 3800 proceeds to step 3816, where device 204 is not deemed authenticated by authentication server 206. At step 3818, device 204 is not granted access to resource 208, where method 3800 ends.

Particular embodiments may repeat one or more steps of method 3800, where appropriate. Although this disclosure describes and illustrates particular steps of method 3800 as occurring in a particular order, this disclosure contemplates any suitable steps of method 3800 occurring in any suitable order. Moreover, although this disclosure describes and illustrates an example method for authenticating a device using geofencing data including the particular steps of method 3800, this disclosure contemplates any suitable method for authenticating a device using geofencing data including any suitable steps, which may include all, some, or none of the steps of method 3800, where appropriate. Furthermore, although this disclosure describes and illustrates particular components, devices, or systems carrying out particular steps of method 3800, this disclosure contemplates any suitable combination of any suitable components, devices, or systems carrying out any suitable steps of method 3800.

Figure 39:
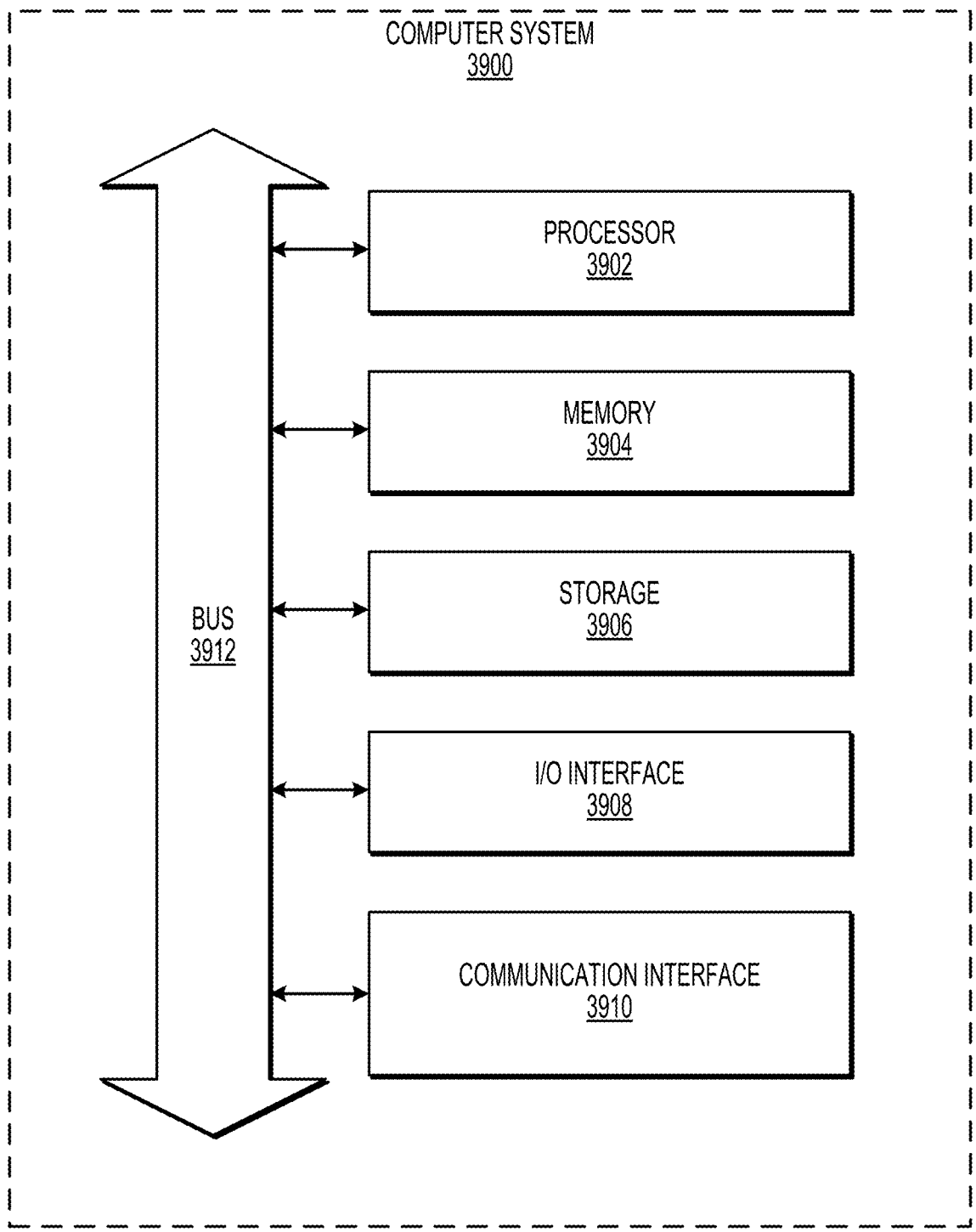
FIG. 39 illustrates an example computer system.

FIG. 39 illustrates an example computer system 3900. In articular embodiments, one or more computer systems 3900 perform one or more steps of one or more methods described or illustrated herein. In particular embodiments, one or more computer systems 3900 provide functionality described or illustrated herein. In particular embodiments, software running on one or more computer systems 3900 performs one or more steps of one or more methods described or illustrated herein or provides functionality described or illustrated herein. Particular embodiments include one or more portions of one or more computer systems 3900. Herein, reference to a computer system may include a computing device, and vice versa, where appropriate. Moreover, reference herein to a computer system may include one or more computer systems, where appropriate. With reference to FIG. 2, a device 204 may include one or more computer systems 3900 (or one or more components of a computer system 3900). Similarly, authentication server 206 and resource 208 may each include one or more computer systems 3900 (or one or more components of a computer system 3900). With reference to FIG. 20, a device 2000 may include one or more computer systems 3900 (or one or more components of a computer system 3900).

This disclosure contemplates any suitable number of computer systems 3900. This disclosure contemplates computer system 3900 taking any suitable physical form. As example and not by way of limitation, computer system 3900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a PDA, a server, a tablet computer system, or a combination of two or more of these. Where appropriate, computer system 3900 may include one or more computer systems 3900; be unitary or distributed; span multiple locations; span multiple machines; span multiple data centers; or reside in a cloud, which may include one or more cloud components in one or more networks. Where appropriate, one or more computer systems 3900 may perform without substantial spatial or temporal limitation one or more steps of one or more methods described or illustrated herein. As an example and not by way of limitation, one or more computer systems 3900 may perform in real time or in batch mode one or more steps of one or more methods described or illustrated herein. One or more computer systems 3900 may perform at different times or at different locations one or more steps of one or more methods described or illustrated herein, where appropriate.

In particular embodiments, computer system 3900 includes a processor 3902, memory 3904, storage 3906, an input/output (I/O) interface 3908, a communication interface 3910, and a bus 3912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3902 includes hardware for executing instructions, such as those making up a computer program. As an example and not by way of limitation, to execute instructions, processor 3902 may retrieve (or fetch) the instructions from an internal register, an internal cache, memory 3904, or storage 3906; decode and execute them; and then write one or more results to an internal register, an internal cache, memory 3904, or storage 3906. In particular embodiments, processor 3902 may include one or more internal caches for data, instructions, or addresses. This disclosure contemplates processor 3902 including any suitable number of any suitable internal caches, where appropriate. As an example and not by way of limitation, processor 3902 may include one or more instruction caches, one or more data caches, and one or more translation lookaside buffers (TLBs). Instructions in the instruction caches may be copies of instructions in memory 3904 or storage 3906, and the instruction caches may speed up retrieval of those instructions by processor 3902. Data in the data caches may be copies of data in memory 3904 or storage 3906 for instructions executing at processor 3902 to operate on; the results of previous instructions executed at processor 3902 for access by subsequent instructions executing at processor 3902 or for writing to memory 3904 or storage 3906; or other suitable data. The data caches may speed up read or write operations by processor 3902. The TLBs may speed up virtual-address translation for processor 3902. In particular embodiments, processor 3902 may include one or more internal registers for data, instructions, or addresses. This disclosure contemplates processor 3902 including any suitable number of any suitable internal registers, where appropriate. Where appropriate, processor 3902 may include one or more ALUs; be a multi-core processor; or include one or more processors 3902. Although this disclosure describes and illustrates a particular processor, this disclosure contemplates any suitable processor.

In particular embodiments, memory 3904 includes main memory for storing instructions for processor 3902 to execute or data for processor 3902 to operate on. As an example and not by way of limitation, computer system 3900 may load instructions from storage 3906 or another source (such as, for example, another computer system 3900) to memory 3904. Processor 3902 may then load the instructions from memory 3904 to an internal register or internal cache. To execute the instructions, processor 3902 may retrieve the instructions from the internal register or internal cache and decode them. During or after execution of the instructions, processor 3902 may write one or more results (which may be intermediate or final results) to the internal register or internal cache. Processor 3902 may then write one or more of those results to memory 3904. In particular embodiments, processor 3902 executes only instructions in one or more internal registers or internal caches or in memory 3904 (as opposed to storage 3906 or elsewhere) and operates only on data in one or more internal registers or internal caches or in memory 3904 (as opposed to storage 3906 or elsewhere). One or more memory buses (which may each include an address bus and a data bus) may couple processor 3902 to memory 3904. Bus 3912 may include one or more memory buses, as described below. In particular embodiments, one or more memory management units (MMUs) reside between processor 3902 and memory 3904 and facilitate accesses to memory 3904 requested by processor 3902. In particular embodiments, memory 3904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3904 may include one or more memories 3904, where appropriate. Although this disclosure describes and illustrates particular memory, this disclosure contemplates any suitable memory.

In particular embodiments, storage 3906 includes mass storage for data or instructions. As an example and not by way of limitation, storage 3906 may include an HDD, a floppy disk drive, flash memory, an optical disc, a magneto-optical disc, magnetic tape, or a USB drive or a combination of two or more of these. Storage 3906 may include removable or non-removable (or fixed) media, where appropriate. Storage 3906 may be internal or external to computer system 3900, where appropriate. In particular embodiments, storage 3906 is non-volatile, solid-state memory. In particular embodiments, storage 3906 includes ROM. Where appropriate, this ROM may be mask-programmed ROM, PROM, EPROM, EEPROM, EAROM, or flash memory or a combination of two or more of these. This disclosure contemplates mass storage 3906 taking any suitable physical form. Storage 3906 may include one or more storage control units facilitating communication between processor 3902 and storage 3906, where appropriate. Where appropriate, storage 3906 may include one or more storages 3906. Although this disclosure describes and illustrates particular storage, this disclosure contemplates any suitable storage.

In particular embodiments, I/O interface 3908 includes hardware, software, or both, providing one or more interfaces for communication between computer system 3900 and one or more I/O devices. Computer system 3900 may include one or more of these I/O devices, where appropriate. One or more of these I/O devices may enable communication between a person and computer system 3900. As an example and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 3908 for them. Where appropriate, I/O interface 3908 may include one or more device or software drivers enabling processor 3902 to drive one or more of these I/O devices. I/O interface 3908 may include one or more I/O interfaces 3908, where appropriate. Although this disclosure describes and illustrates a particular I/O interface, this disclosure contemplates any suitable I/O interface.

In particular embodiments, communication interface 3910 includes hardware, software, or both providing one or more interfaces for communication (such as, for example, packet-based communication) between computer system 3900 and one or more other computer systems 3900 or one or more networks. As an example and not by way of limitation, communication interface 3910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3910 for it. As an example and not by way of limitation, computer system 3900 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 3900 may communicate with a WPAN (such as, for example, a BLUETOOTH WPAN), a WI-FI network, a WIMAX network, a cellular telephone network (such as, for example, a GSM network), or other suitable wireless network or a combination of two or more of these. Computer system 3900 may include any suitable communication interface 3910 for any of these networks, where appropriate. Communication interface 3910 may include one or more communication interfaces 3910, where appropriate.

Although this disclosure describes and illustrates a particular communication interface, this disclosure contemplates any suitable communication interface.

In particular embodiments, bus 3912 includes hardware, software, or both coupling components of computer system 3900 to each other. As an example and not by way of limitation, bus 3912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3912 may include one or more buses 3912, where appropriate. Although this disclosure describes and illustrates a particular bus, this disclosure contemplates any suitable bus or interconnect.

Herein, a computer-readable non-transitory storage medium or media may include one or more semiconductor-based or other ICs (such, as for example, field-programmable gate arrays (FPGAs) or application-specific ICs (ASICs)), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure includes all changes, substitutions, variations, alterations, and modifications to the example embodiments described or illustrated herein that a person having ordinary skill in the art would comprehend. The scope of this disclosure is not limited to the example embodiments described or illustrated herein. The embodiments disclosed herein are only examples, and the scope of this disclosure is not limited to them. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Particular embodiments may include all, some, or none of the components, elements, features, functions, operations, or steps of the embodiments disclosed herein. Furthermore, reference in the appended claims to an apparatus or system or a component of an apparatus or system being adapted to, arranged to, capable of, configured to, enabled to, operable to, or operative to perform a particular function includes that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by an electronic device, accessing a first series of first magnetic values that represents a first magnetic recording that comprises a first set of first magnetic measurements that are each represented by one of the first magnetic values;
by an electronic device, accessing a second series of second magnetic values that represents a second magnetic recording that comprises a second set of second magnetic measurements that are each represented by one of the second magnetic values;
by an electronic device, approximately aligning the first and second series with each other;
by an electronic device, calculating a difference between the first and second series as aligned with each other; and
by an electronic device, determining a similarity between the first and second series based on the difference.

2. The method of claim 1, wherein:
the first set is a first time series and the second set is a second time series; or
the first set is a first distance series and the second set is a second distance series.

3. The method of claim 1, wherein the difference comprises a sum of one or more Euclidean distances, dynamic time warping (DTW) distances, or Fréchet distances between corresponding first and second magnetic values.

4. The method of claim 1, wherein:
determining the similarity between the first and second series based on the difference comprises:
comparing the difference with a predetermined threshold; and
determining that the first and second series are similar to each other when the difference is less than the predetermined threshold; and
the method further comprises authenticating a user or a device associated with the first magnetic recording when the first and second series are determined to be similar to each other.

5. The method of claim 1, wherein the first and second magnetic measurements comprise one or more of a total value of a magnetic field, an inclination angle of the magnetic field, a declination angle of the magnetic field, an x component of the magnetic field, a y component of the magnetic field, or a z component of the magnetic field or a magnetic-susceptibility or magnetic-conductivity value.

6. The method of claim 1, wherein:
each of the first and second magnetic measurements comprises a plurality of magnetic components; and
each of the first and second magnetic values is a square root of a sum of squares of the magnetic components of the first or second magnetic measurement represented by the first or second magnetic value.

7. The method of claim 1, wherein approximately aligning the first and second series with each other comprises spline interpolation of the first and second series to produce a same number of elements in the first and second series.

8. The method of claim 1, wherein approximately aligning the first and second series with each other comprises centering the first and second series by subtracting a first average of the first magnetic values from each of the first magnetic values and subtracting a second average of the second magnetic values from each of the second magnetic values.

9. The method of claim 1, wherein approximately aligning the first and second series with each other comprises scaling the first and second series by dividing each of the first magnetic values by a first weighted average of the first magnetic values and dividing each of the second magnetic values by a second weighted average of the second magnetic values.

10. The method of claim 1, wherein the first series of first magnetic values and the second series of second magnetic values were generated by the electronic device.

11. The method of claim 1, wherein the first series of first magnetic values and the second series of second magnetic values were generated by another electronic device.

12. One or more computer-readable non-transitory storage media embodying software that is operable when executed to:
access a first series of first magnetic values that represents a first magnetic recording that comprises a first set of first magnetic measurements, wherein each of the first magnetic values represents one of the first magnetic measurements;
access a second series of second magnetic values that represents a second magnetic recording that comprises a second set of second magnetic measurements, wherein each of the second magnetic values represents one of the second magnetic measurements;
approximately align the first and second series with each other;
calculate a difference between the first and second series as aligned with each other; and
determine a similarity between the first and second series based on the difference.

13. The media of claim 12, wherein:
the first set is a first time series and the second set is a second time series; or
the first set is a first distance series and the second set is a second distance series.

14. The media of claim 12, wherein the difference comprises a sum of one or more Euclidean distances, dynamic time warping (DTW) distances, or Fréchet distances between corresponding first and second magnetic values.

15. The media of claim 12, wherein:
determining the similarity between the first and second series based on the difference comprises:
comparing the difference with a predetermined threshold; and
determining that the first and second series are similar to each other when the difference is less than the predetermined threshold; and
the software is further operable when executed to authenticate a user or a device associated with the first magnetic recording when the first and second series are determined to be similar to each other.

16. The media of claim 12, wherein the first and second magnetic measurements comprise measurements of one or more of magnetic susceptibility, magnetic conductivity, magnetic-field strength, magnetic-field inclination angle, or magnetic-field declination angle.

17. The media of claim 12, wherein:
each of the first and second magnetic measurements comprises a plurality of magnetic components; and
each of the first and second magnetic values is a square root of a sum of squares of the magnetic components of the first or second magnetic measurement represented by the first or second magnetic value.

18. The media of claim 12, wherein approximately aligning the first and second series with each other comprises spline interpolation of the first and second series to produce a same number of elements in the first and second series.

19. The media of claim 12, wherein approximately aligning the first and second series with each other comprises centering the first and second series by subtracting a first average of the first magnetic values from each of the first magnetic values and subtracting a second average of the second magnetic values from each of the second magnetic values.

20. The media of claim 12, wherein approximately aligning the first and second series with each other comprises scaling the first and second series by dividing each of the first magnetic values by a first weighted average of the first magnetic values and dividing each of the second magnetic values by a second weighted average of the second magnetic values.

21. A system comprising:
one or more processors; and
one or more computer-readable non-transitory storage media coupled to one or more of the processors and comprising instructions operable when executed by one or more of the processors to cause the system to:
access a first series of first magnetic values that represents a first magnetic recording that comprises a first set of first magnetic measurements, wherein each of the first magnetic values represents one of the first magnetic measurements;
access a second series of second magnetic values that represents a second magnetic recording that comprises a second set of second magnetic measurements, wherein each of the second magnetic values represents one of the second magnetic measurements;
approximately align the first and second series with each other;
calculate a difference between the first and second series as aligned with each other; and
determine a similarity between the first and second series based on the difference.

22. The system of claim 21, wherein:
the first set is a first time series and the second set is a second time series; or
the first set is a first distance series and the second set is a second distance series.

23. The system of claim 21, wherein the difference comprises a sum of one or more Euclidean distances, dynamic time warping (DTW) distances, or Fréchet distances between corresponding first and second magnetic values.

24. The system of claim 21, wherein:
determining the similarity between the first and second series based on the difference comprises:
comparing the difference with a predetermined threshold; and
determining that the first and second series are similar to each other when the difference is less than the predetermined threshold; and
the instructions are further operable when executed to authenticate a user or a device associated with the first magnetic recording when the first and second series are determined to be similar to each other.

25. The system of claim 21, wherein the first and second magnetic measurements comprise measurements of one or more of magnetic susceptibility, magnetic conductivity, magnetic-field strength, magnetic-field inclination angle, or magnetic-field declination angle.

26. The system of claim 21, wherein:
each of the first and second magnetic measurements comprises a plurality of magnetic components; and
each of the first and second magnetic values is a square root of a sum of squares of the magnetic components of the first or second magnetic measurement represented by the first or second magnetic value.

27. The system of claim 21, wherein approximately aligning the first and second series with each other comprises spline interpolation of the first and second series to produce a same number of elements in the first and second series.

28. The system of claim 21, wherein approximately aligning the first and second series with each other comprises centering the first and second series by subtracting a first average of the first magnetic values from each of the first magnetic values and subtracting a second average of the second magnetic values from each of the second magnetic values.

29. The system of claim 21, wherein approximately aligning the first and second series with each other comprises scaling the first and second series by dividing each of the first magnetic values by a first weighted average of the first magnetic values and dividing each of the second magnetic values by a second weighted average of the second magnetic values.

30. A system comprising:
means for accessing a first series of first magnetic values that represents a first magnetic recording that comprises a first set of first magnetic measurements, wherein each of the first magnetic values represents one of the first magnetic measurements;
means for accessing a second series of second magnetic values that represents a second magnetic recording that comprises a second set of second magnetic measurements, wherein each of the second magnetic values represents one of the second magnetic measurements;
means for approximately aligning the first and second series with each other;
means for calculating a difference between the first and second series as aligned with each other; and
means for determining a similarity between the first and second series based on the difference.

* * * * *